US012360608B2

(12) United States Patent
Reisman et al.

(10) Patent No.: US 12,360,608 B2
(45) Date of Patent: Jul. 15, 2025

(54) NAVIGATING A USER INTERFACE USING IN-AIR GESTURES DETECTED VIA NEUROMUSCULAR-SIGNAL SENSORS OF A WEARABLE DEVICE, AND SYSTEMS AND METHODS OF USE THEREOF

(71) Applicant: Meta Platforms Technologies, LLC, Menlo Park, CA (US)

(72) Inventors: Jason Lowell Reisman, Brooklyn, NY (US); Luke O'Connor, Toronto (CA); Christopher Anderson, New York, NY (US); Adam Berenzweig, Brooklyn, NY (US); Austin Ha, Flushing, NY (US); Zaina Edelson, New York, NY (US); Szeyin Lee, Seattle, WA (US); Paulo Jose Telo Coelho, Seattle, WA (US); Edith Comas, Brooklyn, NY (US); Shaker Islam, Brooklyn, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/364,396

(22) Filed: Aug. 2, 2023

(65) Prior Publication Data
US 2024/0061514 A1 Feb. 22, 2024

Related U.S. Application Data

(63) Continuation-in-part of application No. 18/359,855, filed on Jul. 26, 2023.
(Continued)

(51) Int. Cl.
G06F 3/01 (2006.01)
G06F 3/0482 (2013.01)
(Continued)

(52) U.S. Cl.
CPC .............. G06F 3/017 (2013.01); G06F 3/015 (2013.01); G06F 3/0482 (2013.01); G06F 3/0485 (2013.01); G06F 3/0487 (2013.01)

(58) Field of Classification Search
CPC ........ G06F 3/015; G06F 3/017; G06F 3/0482; G06F 3/0485; G06F 3/0487; G06F 3/0346; G06F 1/163
See application file for complete search history.

(56) References Cited

U.S. PATENT DOCUMENTS 9,377,860 B1  6/2016  Weber et al.
10,088,908 B1  10/2018  Poupyrev et al.
(Continued)

OTHER PUBLICATIONS

European Search Report for European Patent Application No. 23191848.3 dated Dec. 22, 2023, 06 pages.
(Continued)

Primary Examiner — Kenneth Bukowski
(74) Attorney, Agent, or Firm — Morgan, Lewis & Bockius LLP

(57) ABSTRACT

The various implementations described herein include methods and systems for using hand gestures detected at a wearable device to navigate a user interface. An example method includes receiving, via one or more neuromuscular-signal sensors of a wrist-wearable device worn by a user, data generated during performance of an in-air wrist movement by a wrist of the user. The method also includes moving a point of focus on the user interface in accordance with the in-air wrist movement; and receiving, via the one or more neuromuscular-signal sensors, additional data generated during performance of an in-air gesture by the user. The method further includes determining that the in-air gesture is an execution gesture; and executing a command corresponding to the execution gesture.

20 Claims, 83 Drawing Sheets

Related U.S. Application Data

(60) Provisional application No. 63/414,884, filed on Oct. 10, 2022, provisional application No. 63/414,880, filed on Oct. 10, 2022, provisional application No. 63/399,187, filed on Aug. 18, 2022, provisional application No. 63/399,188, filed on Aug. 18, 2022.

(51) Int. Cl.
*G06F 3/0485* (2022.01)
*G06F 3/0487* (2013.01)

(56) References Cited

U.S. PATENT DOCUMENTS

| | | | |
|---|---|---|---|
| 10,120,454 B2 | 11/2018 | Steinberg et al. | |
| 10,488,939 B2 | 11/2019 | Karmon et al. | |
| 10,701,316 B1 | 6/2020 | Cheung et al. | |
| 11,150,730 B1* | 10/2021 | Anderson | G06F 3/017 |
| 11,543,889 B2 | 1/2023 | Doganis | |
| 12,189,865 B2 | 1/2025 | Nguyen et al. | |
| 2004/0135819 A1* | 7/2004 | Maa | H04N 21/422 |
| | | | 348/E7.071 |
| 2011/0320949 A1 | 12/2011 | Ohki et al. | |
| 2012/0124516 A1 | 5/2012 | Friedman | |
| 2012/0127070 A1* | 5/2012 | Ryoo | G06F 3/0346 |
| | | | 345/156 |
| 2013/0080976 A1* | 3/2013 | Zambrano | G06F 3/0482 |
| | | | 715/830 |
| 2013/0120254 A1 | 5/2013 | Mun et al. | |
| 2013/0271360 A1 | 10/2013 | MacDougall et al. | |
| 2013/0285951 A1 | 10/2013 | Jeon et al. | |
| 2013/0328763 A1 | 12/2013 | Latta et al. | |
| 2014/0240103 A1* | 8/2014 | Lake | G06F 1/163 |
| | | | 340/12.5 |
| 2015/0220149 A1 | 8/2015 | Plagemann et al. | |
| 2015/0248207 A1 | 9/2015 | Dorfner | |
| 2016/0048213 A1 | 2/2016 | Zafiris | |
| 2016/0048215 A1 | 2/2016 | Shin et al. | |
| 2016/0274762 A1 | 9/2016 | Lopez et al. | |
| 2016/0334870 A1 | 11/2016 | Priyantha et al. | |
| 2016/0349927 A1 | 12/2016 | Sun et al. | |
| 2017/0139568 A1 | 5/2017 | Itani et al. | |
| 2017/0308118 A1* | 10/2017 | Ito | G06F 1/163 |
| 2018/0052518 A1 | 2/2018 | Zhu et al. | |
| 2018/0153430 A1* | 6/2018 | Ang | A61B 5/24 |
| 2018/0364853 A1 | 12/2018 | Pahud et al. | |
| 2019/0033974 A1* | 1/2019 | Mu | G06F 3/011 |
| 2019/0167764 A1 | 6/2019 | Itani et al. | |
| 2019/0243451 A1 | 8/2019 | Wakuda et al. | |
| 2019/0361521 A1* | 11/2019 | Stellmach | G06F 3/04812 |
| 2020/0012946 A1 | 1/2020 | Costa et al. | |
| 2020/0097082 A1 | 3/2020 | Berenzweig et al. | |
| 2020/0097083 A1* | 3/2020 | Mao | G06F 3/16 |
| 2020/0134890 A1 | 4/2020 | Zhang et al. | |
| 2020/0159325 A1* | 5/2020 | Bailey | G02B 27/017 |
| 2021/0048890 A1 | 2/2021 | Kim et al. | |
| 2021/0064132 A1 | 3/2021 | Rubin et al. | |
| 2021/0096726 A1 | 4/2021 | Faulkner et al. | |
| 2021/0117010 A1* | 4/2021 | Rizzardini | G06F 1/1694 |
| 2021/0124417 A1* | 4/2021 | Ma | G06F 3/015 |
| 2021/0240332 A1* | 8/2021 | Walkin | G06F 3/0489 |
| 2021/0247896 A1 | 8/2021 | Tanemura et al. | |
| 2021/0286436 A1* | 9/2021 | Parizi | G01S 13/581 |
| 2021/0318790 A1* | 10/2021 | Palos | G06F 3/04815 |
| 2021/0325972 A1 | 10/2021 | Ahn et al. | |
| 2021/0333884 A1 | 10/2021 | Li et al. | |
| 2022/0137713 A1 | 5/2022 | Hu et al. | |
| 2022/0197392 A1 | 6/2022 | Zhou et al. | |
| 2022/0206586 A1 | 6/2022 | Yitzhak et al. | |
| 2022/0206587 A1 | 6/2022 | Da-Yuan et al. | |
| 2022/0206588 A1 | 6/2022 | Canberk et al. | |
| 2022/0253144 A1 | 8/2022 | Hu et al. | |
| 2022/0269351 A1 | 8/2022 | Wu et al. | |
| 2023/0145592 A1 | 5/2023 | Singh et al. | |
| 2023/0244320 A1 | 8/2023 | Tang et al. | |
| 2023/0252737 A1 | 8/2023 | Dreyer et al. | |
| 2023/0341932 A1* | 10/2023 | Silva | G06F 3/011 |
| 2023/0353862 A1 | 11/2023 | Yi et al. | |
| 2024/0094825 A1 | 3/2024 | Chen et al. | |
| 2024/0152256 A1 | 5/2024 | Dascola et al. | |
| 2024/0338085 A1 | 10/2024 | Zeng et al. | |
| 2024/0427869 A1 | 12/2024 | Paul | |

OTHER PUBLICATIONS

European Search Report for European Patent Application No. 23191852.5 dated Dec. 14, 2023, 08 pages.
Non-Final Office Action mailed Jan. 16, 2025 for U.S. Appl. No. 18/359,855, filed Jul. 26, 2023, 31 pages.

* cited by examiner

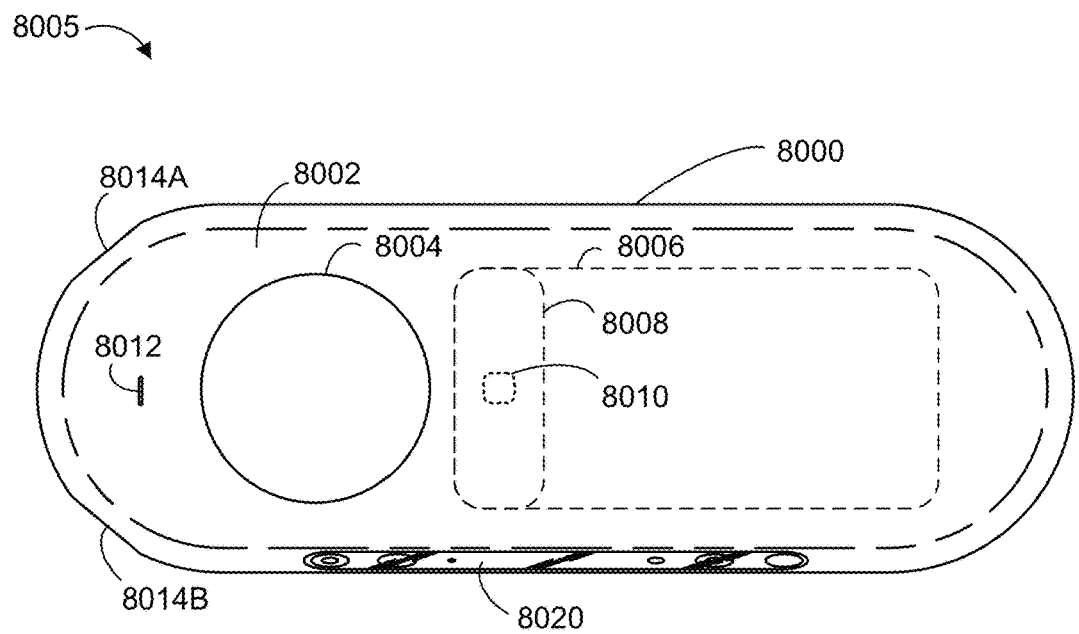
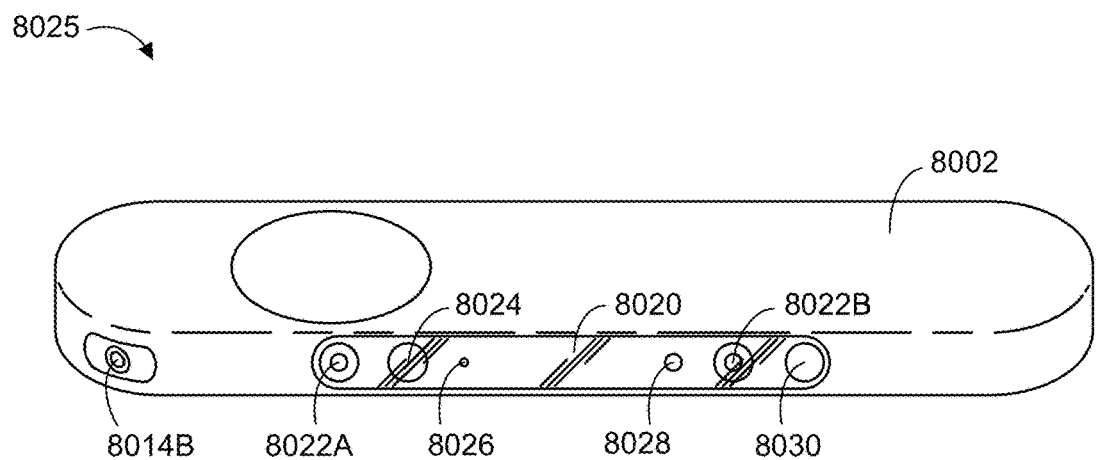
FIG. 14A

NAVIGATING A USER INTERFACE USING IN-AIR GESTURES DETECTED VIA NEUROMUSCULAR-SIGNAL SENSORS OF A WEARABLE DEVICE, AND SYSTEMS AND METHODS OF USE THEREOF

PRIORITY AND RELATED APPLICATIONS

This application is a continuation-in-part of U.S. patent application Ser. No. 18/359,855, entitled "Multi-Stage Gestures Detected Based on Neuromuscular-Signal Sensors of a Wearable Device to Activate User-Interface Interactions with Low-False Positive Rates, and Systems and Methods of Use Thereof," filed Jul. 26, 2023, which claims priority to:
- U.S. Provisional Patent Application No. 63/399,187, entitled "Navigating a User Interface Using In-Air Gestures Detected Via Neuromuscular-Signal Sensors of a Wearable Device, and Systems and Methods of Use Thereof" filed Aug. 18, 2022;
- U.S. Provisional Patent Application No. 63/399,188, entitled "Multi-Stage Gestures Detected Based on Neuromuscular-Signal Sensors of a Wearable Device to Activate User-Interface Interactions with Low-False Positive Rates, and Systems and Methods of Use Thereof" filed Aug. 18, 2022;
- U.S. Provisional Patent Application No. 63/414,880, entitled "Multi-Stage Gestures Detected Based on Neuromuscular-Signal Sensors of a Wearable Device to Activate User-Interface Interactions with Low-False Positive Rates, and Systems and Methods of Use Thereof" filed Oct. 10, 2022; and
- U.S. Provisional Patent Application No. 63/414,884, entitled "Navigating a User Interface Using In-Air Gestures Detected Via Neuromuscular-Signal Sensors of a Wearable Device, and Systems and Methods of Use Thereof" filed Oct. 10, 2022, each of which is hereby incorporated by reference in its entirety.

TECHNICAL FIELD

The present disclosure relates generally to wearable devices (e.g., wrist-wearable devices and head-wearable devices) and methods for detecting different types of gestures using wearable devices, and more particularly wearable devices configured to detect neuromuscular-based signals corresponding to in-air gestures (e.g., gestures performed by a user's digits without contacting any electronic devices) and perform corresponding commands.

BACKGROUND

Users typically carry a number of electronic devices to assist them in their daily lives. For example, users carry smartphones, smartwatches, and other electronic devices that help make the users' days run more smoothly, e.g., by allowing them to send messages and emails, and to capture images and take notes. Many devices require a user to handle, open, or otherwise setup their device and physically interact with it, which requires a user to have their hands free, takes away from the user's experience, and can be less efficient. Further, many devices physical interaction with the device to control a cursor or focus point, which also takes away from the user's experience and can be less efficient. As such, it would be desirable to address one or more of the above-identified issues, drawbacks, or areas for further exploration.

SUMMARY

As discussed above, there is a need for a wearable device that can detect in-air gestures to control an electronic device (e.g., a cursor or point of focus) without needing to physically interact with the electronic device or require a large open space for user gestures.

The systems (e.g., wearable devices) and methods described herein address at least some of the above-mentioned drawbacks by allowing a user to efficiently interact with a user interface using gestures detected by the one or more wearable devices (e.g., a wrist-wearable device) that include sensors for detecting gestures performed by the user. The sensors at the wearable devices can include electromyography (EMG) sensors (e.g., to detect muscular responses), inertial measurement unit (IMU) sensors, and time-of-flight sensors (e.g., to detect spatial distances).

As described herein, an in-air gesture performed by the user can correspond to an operation to control one or more wearable devices (e.g., a head-wearable device, wrist-wearable device, smartphone, and/or intermediary device). For example, a wrist rotation gesture performed by the user at a wrist-wearable device can cause a point of focus to move within a user interface (and select user interface elements). Alternatively, a pinch gesture (e.g., where a user's pinkie finger contacts their thumb) or thumb movements could cause the point of focus to move and/or snap to a user interface element (e.g., give focus to, or select, the element). Furthermore, other types of gestures could activate various functions associated with a selected user interface element.

The wearable devices described herein, after receiving or detecting the user's in-air gestures, can provide data to a computing device which causes the computing device to perform operations at a head-wearable device or other electronic device. The computing device can be another wearable device or an intermediary device (e.g., a smartphone). In some instances, the wearable device (or an intermediary device) is configured to cause operations to be performed at other electronic devices, such as a smartphone.

In this way, an in-air gesture performed by the user can directly cause operations to be performed to control one or more electronic devices. Other in-air gestures performed by the user can perform automatic operations, either at a head-wearable device, or at another electronic device. For example, an in-air gesture (e.g., a pinch, tap, and snap gesture) performed by the user can initiate an automatic operation such as executing an application, sending a message, or capturing a picture.

As an illustrative example, suppose a person, Robin, wants to navigate a user interface (e.g., to open a music application and select a playlist to listen to) while on a crowded bus or train. Conventionally, Robin would need to pull out her mobile phone or other device. Additionally, after Robin retrieves her mobile phone or device, she will need to perform a plurality of operations using a touch-sensitive surface or keyboard and mouse. This could be challenging and/or burdensome if Robin is already holding something, or does not have easy access to her devices. Moreover, using a mobile phone or device (or relying on large gestures or voice commands) can compromise Robin's privacy in such a situation with many people around.

A system described herein allows Robin to navigate a user interface quickly and efficiently without needing to retrieve any devices (or without requiring large gestures or voice commands that could be socially unacceptable or impractical). For example, Robin can navigate the user-interface and execute commands with small in-air gestures (e.g., wrist rotations and/or thumb and finger movements) that are detected by sensors at one or more wearable devices. This approach is quick and efficient for Robin, helps preserve her privacy, and can save energy at the wearable devices. The user interface can be displayed to Robin on a head-wearable device, the wrist-wearable device, and/or any other intermediary device. In this way, Robin is provided a hands-free method of executing commands and/or navigating the user interface quickly and efficiently.

These improvements allow for the wearable devices to be designed such that they are comfortable, functional, practical, and socially acceptable for day-to-day use. Further, these improvements allow users to interact with wearable devices and/or user interface without requiring direct physical contact with any of the devices. Further, the user can also use specify certain in-air gestures to modify which electronic device is being interacted with. All this furthers the goal of getting more users to adopt emerging technologies in the artificial-reality (AR and VR) spaces for more use cases, especially beyond just gaming uses in large, well-defined open spaces.

Further, the systems and methods described herein can allow for a more efficient and simplified man-machine interface, because they can provide a user with a means for interacting with electronic devices and digital mediums without inconveniencing the user or requiring the user to physically interact with any electronic devices. Therefore, the improvements simplify the user interface by providing fewer visual elements and simplify user input for interacting with such interfaces. Some of the gestures and operations described herein can be performed without any user interfaces being displayed, which allows users to interact with digital technology more seamlessly as they perform their daily tasks in the physical world and reduces energy consumption of the digital technology.

In accordance with some embodiments, a method is provided for using wrist movements to control a user-interface. The method includes: (i) receiving, via one or more neuromuscular-signal sensors of a wrist-wearable device worn by a user, data generated during performance of an in-air wrist movement by the user; (ii) moving a point of focus on the user interface in accordance with the in-air wrist movement; (iii) receiving, via the one or more neuromuscular-signal sensors, additional data generated during performance of an in-air gesture by the user; (iv) determining that the in-air gesture is an execution gesture; and (v) executing a command corresponding to the execution gesture.

In accordance with some embodiments, a method is provided for using in-air gestures to control a point of focus in a user-interface. The method includes: (i) receiving, via one or more sensors of a wrist-wearable device worn by a user, data generated during performance of an in-air hand gesture by the user; (ii) determining, based on the sensor data, that the in-air hand gesture is a user-interface control gesture; (iii) moving a point of focus on the user interface in accordance with the user-interface control gesture; and (iv) in accordance with a determination that the point of focus is within a threshold distance of a selectable user interface element, selecting the user interface element by snapping the point of focus to the selectable user interface element.

In some embodiments, a computing device (e.g., a wrist-wearable device or a head-wearable device, or an intermediary device, such as a smartphone or desktop or laptop computer that can be configured to coordinate operations at the wrist-wearable device and the head-wearable device) includes one or more processors, memory, a display (in some embodiments, the display can be optional, such as for certain example intermediary devices that can coordinate operations at the wrist-wearable device and the head-wearable device, and thus have ample processing and power resources, but need not have its own display), and one or more programs stored in the memory. The programs are configured for execution by the one or more processors. The one or more programs include instructions for performing (or causing performance of) any of the methods described herein (e.g., including methods 800, 900, and 1000 that are described in detail below).

In some embodiments, a non-transitory computer-readable storage medium stores one or more programs configured for execution by a computing device (e.g., a wrist-wearable device or a head-wearable device, or an intermediary device, such as a smartphone or desktop or laptop computer that can be configured to coordinate operations at the wrist-wearable device and the head-wearable device) having one or more processors, memory, and a display (in some embodiments, the display can be optional, such as for certain example intermediary devices that can coordinate operations at the wrist-wearable device and the head-wearable device, and thus have ample processing and power resources, but need not have its own display). The one or more programs include instructions for performing (or causing performance of) any of the methods described herein (e.g., including methods 800, 900, and 1000 that are described in detail below).

Thus, methods, systems, and computer-readable storage media are disclosed for neuromuscular-signal-based detection of in-air hand gestures. Such methods and systems may complement or replace conventional methods for gesture detection.

The features and advantages described in the specification are not necessarily all inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not to necessarily be considered limiting, for the description can admit to other effective features as the person of skill in this art will appreciate upon reading this disclosure.

FIGS. 6H-6O illustrate another example user scenario of interacting with a wearable device in accordance with some embodiments.

FIGS. 13A, 13B-1, 13B-2, and 13C illustrate example artificial-reality systems in accordance with some embodiments.

FIGS. 14A-14B illustrate an example handheld device in accordance with some embodiments.

In accordance with common practice, the various features illustrated in the drawings are not necessarily drawn to scale, and like reference numerals can be used to denote like features throughout the specification and figures.

DETAILED DESCRIPTION

Embodiments of this disclosure may include or be implemented in conjunction with various types or embodiments of artificial-reality systems. Artificial reality constitutes a form of reality that has been altered by virtual objects for presentation to a user. Such artificial reality may include and/or represent virtual reality (VR), augmented reality (AR), mixed reality (MR), hybrid reality, or some combination and/or variation of one or more of the these. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, which are used, for example, to create content in an artificial reality and/or are otherwise used in (e.g., to perform activities in) an artificial reality.

Artificial-reality systems may be implemented in a variety of different form factors and configurations. Some artificial-reality systems include a near-eye display (NED), which provides visibility into the real world (e.g., the AR system 7000 in FIG. 13A) or that visually immerses a user in an artificial reality (e.g., the virtual-reality system 7010 in FIG. 13B). While some artificial-reality devices are self-contained systems, other artificial-reality devices communicate and/or coordinate with external devices to provide an artificial-reality experience to a user. Examples of such external devices include handheld controllers, mobile devices, desktop computers, devices worn by a user (e.g., the HIPD 8000 in FIG. 14A), devices worn by one or more other users, and/or any other suitable external system.

As an example, suppose Robin is jogging while wearing augmented-reality glasses and she receives a message from a friend. In this example, Robin would like to respond to her friend without interrupting her jogging. Conventionally, Robin would need to manipulate buttons on her glasses, or pull out a connected electronic device and navigate on a touch display or keyboard in order to compose and send a reply to the message. With the systems described herein, Robin can use in-air hand gestures to compose and send a response without interrupting her jog. For example, Robin could use wrist rotations to move a point of focus to elements in the messenger interface and use tap (e.g., the thumb contacting the side of the index finger) or pinch (e.g., the thumb contacting the middle finger) gestures to activate functions associated with the elements. The gestures in this example are small and unobtrusive, not requiring a large, open space for Robin to maneuver or the manipulation of handheld devices.

Figure 1A:
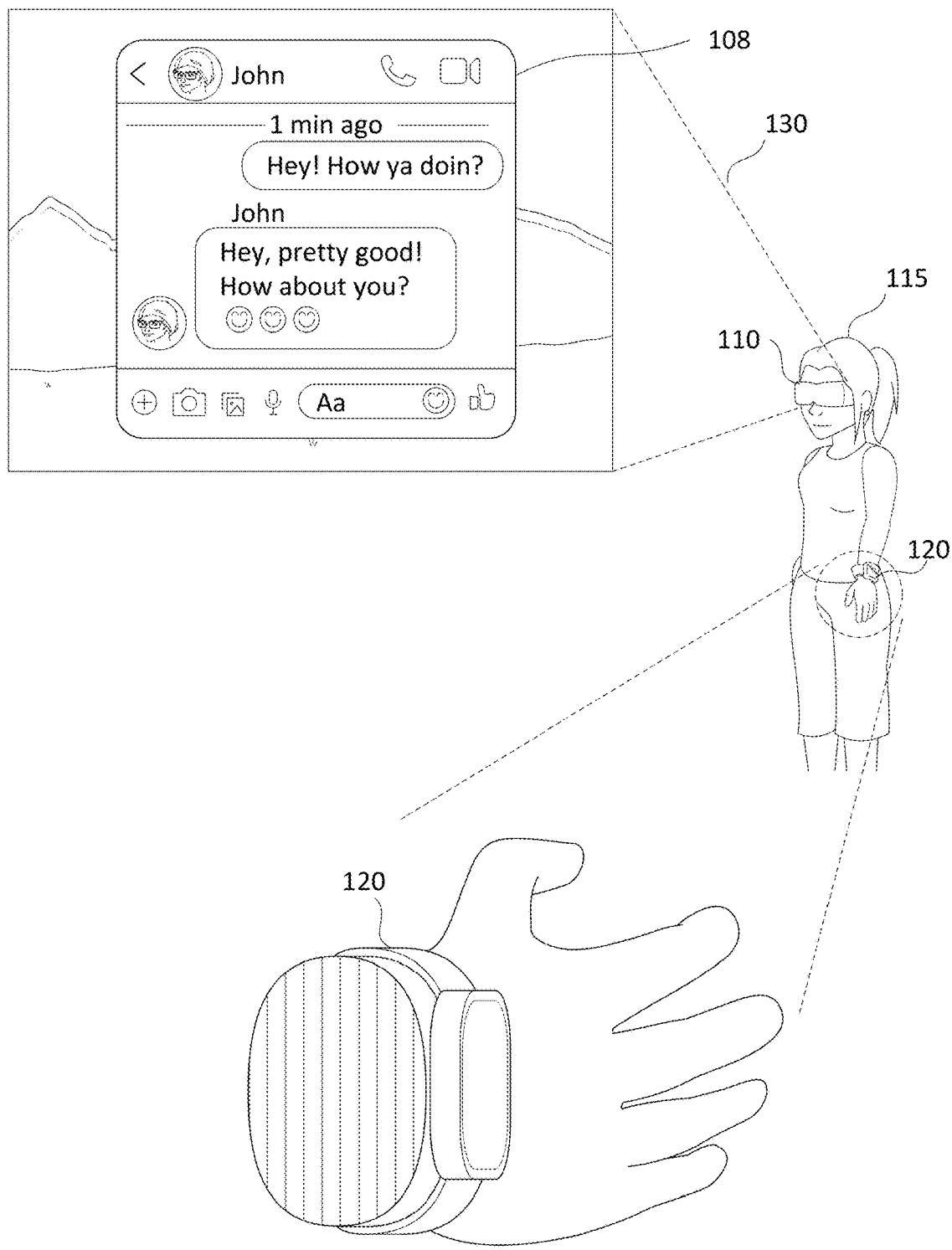
FIGS. 1A-1H illustrate an example user scenario of interacting with an artificial-reality system (e.g., including at least a virtual reality headset and a wrist-wearable device) in accordance with some embodiments.

FIGS. 1A-1H illustrate an example user scenario of interacting with an artificial-reality system in accordance with some embodiments. The user 115 in FIG. 1A is wearing a head-wearable device 110 (e.g., a virtual reality headset) and a wrist-wearable device 120 (e.g., a smartwatch). In some embodiments, the wrist-wearable device 120 is an instance of the wrist-wearable device 1188 (FIG. 11). In some embodiments, the head-wearable device 110 is an instance of the head-wearable device 1111. The user 115 in FIG. 1A is viewing a scene 130 that includes a messenger interface 108 (e.g., corresponding to a messenger application). In the example of FIG. 1A, the user 115 is not performing a gesture.

Figure 1B:
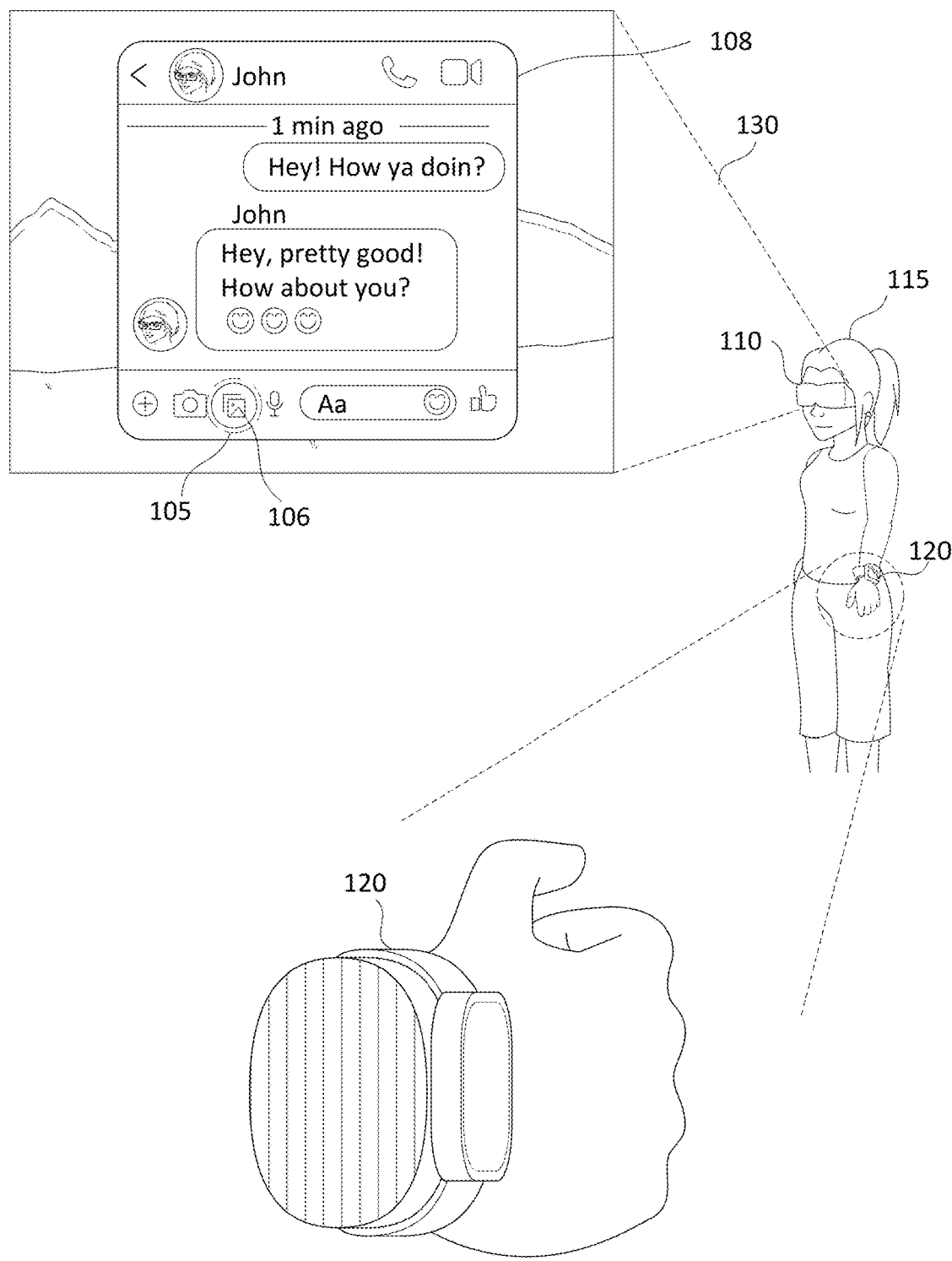

FIG. 1B shows the user 115 performing a fist gesture (e.g., a priming gesture) that involves the user curling their fingers to their palm. FIG. 1B further shows the scene 130 updating (responsive to the fist gesture) to include a point of focus 105 selecting an icon 106 (e.g., corresponding a photo gallery command) on the interface 108. In accordance with some embodiments, the priming gesture in FIG. 1B causes the interface 108 to be responsive to navigation gestures (e.g., causes the point of focus 105 appear and be manipulable by the user 115). Although FIG. 1B shows the fist gesture involving the user maintaining their thumb above their index finger, in some embodiments, the fist gesture may be performed with the thumb resting on the index finger. FIG. 1B illustrates the fist gesture as a priming gesture, however in other embodiments the priming gesture includes other in-air gestures performed by the user 115 (e.g., a maintained pinch gesture using the user's thumb and another phalange, a quick pinch gesture using two of the user's phalanges, and/or a double pinch gesture). For example, a priming gesture for navigation gestures can be a thumb tap-and-hold gesture. In some embodiments, the icon 106 is selected by default (e.g., based on a setting in the messenger application, or a user preference). In some embodiments, the icon 106 is selected based on a gaze of the user (e.g., determined via eye tracking). In some embodiments, the icon 106 had the focus the previous time the user interacted with the interface 108 and the messenger application defaults to that previous point of focus.

Figure 1C:
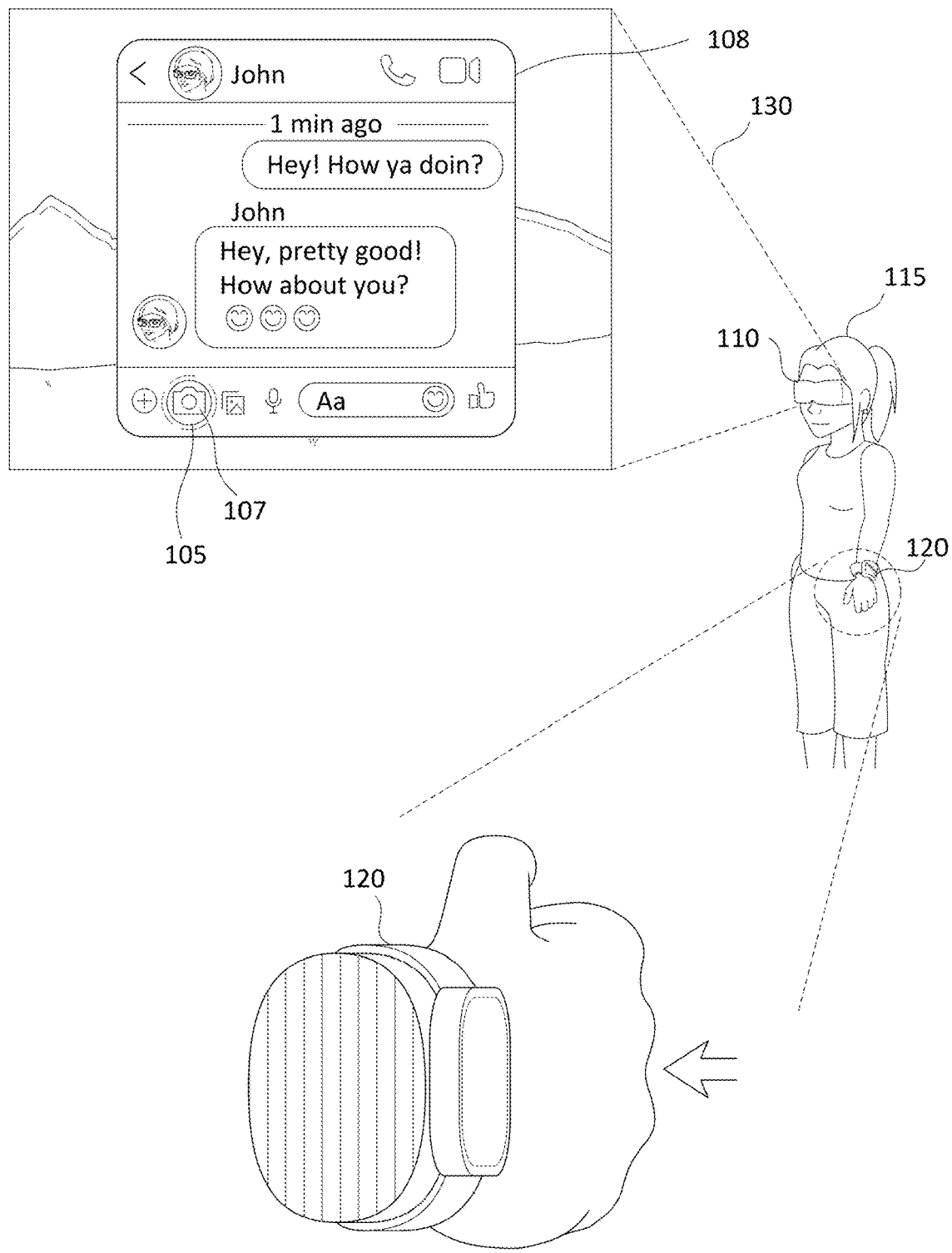

FIG. 1C shows the user 115 rotating their wrist (e.g., a navigation gesture) while maintaining the fist gesture from FIG. 1B. The rotation in FIG. 1C is inward (e.g., toward the user's body) and corresponds to a leftward direction from the perspective the user 115. FIG. 1C further shows the point of focus 105 moving to the left in the interface 108 and selecting the icon 107 (e.g., corresponding to a photo capture command). In some embodiments, the point of focus 105 continues to move to the left while the user maintains the wrist rotation gesture. In some embodiments, the point of focus 105 moves to the left a preset amount per gesture (e.g., regardless of how long the user maintains the gesture). For example, the point of focus 105 moves to an adjacent selectable user interface element each time a navigation gesture is performed. In some embodiments, the point of focus 105 moves with a speed that corresponds to a speed of the wrist rotation. For example, the point of focus 105 moves at one of two different speeds based on whether the wrist rotation gesture has a speed above or below a speed threshold. In some embodiments, the point of focus 105 moves with a speed that corresponds to an angle of the wrist rotation. For example, the point of focus 105 moves at one of two different speeds based on whether the wrist rotation gesture has an angle above or below an angular threshold.

Figure 1D:
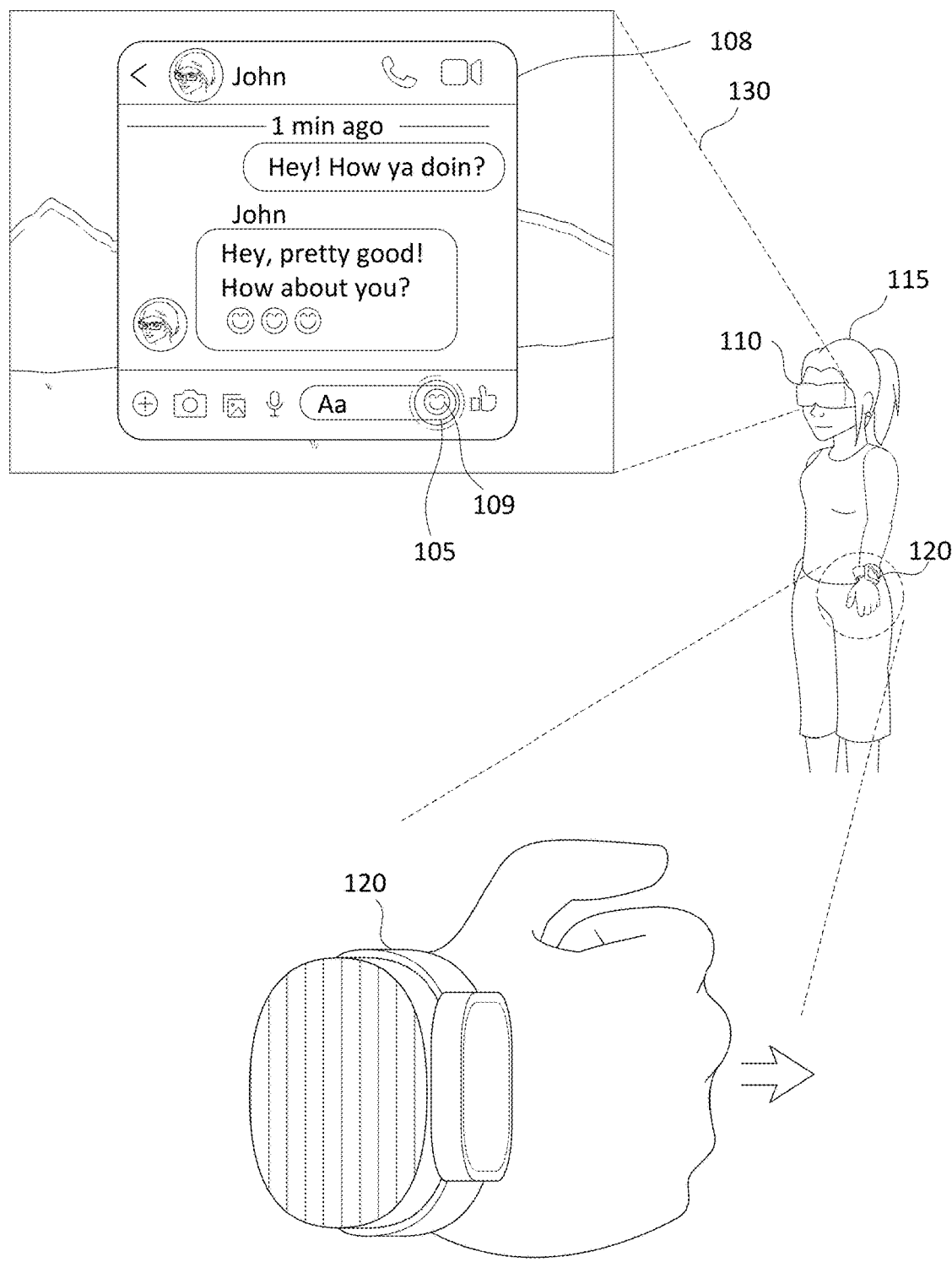

FIG. 1D shows the user 115 rotating their wrist (e.g., a navigation gesture) while maintaining the fist gesture from FIG. 1C. The rotation in FIG. 1D is outward (e.g., away from the user's body) and corresponds to a rightward direction from the perspective of the user 115. FIG. 1D further shows the point of focus 105 moving to the right in the interface 108 and selecting the icon 109 (e.g., corresponding to an emoji menu).

Figure 1E:
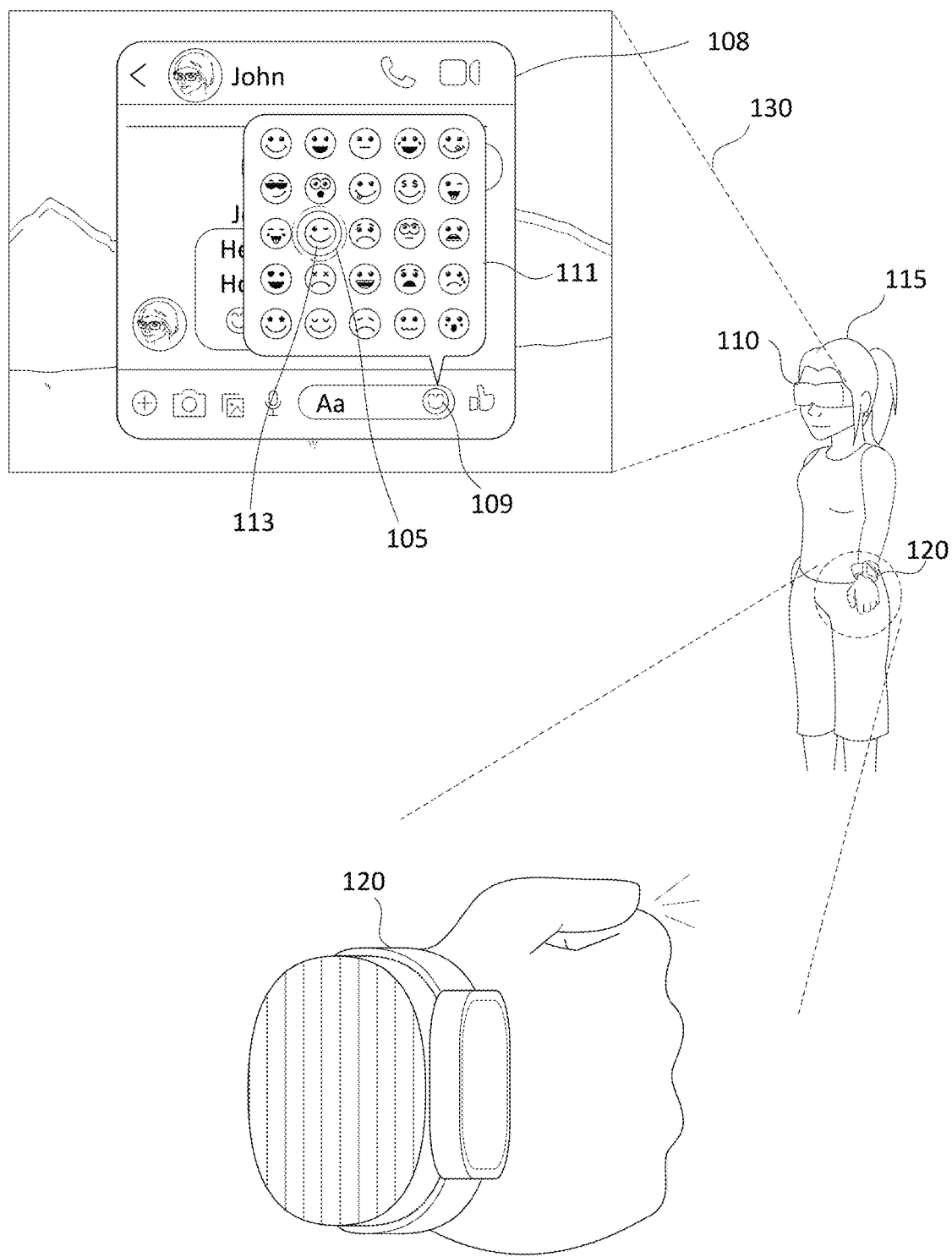

FIG. 1E shows the user 115 performing a tap gesture (e.g., a control gesture) that involves the user's thumb contacting a surface of the user's index finger. In the example of FIG. 1E, the user is maintaining the fist gesture from FIG. 1D. In some embodiments, a control gesture (e.g., the tap gesture) can be performed and recognized without maintaining the priming gesture (e.g., the fist gesture). In some embodiments, (e.g., where the user is resting the thumb against the surface of the index finger while performing the fist gesture), the tap gesture is detected in accordance with the thumb pressing against the surface of the index finger with a force that meets one or more criteria (e.g., with a force that is greater than a preset threshold). For example, the tap gesture could be a 'deep' or 'forceful' tap gesture that requires a sufficient amount of force to be recognized by the sensors (e.g., the sensors in the wrist-wearable device 120). In accordance with some embodiments, the tap gesture corresponds to a command to activate the selected icon (e.g., the icon 109). FIG. 1E further shows the emoji menu 111 being displayed (e.g., in response to activation of icon 109). The point of focus 105 is selecting a winking emoji 113 in the example of FIG. 1E. In some embodiments, the emoji 113 is selected by default (e.g., based on a setting in the messenger application, or a user preference). In some embodiments, the emoji 113 is selected based on a gaze of the user (e.g., determined via eye tracking). In some embodiments, the emoji 113 is the last emoji selected by the user within the messenger application and the messenger application defaults to that previous selection.

Figure 1F:
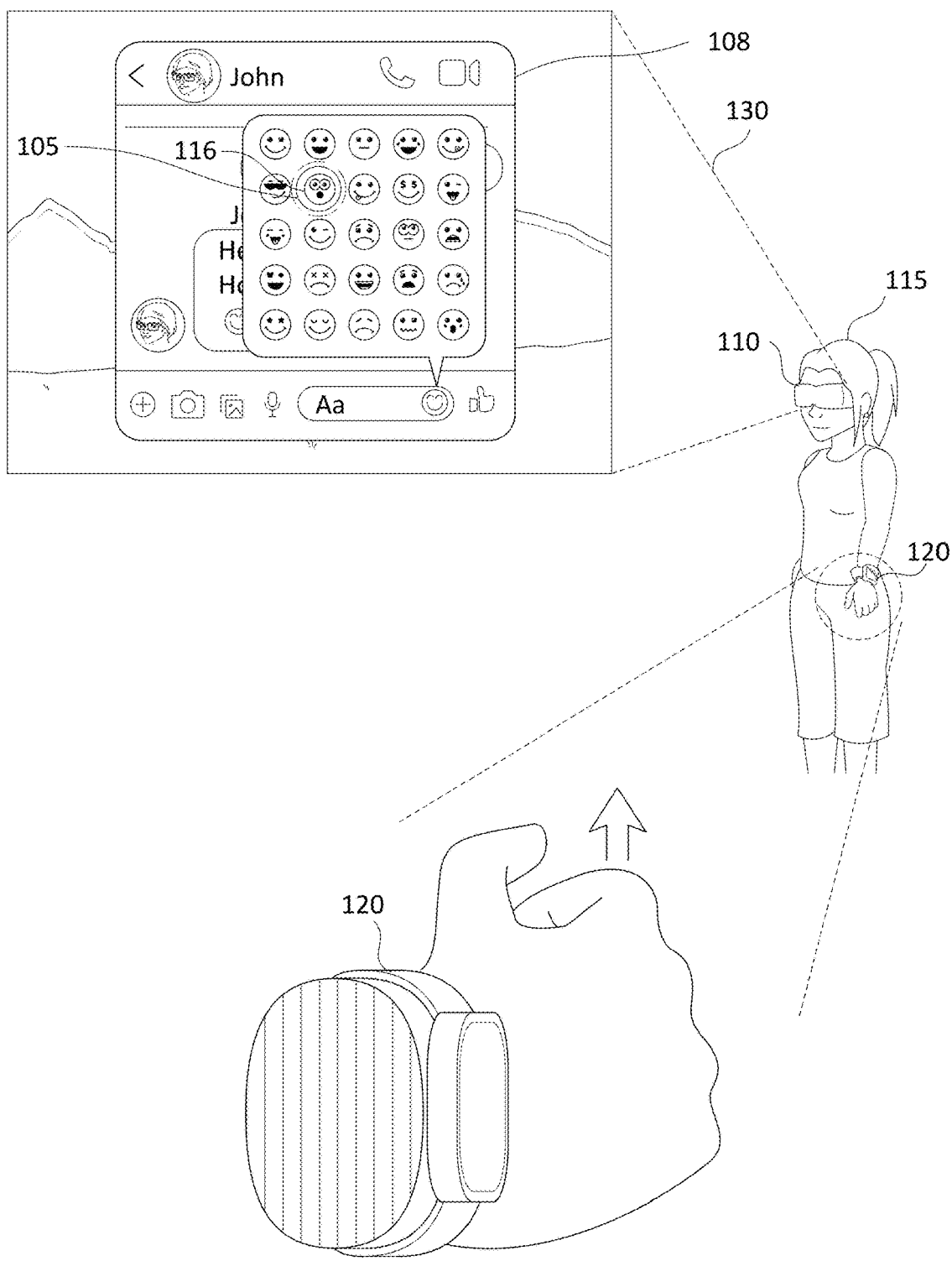

FIG. 1F shows the user 115 rotating their wrist (e.g., a navigation gesture) while maintaining the fist gesture from FIG. 1E. The rotation in FIG. 1F is upward (e.g., the user's thumb moves towards the user's arm as a result of the rotation). FIG. 1F further shows the point of focus 105 moving up in the interface 108 and selecting the emoji 116.

Figure 1G:
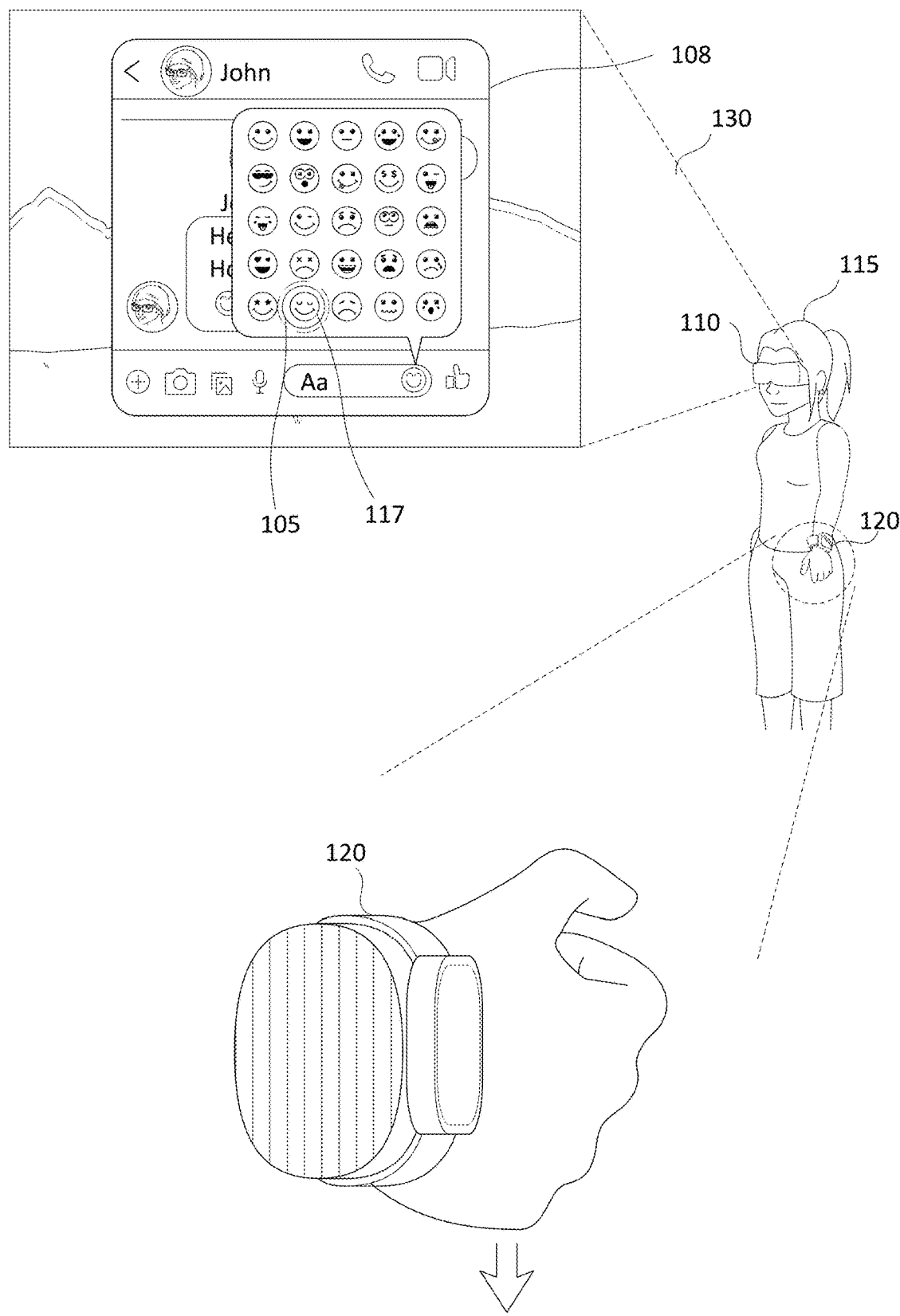

FIG. 1G shows the user 115 rotating their wrist (e.g., a navigation gesture) while maintaining the fist gesture from FIG. 1F. The rotation in FIG. 1G is downward (e.g., the user's pinkie finger moves toward the user's arm as a result of the rotation). FIG. 1G further shows the point of focus 105 moving down in the interface 108 and selecting the emoji 117.

Figure 1H:
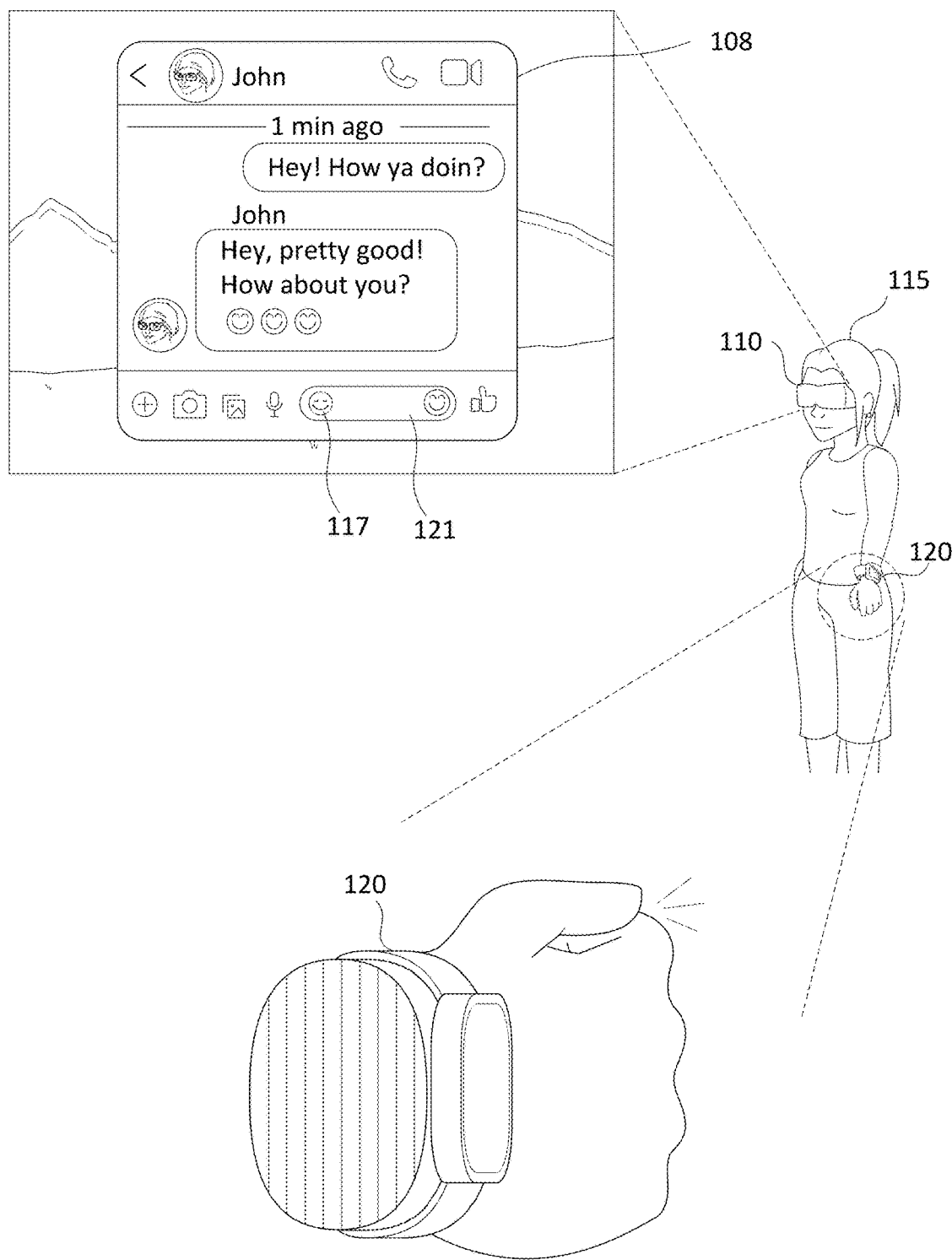

FIG. 1H shows the user 115 performing a tap gesture (e.g., a control gesture) that involves the user's thumb contacting a surface of the user's index finger. In the example of FIG. 1E, the user is maintaining the fist gesture from FIG. 1G. In some embodiments, a control gesture (e.g., the tap gesture) can be performed and recognized without maintaining the priming gesture (e.g., the fist gesture). In accordance with some embodiments, the tap gesture corresponds to a command to insert the selected emoji 117 into the response box 121. FIG. 1H further shows the emoji menu 111 ceasing to be displayed (e.g., in response to the tap gesture). In some embodiments, the emoji menu 111 continues to be displayed until a close (or 'go back') command is received from the user 115. In the example of FIG. 1H, the point of focus is no longer displayed (e.g., nothing is selected) in accordance with the tap gesture being performed. In some embodiments, the point of focus continues to be displayed (e.g., until the user releases the fist gesture or performs a dismissal gesture).

In some embodiments, the wrist-wearable device 120 and/or the head-wearable device 110 provides visual, audio, and/or haptic feedback to the user to indicate that a performed gesture has been detected (e.g., distinct feedback provided in response to each type of gesture).

Figure 2A:
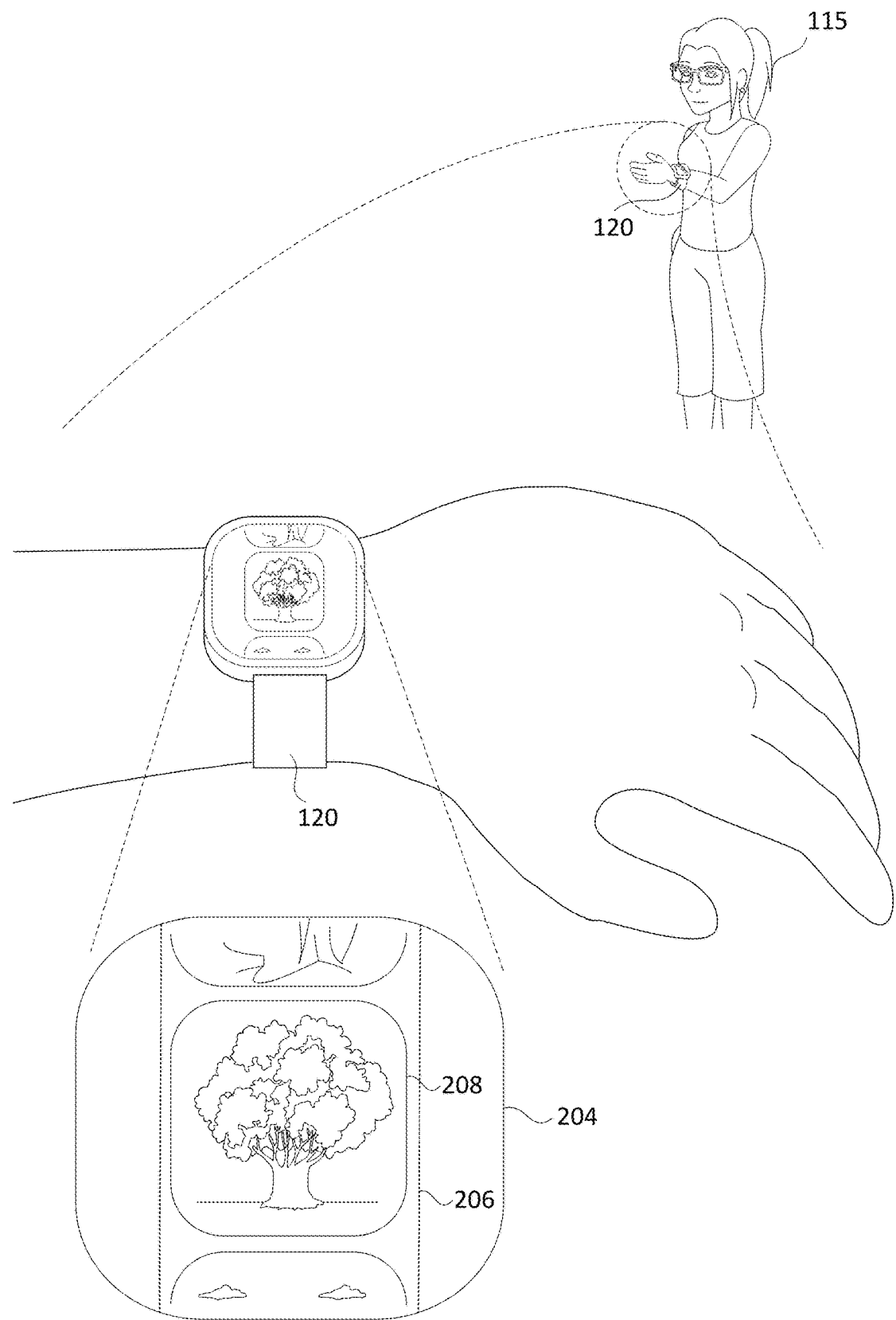
FIGS. 2A-2F illustrate an example user scenario of interacting with a wearable device in accordance with some embodiments.

FIGS. 2A-2F illustrate an example user scenario of interacting with a wearable device in accordance with some embodiments. The user 115 in FIG. 2A is wearing a wrist-wearable device 120 (e.g., a smartwatch) that includes a display 204 showing a photo gallery user interface 206 (e.g., a photo application). The user interface 206 in FIG. 2A includes a plurality of images displayed in a single column with an image 208 presented near a center of the display. The user 115 in FIG. 2A is not performing a gesture.

Figure 2B:
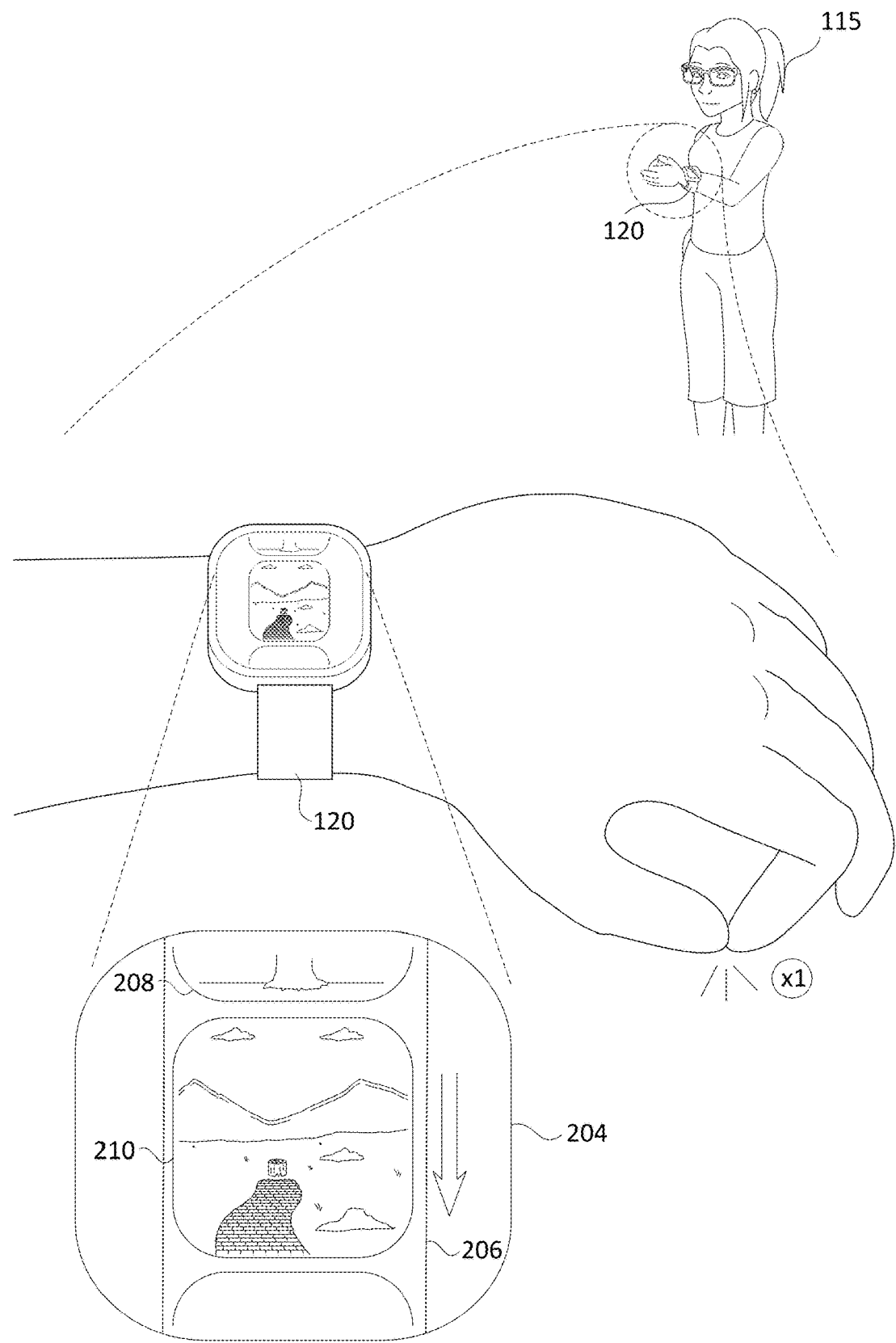

FIG. 2B shows the user 115 performing a first pinch gesture (e.g., a navigation gesture) that involves the user's index finger contacting the thumb (one time). FIG. 2B further shows the interface 206 updating (responsive to the first pinch gesture) to present an image 210 near the center of the display. In the example of FIG. 2B, the first pinch gesture causes the plurality of images to scroll downward once time resulting in the image 208 moving to a top of the display 204 and the image 210 moving near the center of the display 204. For example, the index finger pinch gesture shown in FIG. 2B corresponds to a downward (forward) navigation command.

Figure 2C:
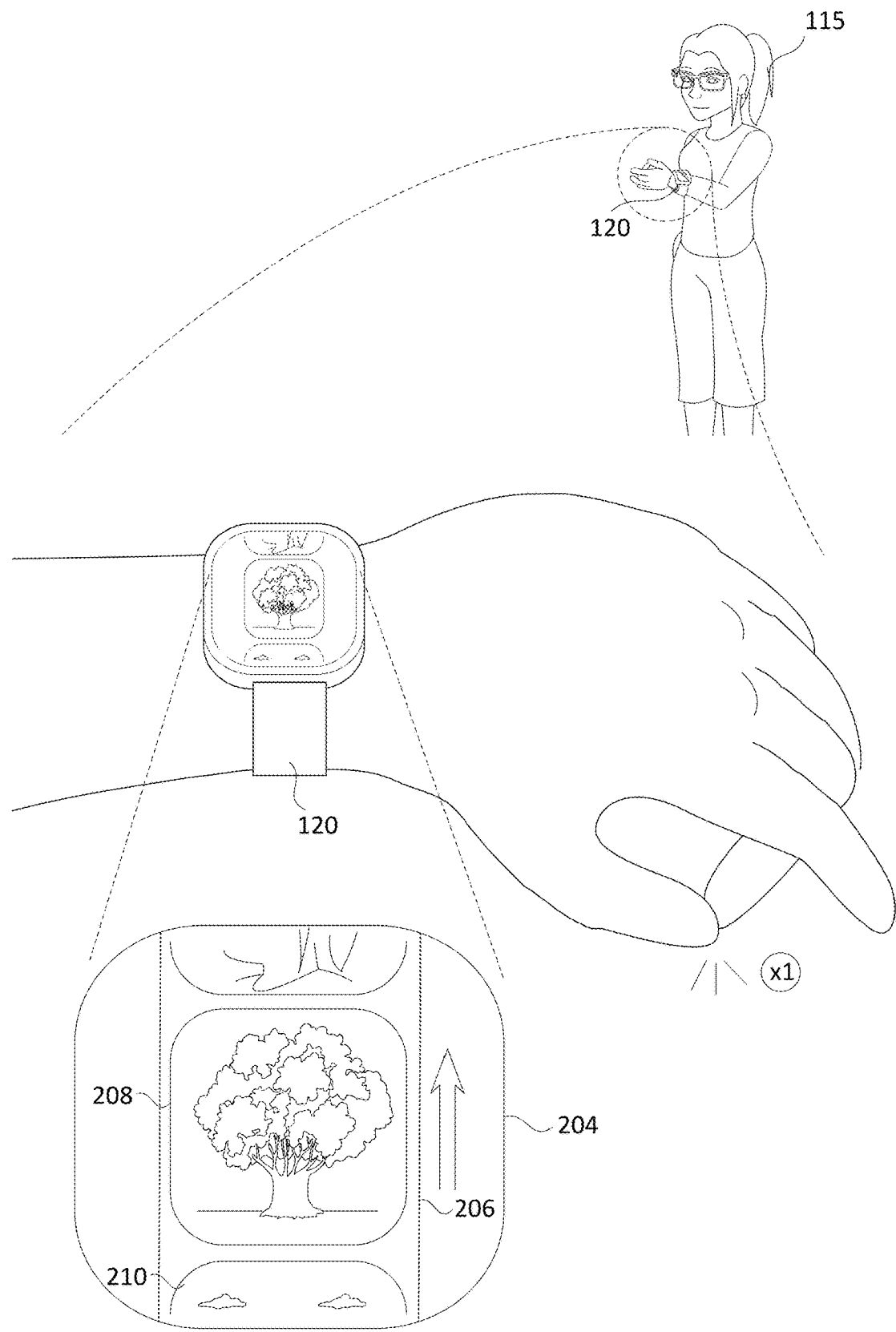

FIG. 2C shows the user 115 performing a second pinch gesture (e.g., a navigation gesture) that involves the user's middle finger contacting the thumb (one time). FIG. 2C further shows the interface 206 updating (responsive to the second pinch gesture) to present the image 208 near the center of the display. In the example of FIG. 2C, the second pinch gesture causes the plurality of images to scroll upward one time resulting in the image 210 moving to a bottom of the display 204 and the image 208 moving near the center of the display 204. For example, the middle finger pinch gesture shown in FIG. 2C corresponds to an upward (reverse) navigation command.

Figure 2D:
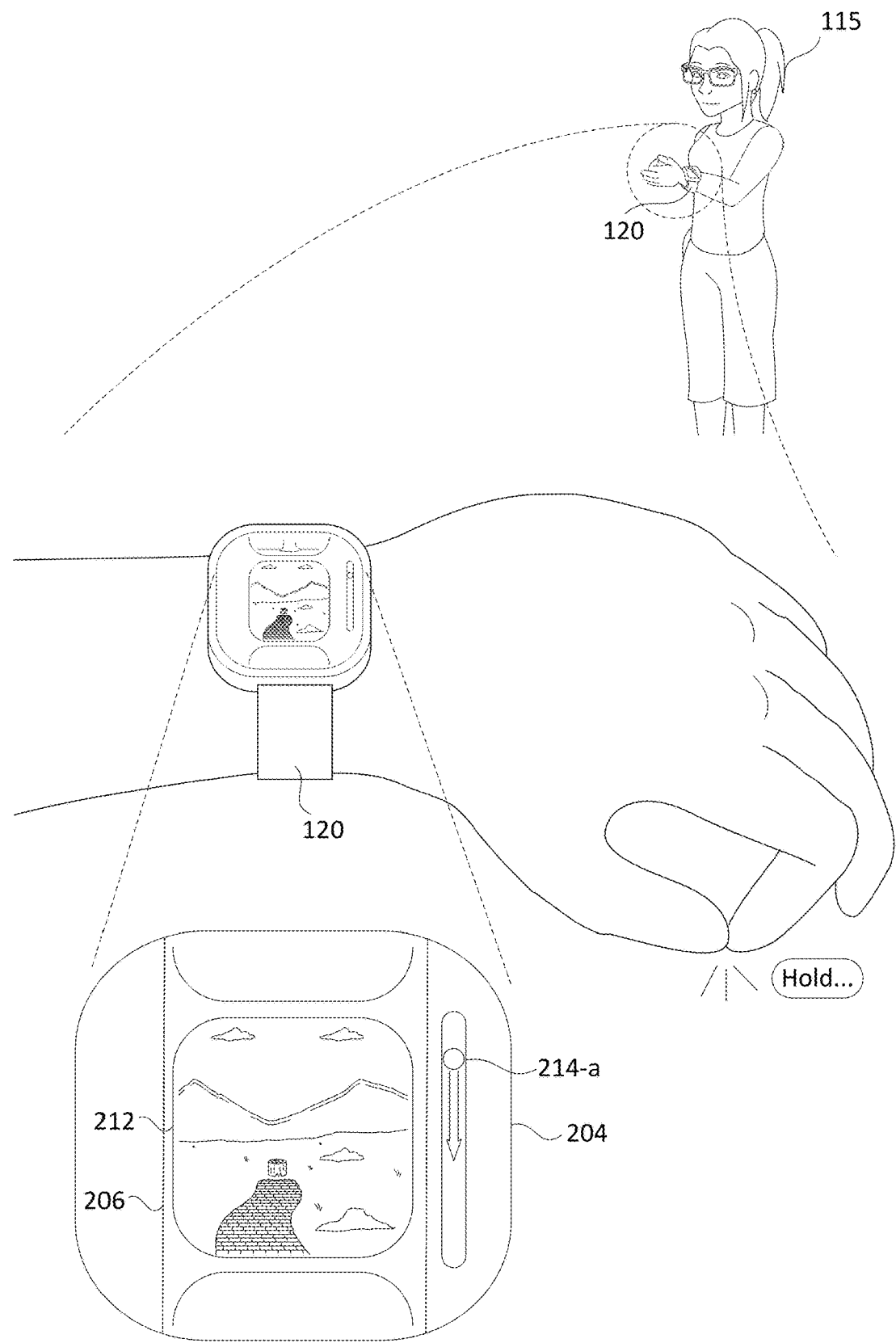

FIG. 2D shows the user 115 performing a pinch-and-hold gesture (e.g., a navigation gesture) that involves the user's index finger maintained in contact with the thumb. FIG. 2D further shows the interface 206 updating (responsive to the pinch-and-hold gesture) to present an image 212 near the center of the display. In the example of FIG. 2D, the pinch-and-hold gesture causes the plurality of images to scroll downward (continuously while the gesture is maintained) resulting in an image 212 moving near the center of the display 204. For example, the index finger pinch-and-hold gesture shown in FIG. 2D corresponds to a continuous downward (forward) navigation command. The relative location of the image 212 within the photo gallery column is indicated by the indicator 214 having a position 214-a in FIG. 2D (e.g., indicating that the image 212 is near the top of the photo gallery column). In some embodiments, a force of the pinch-and-hold gesture corresponds to scroll speed for the corresponding navigation command. For example, a force between the index finger and thumb below a force threshold results in a scroll at a first speed and a force between the index finger and thumb above the force threshold results in a scroll at a second speed (greater than the first speed).

Figure 2E:
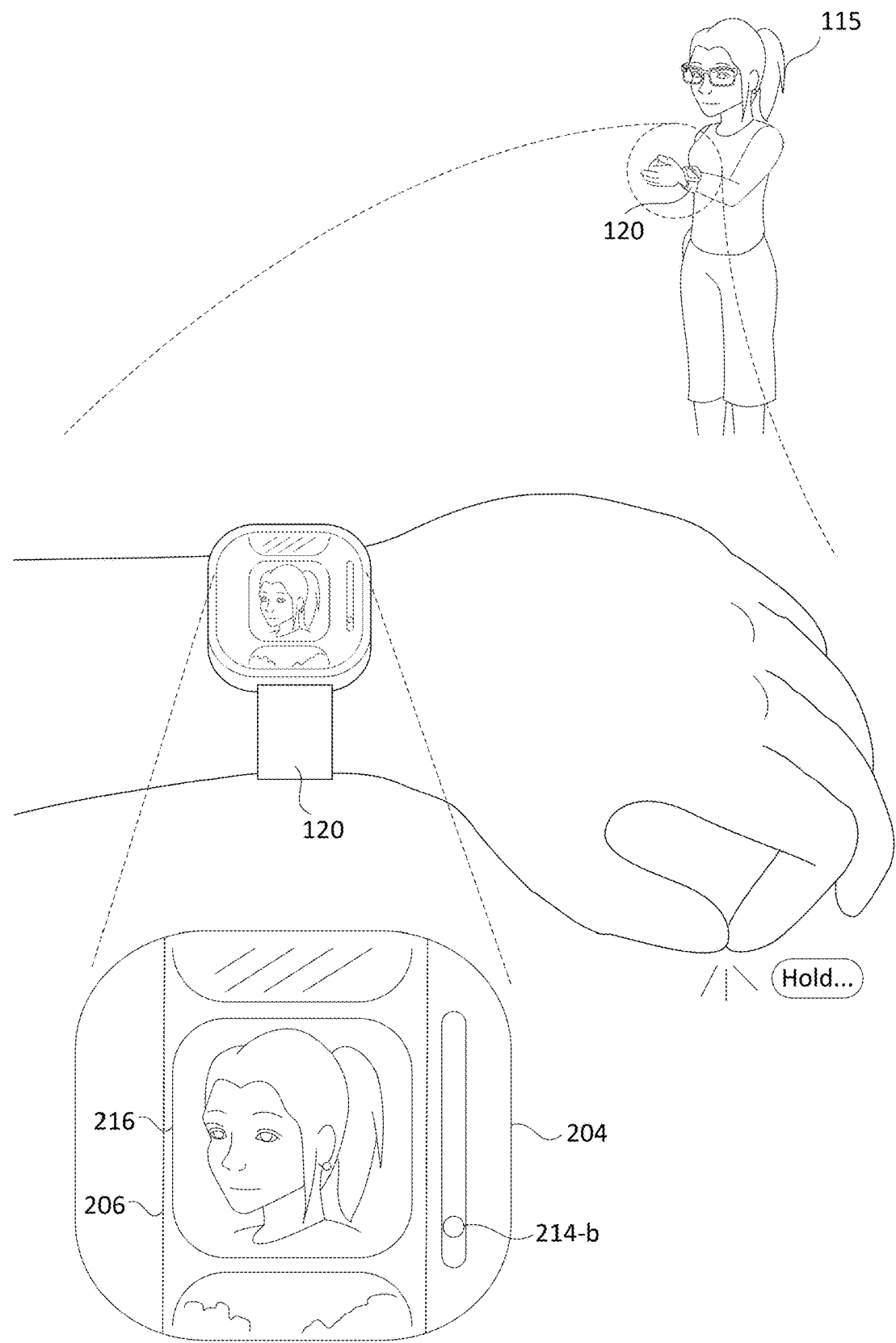

FIG. 2E shows the user 115 maintaining the pinch-and-hold gesture. FIG. 2E further shows the interface 206 updating (responsive to the pinch-and-hold gesture being maintained) to present an image 216 near the center of the display. The relative location of the image 216 within the photo gallery column is indicated by the indicator 214 having a position 214-b in FIG. 2E (e.g., indicating that the image 216 is near the bottom of the photo gallery column).

Figure 2F:
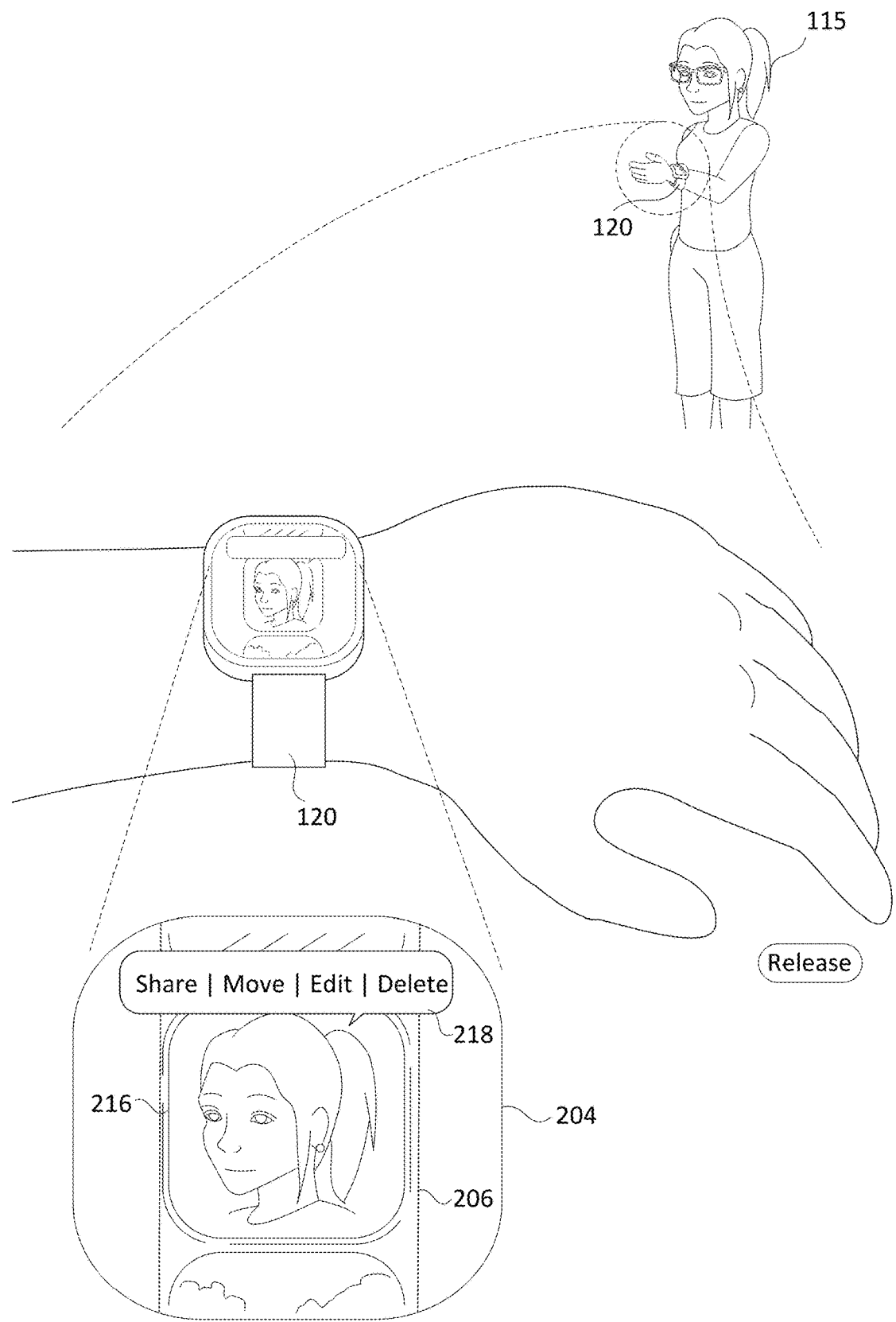

FIG. 2F shows the user 115 releasing the pinch-and-hold gesture and the image 216 being selected. In the example of FIG. 2F, the image 216 is selected in accordance with it being nearest to the middle of the display 204 at the time when the pinch-and-hold gesture is released. FIG. 2E further shows a menu 218 being presented (e.g., a menu of options for manipulating the image 216) in accordance with the selection of the image 216. In some embodiments, the menu 218 is presented in response to a separate gesture (e.g., an activation/control gesture) performed while the image 216 is selected.

Figure 3A:
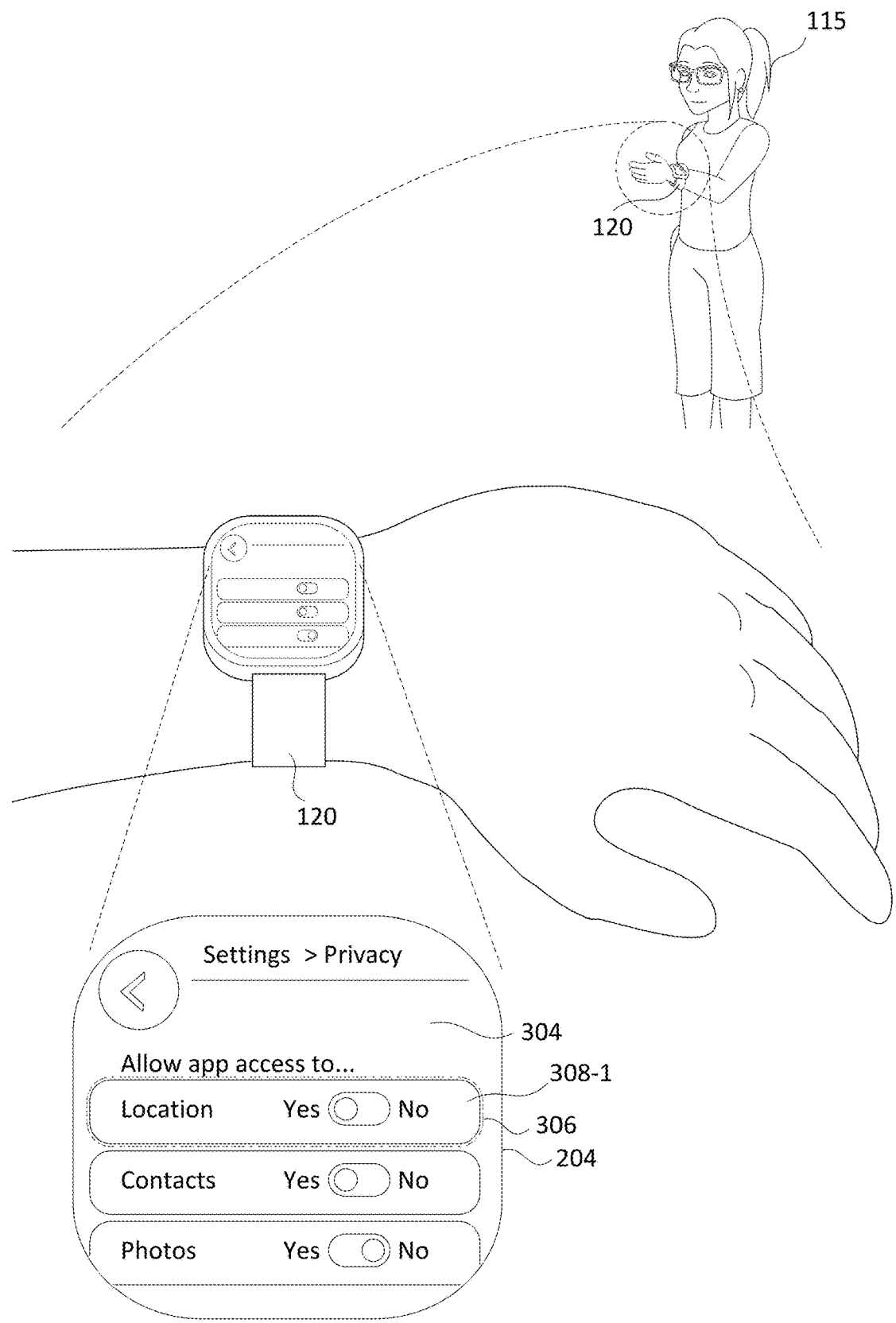
FIGS. 3A-3C illustrate another example user scenario of interacting with a wearable device in accordance with some embodiments.
Figure 3B:
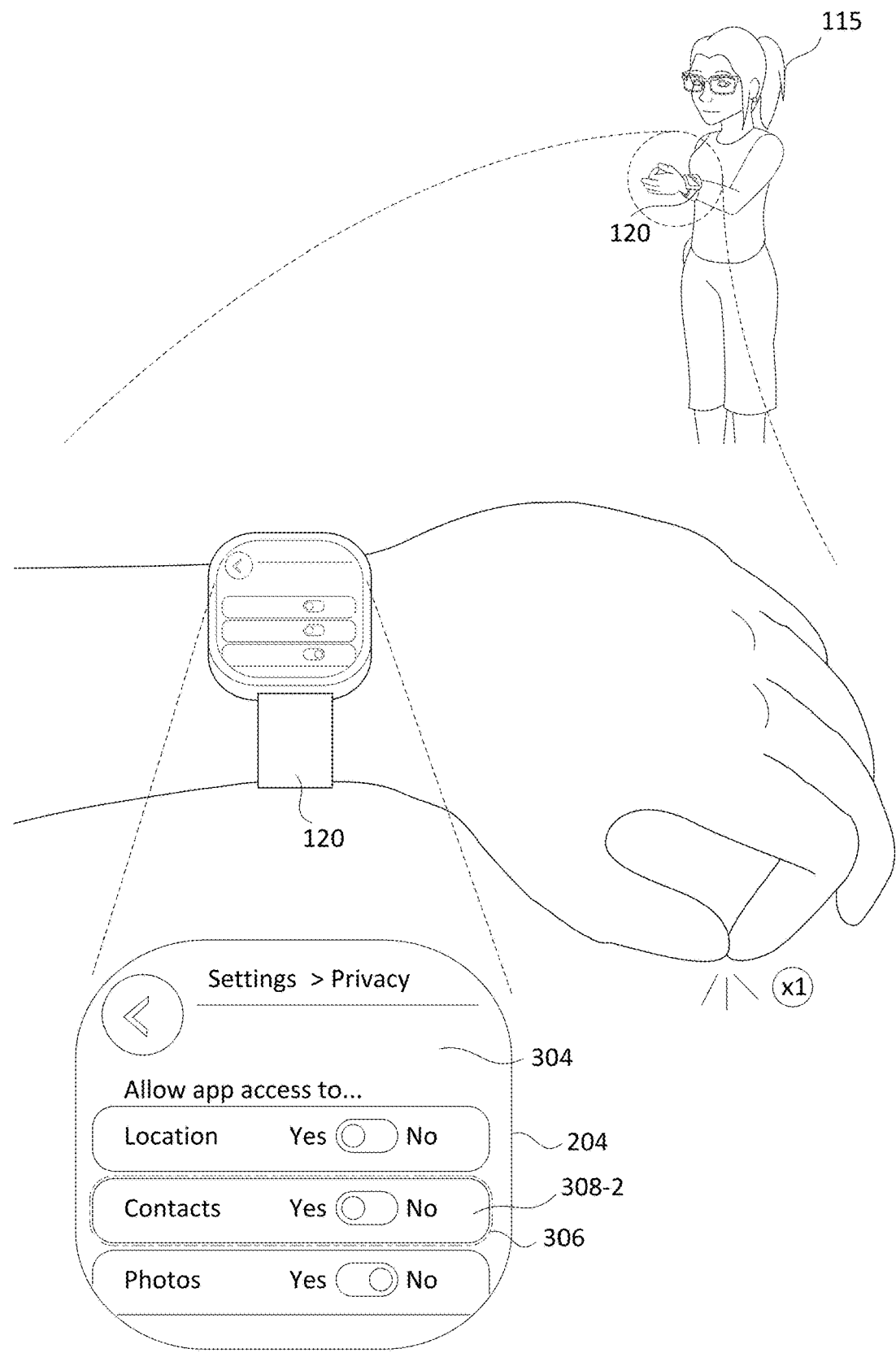
Figure 3C:
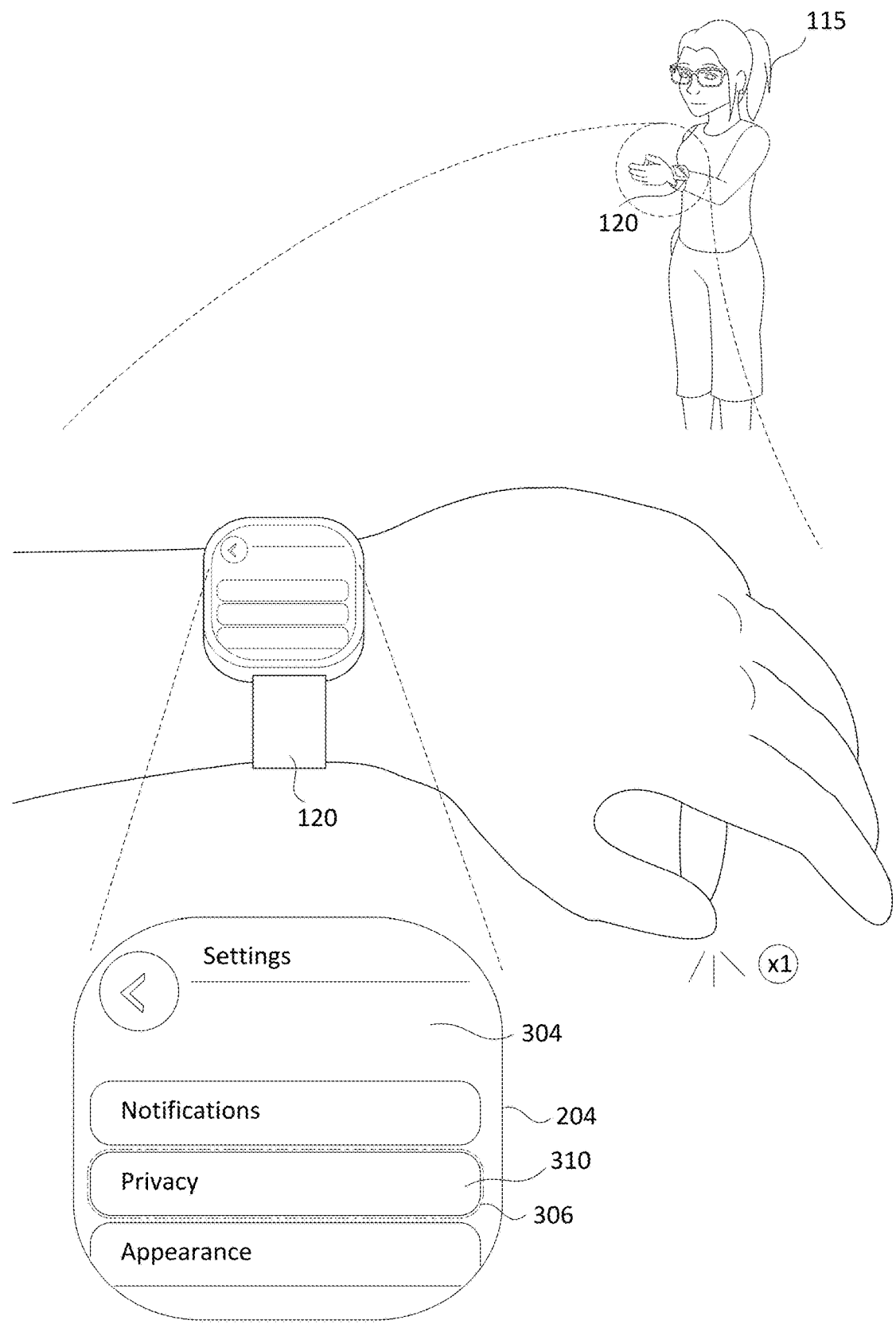

FIGS. 3A-3C illustrate another example user scenario of interacting with a wearable device in accordance with some embodiments. The user 115 in FIG. 3A is wearing a wrist-wearable device 120 (e.g., a smartwatch) that includes a display 204 showing a user interface 304 (e.g., a settings interface). The user interface 304 in FIG. 3A includes a plurality of privacy settings 308 (e.g., selectable user interface elements) for an application (e.g., an application executing on the wrist-wearable device 120). In the example of FIG. 3A, a privacy setting 308-1 is selected by a point of focus 306. The user 115 in FIG. 3A is not performing a gesture. In some embodiments, the privacy setting 308-1 is selected by default (e.g., based on a setting or user preference). In some embodiments, the privacy setting 308-1 is selected based on a gaze of the user (e.g., determined via eye tracking). In some embodiments, the privacy setting 308-1 is selected in response to a previous gesture (not shown) from the user 115.

FIG. 3B shows the user 115 performing a first pinch gesture (e.g., a navigation gesture) that involves the user's index finger contacting the thumb (one time). FIG. 3B further shows the interface 304 updating (responsive to the first pinch gesture) to move the point of focus 306 to a privacy setting 308-2. In the example of FIG. 3B, the first pinch gesture causes the point of focus 306 to move downward once time. For example, the index finger pinch gesture shown in FIG. 3B corresponds to a downward (forward) navigation command.

FIG. 3C shows the user 115 performing a second pinch gesture (e.g., a navigation gesture) that involves the user's pinkie finger contacting the thumb (one time). FIG. 3C further shows the interface 304 updating (responsive to the second pinch gesture) to show general settings (e.g., close the privacy settings and return to general settings). For example, the pinkie finger pinch gesture shown in FIG. 3C corresponds to a 'close' or 'go back' navigation command. FIG. 3C further shows the privacy option 310 selected by the point of focus 306. In some embodiments, the privacy option 310 is selected by default (e.g., based on a setting or user preference). In some embodiments, the privacy option 310 is selected in response to the user 115 closing the privacy settings shown in FIG. 3B. Thus, in the example of FIGS. 3A-3C a first type of gesture (e.g., the index finger pinch gesture) corresponds to navigation through a set of options and a second type of gesture (e.g., the pinkie finger pinch gesture) corresponds to navigation through a set of menus (e.g., a hierarchy of menus).

In some embodiments, the wrist-wearable device 120 provides visual, audio, and/or haptic feedback to the user to indicate that a performed gesture has been detected (e.g., distinct feedback provided in response to each type of gesture).

Figure 4A:
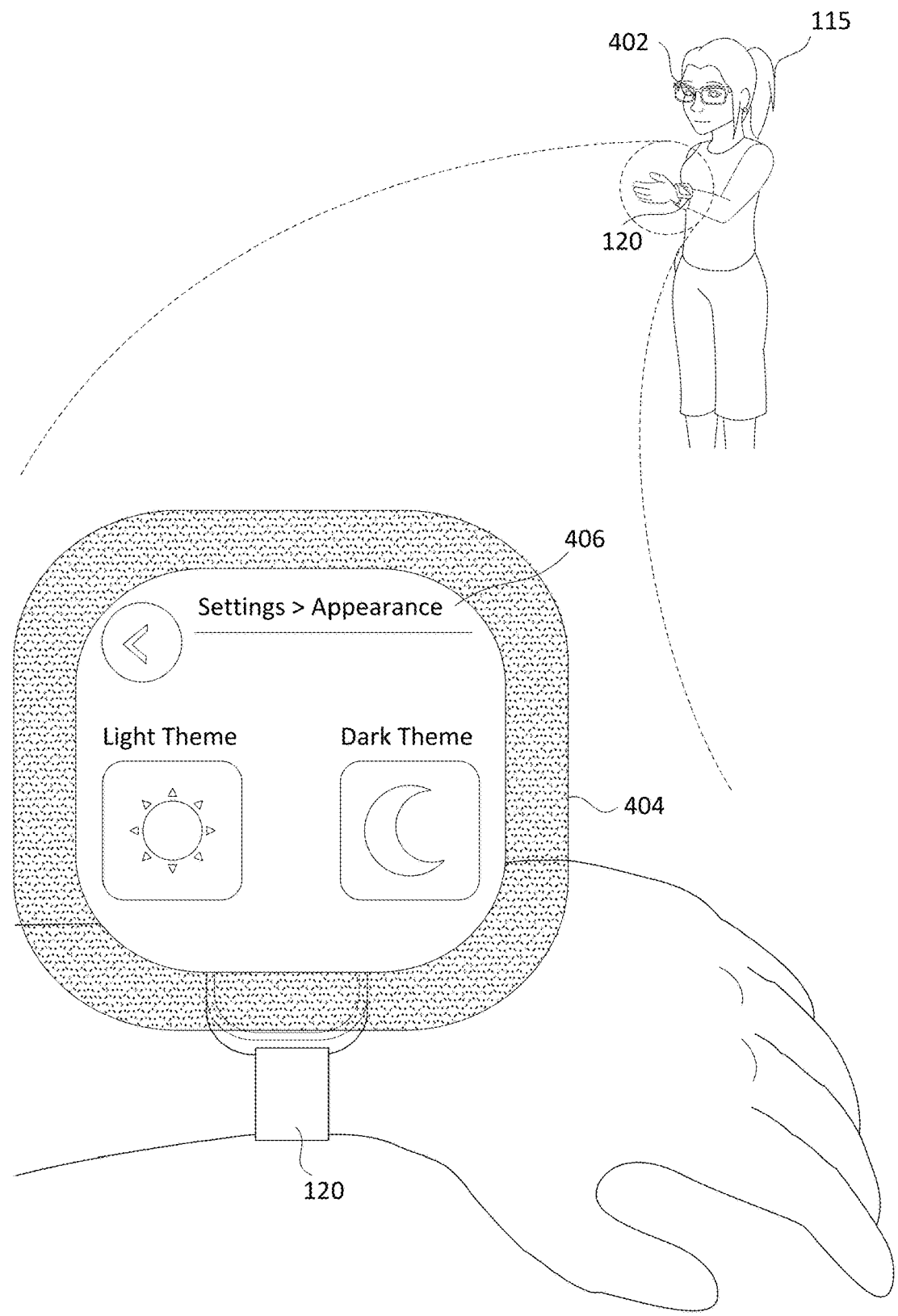
FIGS. 4A-4F illustrate another example user scenario of interacting with a wearable device in accordance with some embodiments.

FIGS. 4A-4F illustrate another example user scenario of interacting with a wearable device in accordance with some embodiments. The user 115 in FIG. 4A is wearing a head-wearable device 402 (e.g., augmented-reality glasses) and a wrist-wearable device 120 (e.g., a smartwatch). In some embodiments, the wrist-wearable device 120 is an instance of the wrist-wearable device 1188 (FIG. 11). In some embodiments, the head-wearable device 402 is an instance of the head-wearable device 1111. The user 115 in FIG. 4A is viewing a scene 404 that includes an appearance settings interface 406 (e.g., corresponding to an application or operating system). In some embodiments, the scene 404 corresponds to a display of the wrist-wearable device 120 or a display of the head-wearable device 402. For example, the scene 404 is displayed by the head-wearable device 402 in response to the user 115 gazing toward the wrist-wearable device 120. In the example of FIG. 4A, the user 115 is not performing a gesture.

Figure 4B:
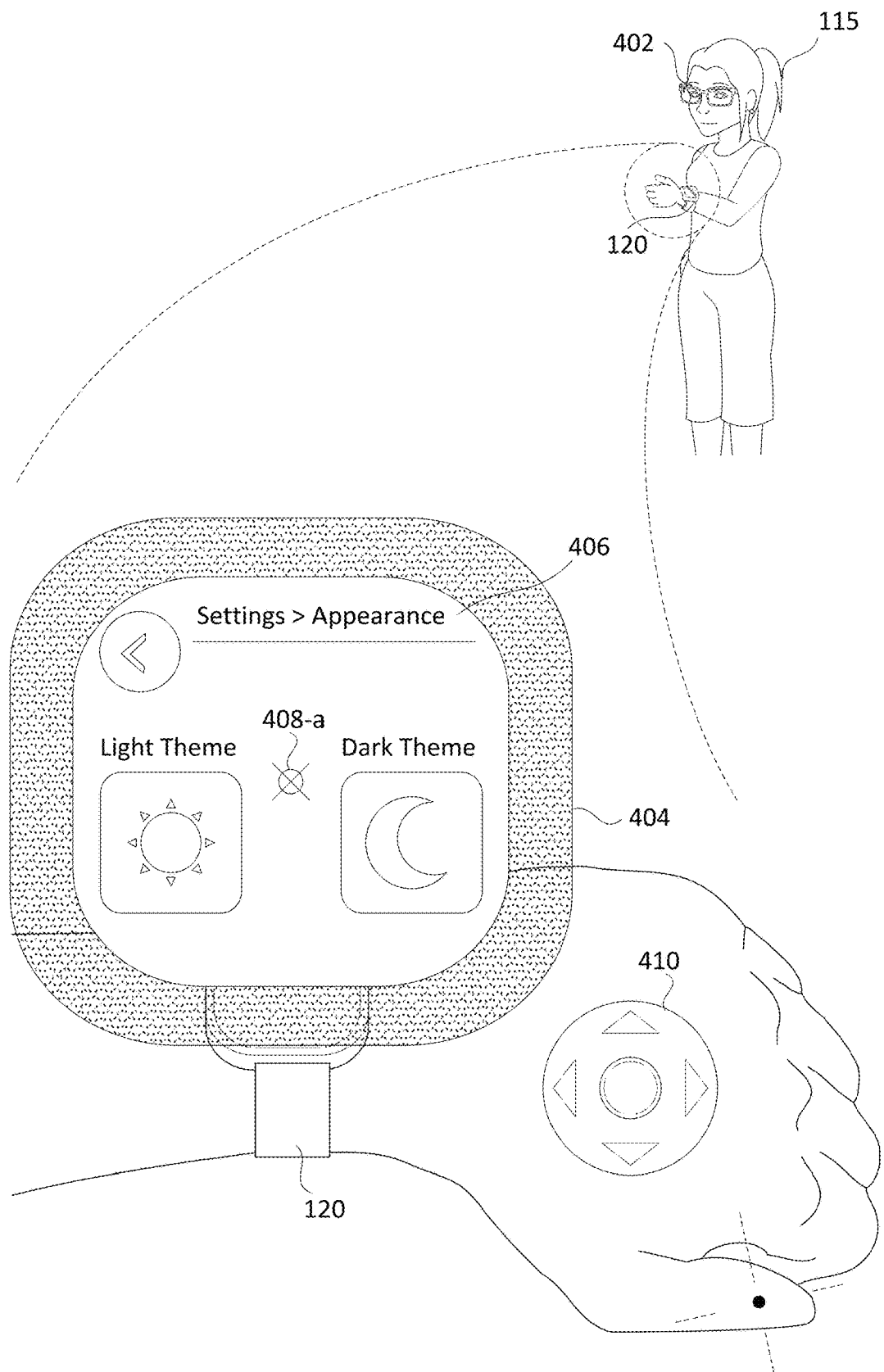

FIG. 4B shows the user 115 performing a fist gesture (e.g., a priming gesture) that involves the user curling their fingers to their palm. FIG. 4B further shows the scene 404 updating (responsive to the fist gesture) to include a point of focus (e.g., cursor) 408 at a location 408-a on the interface 406. In accordance with some embodiments, the priming gesture in FIG. 4B causes the interface 406 to be responsive to navigation gestures (e.g., causes the point of focus 408 appear and be manipulable by the user 115). In some embodiments, the location 408-a of the point of focus (e.g., an initial location for the point of focus) is selected by default (e.g., based on a setting or user preference). In some embodiments, the location 408-a of the point of focus is a center of the user interface 406 or the scene 404.

FIG. 4B further shows an indicator 410 (e.g., a virtual directional-pad) indicating that the user 115 is able to move their thumb as if the thumb is in contact with a directional-pad. In some embodiments, the indicator 410 is presented (e.g., via the head-wearable device 402) to the user 115 in response to the fist gesture. In some embodiments, the indicator 410 is not presented to the user 115 (e.g., in accordance with a preference setting). In some embodiments, the position of the user's thumb when the fist gesture is performed becomes an origin point (e.g., coordinates 0,0) for the virtual directional-pad.

Figure 4C:
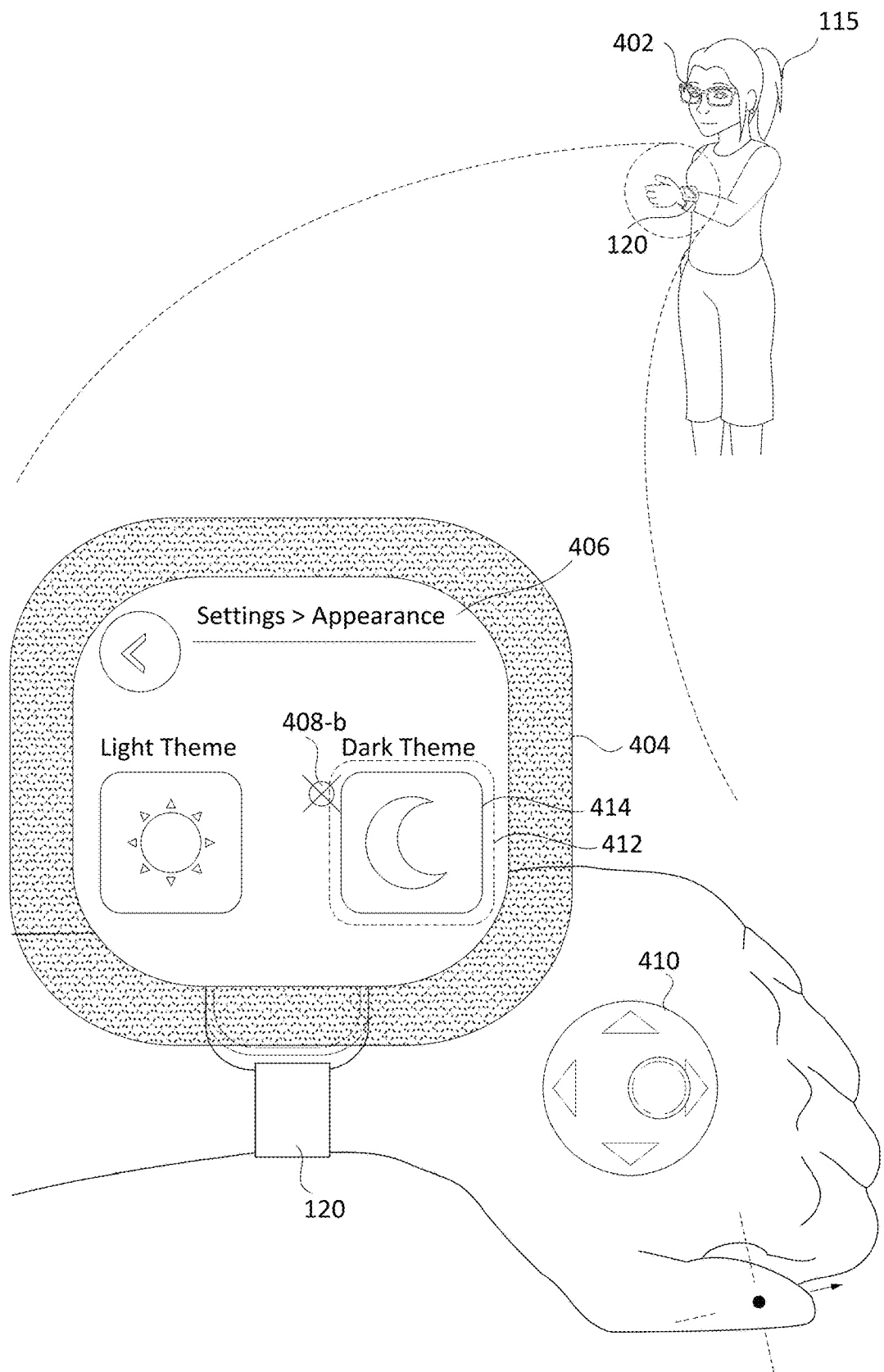

FIG. 4C shows the user 115 moving their thumb in a direction extending away from the user's wrist (e.g., a navigation gesture). FIG. 4C further shows the point of focus 408 moving to the right on the interface 406 (responsive to the thumb movement) to a location 408-b on the interface 406. FIG. 4C further shows the indicator 410 updating to indicate that the user 115 is activating a rightward direction on the virtual directional-pad. FIG. 4C also shows a snap boundary (threshold) 412 for a user interface element 414. In the example of FIG. 4C, the location 408-b of the point of focus 408 is beyond the snap boundary 412 and the user interface element 414 is not selected.

Figure 4D:
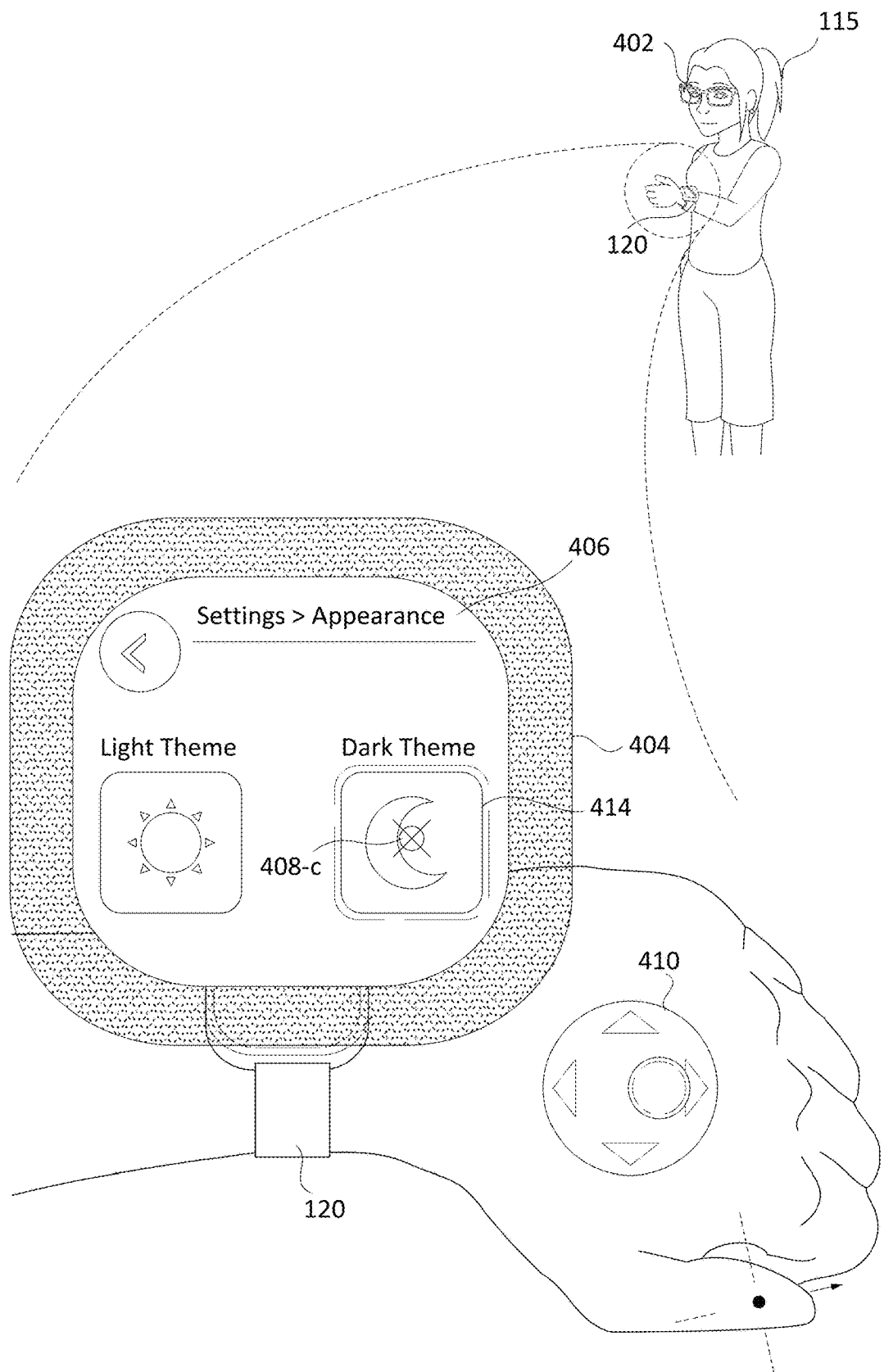

FIG. 4D shows the user 115 continuing to have their thumb in the direction away from their wrist (e.g., maintaining the navigation gesture). FIG. 4D further shows the point of focus 408 moving to the right on the interface 406 (responsive to maintained thumb gesture) to a location 408-c on the interface 406. In the example of FIG. 4D, the point of focus 408 has moved within the snap boundary for the user interface element 414 and has snapped to the user interface element 414 (e.g., as indicated by the point of focus 408-c location being in the center of the user interface element 414). FIG. 4D also shows that the user interface element 414 is selected in accordance with the point of focus 408 snapping to the user interface element 414. In some embodiments, the point of focus 408 is not displayed to the user while the point of focus 408 is snapped to a user interface element (e.g., the point of focus 408 is replaced with an indication that the user interface element is selected).

Figure 4E:
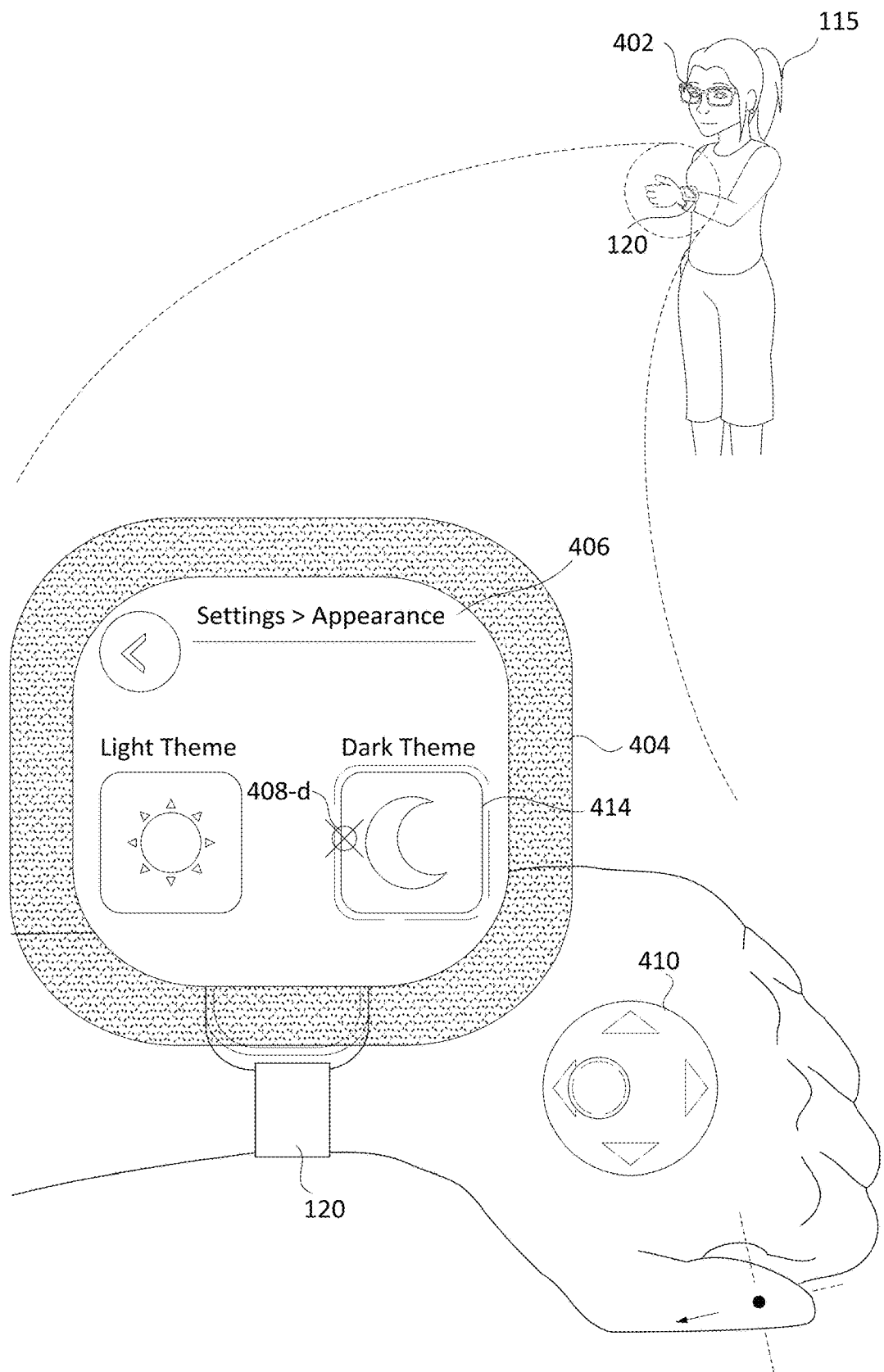

FIG. 4E shows the user 115 moving their thumb in a direction contracting toward from the user's wrist (e.g., a navigation gesture). FIG. 4E further shows the point of focus 408 moving to the left on the interface 406 (responsive to the thumb movement) to a location 408-d on the interface 406. In the example of FIG. 4E, the location 408-d of the point of focus 408 is overlaid with the user interface element 414 (e.g., is within an un-snap boundary) and the user interface element 414 continues to be selected. FIG. 4E further shows the indicator 410 updating to indicate that the user 115 is activating a leftward direction on the virtual directional-pad.

Figure 4F:
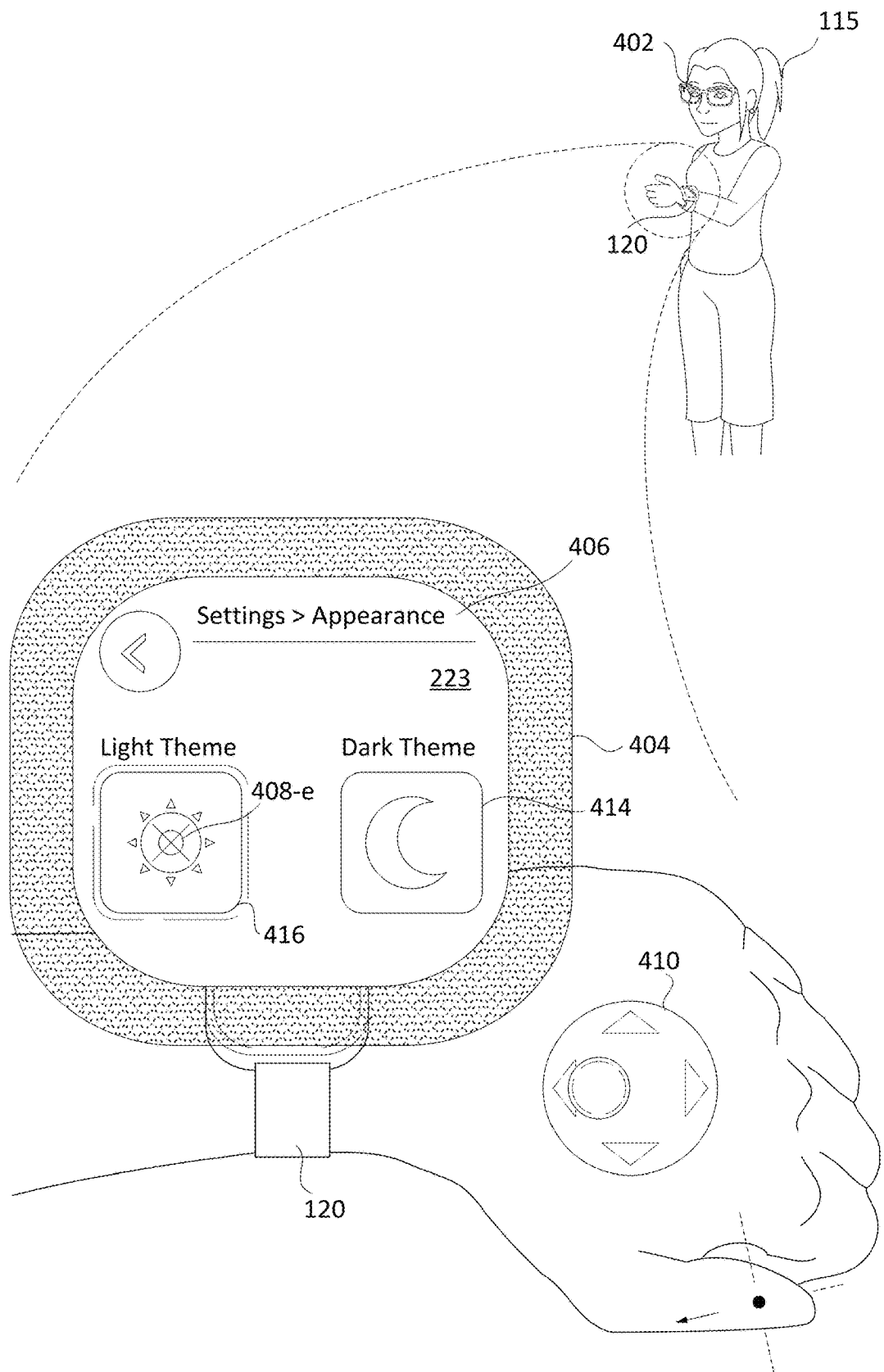

FIG. 4F shows the user 115 continuing to have their thumb in the direction toward their wrist (e.g., maintaining the navigation gesture). FIG. 4F further shows the point of focus 408 moving to the left on the interface 406 (responsive to maintained thumb gesture) to a location 408-e on the interface 406. In the example of FIG. 4F, the point of focus 408 has moved has snapped to the user interface element 416 (e.g., as indicated by the point of focus 408-e location being in the center of the user interface element 416). In some embodiments, the point of focus 408 snaps to the user interface element 416 in accordance with movement of the point of focus 408 within a snap boundary of the user interface element 416. In some embodiments, the point of focus 408 snaps to the user interface element 416 in accordance with the point of focus 408 unsnapping from the user interface element 414. For example, the point of focus 408 moves beyond an un-snap boundary for the user interface element 414 and automatically snaps to the user interface element 416. In some embodiments, the point of focus 408 snaps to the user interface element 416 in accordance with the point of focus 408 moving to a location where the user interface element 416 is the closest user interface element to the point of focus 408. FIG. 4F also shows that the user interface element 416 is selected in accordance with the point of focus 408 snapping to the user interface element 416.

In some embodiments, the wrist-wearable device 120 and/or the head-wearable device 402 provides visual, audio, and/or haptic feedback to the user to indicate that a performed gesture has been detected (e.g., distinct feedback provided in response to each type of gesture).

Figure 5A:
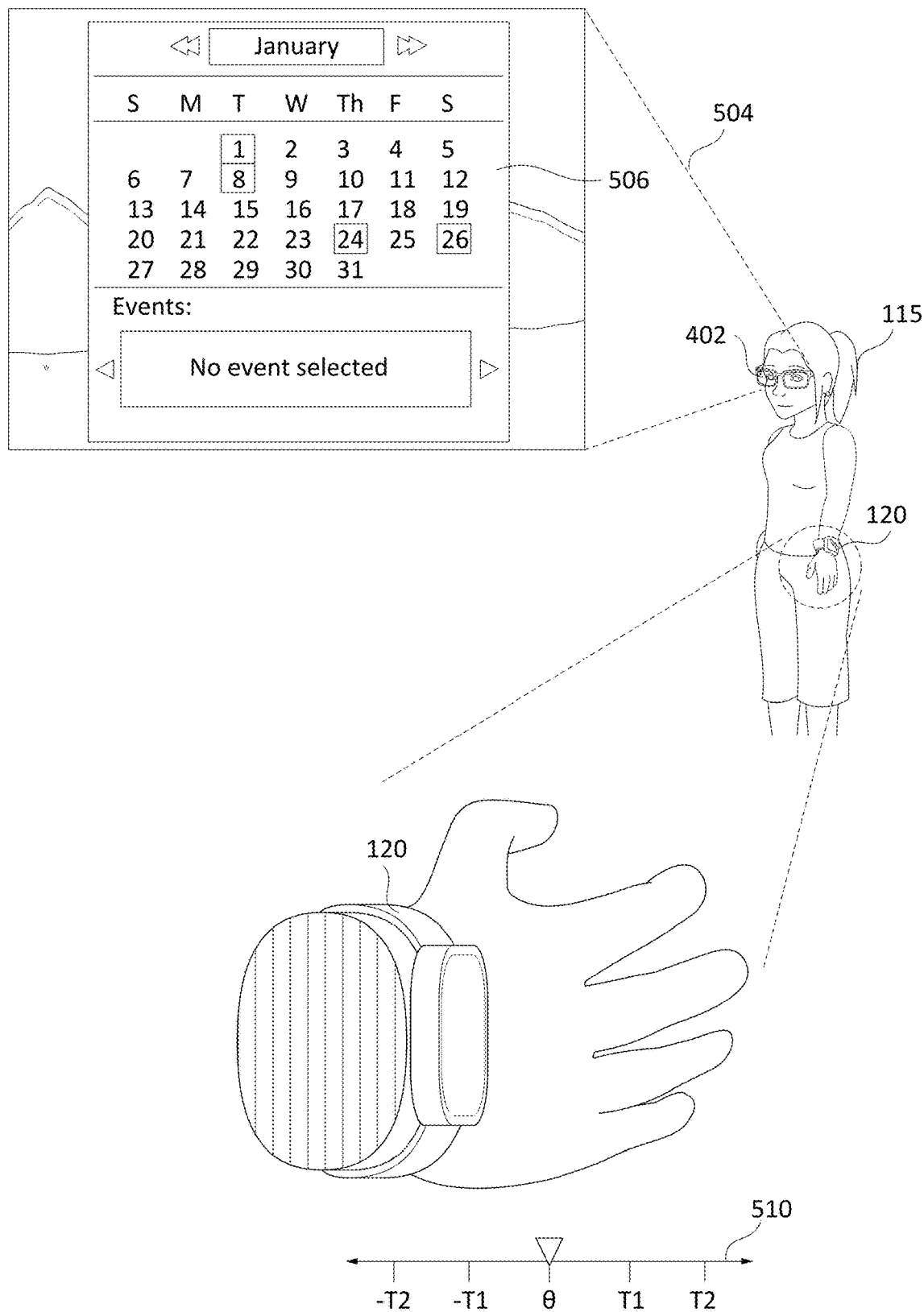
FIGS. 5A-5E illustrate an example user scenario of interacting with an artificial-reality system (e.g., including at least augmented-reality glasses and a wrist-wearable device) in accordance with some embodiments.

FIGS. 5A-5E illustrate an example user scenario of interacting with an artificial-reality system in accordance with some embodiments. The user 115 in FIG. 5A is wearing a head-wearable device 402 (e.g., augmented-reality glasses) and a wrist-wearable device 120 (e.g., a smartwatch). In some embodiments, the wrist-wearable device 120 is an instance of the wrist-wearable device 1188 (FIG. 11). In some embodiments, the head-wearable device 402 is an instance of the head-wearable device 1111. The user 115 in FIG. 5A is viewing a scene 504 that includes a calendar interface 506 (e.g., corresponding to a calendar application). The calendar interface 506 in FIG. 5A shows the month of January with no event selected. In some embodiments, the calendar interface 506 is presented in response to a user performing a control gesture while an icon for the calendar application is selected. In the example of FIG. 5A, the user 115 is not performing a gesture. FIG. 5A further shows a scale 510 indicating an amount of rotation of the user's wrist and including multiple rotation thresholds, labeled T1 and T2.

In some embodiments, a wrist rotation gesture with rotation less than the T1 threshold corresponds to a first type of navigation gesture (e.g., navigate to adjacent day), a wrist rotation gesture with a rotation between the T1 and T2 thresholds corresponds to a second type of navigation gesture (e.g., navigate to next event), and a wrist rotation gesture with a rotation greater than the T2 threshold corresponds to a third type of navigation gesture (e.g., navigate to adjacent month).

Figure 5B:
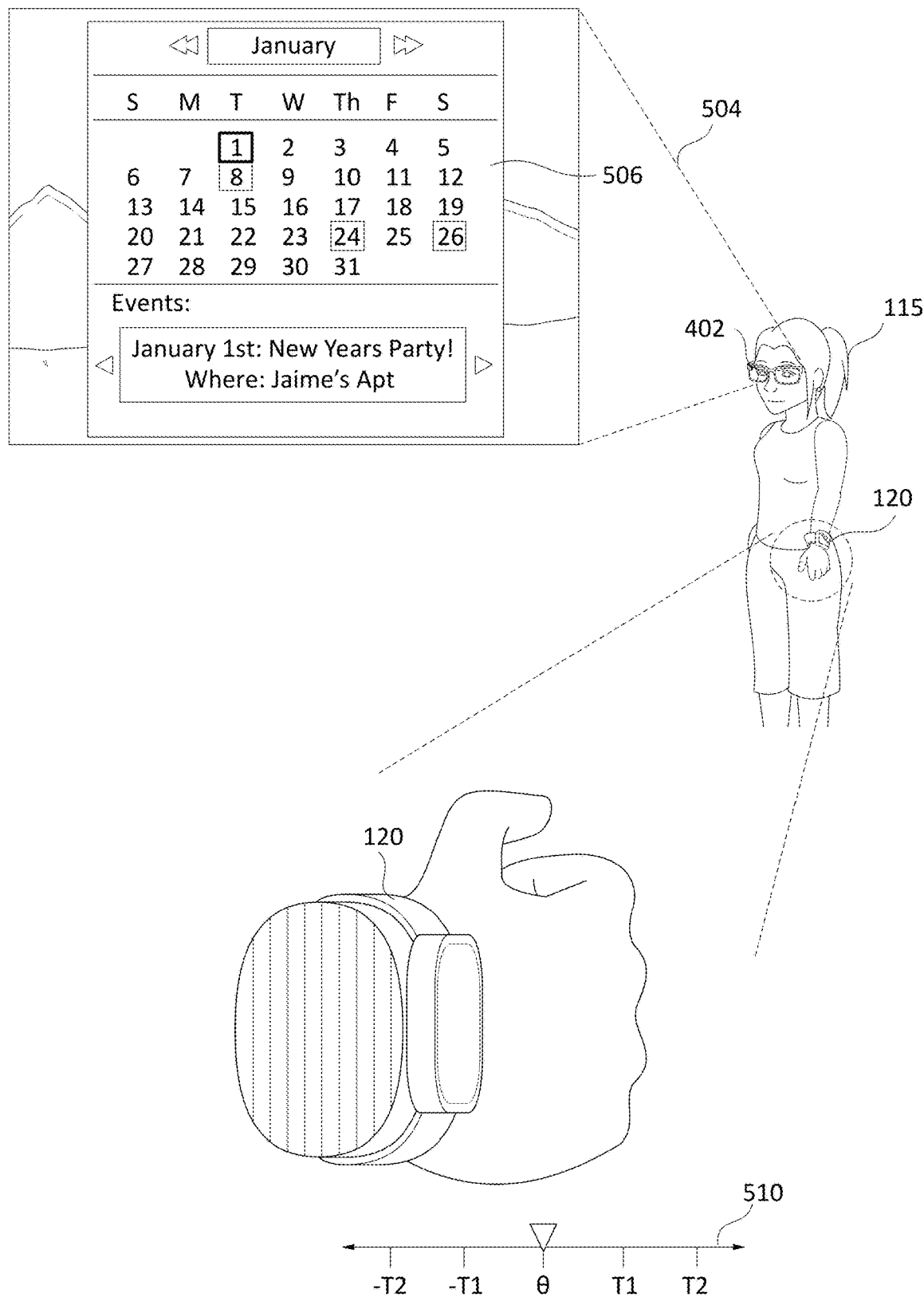

FIG. 5B shows the user 115 performing a fist gesture (e.g., a priming gesture) that involves the user curling their fingers to their palm. FIG. 5B further shows the scene 504 updating (responsive to the fist gesture) to select an event on January 1st on the interface 506. In accordance with some embodiments, the priming gesture in FIG. 5B causes the interface 506 to be responsive to navigation gestures. Although FIG. 5B shows the fist gesture involving the user maintaining their thumb above their index finger, in some embodiments, the fist gesture may be performed with the thumb resting on the index finger. In some embodiments, the January $1^{st}$ event is selected by default (e.g., based on a setting in the calendar application, or a user preference). In some embodiments, the January $1^{st}$ event is selected based on a gaze of the user (e.g., determined via eye tracking). In some embodiments, the January $1^{st}$ event is selected in accordance with it being the first event or next event in the month (e.g., in the current month). The scale 510 in FIG. 5B indicates that the user 115 has not rotated their wrist. In some embodiments, the positioning (orientation) of the user's wrist when the fist gesture is performed is assigned as an origin point (zero point of rotation) on the scale 510.

Figure 5C:
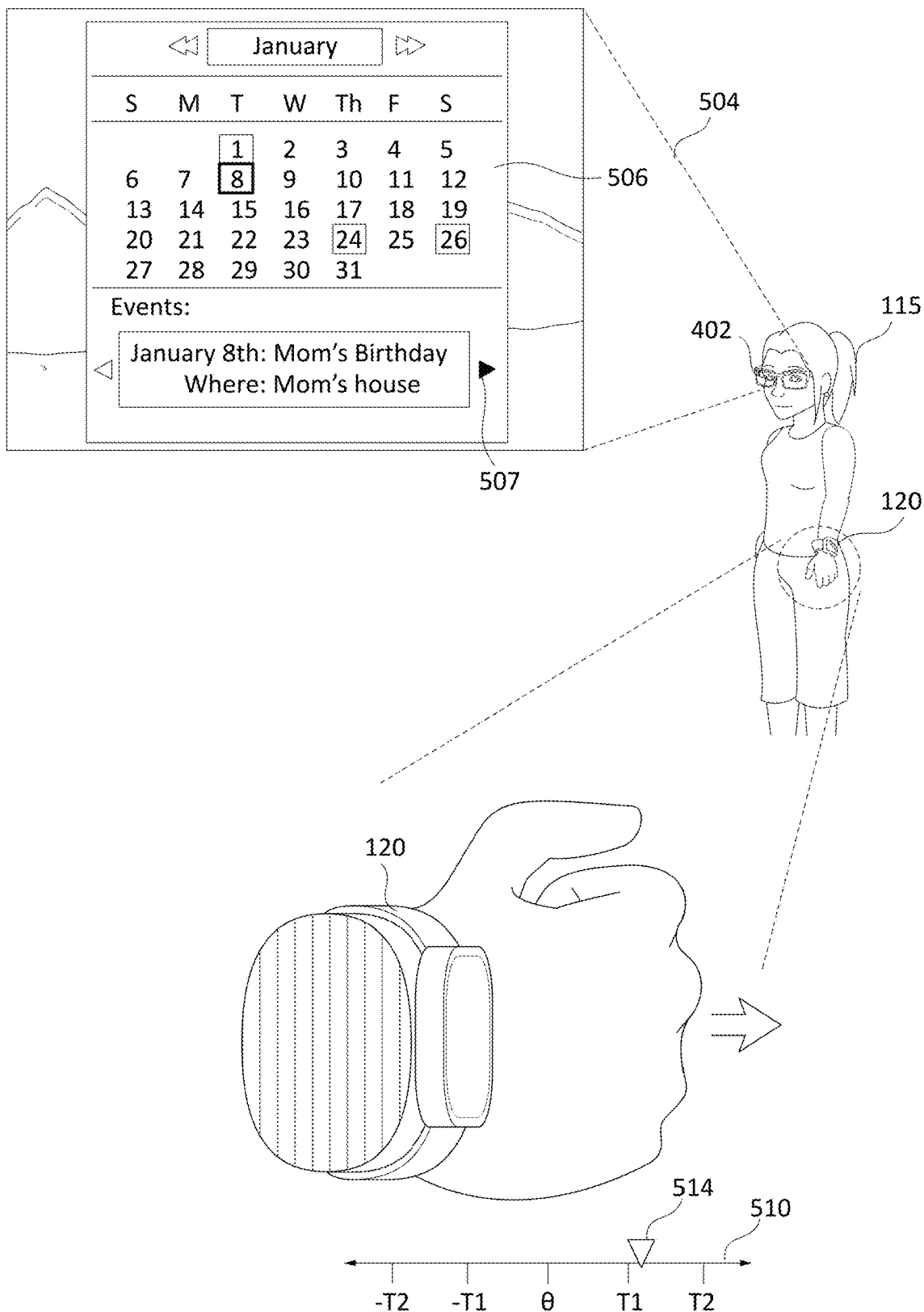

FIG. 5C shows the user 115 performing a wrist rotation gesture (e.g., a navigation gesture) that involves the user rotating their wrist outward (e.g., away from their body).

FIG. 5C further shows the scene 504 updating (responsive to the wrist rotation gesture) to select an event on January 8th on the interface 506 (e.g., corresponding to activation of the next event affordance 507). The scale 510 in FIG. 5C indicates that the user 115 has rotated their wrist beyond the T1 threshold but not to the T2 threshold (e.g., has performed the second type of navigation gesture corresponding to selection of a next event) as shown by the rotation indicator 514. In some embodiments, the January 8th event is selected in accordance with the direction of the wrist rotation and amount of rotation (e.g., the type of navigation gesture).

Figure 5D:
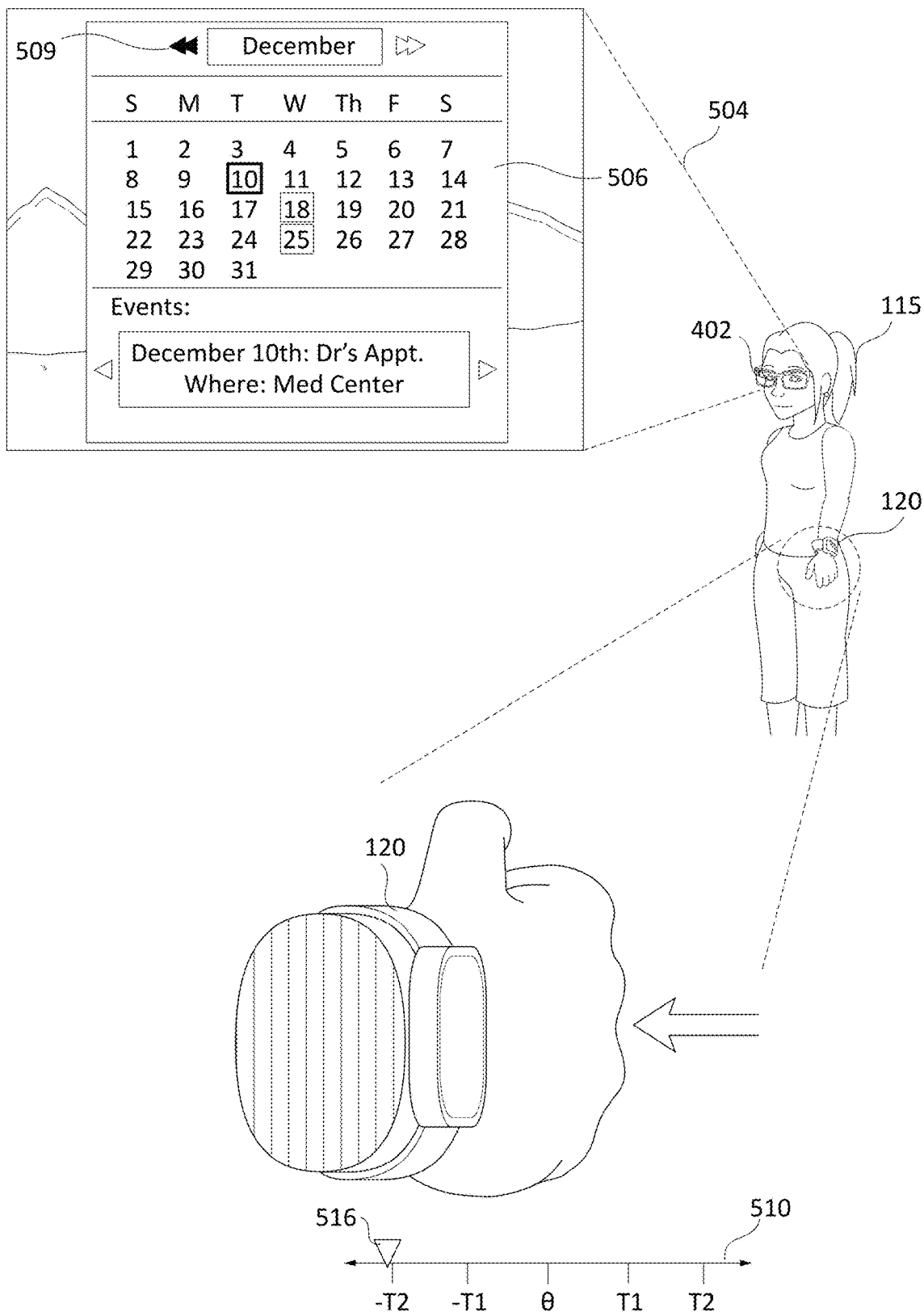

FIG. 5D shows the user 115 performing another wrist rotation gesture (e.g., a navigation gesture) that involves the user rotating their wrist inward (e.g., toward their body). FIG. 5D further shows the scene 504 updating (responsive to the wrist rotation gesture) to select an event on December 10th on the interface 506 (e.g., corresponding to activation of the previous month affordance 509). The scale 510 in FIG. 5D indicates that the user 115 has rotated their wrist beyond the (negative) T2 threshold (e.g., has performed the third type of navigation gesture corresponding to navigation to an adjacent month) as shown by the rotation indicator 516. In some embodiments, the December 10th event is selected in accordance with the direction of the wrist rotation and amount of rotation (e.g., the type of navigation gesture). In some embodiments, the wrist rotation gesture corresponds to a command to navigate to the previous month (December) and the December 10th event is selected by default (e.g., due to it being the first event in December).

Figure 5E:
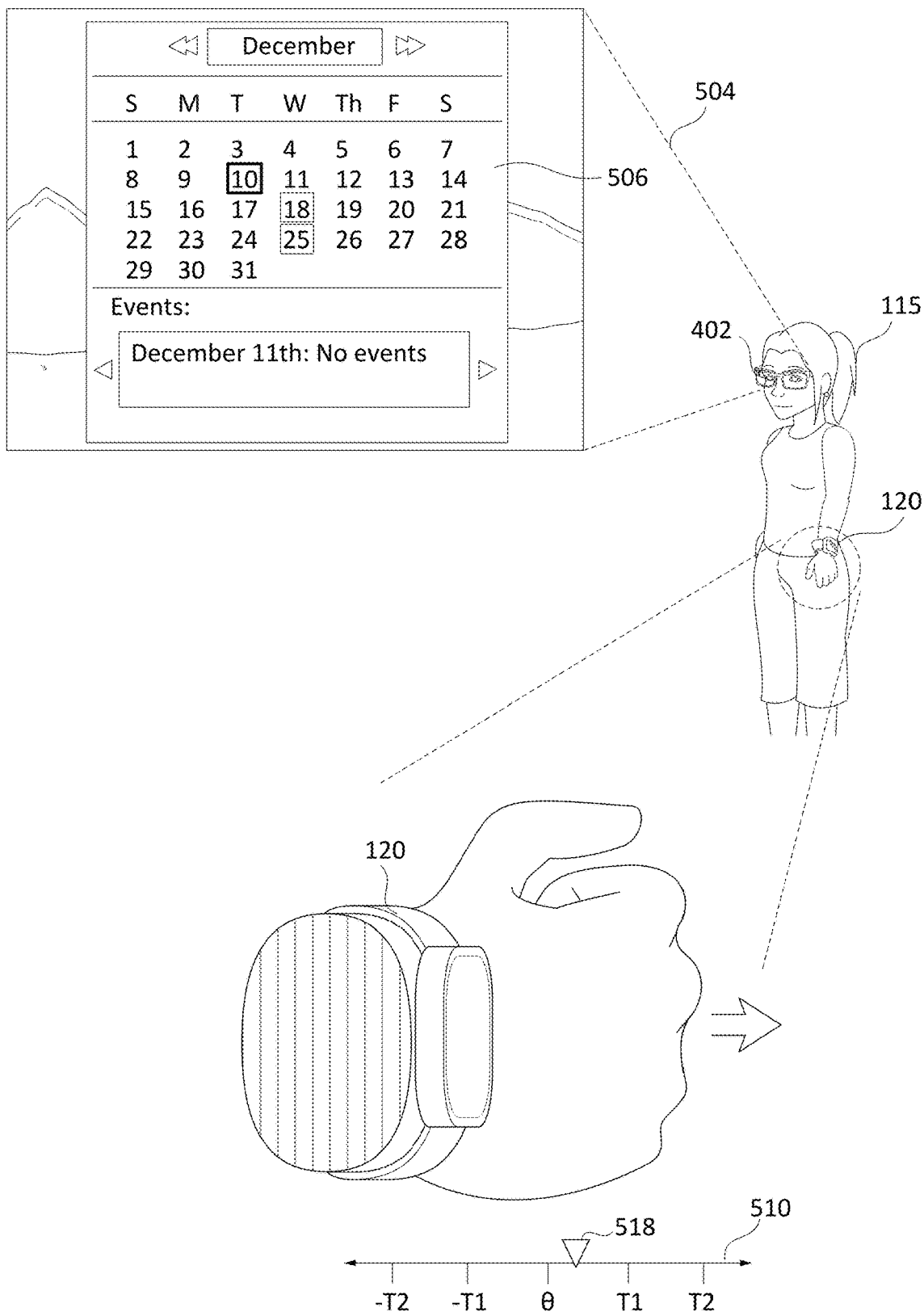

FIG. 5E shows the user 115 performing another wrist rotation gesture (e.g., a navigation gesture) that involves the user rotating their wrist outward (e.g., away from their body). FIG. 5E further shows the scene 504 updating (responsive to the wrist rotation gesture) to display events (none) for December 11th on the interface 506. The scale 510 in FIG. 5E indicates that the user 115 has rotated their wrist less than the T1 threshold (e.g., has performed the first type of navigation gesture corresponding to navigation to an adjacent day) as shown by the rotation indicator 518. In some embodiments, December 11th is selected in accordance with the direction of the wrist rotation and amount of rotation (e.g., the type of navigation gesture).

Figure 6A:
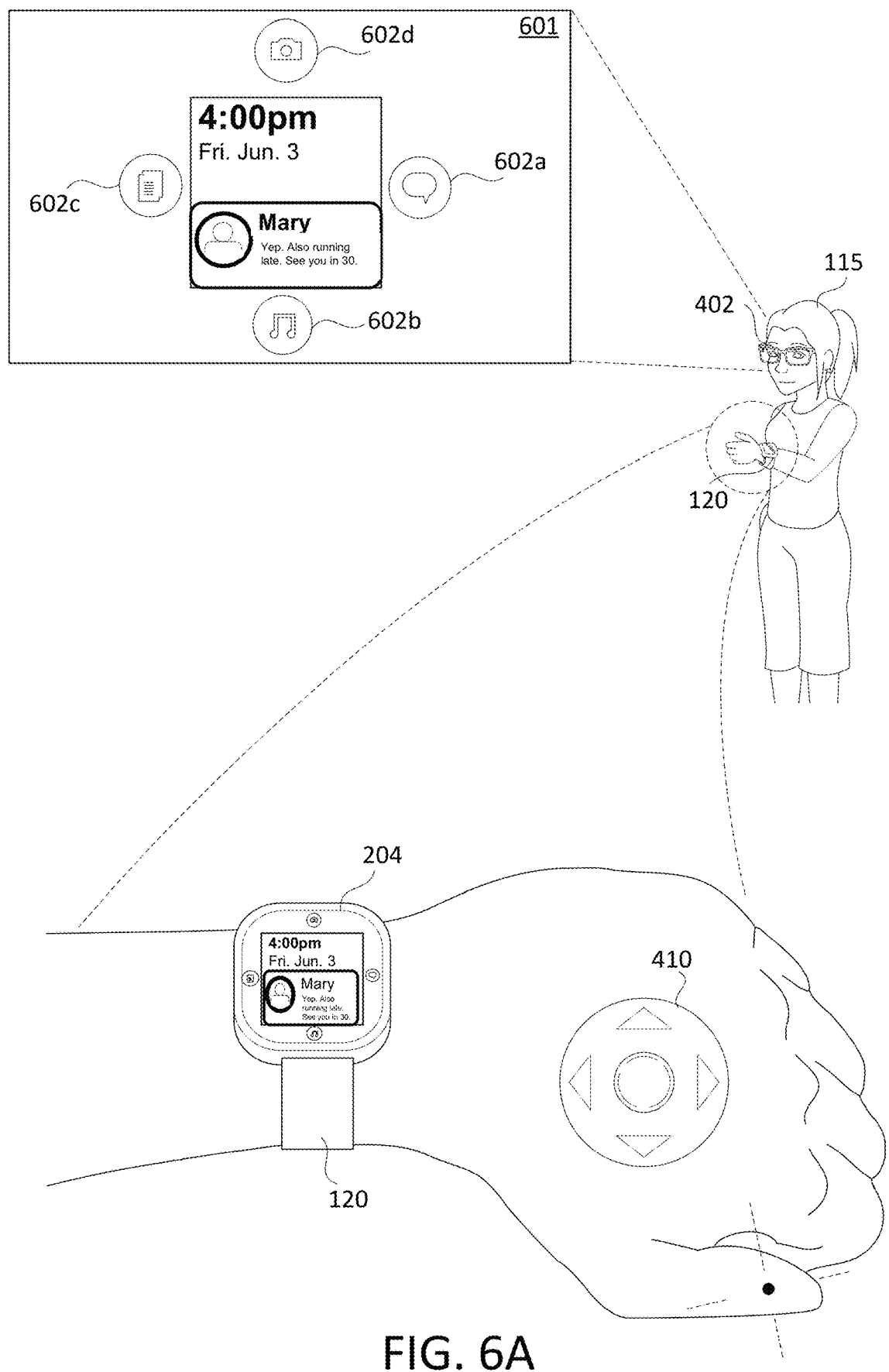
FIGS. 6A-6G illustrate another example user scenario of interacting with a wearable device in accordance with some embodiments.

FIGS. 6A-6G illustrate another example user scenario of interacting with the wearable device 120 in accordance with some embodiments. The user 115 in FIG. 6A is wearing the head-wearable device 402 (e.g., augmented-reality glasses) and the wrist-wearable device 120 (e.g., a smartwatch). The user 115 in FIG. 6A is viewing a navigable user interface 601 (e.g., a user interface corresponding to a home screen and/or landing page) on the display of the head-wearable device 402. In some embodiments, the navigable user interface 601 is displayed in response to a wake gesture performed by the user. For example, the user 115 is able to wake the head-wearable device 402 and/or the wrist-wearable device 120 by performing a wake gesture (e.g., a middle finger and thumb double tap gesture). In some embodiments, waking the head-wearable device 402 and/or the wrist-wearable device 120 causes the navigable user interface 610 to be displayed. In some embodiments, waking the head-wearable device 402 and/or the wrist-wearable device 120 causes the system (e.g., the head-wearable device 402 and/or the wrist-wearable device 120) to be responsive to additional gestures (such as navigational gestures and/or gestures linked to particular applications).

In some embodiments, the same or similar navigable user interface also appears on the display 204 of the wrist-wearable device as shown in FIG. 6A. The navigable user interface 601 includes content (e.g., time and data information and an unread message) and quick-action user interface elements 602 which the user 115 can navigate to through gestures (e.g., to open selected applications in particular states). In some embodiments, the quick-action user interface elements 602 are customizable by the user 115 to fit their needs for applications they wish to access quickly. In accordance with some embodiments, the quick-action user interface elements 602 are application icons located in the user interface 601 that allow the user 115 to immediately access and open the corresponding application (e.g., in response to performing a single navigation gesture).

FIG. 6A shows one configuration of quick-action user interface elements 602, but this application is not limited to that configuration. In various embodiments, there are less than four or more than four quick-action user interface elements 602 (e.g., each located along a periphery of the user interface 601). In some embodiments, each quick-action user interface element 602 navigates to a different application or page on the wrist-wearable device 120. For example, in FIG. 6A four different applications are represented by the quick-action user interface elements: a messaging application corresponding to quick-action user interface element 602a, music application corresponding to quick-action user interface element 602b, notifications application corresponding to quick-action user interface element 602c, and camera application corresponding to quick-action user interface element 602d. In some embodiments, other applications such as phone, email, and/or exercise applications can each be assigned a corresponding quick-action user interface element 602.

In some embodiments, navigation to a quick-action user interface element causes activation of a function associated with the user interface element (e.g., without requiring an additional user input, such as a control gesture). In some embodiments, the function involves opening an application in a particular state. For example, navigation to a quick-action user interface element corresponding to a messaging application may cause presentation of a particular interface of the messaging application (e.g., a user interface for recent messages or a user interface for user contacts). In this way, the user is able to activate commonly used and/or important functions without requiring additional inputs or navigating additional menus or interfaces. The user 115 in FIG. 6A is making a fist gesture at a first time. In some embodiments, the fist gesture is a priming gesture for navigation via a virtual directional-pad (as represented by the indicator 410). FIGS. 6A-6G, shows navigation of applications using the quick-action user interface elements.

Figure 6B:
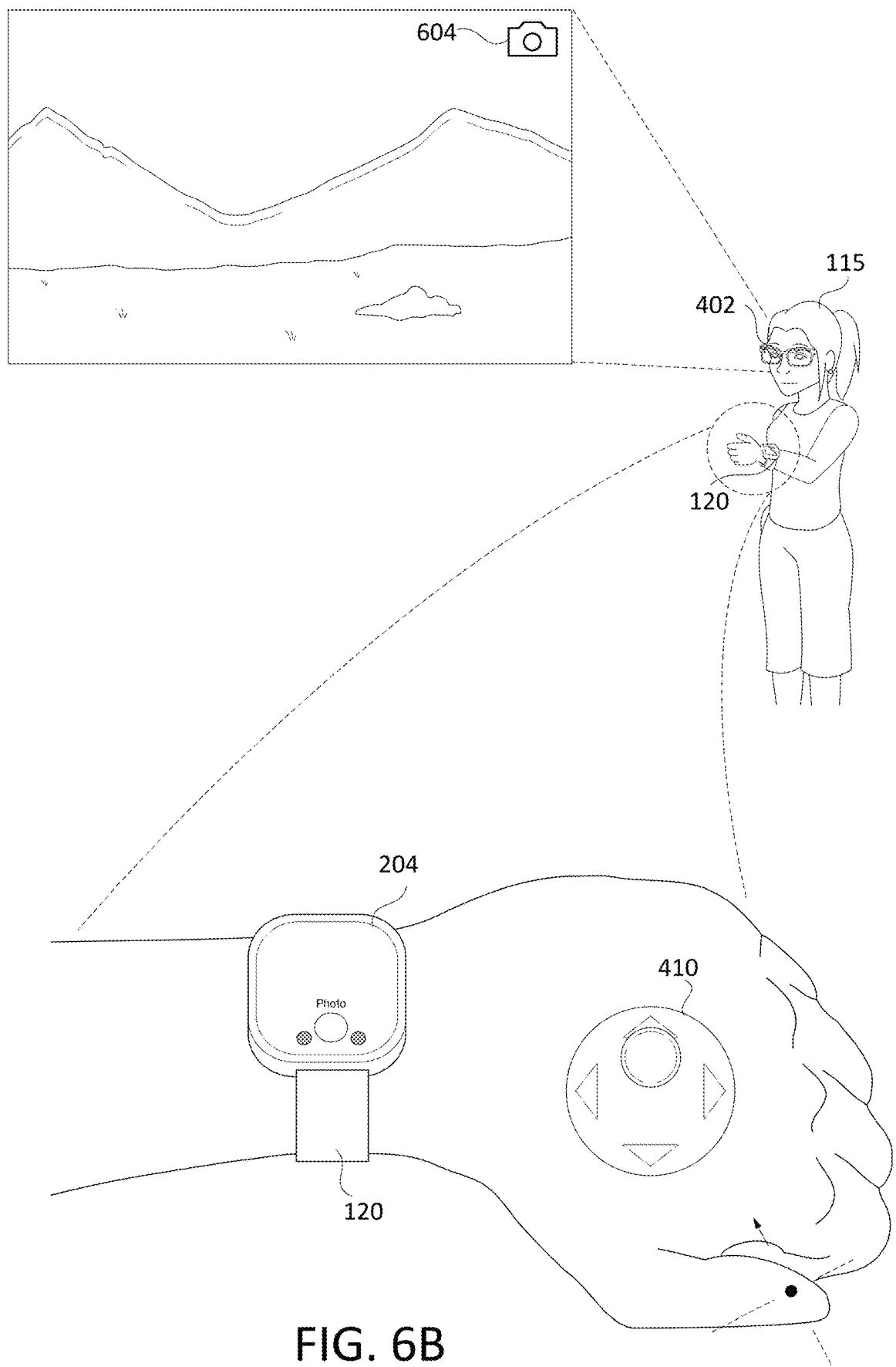

FIG. 6B shows the user 115 moving their thumb in a direction toward the back of their hand (e.g., an upward navigation gesture while maintaining the fist gesture) at a second time, subsequent to the first time. The upward navigation gesture in FIG. 6B corresponds to the quick-action user interface element 602d for a camera application (as shown in FIG. 6A). As the user moves their thumb, the indicator 410 updates to indicate that the user 115 is activating an upward direction on the virtual directional-pad. FIG. 6B further shows activation of the camera application in response to the user gesture, e.g., including activating an imaging device on the head-wearable device 402. In some embodiments, an icon (e.g., camera icon 604) is displayed for the user 115 on the display of the head-wearable device to indicate that the camera application is active. In some embodiments, the display 204 of the wrist-wearable device does not display an active camera live feed as shown in FIG. 6B. In some embodiments, the display 204 shows an indication that the camera application is active (e.g., an icon similar to camera icon 604). In some embodiments, the display 204 on the wrist-wearable device shows an active camera feed of what the imaging device is capturing.

Figure 6C:
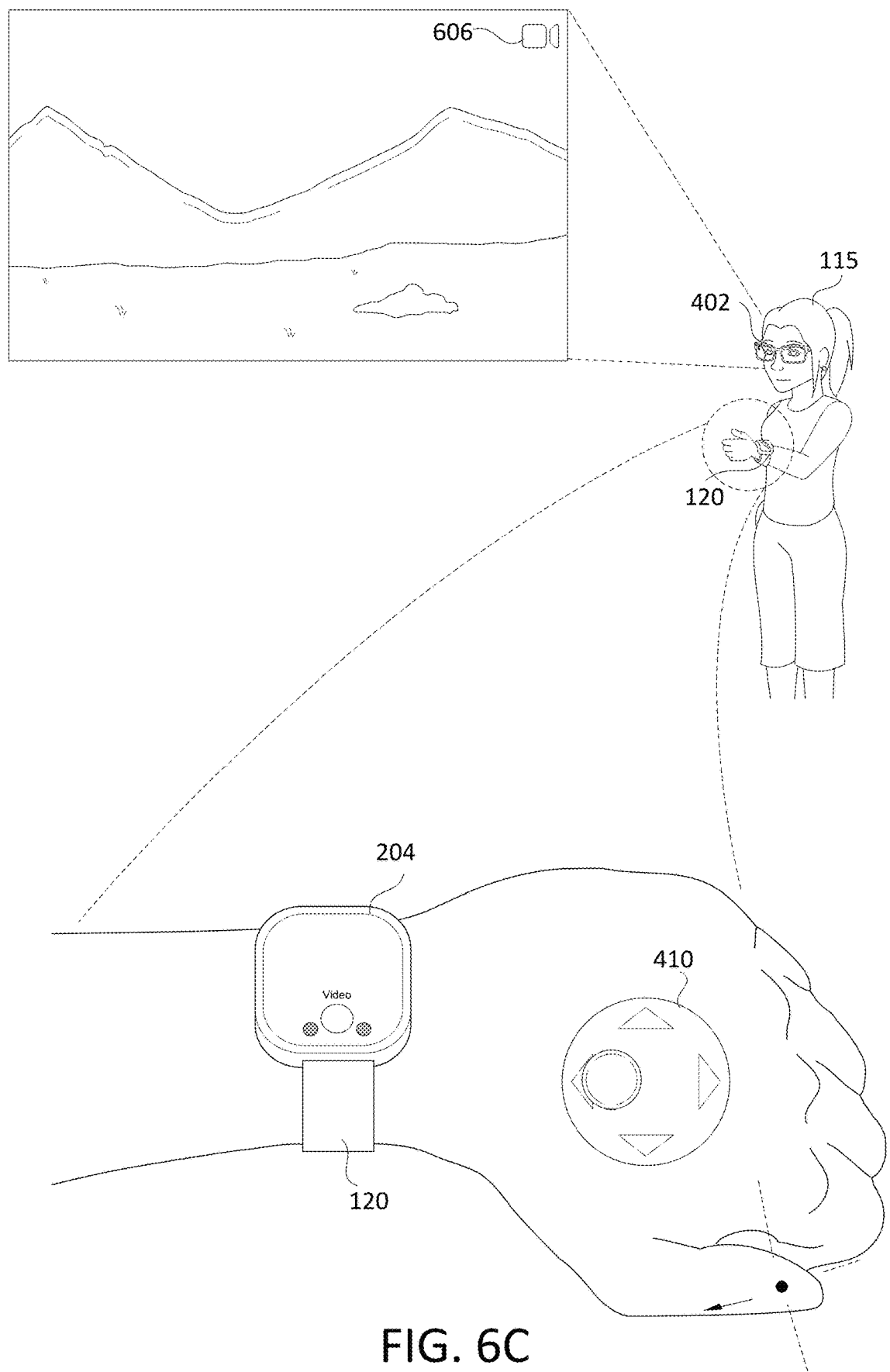

FIG. 6C shows the user 115 moving their thumb in a direction extending towards the user's wrist (e.g., a leftward navigation gesture) at a third time, subsequent to the second time. FIG. 6C further shows the result of this gesture is the user 115 scrolling through the one or more camera options (e.g. from a photo option in FIG. 6B and to a video option in FIG. 6C). As the user 115 moves their thumb, the indicator 410 updates to indicate that the user 115 is activating a leftward direction on the virtual directional-pad. In some embodiments, as shown in FIG. 6C, the display of the head-wearable device includes a video icon 606 to indicate to the user 115 that the imaging device is active and is in a video mode.

Figure 6D:
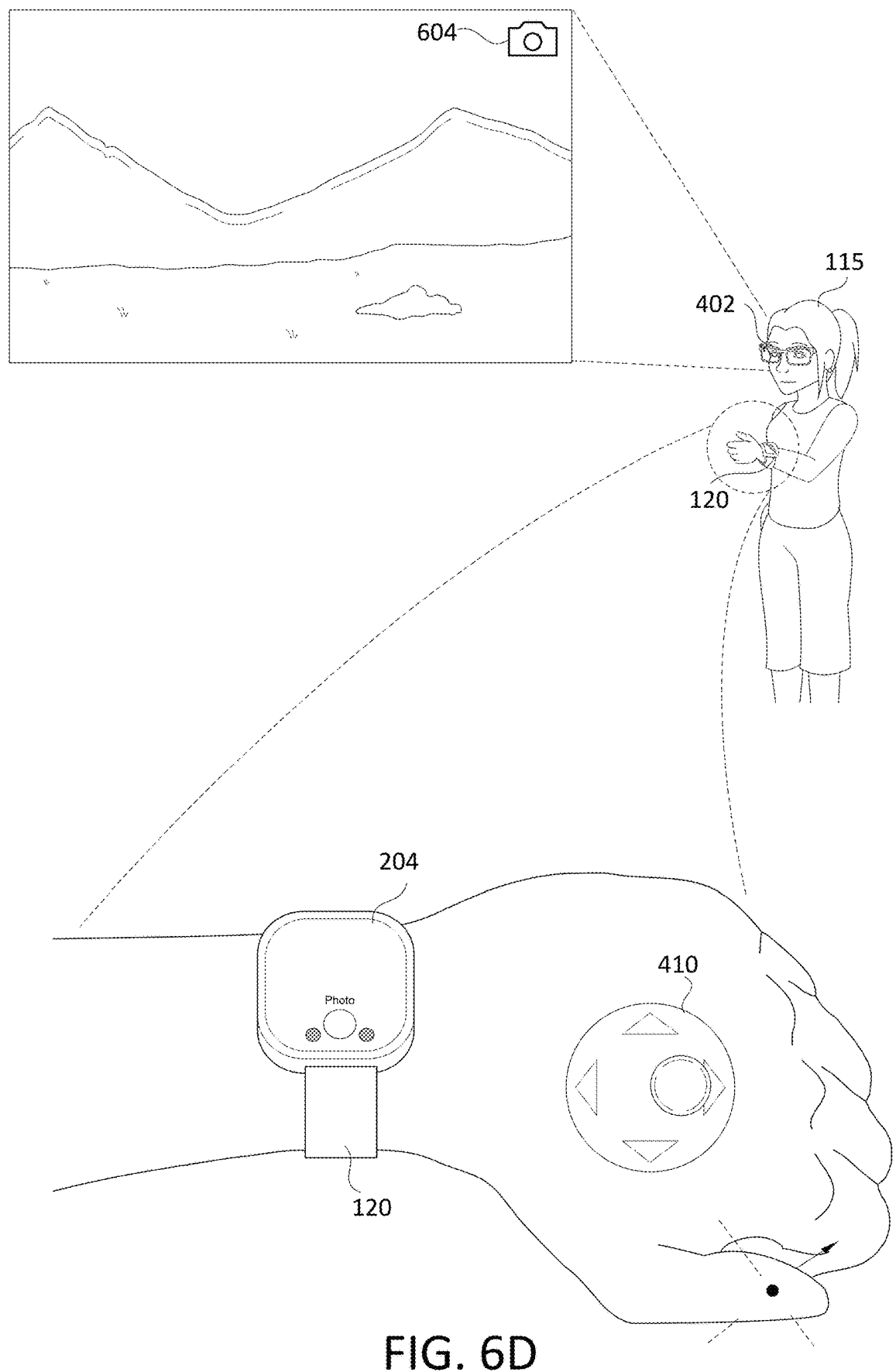

FIG. 6D shows the user 115 moving their thumb in a direction extending away from the user's wrist (e.g., a rightward navigation gesture) at a fourth time, subsequent to the third time. As the user moves their thumb away from the user's wrist, the indicator 410 updates to indicate that the user 115 is activating a rightward direction on the virtual directional-pad. The rightward thumb movement in FIG. 6D results in the user 115 scrolling through the one or more camera options (e.g. from the video option in FIG. 6C and to the photo option in FIG. 6D). In some embodiments, the one or more camera options include other options such as a gallery of photos and/or videos that the user can scroll to/from with the navigation gestures.

Figure 6E:
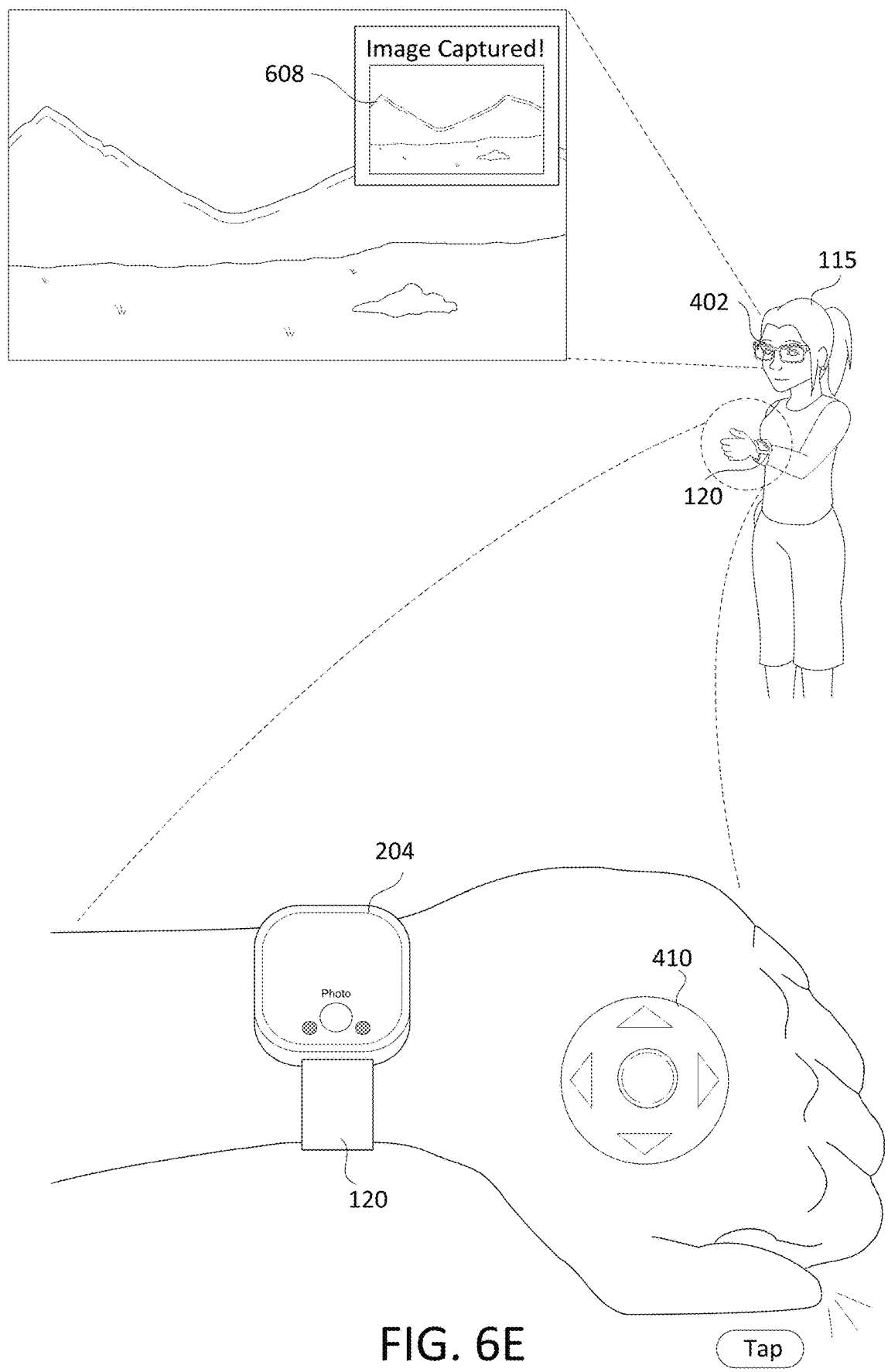

FIG. 6E shows the user 115 performing a tap gesture (e.g., a control gesture while maintaining the fist gesture) at a fifth time, subsequent to the fourth time. The tap gesture in FIG. 6E involves the user's thumb contacting a surface of the user's index finger. FIG. 6E further shows the result of the tap gesture is a captured image as indicated by the notification 608. In some embodiments, the user can capture multiple images by performing one or more taps in to capture additional images.

Figure 6F:
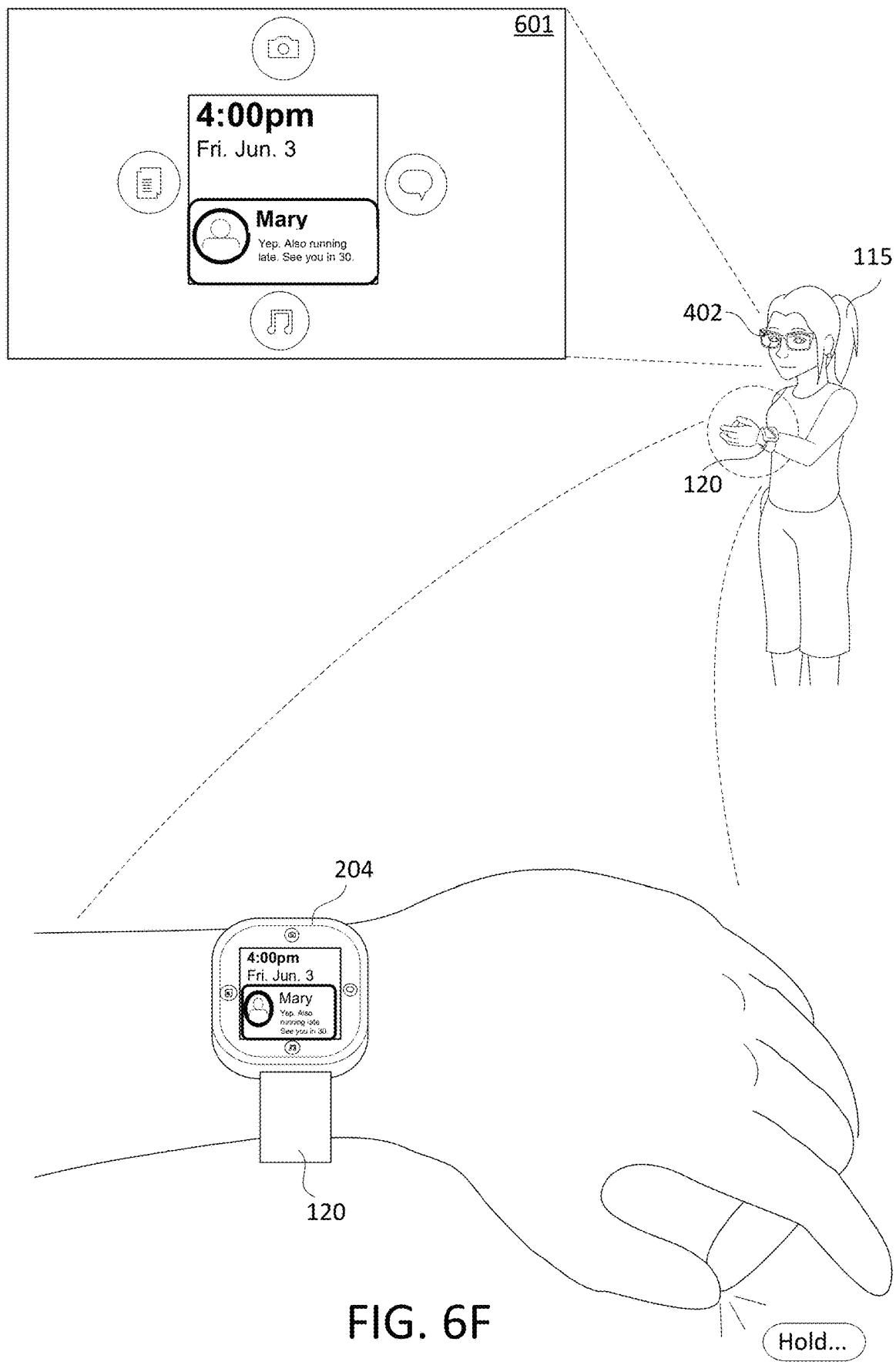
Figure 6G:
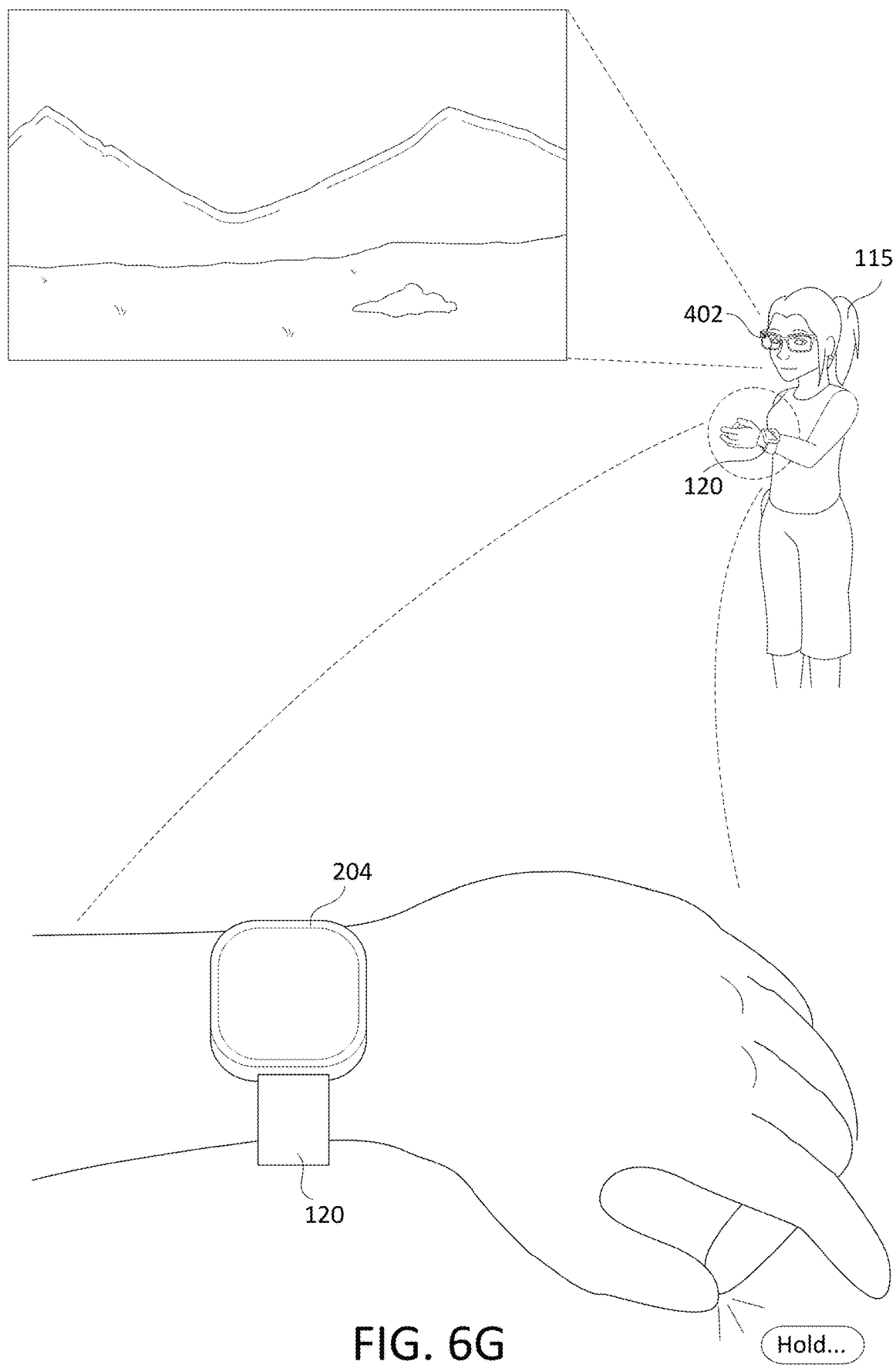

FIG. 6F shows the user 115 holding a gesture (e.g., a middle finger pinch gesture) to navigate to another screen at a sixth time, subsequent to the fifth time. In some embodiments, the user 115 navigates to a home screen by holding a pinch gesture with two phalanges (e.g. a thumb and middle finger pinch) for a predetermined amount of time (e.g. about 1-3 seconds). FIG. 6G shows the user 115 continuing to maintain the gesture from FIG. 6F at a seventh time, subsequent to the sixth time. In the example of FIG. 6G, maintaining the gesture causes the user interface to be disabled (e.g., ceased to be displayed). In some embodiments, if the user 115 maintains the pinch-and-hold gesture described in FIG. 6F for at least a preset amount of time, the user interface ceases to be presented and the display 204 of the wrist-wearable device will appear blank (e.g., powers down, goes to sleep, and/or dims). In some embodiments, maintaining the pinch-and-hold gesture does not shut off the display for the head-wearable device 402. In some embodiments, in response to the pinch-and-hold gesture, the head-wearable device 402 ceases to display any user interface or overlay.

FIGS. 6H-6O illustrate another example user scenario of interacting with a wearable device in accordance with some embodiments. For example, FIGS. 6H-6O illustrate different types of navigational gestures and corresponding navigation operations and functions.

Figure 6H:
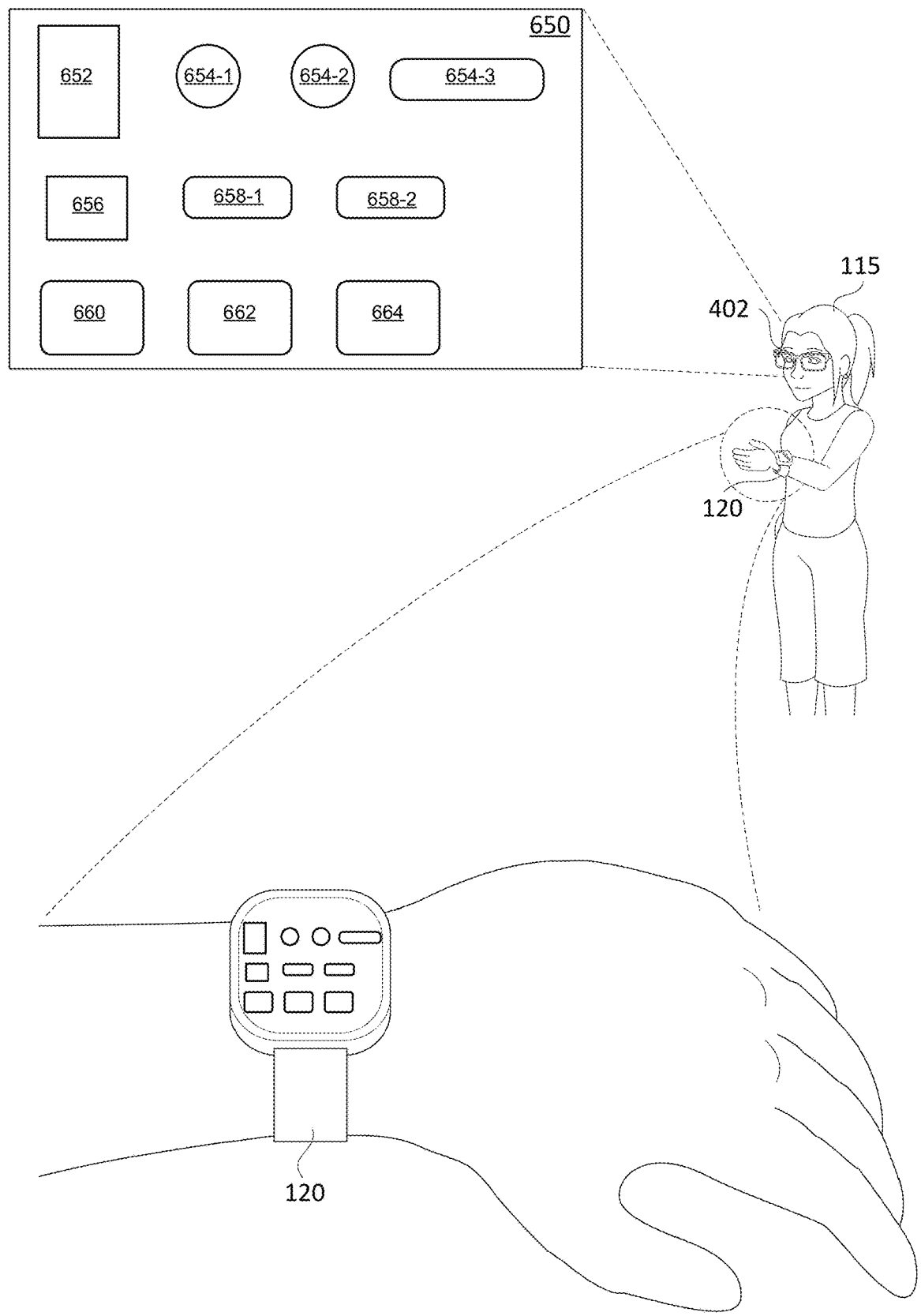
Figure 61:
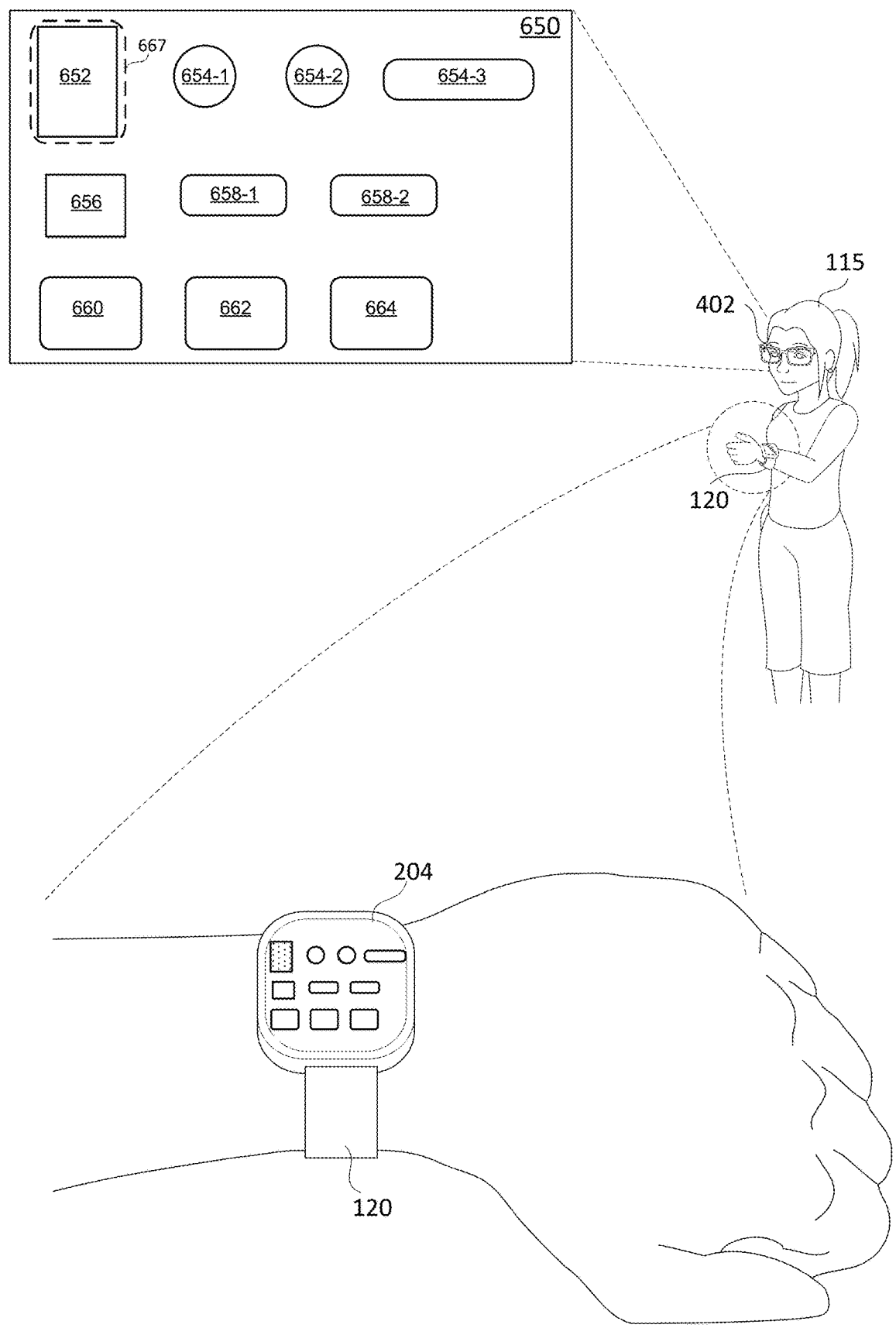

The user 115 in FIG. 6H is wearing the head-wearable device 402 (e.g., augmented-reality glasses) and the wrist-wearable device 120 (e.g., a smartwatch). The user 115 in FIG. 6H is viewing a navigable user interface 650 (e.g., a user interface corresponding to a home screen and/or landing page) on the display of the head-wearable device 402 and/or the wrist-wearable device 120. In some embodiments, the navigable user interface 650 is displayed in response to a wake gesture performed by the user. The navigable user interface 650 includes an icon 652 corresponding to a first application and associated action icons 654 corresponding to particular functions for the first application. The navigable user interface 650 also includes an icon 656 corresponding to a second application and associated action icons 658 corresponding to particular functions for the second application. The navigable user interface 650 further includes other application icons 660, 662, and 664. In some embodiments, each application is stored/executed at the head-wearable device 402 and/or the wrist-wearable device 120. In some embodiments, an application is stored/executed at an intermediary device coupled to the wearable devices shown. In FIG. 6H the user 115 is not performing a gesture.

FIG. 6I shows the user 115 performing a fist gesture (e.g., a first type of priming gesture) that involves the user curling their fingers to their palm. FIG. 6I further shows the user interface 650 updating (responsive to the fist gesture) to include a point of focus 667 selecting the icon 652 (e.g., corresponding a first application). In accordance with some embodiments, the priming gesture in FIG. 6I causes the interface 650 to be responsive to navigation gestures (e.g., causes the point of focus 667 be presented and be manipulable by the user 115). In some embodiments, the icon 652 is selected based on a gaze of the user (e.g., determined via eye tracking). In some embodiments, the icon 652 is given focus in accordance with it being the top-leftmost icon (e.g., is a default icon for giving focus in accordance with the priming gesture).

Figure 6J:
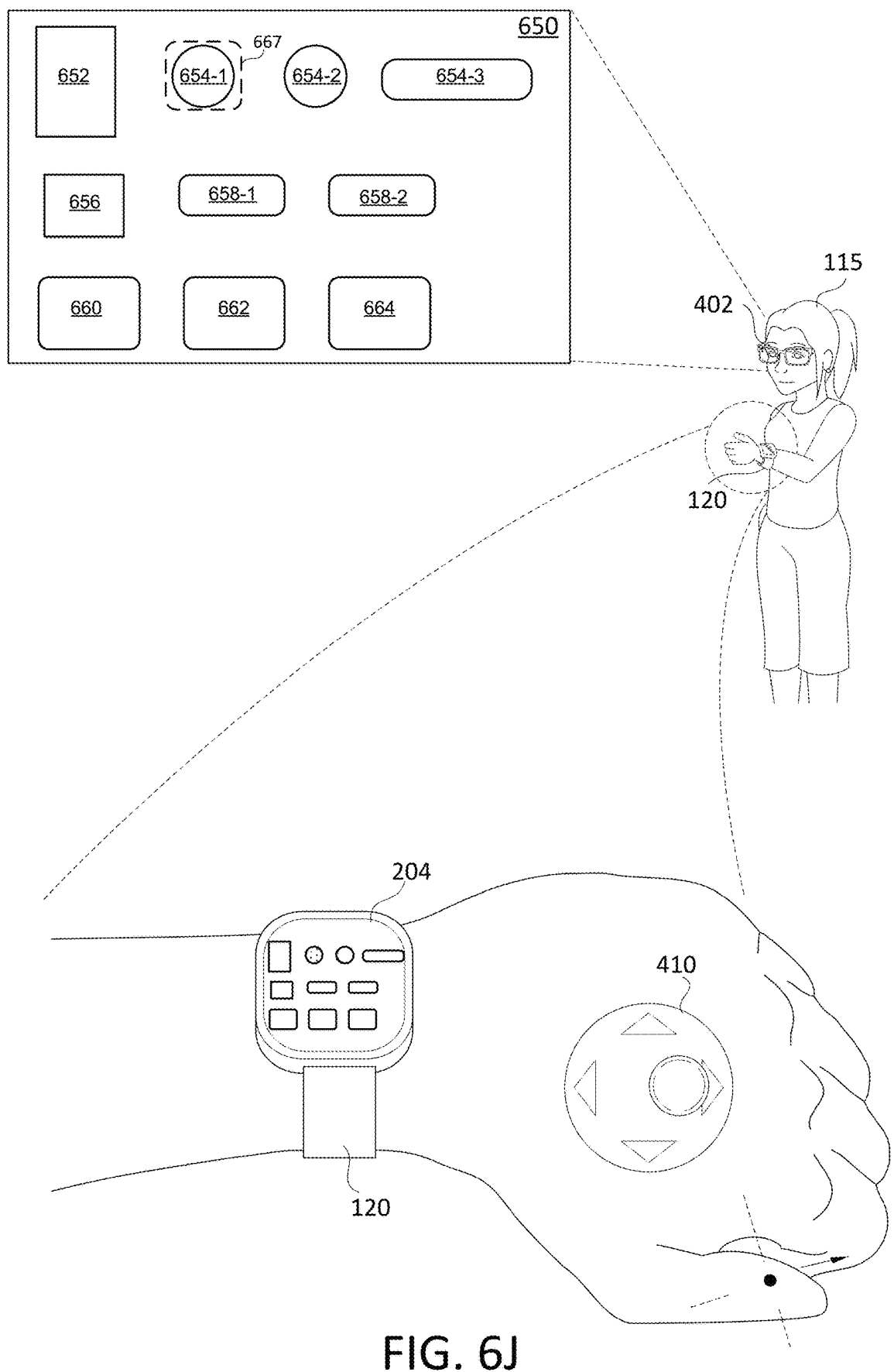

FIG. 6J shows the user 115 moving their thumb in a direction extending away from the user's wrist (e.g., a first type of navigation gesture). FIG. 6J further shows the point of focus 667 moving to the right on the interface 650 (responsive to the thumb movement) to select the icon 654-1. FIG. 6J further shows the indicator 410 updating to indicate that the user 115 is activating a rightward direction on the virtual directional-pad.

Figure 6K:
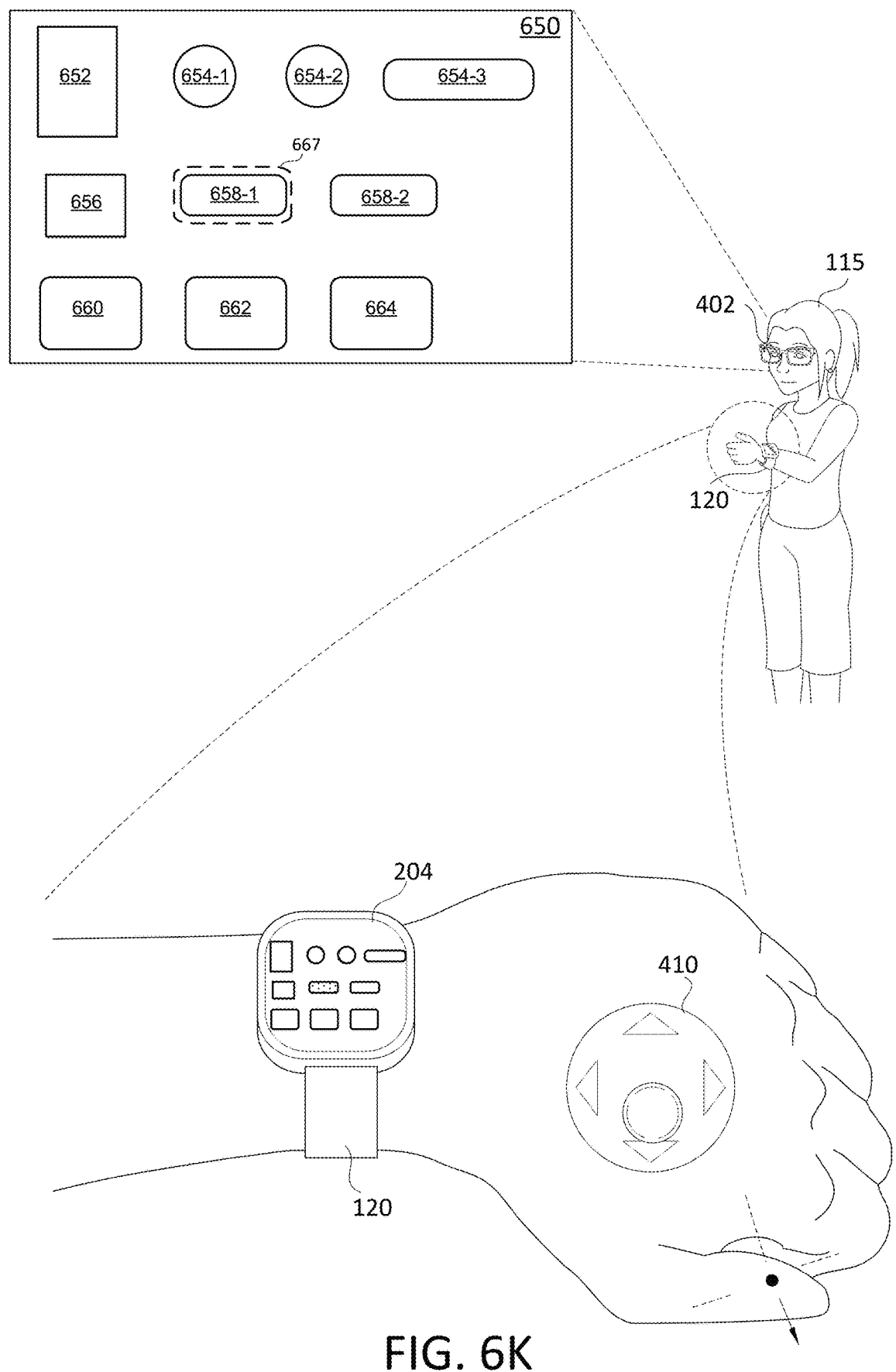

FIG. 6K shows the user 115 moving their thumb in a direction away from the back of the user's hand (e.g., a first type of navigation gesture). FIG. 6K further shows the point of focus 667 moving down on the interface 650 (responsive to the thumb movement) to select the icon 658-1. FIG. 6K further shows the indicator 410 updating to indicate that the user 115 is activating a downward direction on the virtual directional-pad. In some embodiments, each d-pad thumb gesture results in the point of focus 667 moving to the adjacent icon in the direction of the gesture (e.g., a rightward gesture causes the point of focus 667 to move to the next icon on the right from its previous location).

Figure 6L:
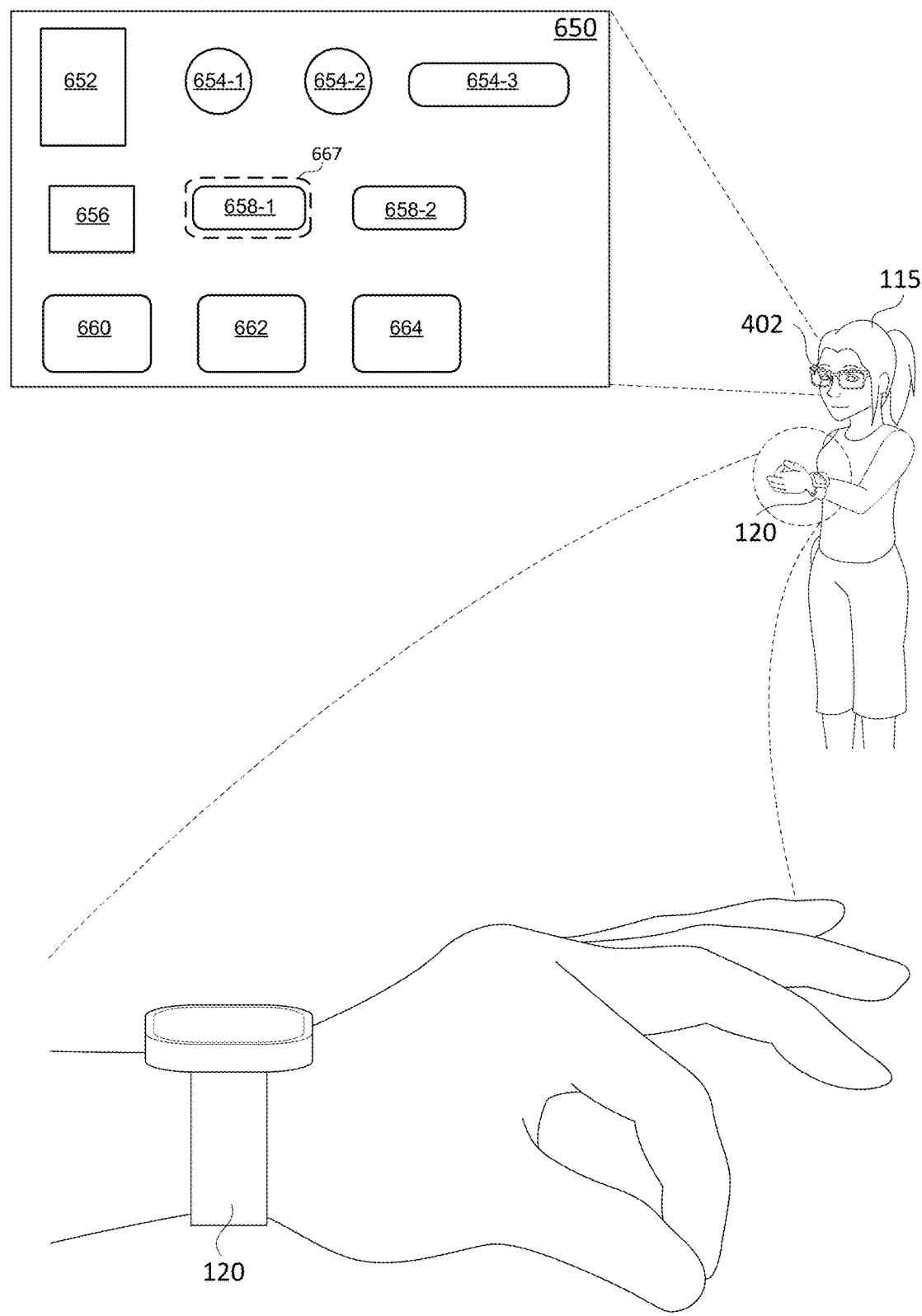

FIG. 6L shows the user 115 performing a pinch gesture (e.g., a pinch-and-hold gesture) that involves the user's index finger contacting the thumb (e.g., a second type of priming gesture). FIG. 6L further shows the user interface 650 including the point of focus 667 selecting the icon 658-1. For example, the point of focus 667 is presented in accordance with the user maintaining the pinch gesture for at least a threshold amount of time (e.g., 1-3 seconds).

Figure 6M:
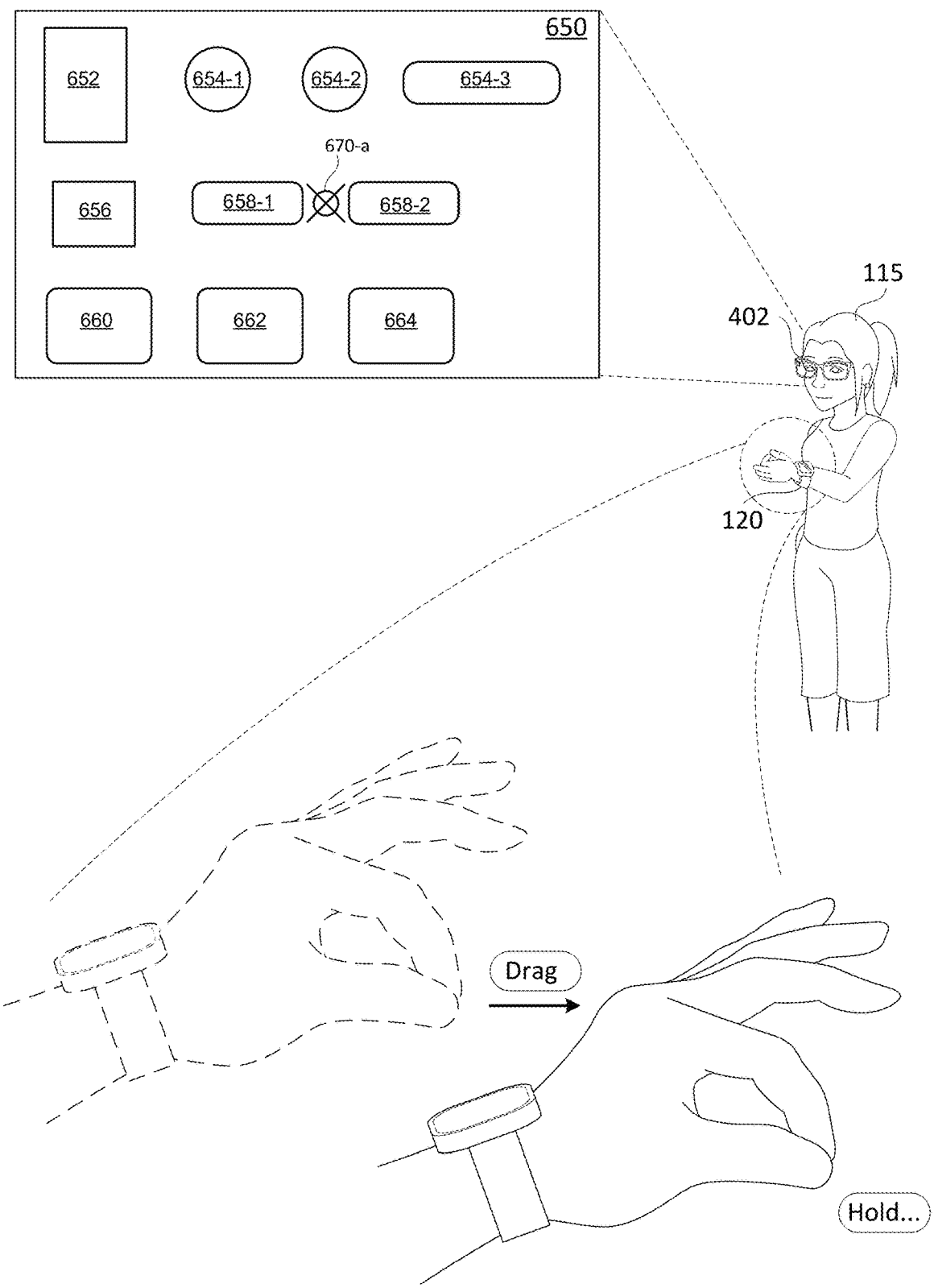

FIG. 6M shows the user 115 performing a pinch-and-drag gesture (e.g., a second type of navigation gesture) that involves the user horizontally translating their arm in a first direction (e.g., to the right) while maintaining the pinch gesture from FIG. 6L. In particular, the user's arm moves in a horizontal translation in FIG. 6M in accordance with the drag arrow. FIG. 6M further shows the user interface 650 updating (responsive to the pinch-and-drag gesture) to move focus from the icon 658-1 (in FIG. 6L) to the point of focus location 670-a. In some embodiments, the point of focus is displayed to the user as a cursor when not selecting a user interface element (e.g., an icon). In some embodiments, rather than performing a translation, the user may pinch and rotate their wrist (e.g., rotate their wrist is shown and described with reference to FIGS. 5A-5E) to move the point of focus. In some embodiments, a pinch-and-hold gesture is a priming gesture for either a translation-based navigation gesture or a wrist-rotation based navigation gesture and the user is able to perform either to move the point of focus.

Figure 6N:
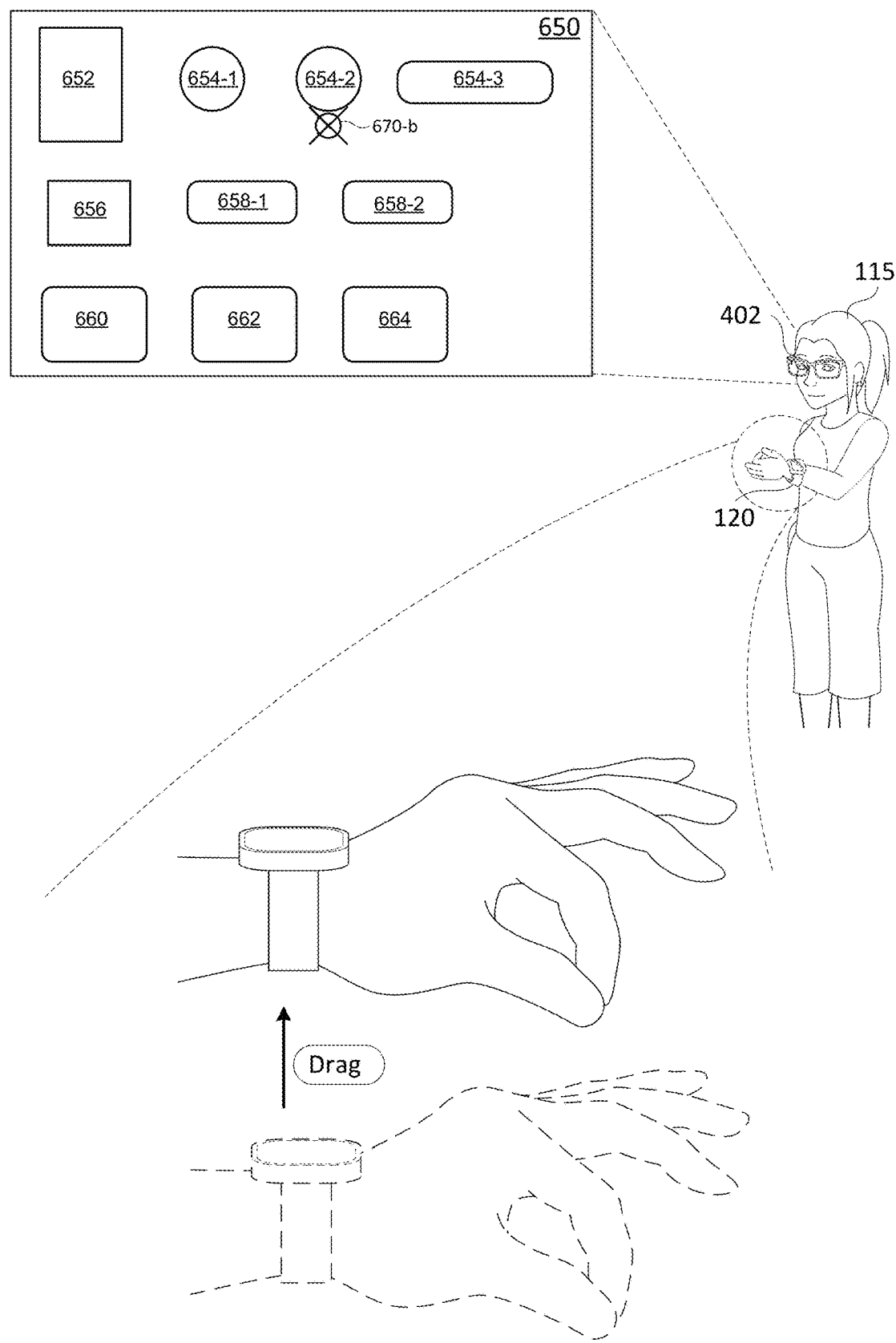

FIG. 6N shows the user 115 performing a pinch-and-drag gesture (e.g., the second type of navigation gesture) that involves the user horizontally translating their arm in a second direction (away from the user's body) while maintaining the pinch gesture from FIG. 6L. In particular, the user's arm moves in a horizontal translation in FIG. 6N in accordance with the drag arrow. FIG. 6N further shows the user interface 650 updating (responsive to the pinch-and-drag gesture) to move focus from the point of focus location 670-a (in FIG. 6M) to the point of focus location 670-b (e.g., moves the point of focus upward in the user interface).

Figure 6O:
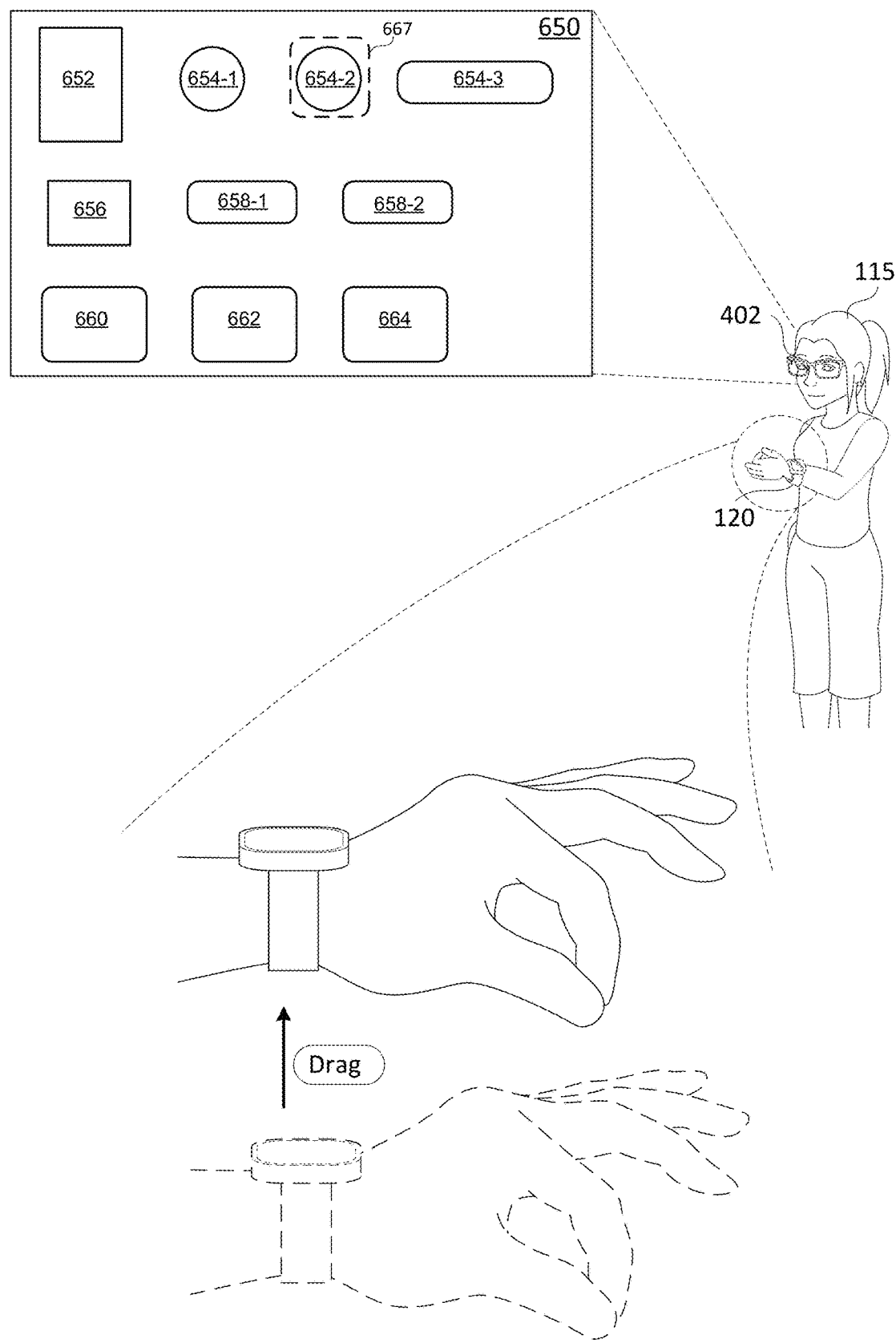

FIG. 6O shows the user 115 performing a pinch-and-drag gesture (e.g., the second type of navigation gesture) that involves the user horizontally translating their arm in the second direction (away from the user's body) while maintaining the pinch gesture from FIG. 6N. In particular, the user's arm moves in a horizontal translation in FIG. 6O in accordance with the drag arrow. FIG. 6O further shows the user interface 650 updating (responsive to the pinch-and-drag gesture) to move focus from the point of focus location 670-b (in FIG. 6N) to select the icon 654-2. Although FIGS. 6M-6O show the cursor moving in cardinal directions, in some embodiments, the user may move the cursor in any direction in accordance with a drag gesture in a particular direction. In some embodiments, the amount of movement of the point of focus corresponds to an amount of movement of the pinch-and-drag gesture (e.g., amount of translation).

Thus, FIGS. 6H-6O illustrate a scenario where the user interface is responsive to multiple types of navigational gesture. In some embodiments, the first type of navigational gesture causes a point of focus to move (e.g., snap) from one icon to another. In some embodiments, the second type of navigational gesture allows the user to move the point of focus freely (e.g., without requiring jumping to adjacent icons). In some embodiments, the first type of navigational gesture (e.g., the virtual d-pad navigation) is detected/identified using a first type of sensor (e.g., an EMG sensor). In some embodiments, the first type of navigational gesture (e.g., the pinch-and-drag gesture) is detected/identified using a second type of sensor (e.g., an IMU sensor) in addition to, or alternatively to, the first type of sensor.

Figure 7A:
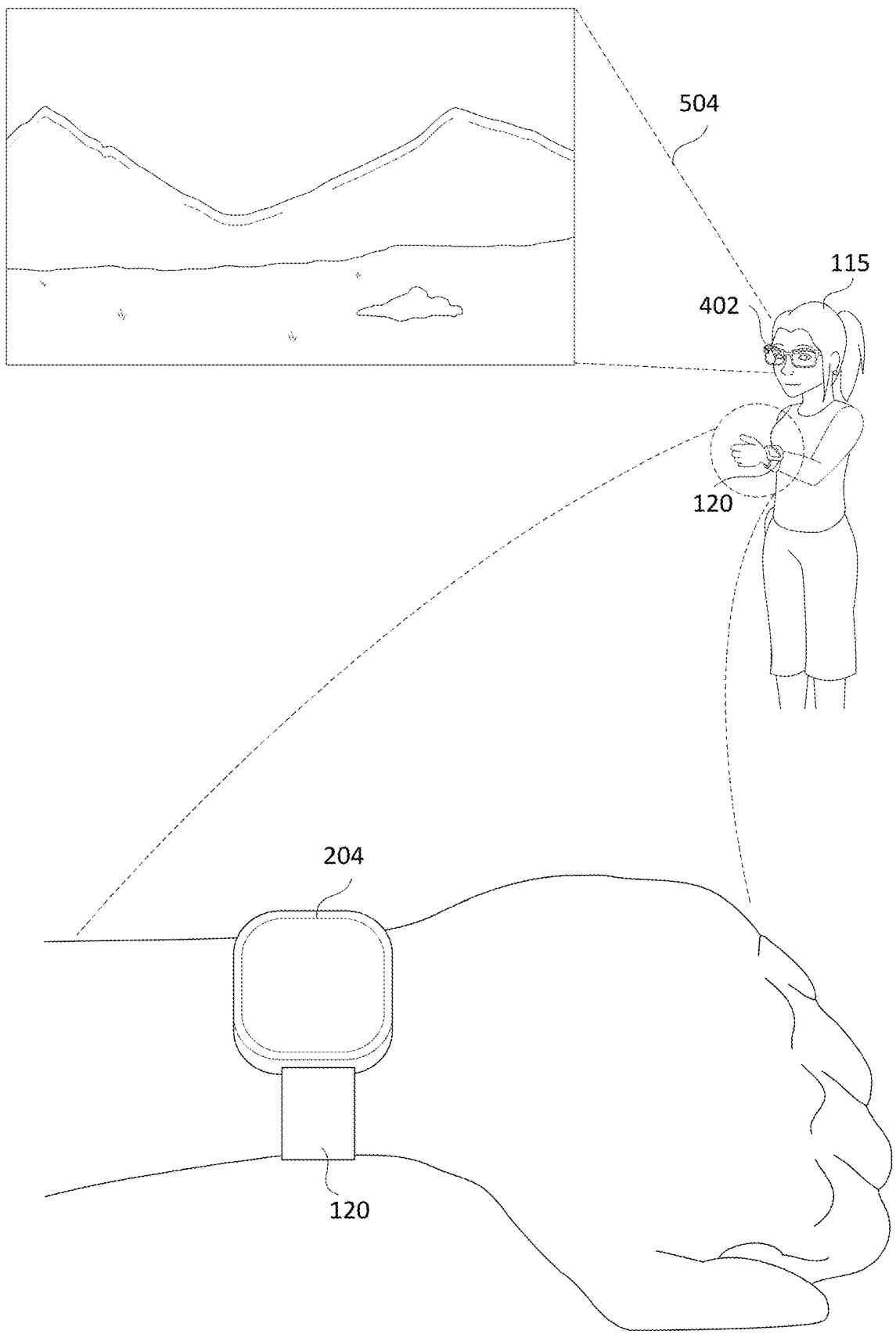
FIGS. 7A-7R illustrate another example user scenario of interacting with a wearable device in accordance with some embodiments.
Figure 7B:
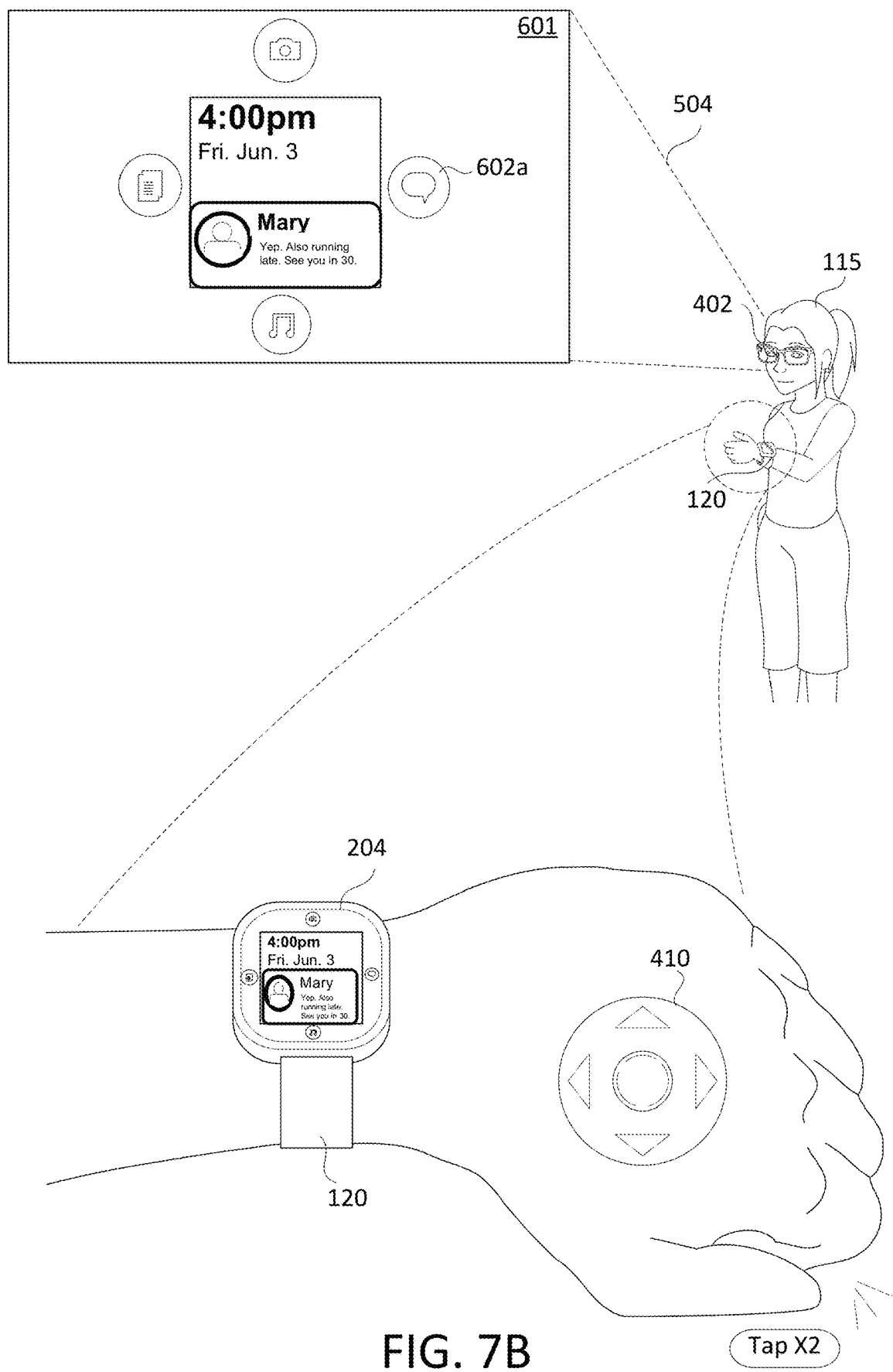
FIGS. 7S-7U illustrate another example user scenario of interacting with a wearable device in accordance with some embodiments.
Figure 7C:
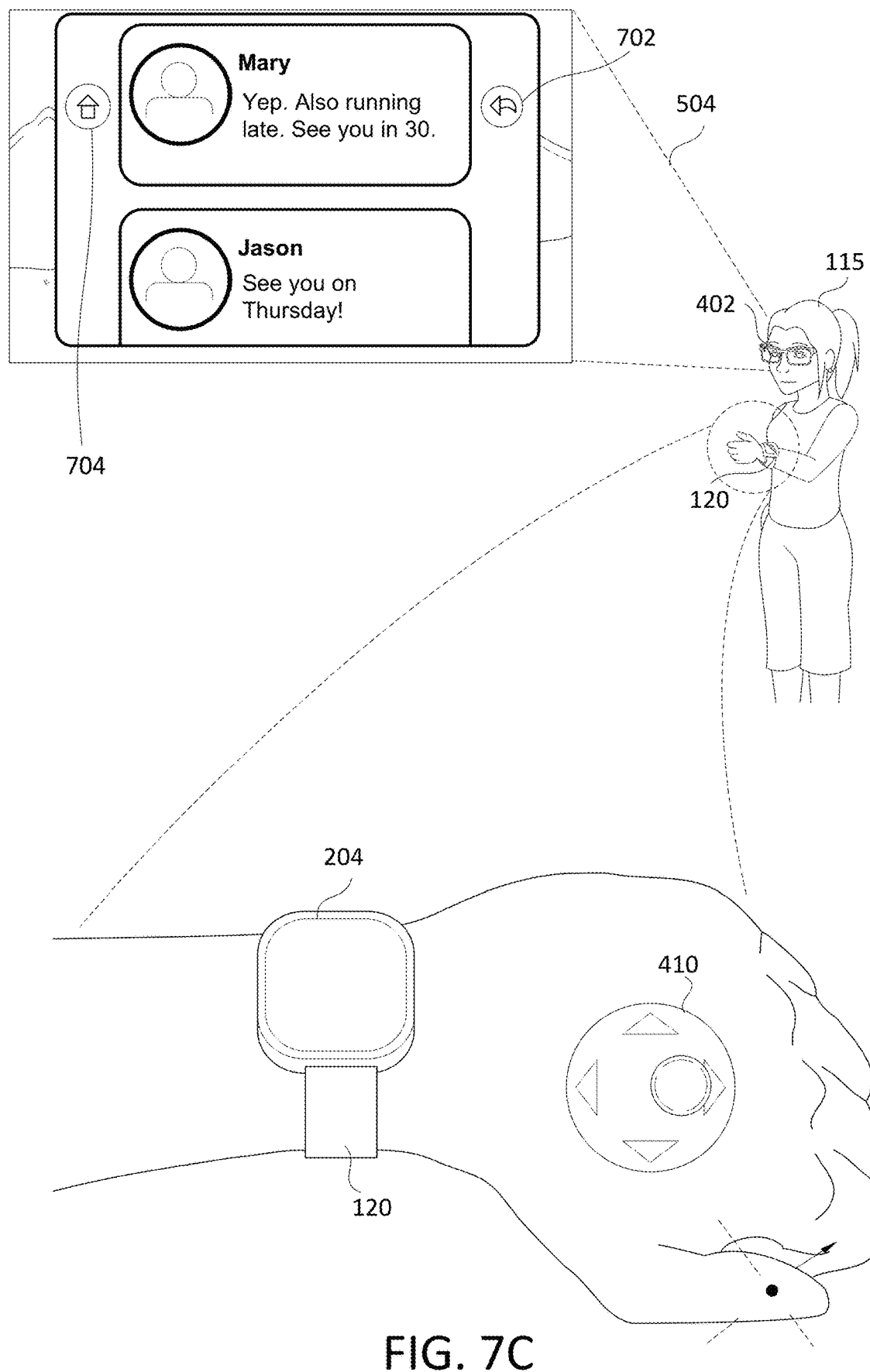
Figure 7D:
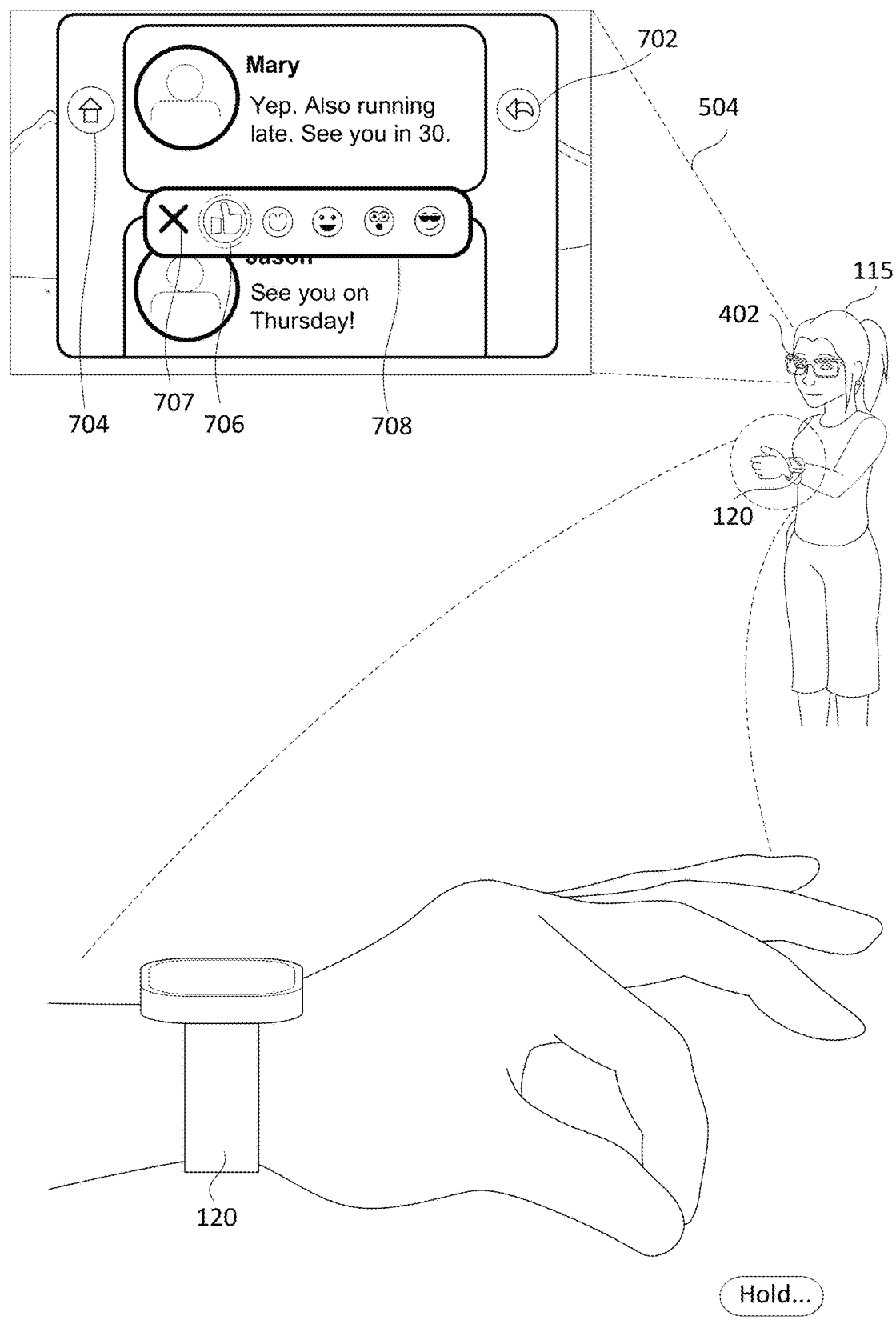
Figure 7E:
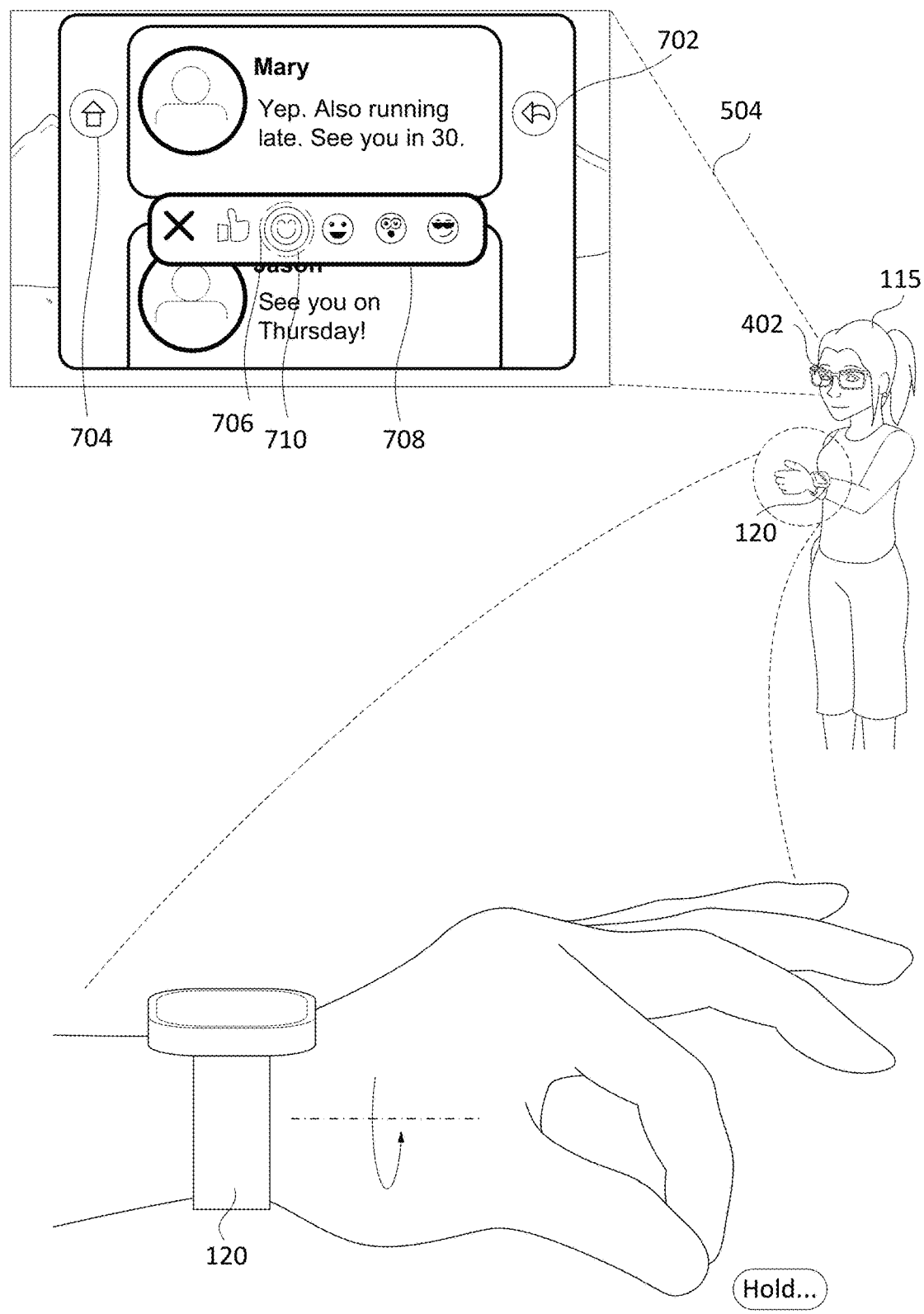
Figure 7F:
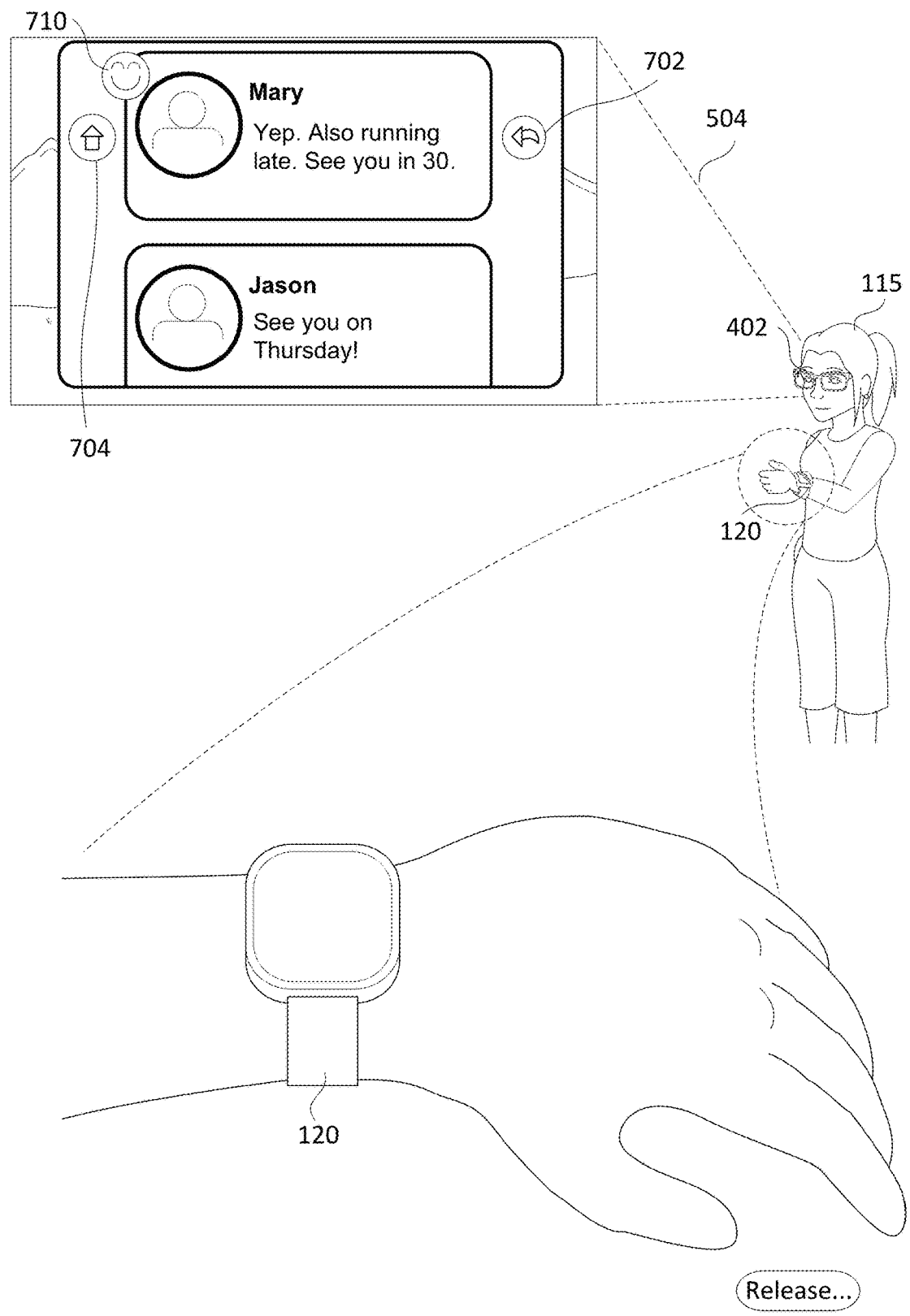
Figure 7G:
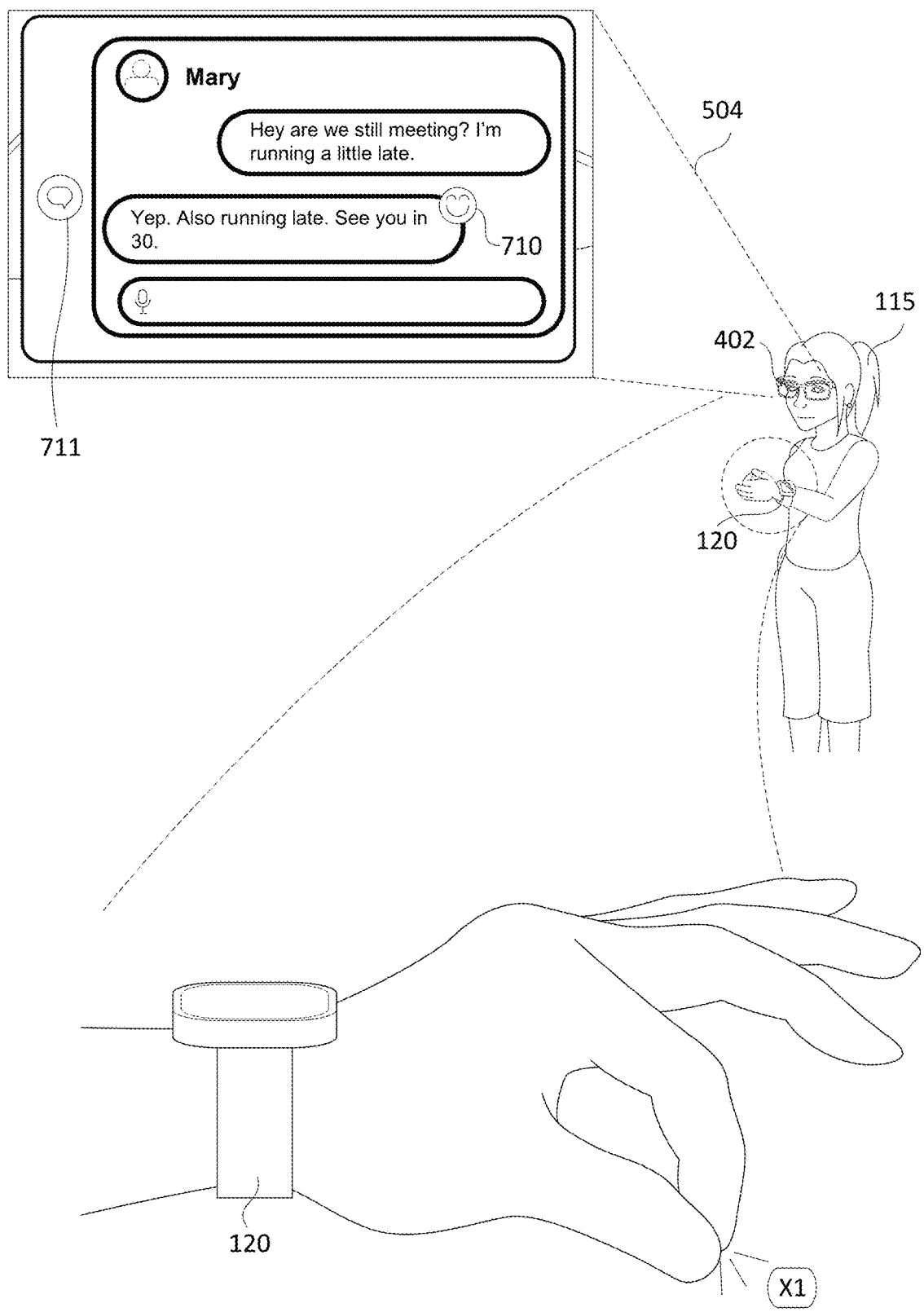
Figure 7H:
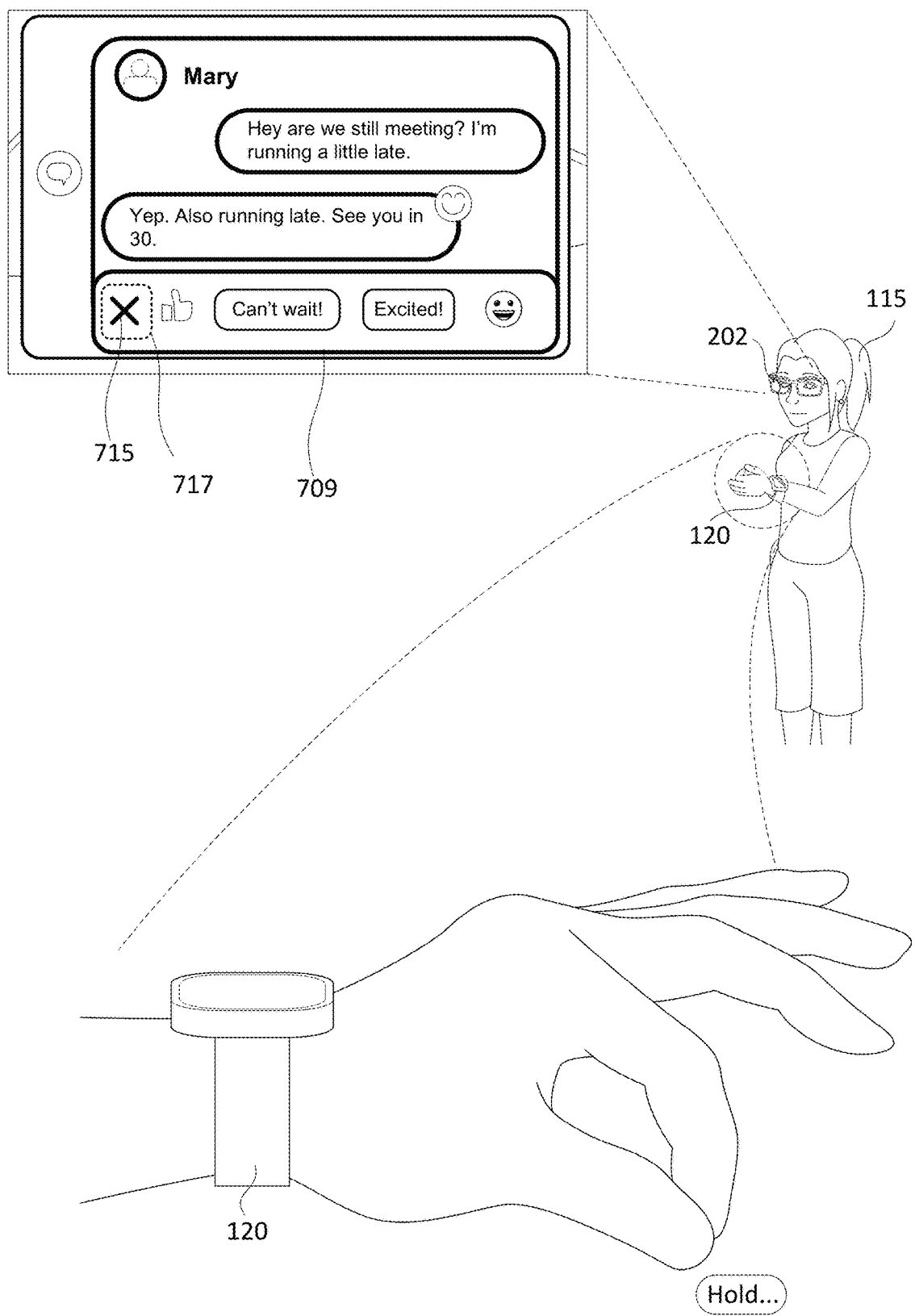
Figure 71:
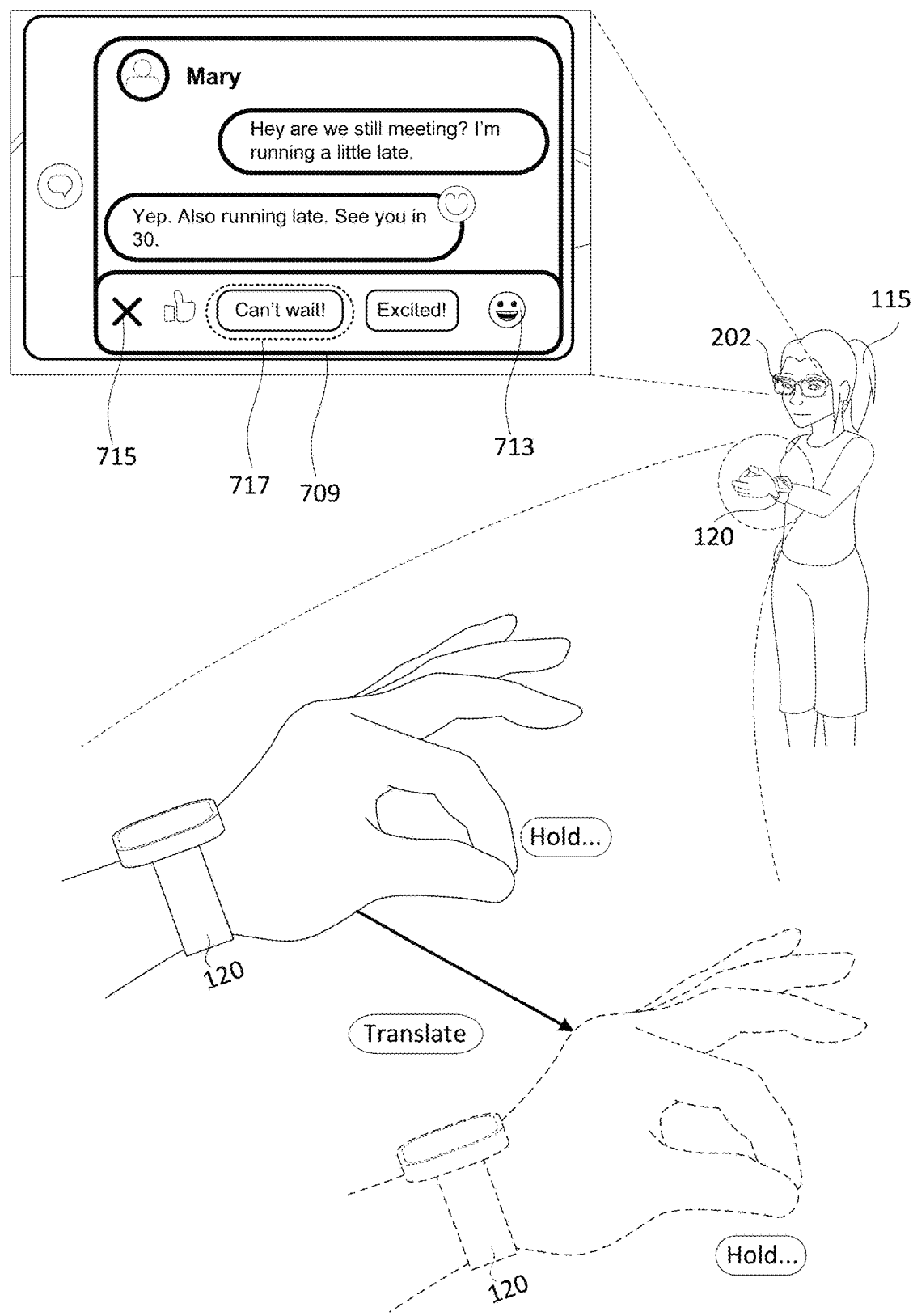
Figure 7J:
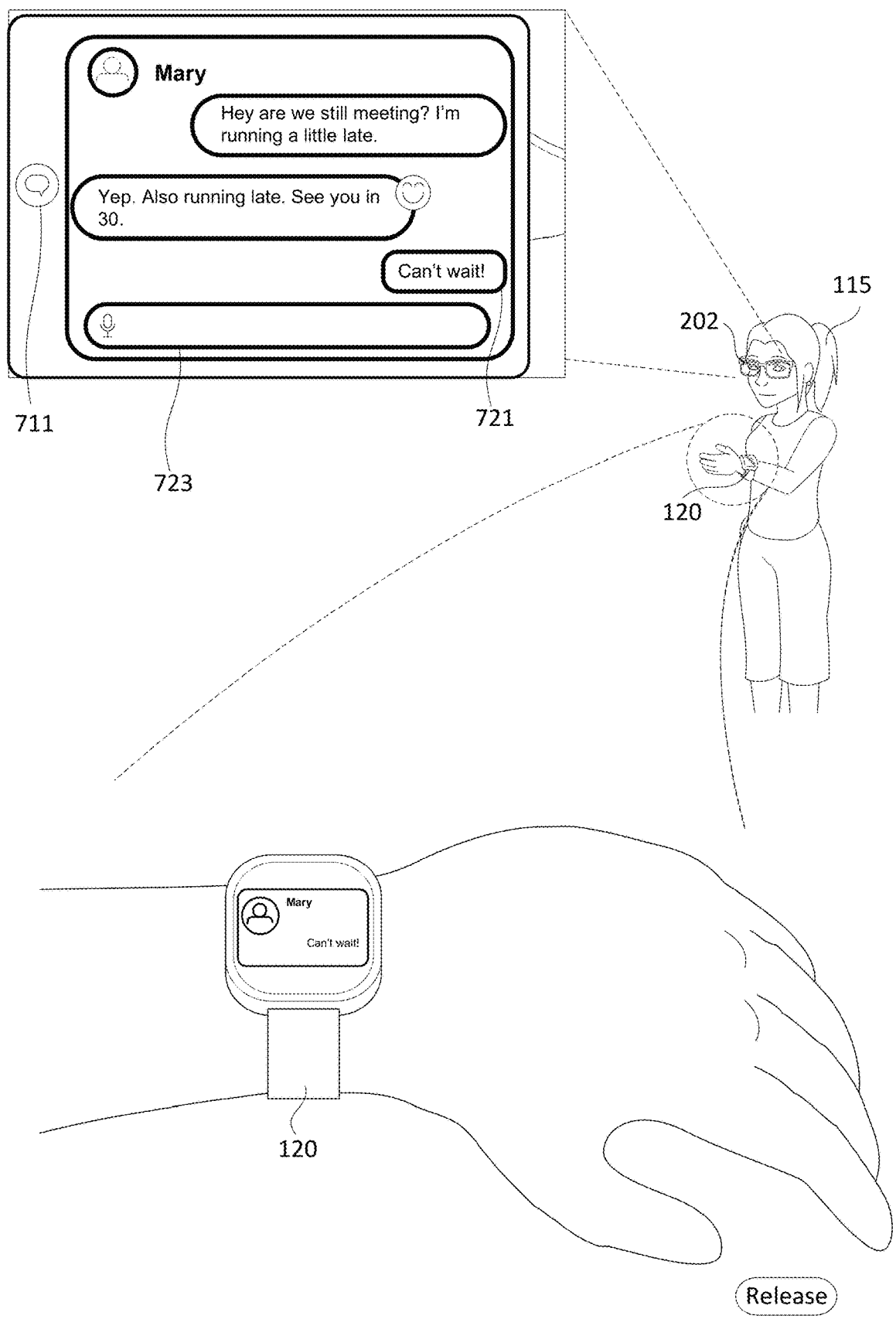
Figure 7K:
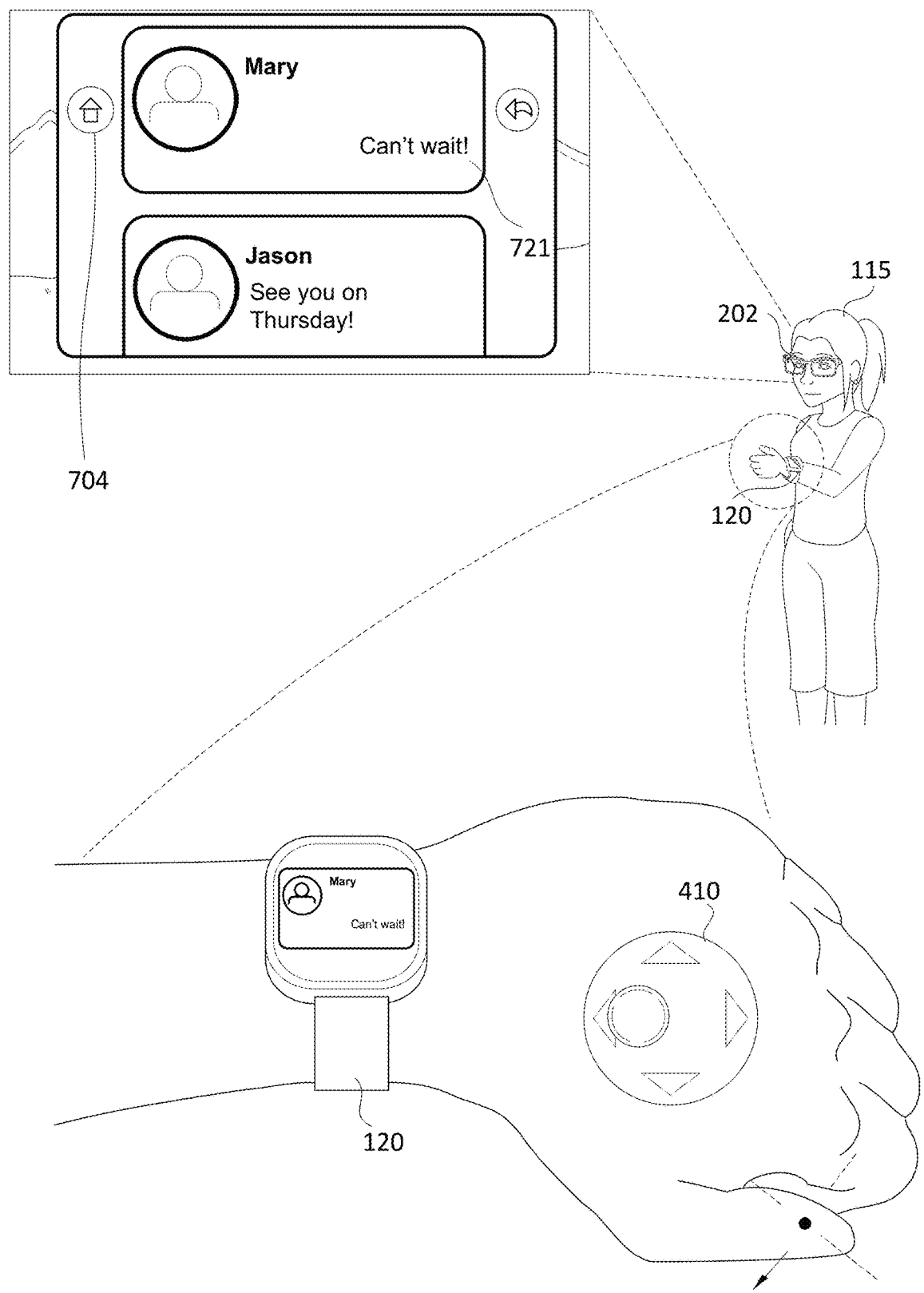
Figure 7L:
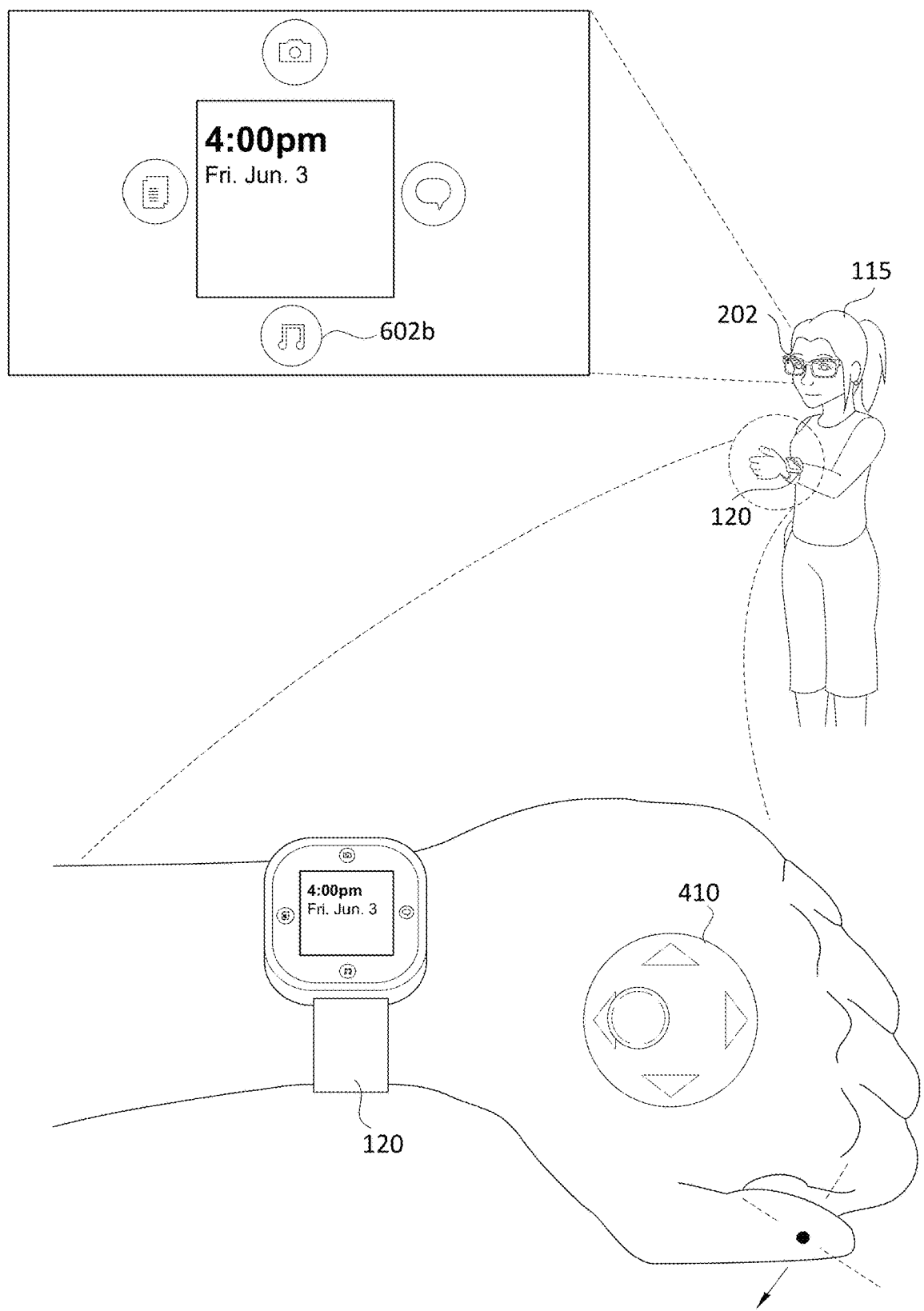
Figure 7M:
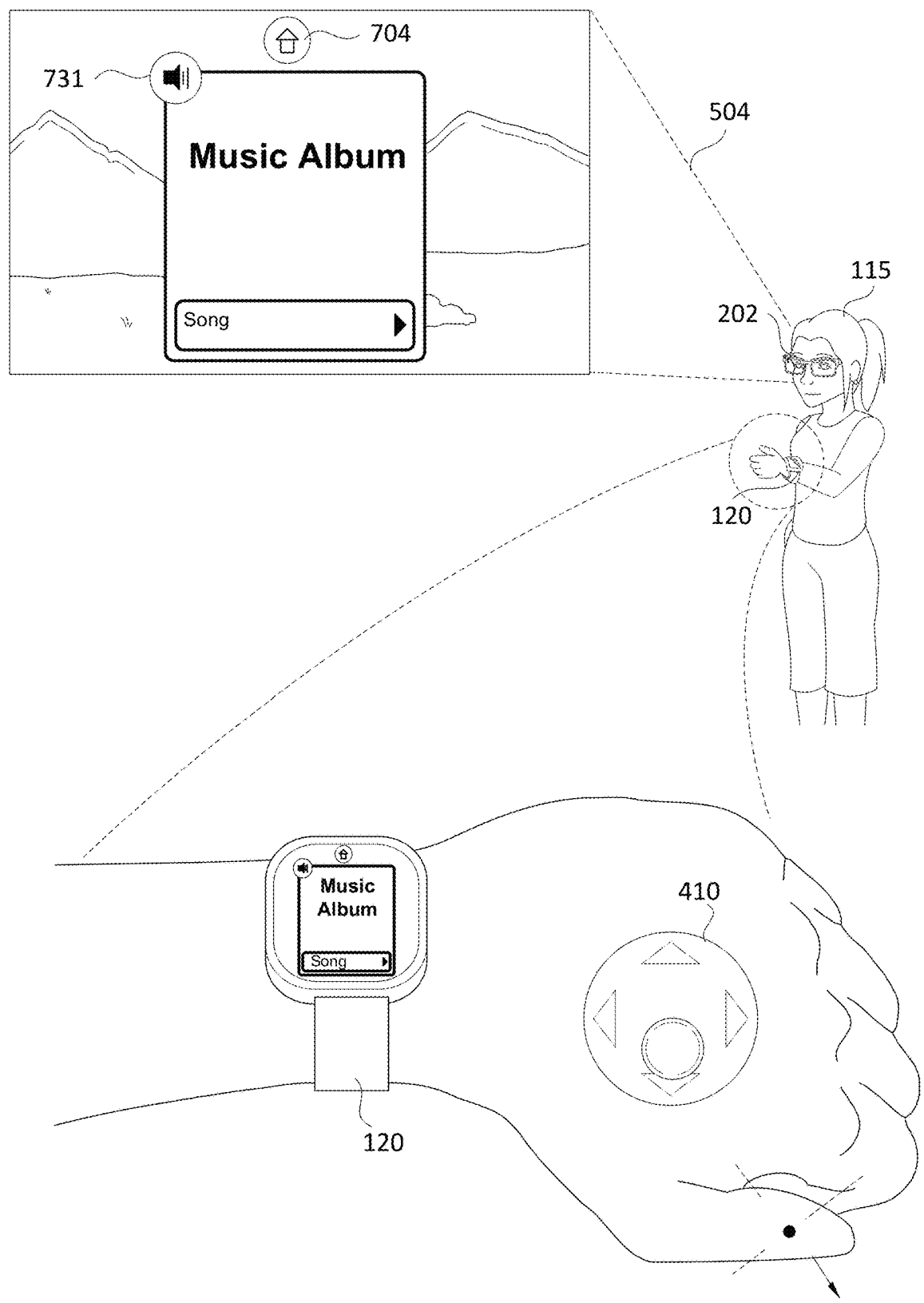
Figure 7N:
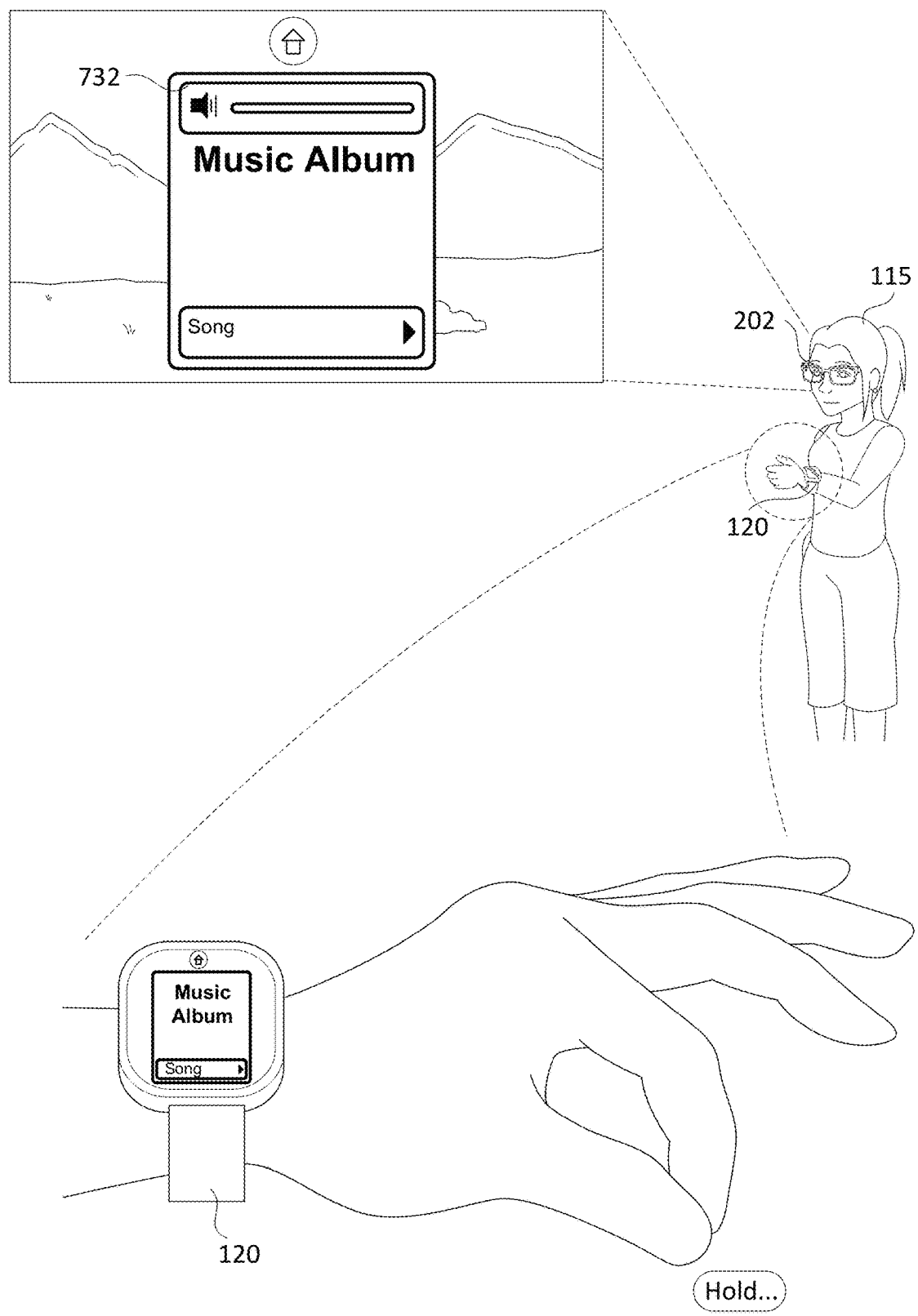
Figure 70:
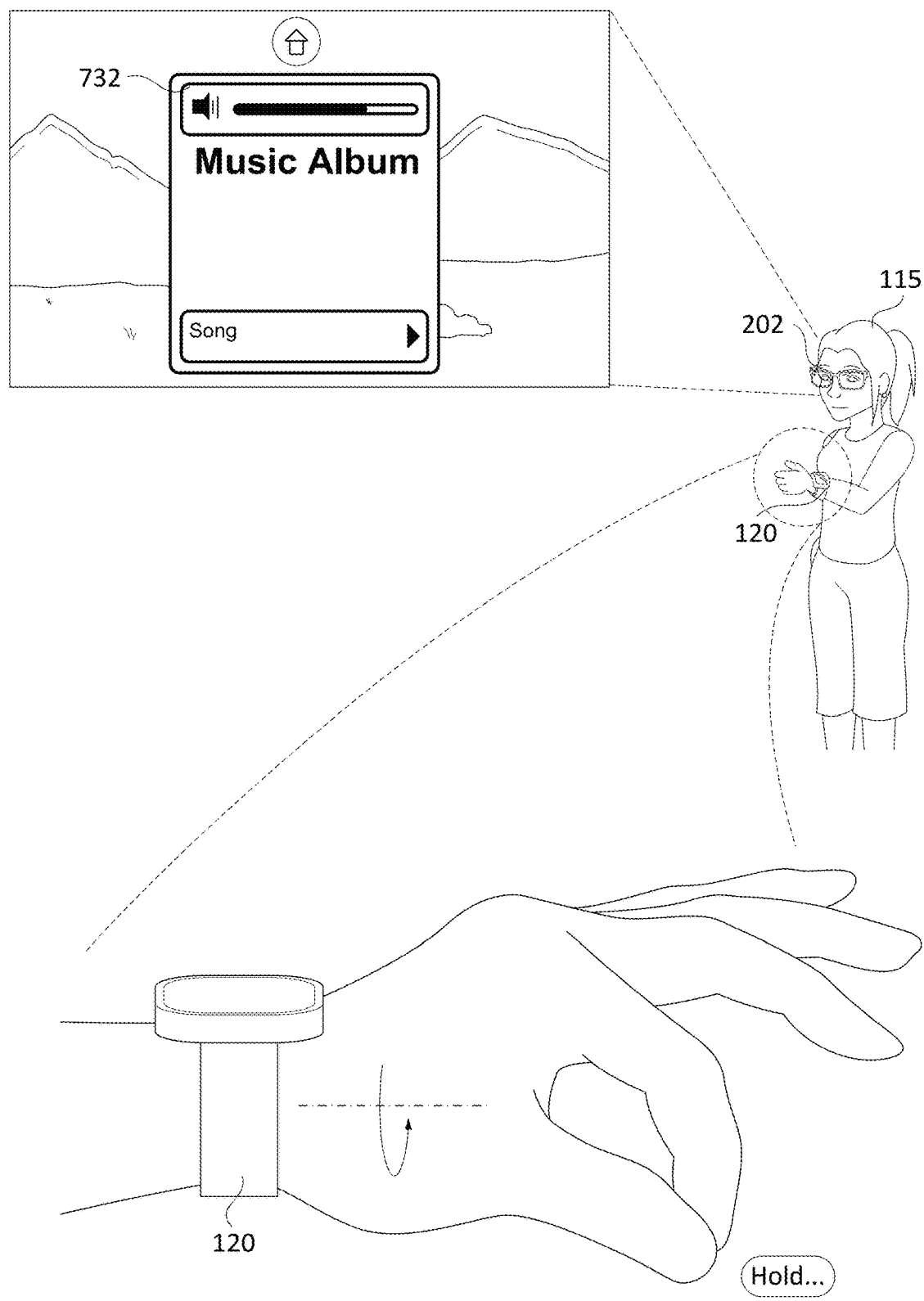
Figure 7P:
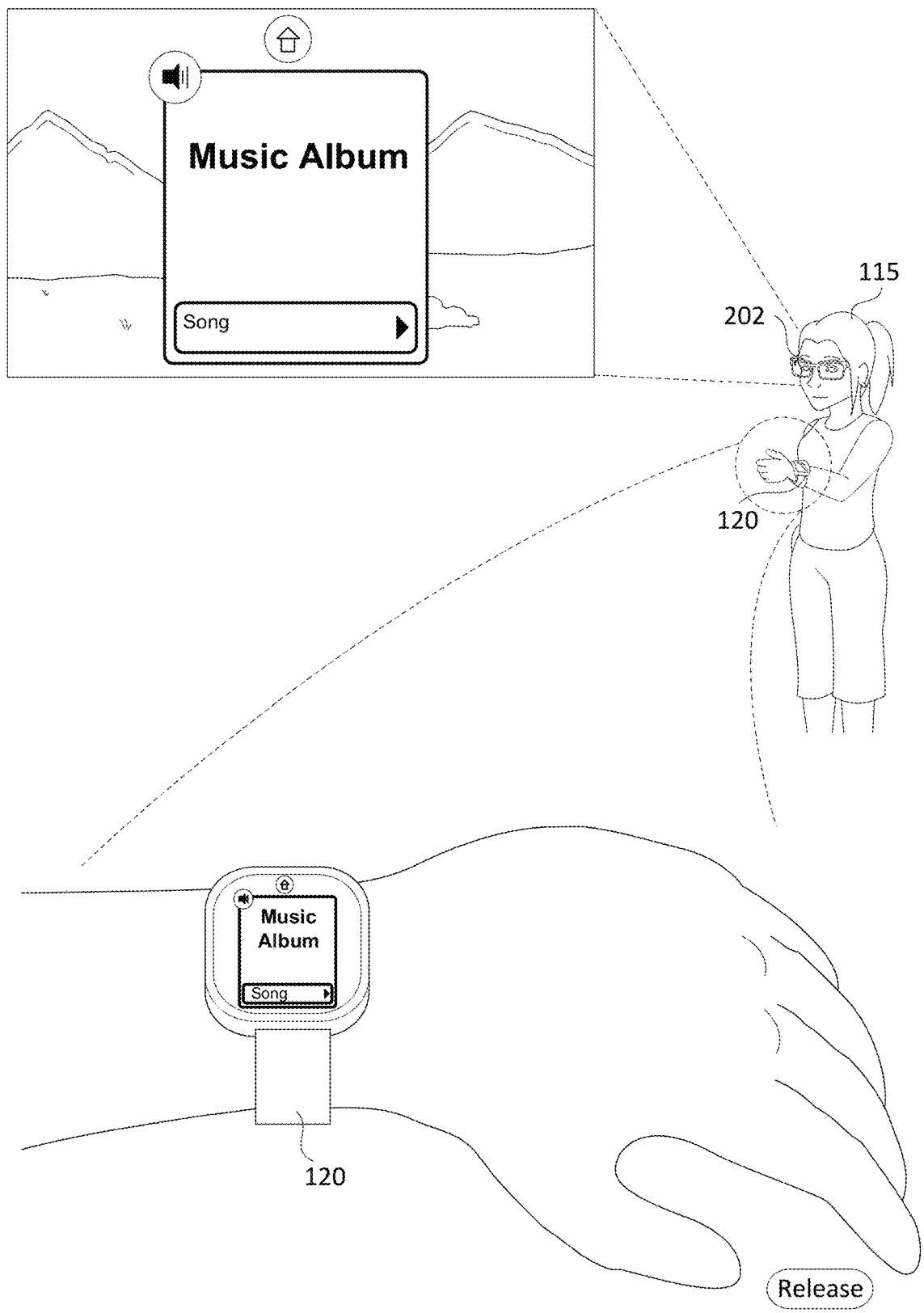
Figure 7Q:
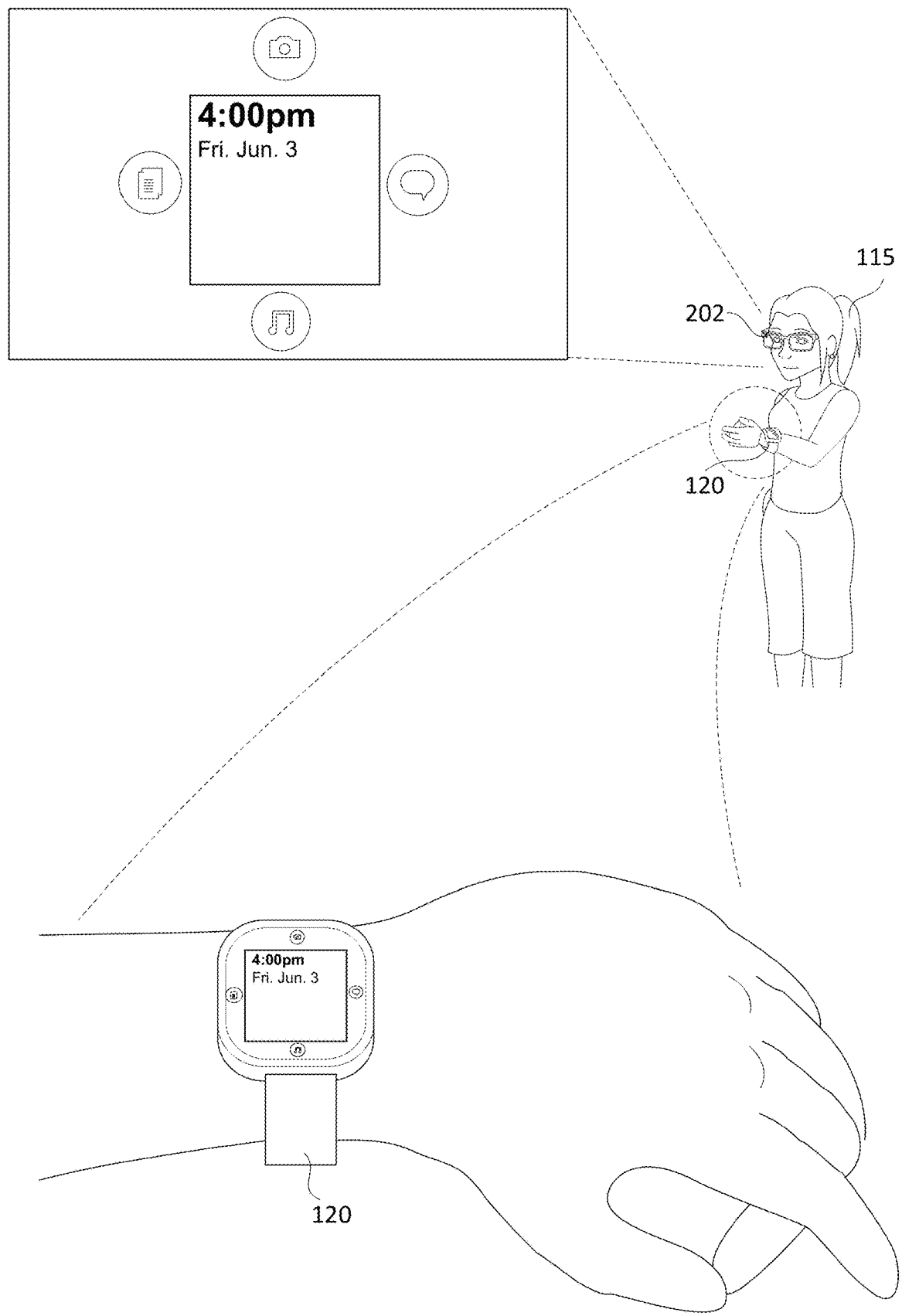
Figure 7R:
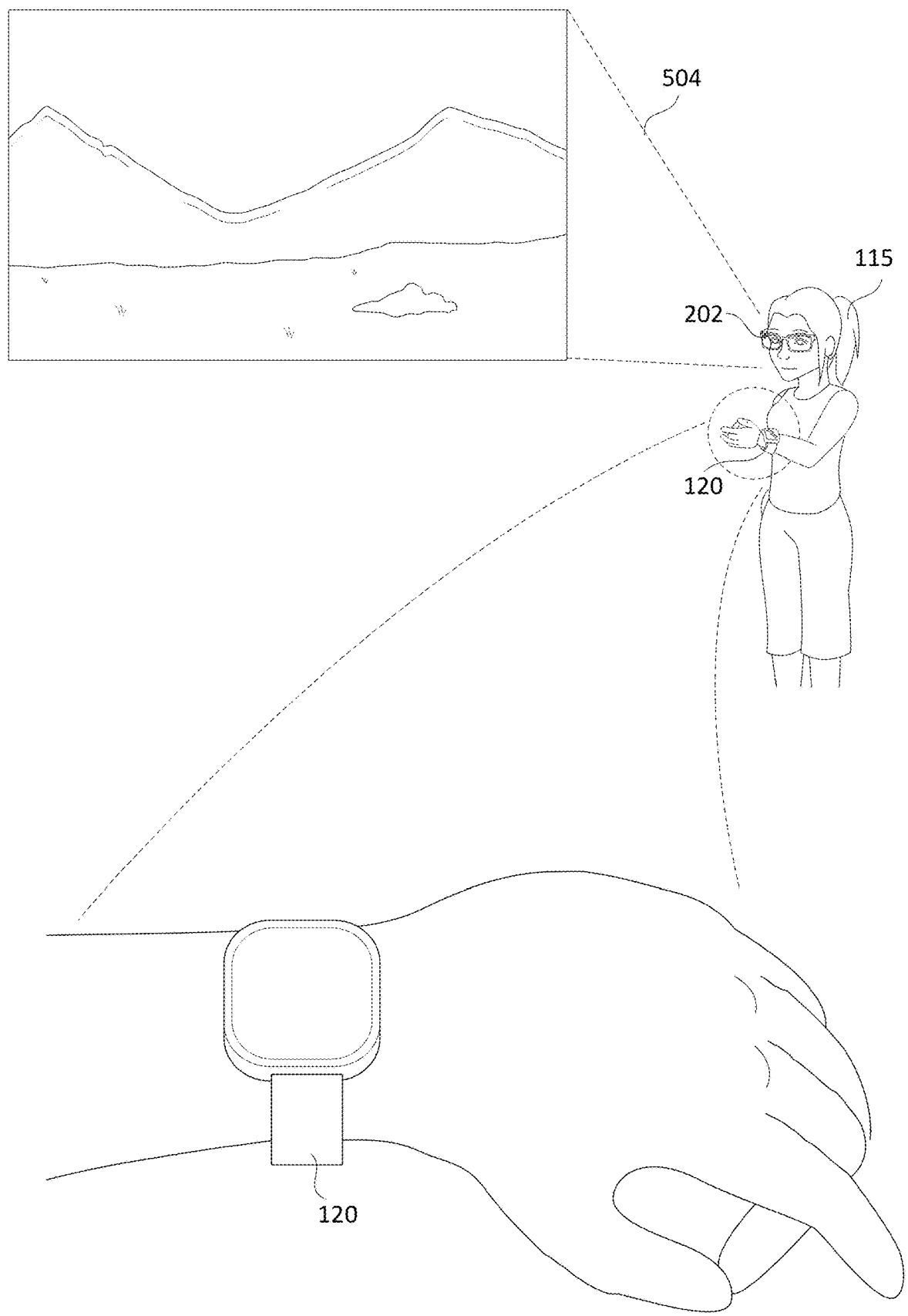

FIGS. 7A-7R illustrate another example user scenario of interacting with a wearable device in accordance with some embodiments. The user 115 in FIG. 7A is wearing the head-wearable device 402 (e.g., augmented-reality glasses) and the wrist-wearable device 120 (e.g., a smartwatch). The user 115 in FIG. 7A is viewing the scene 504 on the display of the head-wearable device 402. The user 115 in FIG. 7A is making a fist at a first time. In some embodiments, the fist is not a gesture that corresponds to an action at the head-wearable device 402 or the wrist-wearable device 120. In some embodiments, the fist gesture is a priming gesture for navigation via a virtual directional-pad (as represented by the indicator 410). In some embodiments, the wrist-wearable device 120 is prepared to receive user input through one or more gestures (e.g., in accordance with the fist gesture being maintained).

FIG. 7B illustrates the user's 115 performing a double tap gesture to activate a user-interface. In some embodiments, as shown in FIG. 7B, the user 115 is able to wake the head-wearable device 402 and/or the wrist-wearable device 120 by performing the double tap gesture (e.g., two tap gestures in succession). In some embodiments, when the user 115 performs a tap gesture (e.g., a control gesture that involves the user's thumb contacting a surface of the user's index finger) it activates the display 204 of the wrist-wearable device 120 and/or a display of the head-wearable device 402.

In some embodiments, only one of the displays (e.g., either the wrist-wearable device display 204 or the head-wearable device display) is activated. In some embodiments, the middle finger pinch gesture as shown in FIG. 2C is a wake gesture (e.g., that activates the user-interface on either the head-wearable device or the display 204 of the wrist-wearable device 120). For example, when the display 204 of the wrist-wearable device is inactive (e.g., the display of the head-wearable device is also in active in some embodiments), and the user 115 maintains the middle finger pinch gesture, the display of the wrist-wearable device is activated and the user interface in FIG. 7B is displayed. In some embodiments, the user interface is shown on both the display 204 of the wrist-wearable device and in the scene 504 of the head-wearable device 402.

In some embodiments, while the display 204 of the wrist-wearable device 120 is inactive, only a subset of the sensor channels 1385a-1385h are active (e.g., a second subset of the sensor channels 1385a-1385h are inactive). In some embodiments, while the display 204 of the wrist-wearable device 120 is inactive, the user 115 performs a control gesture to activate the display 204 of the wrist-wearable device 120 and the control gesture is captured by the active subset of sensor channels 1385a-1385h.

FIG. 7C illustrates the user 115 performing a gesture to navigate the user-interface 601. In FIG. 7C, the user 115 is moving their thumb in a direction extending away from the user's wrist (e.g., a rightward navigation gesture). As the user moves their thumb rightward, the indicator 410 updates to indicate that the user 115 is activating a rightward direction on the virtual directional-pad. As a result of the navigation gesture, the user 115 has accessed the quick-action user interface element 602a on the right-hand side of the user interface (shown in FIG. 7B) which displays (e.g., activates) the messaging application. The messaging application, as shown in FIG. 7C, includes two quick-action user interface elements 702 and 704 (e.g., displayed to aid the user 115 in further navigation). The home icon 704 returns the user to the home user interface 601 displayed in FIG. 7B. The reply icon 702 allows the user to respond to one of the message shown (e.g., respond to the message that has focus within the user interface when the reply icon 702 is activated). The messaging application interface also shows a list of messages including showing a most recent message in the conversation between the user 115 and another user (e.g., a user Mary and a user Jason). In some embodiments, a user interface for the messaging application is shown on the display 204 (e.g., in addition to, or alternatively to, presenting it in the scene 504).

FIG. 7D illustrates the user 115 performing a control gesture (e.g., a pinch or tap gesture) to select a reaction to a message. In some embodiments, while the messaging application is active and the user performs a pinch-and-hold gesture (e.g., as shown in FIG. 7D), the user activates a panel 708 (e.g., a menu) that includes one or more emoji responses. In some embodiments, the panel 708 allows the user 115 to quickly react to a message sent by another user. In some embodiments, when the panel 708 is displayed, one of the emojis is given focus (e.g., is highlighted) as shown by selection indicator 706 (e.g., a halo element). The close icon 707 causes the panel 708 to cease to be displayed. In some embodiments, another emoji or the close icon 707 is highlighted. In some embodiments, the panel 708 ceases to be displayed in accordance with the user 115 releasing the pinch-and-hold gesture.

FIG. 7E illustrates the user 115 performing a navigation gesture to scroll through the emojis in the panel 708. The navigation gesture in FIG. 7E includes user 115 rotating their wrist while maintaining the pinch gesture from FIG. 7D. The rotation in FIG. 7E is counterclockwise and corresponds to a rightward direction from the perspective of the user 115. FIG. 7E further illustrates the selection indicator 706 moving to the right to the happy face emoji 710. In some embodiments, the selection indicator 706 continues to move to the right in accordance with movement of the wrist rotation gesture. In some embodiments, the selection indicator 706 moves to the right a preset amount per gesture (e.g., regardless of velocity, duration, and/or distance of the gesture). In some embodiments, the selection indicator 706 includes dots or some other selection indication. Another example of a selection indicator is the selection indicator 717 shown in FIG. 7H.

FIG. 7F illustrates the user 115 releasing the pinch-and-hold gesture to select an emoji, thereby reacting to the message sent by another user. For example, the happy face emoji 710 is sent to the remote person (e.g., Mary). FIG. 7F further illustrates the happy face emoji 710 positioned next to the message the user 115 reacted to (the message from Mary). In some embodiments, the location of the happy face emoji 710 after selection is customizable by the user 115, thus the emoji can appear in a different corner or a different portion of the message entirely. In some embodiments, the user 115 can customize the setting so that the emoji does not appear in the messaging application.

FIG. 7G illustrates the user 115 performing a tap gesture to navigate to a specific message (e.g., expand a conversation with a particular person). FIG. 7G illustrates the user opening the messaging chain between the user and Mary by performing a tap gesture. In some embodiments, along with the message chain, a quick-action user interface element 711 is displayed. In some embodiments, when the user performs a navigation gesture to the quick-action user interface element 711, the user interface navigates to the display shown in FIG. 7F with the list of conversations between user 115 and other users (e.g., navigates to a home page associated with the messaging application). FIG. 7G further illustrates happy face emoji 710 indicating that the user 115 they reacted to that particular message (in accordance with the gesture of FIG. 7E). In some embodiments, the happy face emoji 710 is located elsewhere in the display but still indicates that the user 115 reacted to the particular message.

FIG. 7H illustrates the user 115 maintaining a pinch gesture (e.g., to view quick response options for the message chain). In one embodiment, the user 115 maintains the pinch gesture (e.g., a pinch-and-hold gesture) while viewing an individual messaging conversation, and view a panel 709 of recommended quick response options is displayed. For example, in FIG. 7H, the quick response options include phrases and emojis. In some embodiments, the quick responses include only phrases or emojis. In some embodiments, the response options are generated based on a history of how the user 115 has responded to similar messages in the past and/or is computer generated using machine learning to show the user 115 options of how a person may respond. In some embodiments, the user 115 is allowed to pre-program quick response options (e.g., based on a variety of messages the user 115 typically receives from other users). In some embodiments, the selection indicator 717 appears on the close icon 715 (as illustrated in FIG. 7H) or on a quick response option. In some embodiments, the selection indicator 717 highlights the most likely response and/or the response recommended by the system.

FIG. 7I illustrates the user 115 maintaining the pinch gesture from FIG. 7H and translating their hand from one location to another to scroll through the quick response options. FIG. 7I illustrates the translation of the user's 115 hand being inward (e.g., toward the user's body) and corresponds to a rightward direction from the perspective of the user 115. In the example of FIG. 7I, performing the hand translation while maintaining the pinch gesture moves the selection indicator 717 to the quick response "Can't wait!" (e.g., in a rightward direction). In some embodiments, the selection indicator 717 moves to the right a preset amount per amount of movement in the hand translation (e.g., regardless of how long the user 115 maintains the translation). In some embodiments, the user 115 translates their hand in an outward direction (e.g., away from the user's body) that corresponds to a leftward direction from the perspective of the user 115. In accordance with some embodiments, a user performing the hand translation in an outward direction while maintaining the pinch gesture moves the selection indicator 717 in a leftward direction. In some embodiments, when the user 115 translates their hand beyond the bounds of the displayed quick responses, the selection indicator 717 moves to the other side of the panel 709. For example, if the selection indicator 717 is highlighting the laughing emoji 713 and the user translates their hand in an inward direction corresponding to a rightward direction, the selection indicator 717 moves to the close icon 715. In some embodiments, there are additional quick responses not shown, and thus while the user has laughing emoji 713 highlighted with the selection indicator 717 and the user translates their hand in an inward direction, the panel 709 will scroll to display additional quick responses to the user 115. In some embodiments, if the selection indicator is highlighting the close icon 715 and the user translates their hand in an outward direction moving the selection indicator in a leftward direction, the selection indicator 717 will move to the end of the quick response options. In some embodiments, when the user 115 translates their hand beyond the bounds of the displayed quick responses, the selection indicator 717 ceases to move (e.g., stays at a leftmost or rightmost option).

FIG. 7J illustrates the user 115 releasing the pinch gesture from FIG. 7I which selects the quick response option "Can't wait!". FIG. 7J further shows the result of the selection of the quick response on the display of both the wrist-wearable device and the head-wearable device 202 (e.g., the "Can't wait!" message is added to the conversation). In some embodiments, the quick response selection action (e.g., releasing the pinch gesture) causes the response to be sent to the other user. In some embodiments, the quick response selection is displayed in the dialogue box 723 so that the user 115 can edit the response before sending, if desired.

FIG. 7K illustrates the user 115 moving their thumb in a direction toward the user's wrist (e.g., a navigation gesture). FIG. 7K further shows this navigational gesture causing activation of the messaging quick-action user interface element 711 (in FIG. 7J) and results in the user interface returning to the messaging application page shown in FIG. 7C, displaying messages from multiple people. In some embodiments, a most recent message in a conversation between the user and another person is displayed. For example, FIG. 7K shows the user's quick response 721 "Can't wait!" in the message box with Mary. In other embodiments, no message is shown (e.g., the contact name and photo are displayed without a message).

FIG. 7L illustrates the user 115 moving their thumb in a direction toward the user's wrist (e.g., a navigation gesture) a second time. FIG. 7L further illustrates this navigational gesture activates the home screen quick-action user interface element 704 (shown in FIG. 7K) and results in the user interface displaying a home screen (e.g., ceasing to display the messaging application or reducing the display of the messaging application). In some embodiments, the user interface in FIG. 7L corresponds to the user interface 601 in FIG. 7B.

FIG. 7M illustrates the user 115 moving their thumb in a direction extending away from the back of the user's hand (e.g., a downward navigation gesture). As the user 115 moves their thumb away from the back of the user's hand, the indicator 410 updates to indicate that the user 115 is activating a downward direction on the virtual directional-pad. Navigating downward one the home screen activates the music application quick-action user interface element 602b shown in FIG. 7L. FIG. 7M displays a user interface corresponding to the music application as a result of navigating to the music application quick-action user interface element 602b. In some embodiments, the music application interface includes display of a volume icon 731, a music album, a song title, and a home screen quick-action user interface element 704. In some embodiments, other actions can be added as quick-action user interface elements and other information (e.g., about the music) are displayed with the music application interface. In some embodiments, the quick-action user interface elements are displayed in different locations than shown in FIGS. 7A-7R. For example, the home screen quick-action user interface element 704 in FIG. 7M may be displayed below or to a side of the music application interface (or in a corner of the scene 504).

FIG. 7N illustrates the user 115 maintaining a pinch gesture (e.g., a pinch-and-hold gesture) to activate a volume function (e.g., corresponding to the volume icon 731 in FIG. 7M), as indicated by a volume indicator 732. In some embodiments, in accordance with the user maintaining a pinch gesture for a threshold amount of time (e.g., 1-3 seconds), the volume indicator 732 is displayed and is responsive to further interactions with the user.

FIG. 7O illustrates the user 115 performing a navigation gesture to increase the volume. FIG. 7O illustrates the user 115 rotating their wrist (e.g., the navigation gesture) while maintaining the pinch gesture from FIG. 7N. In accordance with movement of the navigation gesture, the volume of the music adjusts as indicated by the volume indicator 732. In FIG. 7O, the user 115 is rotating their wrist inward (e.g., toward the user's body) corresponding to a rightward direction from the perspective of the user 115. Thus, as shown in FIG. 7O, while the user 115 is rotating their wrist inward, the bar of the volume indicator 732 moves in the rightward direction (e.g., increasing volume of the music). In some embodiments, when the user 115 rotates their wrist outward (e.g., away from the user's body), it corresponds to a leftward direction from the perspective of the user 115, resulting in the volume indicator 732 bar decreasing (e.g., lowering the volume of the music). In some embodiments, the volume is responsive to the navigation gesture only if audio media (e.g., music, a song, etc.) is currently playing. For example, the system does not respond to the user rotating their wrist if no audio media is currently playing. In some embodiments, the volume can be increased or decreased when audio media is not playing.

FIG. 7P illustrates the user 115 releasing the pinch gesture shown in FIG. 7O. FIG. 7P further shows that the volume indicator 732 has ceased to be displayed (e.g., is closed or otherwise deactivated) in accordance with the release of the pinch gesture. In some embodiments, the volume change performed in FIG. 7O is maintained (e.g., saved or stored in the system) after the pinch gesture is released.

FIG. 7Q illustrates the user 115 maintaining a pinch gesture (e.g., performing a pinch-and-hold gesture) using the thumb and middle finger. In some embodiments, in accordance with the pinch gesture being held for a threshold amount of time (e.g., 1 or 2 seconds), the home screen is displayed (e.g., the music application is ceased to be displayed in accordance with an exit or go back command). In some embodiments, other gestures may be used for the exit and/or 'go back' action (e.g., an index finger or pinkie finger pinch gesture or a wrist flick gesture).

FIG. 7R illustrates the user 115 continuing to maintain the pinch gesture from FIG. 7Q using the thumb and middle finger. FIG. 7R further shows, as a result of maintaining the pinch gesture, the scene 504 and display 204 of the wrist wearable device are updated to no longer show the home screen (e.g., corresponding to a sleep or shut down command). In some embodiments, maintaining the pinch gesture for at least a second threshold amount of time (e.g., 3-5 seconds) causes any user interface or overlay to cease to be displayed.

Figure 7S:
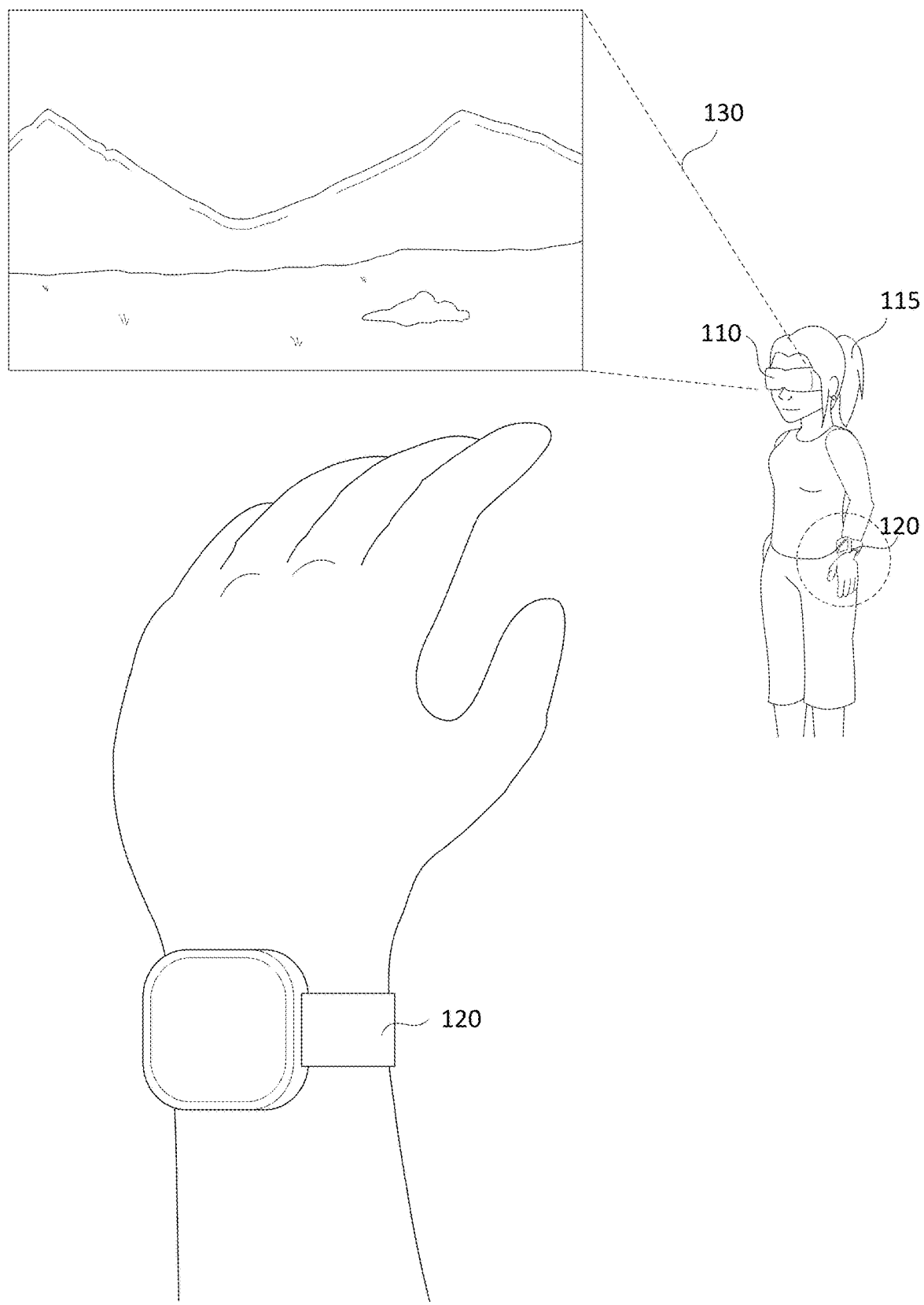
Figure 7T:
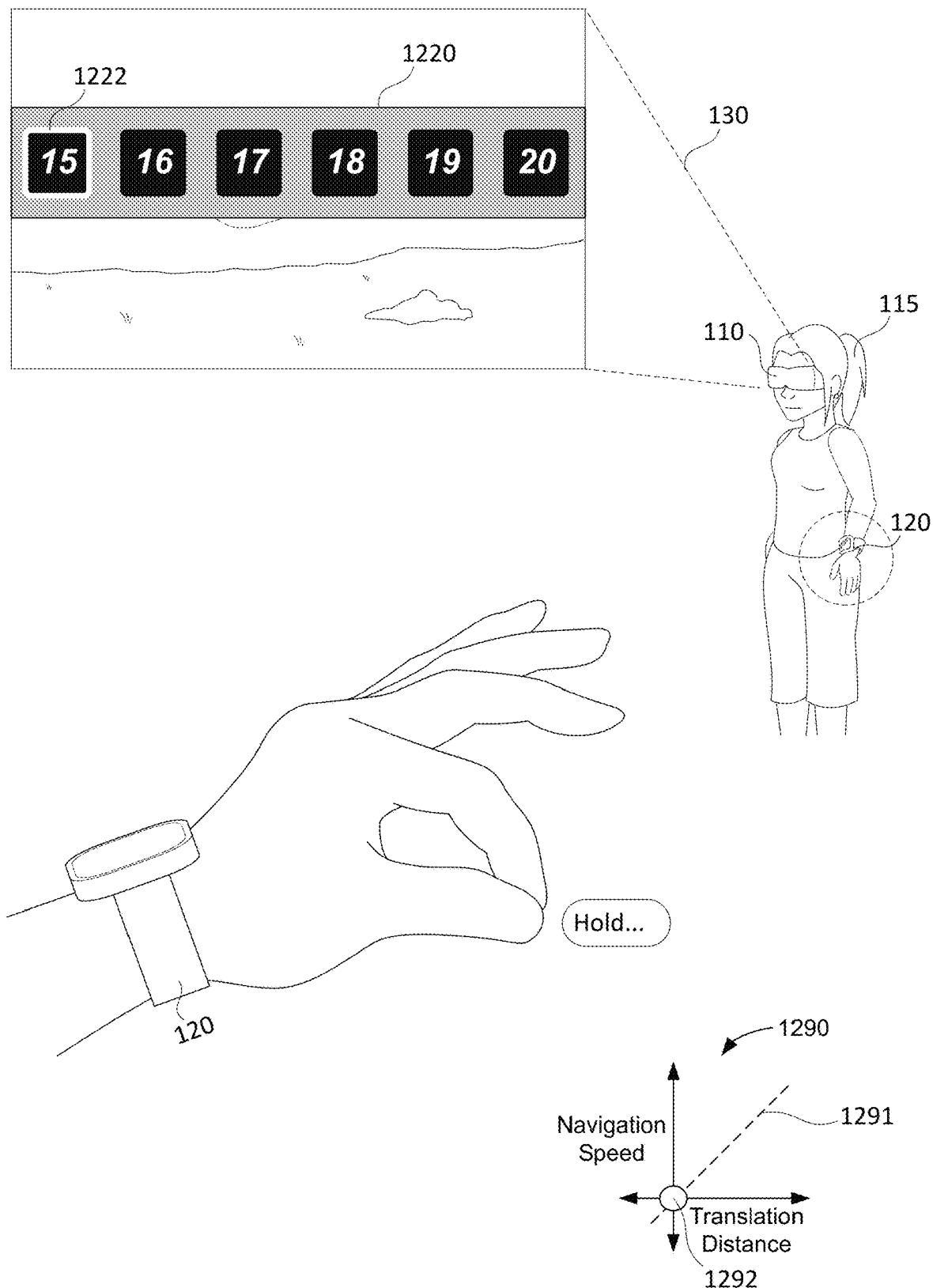
Figure 7U:
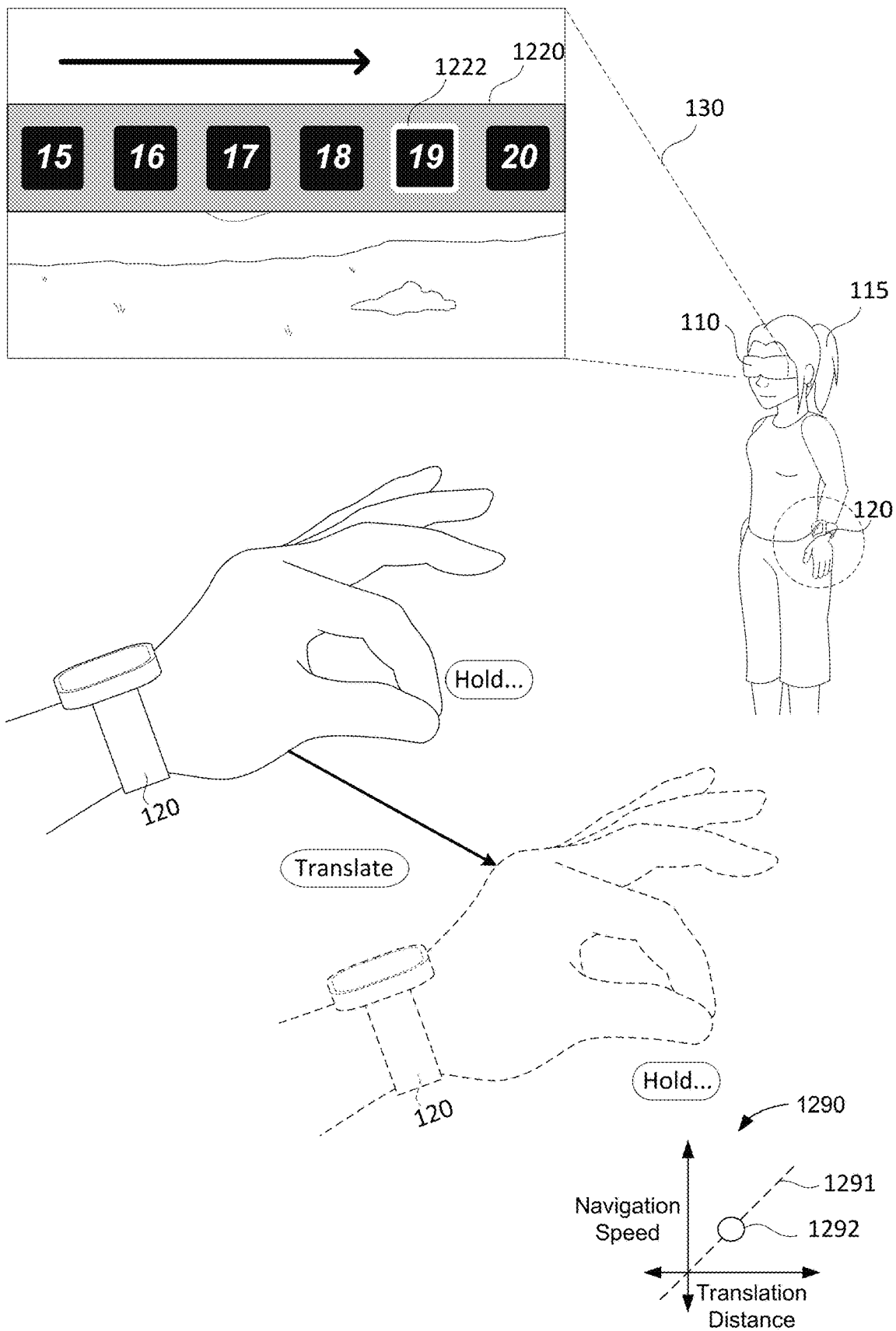

FIGS. 7S-7U illustrate another example user scenario of interacting with a wearable device in accordance with some embodiments. The user 115 in FIG. 7S is wearing a head-wearable device 110 (e.g., a virtual reality headset) and a wrist-wearable device 120 (e.g., a smartwatch). In FIG. 7S, the user 115 is viewing a scene 130 via the head-wearable device 110 and the user 115 is not performing a gesture.

In FIG. 7T, the user 115 is performing a priming gesture (e.g., a pinch gesture) using the user's pointer finger contacting the thumb. FIG. 7T further shows the scene 130 having updated in response to the pinch gesture. The scene 130 in FIG. 7T includes a user interface 1220 (e.g., a list of numbers the user 115 can scroll through). The user interface 1220 includes one or more numbers and a focus 1222 which highlights the currently selected number (the number 15). In some embodiments, the focus 1222 appears on a number that was previously selected in response to detecting the priming gesture. In some embodiments, the focus 1222 appears on the start of the list of numbers (e.g., the leftmost number). In some embodiments, as the user 115 performs one or more hand gestures, the focus 1222 moves in accordance with the performed hand gesture. In some embodiments, the focus 1222 is a cursor that moves between the user interface elements. In some embodiments, the user interface 1220 is displayed while the priming gesture is maintained. In some embodiments, the user interface 1220 is displayed for a predetermined amount of time after the priming gesture is performed. In some embodiments, the focus 1222 is displayed (and manipulable) while the priming gesture is maintained. In some embodiments, the focus 1222 is displayed (and manipulable) for a predetermined amount of time after the priming gesture is performed. In some embodiments, a first predetermined amount of time after the priming gesture is performed the focus 1222 ceases to be manipulable and/or displayed. In some embodiments, a second predetermined amount of time after the priming gesture is performed the user interface 1220 ceases to be displayed. In some embodiments, the second predetermined amount of time is longer than the first predetermined amount of time.

FIG. 7T further illustrates a graph 1290 showing a relationship between a translation distance of a navigation gesture and a navigation speed for the focus 1222. The graph 1290 in FIG. 7T corresponds to a first point in time (e.g., a point in time before the user 115 has performed a navigation gesture) and indicator 1292 indicates that the navigation speed is zero (e.g., no navigation is occurring at the first point in time). In some embodiments, the navigation speed of the focus 1222 corresponds to a translation distance of a navigation gesture from an initial position. In some embodiments, the relationship between the navigation speed and the translation distance is a linear relationship, as indicated by dotted line 1291. In some embodiments, the position of the hand of the user 115 when the priming gesture is performed is set as an initial position (e.g., for use with subsequent navigation gestures).

FIG. 7U illustrates the user 115 performing a navigation gesture (e.g., a drag gesture which is a horizontal translation). In the example of FIG. 7U the priming gesture (e.g., the pinch gesture) is maintained during the navigation gesture. FIG. 7U also illustrates the scene 130 updating responsive to the navigation gesture by scrolling through the user interface 1220 at a first speed and moving the focus 1222 from the number "15" to the number "19." In some embodiments, the distance of the translation corresponds to a speed of the navigation, as indicated by the graph 1290 in FIG. 7U. In some embodiments, the navigation speed is based on one or more settings (e.g., set by the user 115 or set as a default by the system). For example, the user 115 may adjust a setting that adjusts the slope of the dotted line 1291. More details regarding navigation speed that based on distance from an initial position can be found in co-owned U.S. patent application Ser. No. 18/359,855, entitled "Multi-Stage Gestures Detected Based on Neuromuscular-Signal Sensors of a Wearable Device to Activate User-Interface Interactions with Low-False Positive Rates, and Systems and Methods of Use Thereof," which is incorporated herein in its entirety.

Although the user scenarios described previously with respect to the series of FIGS. 1 through 7 describe operations being performed by the wrist-wearable device 120 and head-wearable devices 110 and 402, in some embodiments, at least a subset of the operations are performed by an intermediary device, such as a smartphone or personal computer, that is in communication with the wearable devices. For example, detection of user movement may occur at the wearable devices, but interpretation of the movement (e.g., identifying a gesture to which the movement corresponds) optionally occurs at an intermediary device. In some embodiments, the wrist-wearable device 120 and the head-wearable devices 110 and 402 communication with one another via the intermediary device (e.g., each are communicatively coupled to the intermediary device and the intermediary device manages interactions between the devices).

Examples of intermediary devices can include the computing devices 1174 described with reference to FIG. 11. In some embodiments, data from sensors on multiple devices are combined (e.g., at the intermediary device) to detect an in-air gesture. For example, data from one or more optical sensors of a head-wearable device (e.g., the head-wearable device 402) can be combined with EMG and/or IMU data from a wrist-worn device (e.g., the wrist-wearable device 120) to identify a swipe gesture at a location that corresponds to a first scroll bar of a user interface rather than a second scroll bar displayed at a separate location.

Additionally, although the user scenarios described with respect to the series of FIGS. 1 through 7 are described as separate sequences, in some embodiments, the user scenarios are combined with one another. For example, the sequence described with respect to FIGS. 7A-7R could occur before (or after) the sequences described with respect to FIGS. 4A-4H and 2A-2F (e.g., all three sequences could occur while the user 115 is on a morning walk).

The user scenarios described with respect to the series of FIGS. 1 through 7 involved specific user interface and applications, such as the messenger interface 108 in FIG. 1A and the photo gallery interface 206 in FIG. 2A. However, the sequences, gestures, actions, and operations can be used in conjunction with other types of menus and applications, such as web-browsing, note-taking, social media, word processing, data-entry, programming, and the like.

Figure 8A:
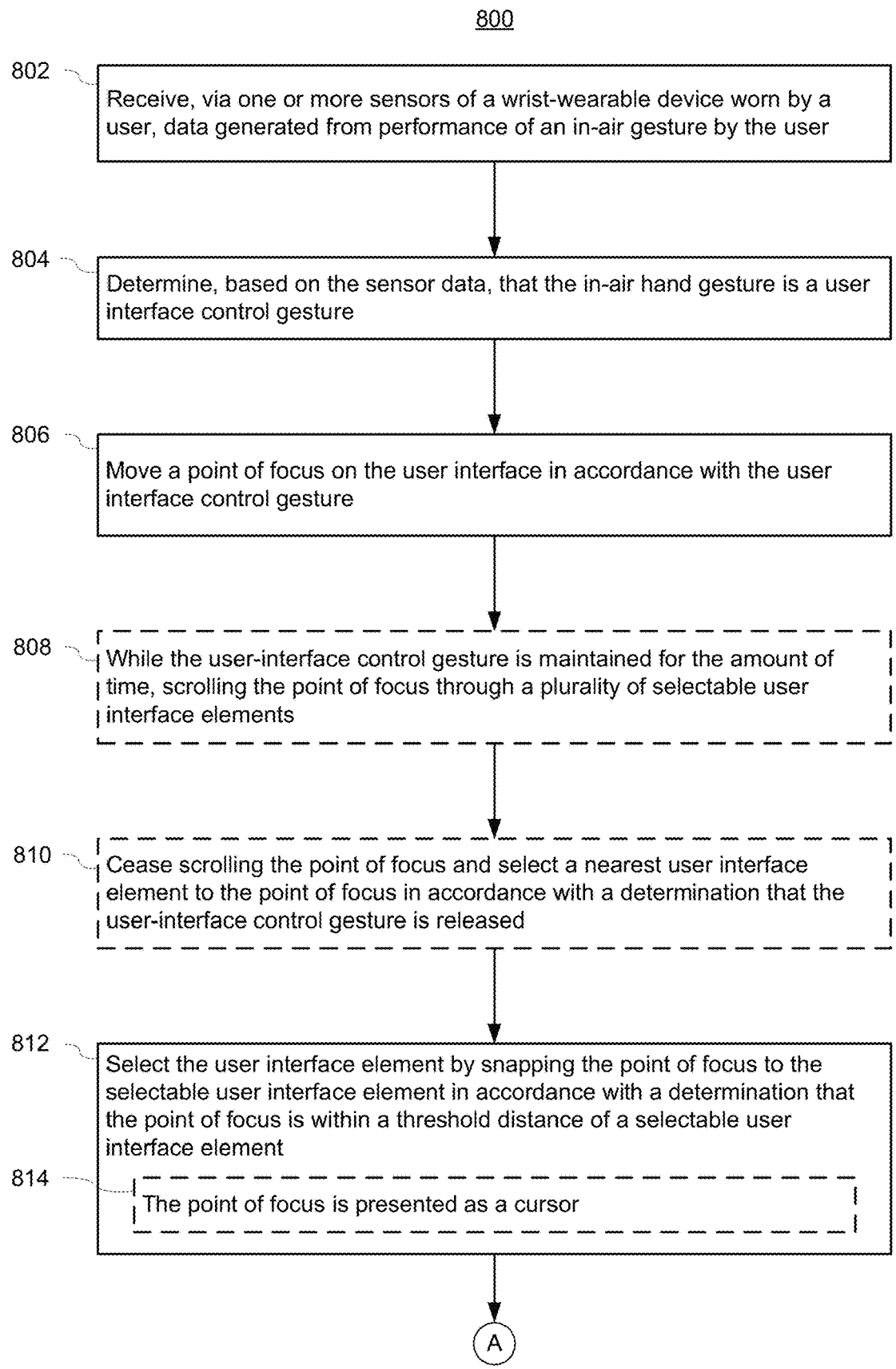
FIGS. 8A-8B are flow diagrams illustrating an example method for using in-air gestures to control a point of focus in a user-interface in accordance with some embodiments.
Figure 8B:
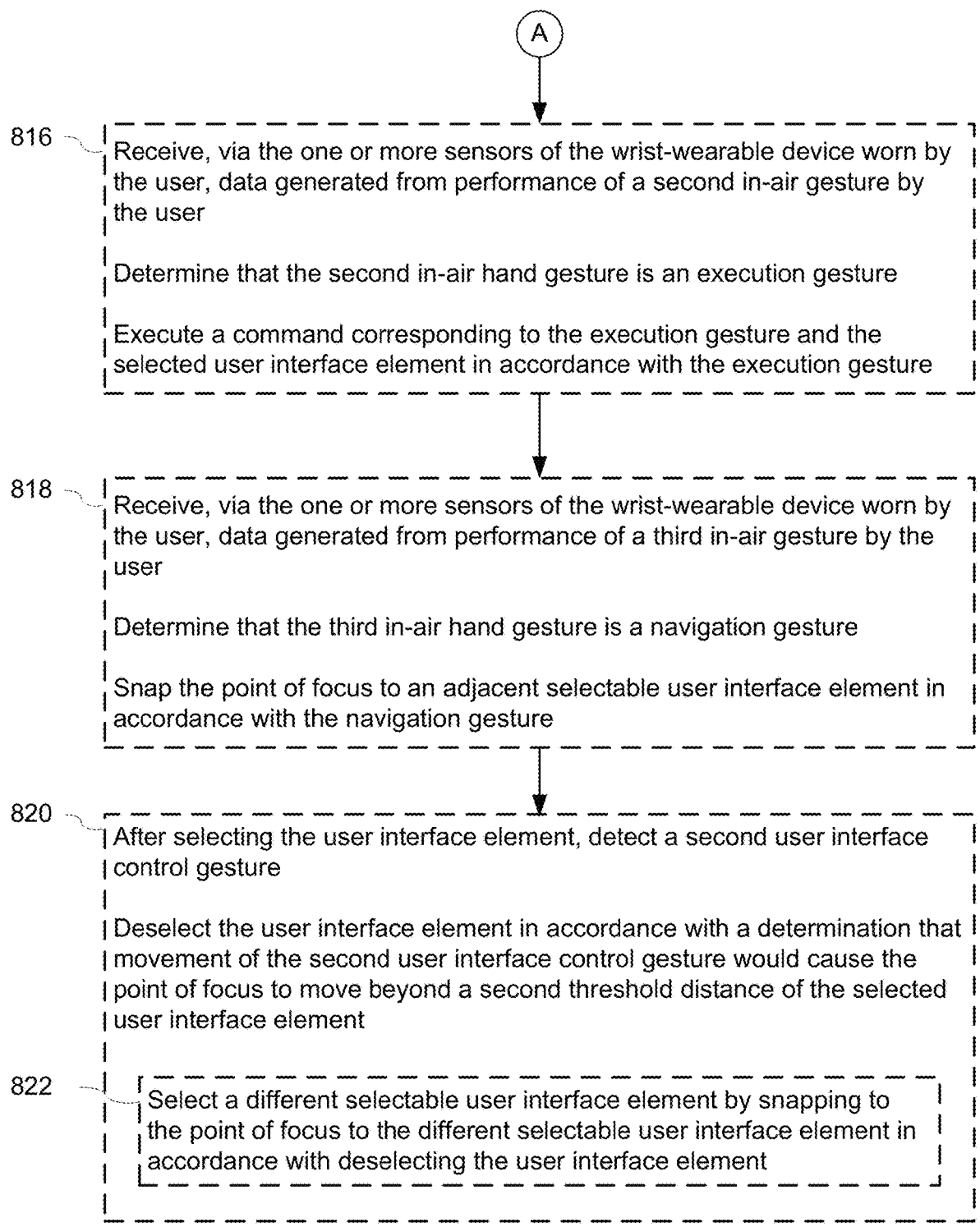

FIGS. 8A-8B are flow diagrams illustrating a method 800 for using in-air gestures to control a point of focus in a user-interface in accordance with some embodiments. The method 800 is performed at a computing system (e.g., a wearable device or intermediary device) having one or more processors and memory. In some embodiments, the memory stores one or more programs configured for execution by the one or more processors. At least some of the operations shown in FIGS. 8A-8B correspond to instructions stored in a computer memory or computer-readable storage medium (e.g., the memory 6050, 6080, and/or 7050). In some embodiments, the computing system is a wearable device, such as the wrist-wearable device 120 or the head-wearable device 110 or 402. In some embodiments, the computing system is, or includes, an intermediary device such as a smartphone (e.g., the HIPD 8000).

The system receives (802), via one or more sensors (e.g., the sensors 6021) of a wrist-wearable device worn by a user, data generated from performance of an in-air gesture by the user (e.g., data generated from the pinch gesture shown in FIG. 2B). In some embodiments, the one or more sensors include one or more IMU or EMG sensors.

The system determines (804), based on the sensor data, that the in-air hand gesture is a user interface control gesture. For example, the gesture is a priming gesture (e.g., the first gesture in FIG. 1B), a navigation gesture (e.g., the wrist rotation gesture in FIG. 1C), or an activation gesture (e.g., the tap gesture in FIG. 1E). For example, one or more processors 1150 of a wearable device or intermediary device analyzes the data and determines whether the gesture is a user interface control gesture.

The system moves (806) a point of focus (e.g., via the processor(s) 6049 and/or 6079) on the user interface in accordance with the user interface control gesture. For example, FIGS. 4C-4F show the point of focus 408 moving in accordance with the user's thumb gestures.

In some embodiments, while the user-interface control gesture is maintained for the amount of time, the system scrolls (808) the point of focus (e.g., via the processor(s) 6049 and/or 6079) through a plurality of selectable user interface elements. For example, FIGS. 2D and 2E show the user interface 206 scrolling photos in accordance with a held pinch gesture. In some embodiments, the system starts the scrolling after the gesture is held for at least a preset amount of time (e.g., 0.5, 1, or 2 seconds).

In some embodiments, the system ceases (810) scrolling the point of focus and select a nearest user interface element to the point of focus in accordance with a determination that the user-interface control gesture is released. For example, FIG. 2F shows the user having released the pinch gesture and the image 216 is selected in accordance with the system ceasing to scroll.

The system selects (812) the user interface element by snapping the point of focus to the selectable user interface element in accordance with a determination that the point of focus is within a threshold distance of a selectable user interface element. For example, FIGS. 4C and 4D illustrate the point of focus 408 moving within the snapping boundary 412 and snapping to the user interface element 414.

In some embodiments, the point of focus is presented (814) as a cursor (e.g., the point of focus in FIG. 4B is presented to the user as a cursor). In some embodiments, the point of focus is presented as a cursor only when not snapped to a selectable user interface element.

In some embodiments, the system: (i) receives (816), via the one or more sensors of the wrist-wearable device worn by the user, data generated from performance of a second in-air gesture by the user; (ii) determines that the second in-air hand gesture is an execution gesture (also sometimes called a control gesture or an activation gesture); and (iii) executes a command corresponding to the execution gesture and the selected user interface element in accordance with the execution gesture. For example, FIG. 1H shows the user 115 performing a thumb tap gesture and a corresponding insertion of the emoji 117 into the response box 121.

In some embodiments, the system: (i) receives (818), via the one or more sensors of the wrist-wearable device worn by the user, data generated from performance of a third in-air gesture by the user; (ii) determines that the third in-air hand gesture is a navigation gesture; and (iii) snaps the point of focus to an adjacent selectable user interface element in accordance with the navigation gesture. For example, FIG. 3B shows the user performing a pinch gesture and the point of focus 306 moving from the user interface element 308-1 (in FIG. 3A) to the user interface element 308-2 (in FIG. 3B).

In some embodiments, the system: (i) detects (820) a second user interface control gesture after selecting the user interface element; and (ii) deselects the user interface element in accordance with a determination that movement of the second user interface control gesture would cause the point of focus to move beyond a second threshold distance of the selected user interface element. For example, FIGS. 4E and 4F illustrate the point of focus 408 moving beyond the snapping boundary 412 and deselection of the user interface element 414. In some embodiments the snapping threshold and un-snapping thresholds are different. For example, the snapping threshold may be closer to, or further from, the corresponding selectable user interface element than the un-snapping threshold.

In some embodiments, the system selects (822) a different selectable user interface element by snapping to the point of focus to the different selectable user interface element in accordance with deselecting the user interface element. For example, the point of focus 408 in FIG. 4F could snap to the user interface element 416 in accordance with deselecting the user interface element 414.

Figure 9A:
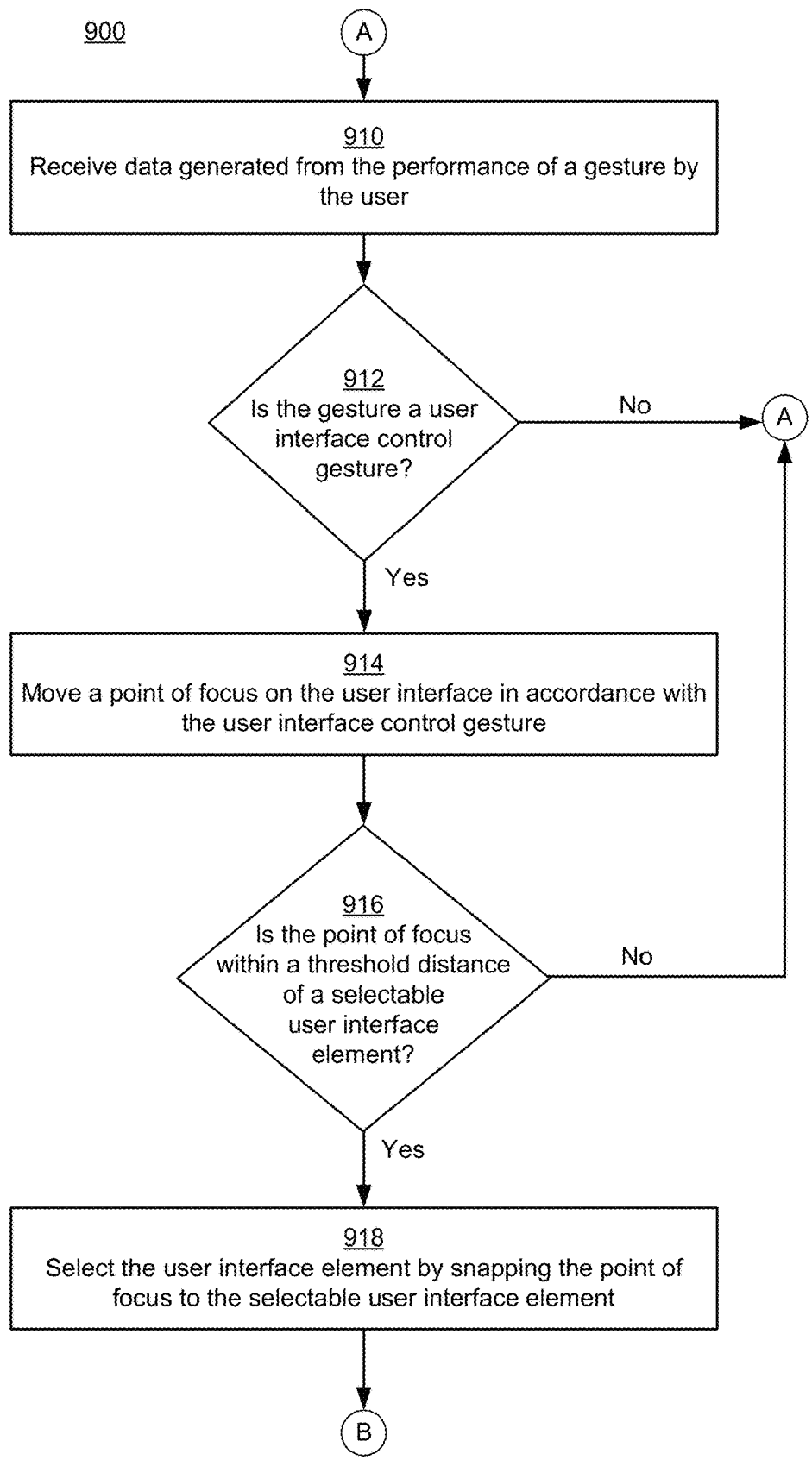
FIGS. 9A-9B are flow diagrams illustrating another example method for using in-air gestures to control a point of focus in a user-interface in accordance with some embodiments.
Figure 9B:
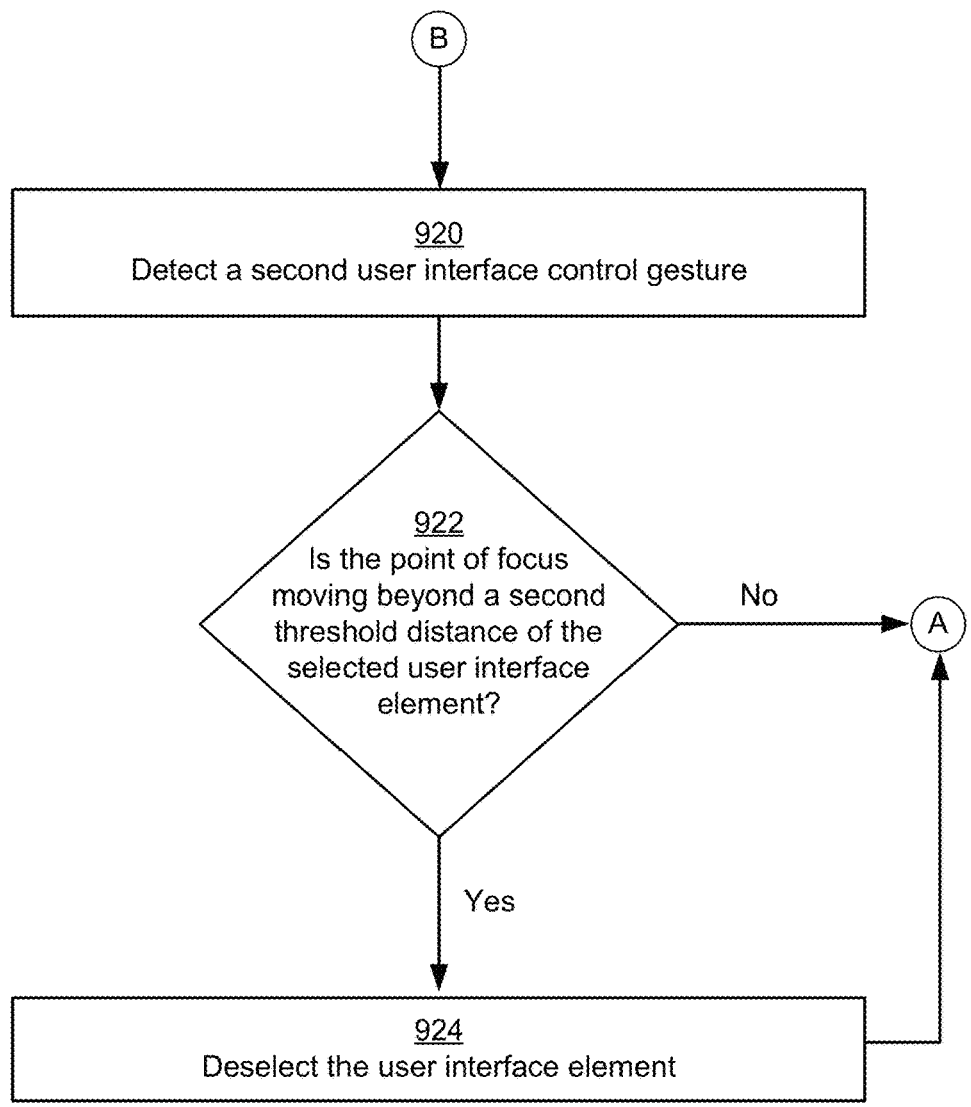

FIGS. 9A-9B are flow diagrams illustrating a method 900 for using in-air gestures to control a point of focus in a user-interface in accordance with some embodiments. The method 900 is performed at a computing system (e.g., a wearable device or intermediary device) having one or more processors and memory. In some embodiments, the memory stores one or more programs configured for execution by the one or more processors. At least some of the operations shown in FIGS. 9A-9B correspond to instructions stored in a computer memory or computer-readable storage medium (e.g., the memory 6050, 6080, and/or 7050). In some embodiments, the computing system is a wearable device, such as the wrist-wearable device 120 or the head-wearable device 110 or 402. In some embodiments, the computing system is, or includes, an intermediary device such as a smartphone (e.g., the HIPD 8000).

The system receives (910) data generated from performance of a gesture by a user. For example, the system receives the data via one or more sensors (e.g., the sensors 6013 and/or 6021). In some embodiments, the system receives data from one or more wearable devices (e.g., the wrist-wearable device 120 and/or the head-wearable device 110 or 402).

The system determines (912) whether the gesture is a user interface control gesture (e.g., a priming, navigation, or execution/activation gesture). For example, one or more processors of a wearable device or intermediary device analyzes the data and determines whether the gesture is a user interface control gesture. In some embodiments, prior to determining that the gesture is a user interface control gesture, the system is in a low-power or sleep state and is responsive to only control gestures (e.g., not responsive to activation or execution gestures).

In accordance with a determination that the gesture is a user interface control gesture, the system moves (914) a point of focus on the user interface in accordance with the user interface control gesture. For example, the system determines that the gesture is a wrist rotation gesture and moves the point of focus in accordance with the rotation of the user's wrist, e.g., as shown in FIG. 3C.

In accordance with a determination that the gesture is not a user interface control gesture, the system forgoes moving the point of focus on the user interface (e.g., returns to a state responsive to user interface control gestures). For example, the system returns to the state it was in prior to receiving the data generated from performance of the gesture by the user.

The system determines (916) whether the point of focus is within a threshold distance (e.g., the snapping boundary 412) of a selectable user interface element. For example, after, or during, the movement of the point of focus, the system determines whether a position of the point of focus overlaps with a selectable user interface element (or is within a threshold distance of the element).

In accordance with a determination that the point of focus is within the threshold distance, the system selects (918) the user interface element by snapping the point of focus to the selectable user interface element. For example, the user gesture would have moved the point of focus next to, but not overlaid with, the user interface element such that the user interface element would not be selected without the snapping action. The snapping action in this example moves the point of focus beyond the position where it otherwise would have stopped to a position that overlays the user interface element.

In accordance with a determination that the point of focus is not within the threshold distance, the system forgoes selecting the user interface element (e.g., returns to a state responsive to user interface control gestures). For example, the system returns to the state it was in prior to receiving the data generated from performance of the gesture by the user.

The system detects (920) a second user interface control gesture. For example, the system detects a navigation gesture (e.g., a wrist rotation, pinch, or thumb d-pad gesture) that moves the point of focus.

The system determines (922) whether the point of focus moves beyond a second threshold distance of the selected user interface element in accordance with the second user interface control gesture. For example, the system determines whether the point of focus move to a position that is not overlaid with the selectable user interface element.

In accordance with a determination that the point of focus has moved beyond the second threshold distance, the system deselects (924) the user interface element. For example, the system deselects the user interface element and displays a cursor that is not overlaid with the user interface element. As another example, the system deselects the user interface element and selects an adjacent user interface element that is in the direction of the second user interface control gesture.

In accordance with a determination that the point of focus has moved beyond the second threshold distance, the system forgoes deselecting the user interface element (e.g., returns to a state responsive to control gestures).

Figure 10A:
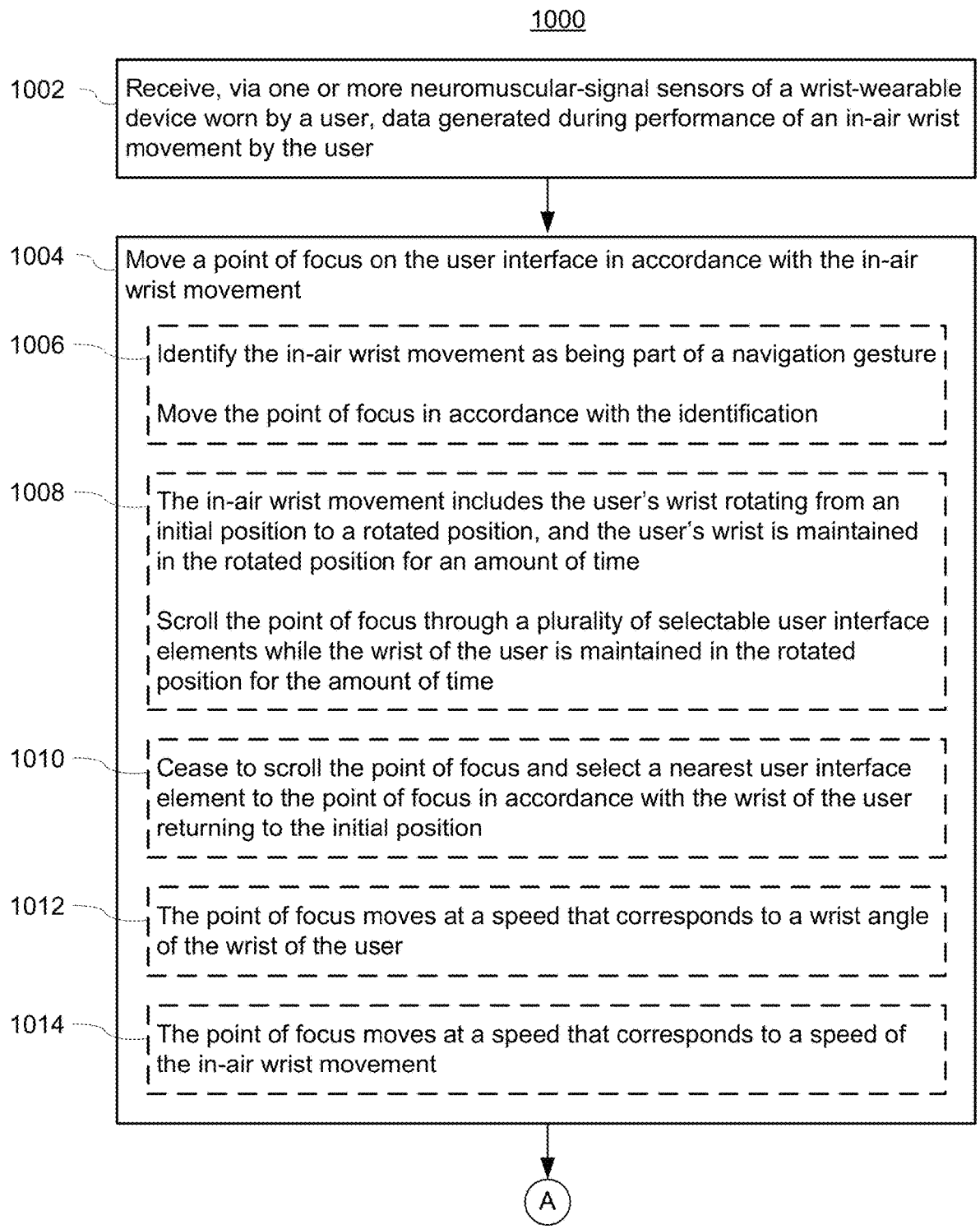
FIGS. 10A-10B are flow diagrams illustrating an example method for using wrist movements to control a user-interface in accordance with some embodiments.
Figure 10B:
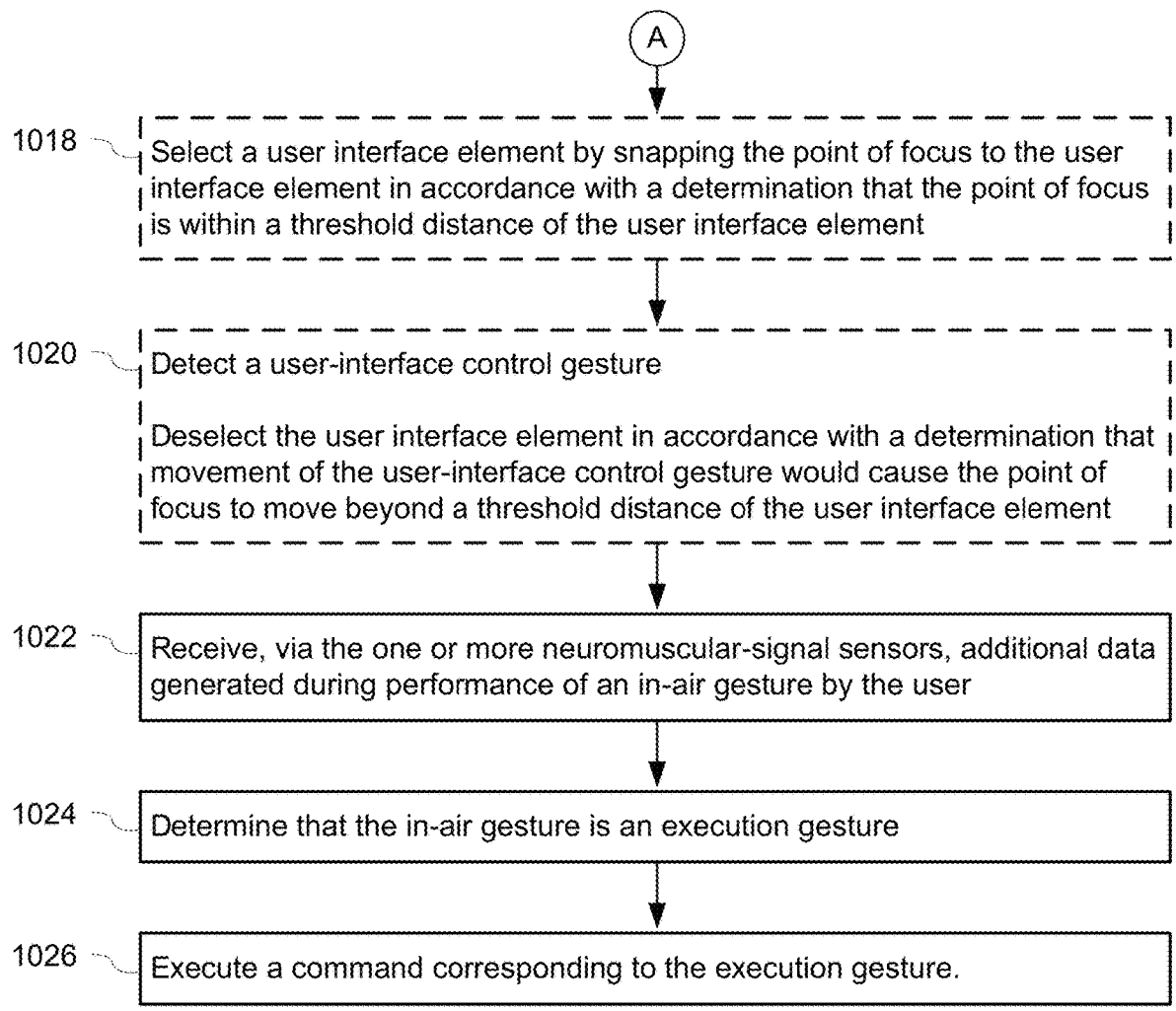

FIGS. 10A-10B are flow diagrams illustrating a method 1000 for using wrist movements to control a user-interface in accordance with some embodiments. The method 1000 is performed at a computing system (e.g., a wearable device or intermediary device) having one or more processors and memory. In some embodiments, the memory stores one or more programs configured for execution by the one or more processors. At least some of the operations shown in FIGS. 10A-10B correspond to instructions stored in a computer memory or computer-readable storage medium (e.g., the memory 6050, 6080, and/or 7050). In some embodiments, the computing system is a wearable device, such as the wrist-wearable device 120 or the head-wearable device 110 or 402. In some embodiments, the computing system is, or includes, an intermediary device such as a smartphone (e.g., the HIPD 8000).

The system receives (1002), via one or more neuromuscular-signal sensors of a wrist-wearable device worn by a user, data generated during performance of an in-air wrist movement by the user. For example, the one or more sensors include the sensors 6021 and/or 6013 (e.g., EMG and/or IMU sensors).

The system moves (1004) a point of focus on the user interface in accordance with the in-air wrist movement. For example, FIG. 5C illustrates the user rotating their wrist and the focus in the interface 506 switching from January $1^{st}$ events (in FIG. 5B) to January $8^{th}$ events (in FIG. 5C).

In some embodiments, the system: (i) identifies (1006) the in-air wrist movement as being part of a navigation gesture (e.g., via the processor(s) 6049 and/or 6079); and (ii) moves the point of focus in accordance with the identification. For example, the system identifies the fist gesture in FIG. 5B as a priming gesture for the navigation and the wrist rotation gesture in FIG. 5C as the movement control gesture for the navigation.

In some embodiments: (i) the in-air wrist movement includes the user's wrist rotating from an initial position to a rotated position, and the user's wrist is maintained in the rotated position for an amount of time; and (ii) the system scrolls (1008) the point of focus through a plurality of selectable user interface elements while the wrist of the user is maintained in the rotated position for the amount of time. For example, while the user maintains the downward wrist rotation shown in FIG. 1G, the point of focus 105 moves downward through the emojis in the emoji menu. In some embodiments, the system ceases (1010) to scroll the point of focus and select a nearest user interface element to the point of focus in accordance with the wrist of the user returning to the initial position. For example, FIG. 2F shows the user having released the pinch gesture and the image 216 is selected in accordance with the system ceasing to scroll.

In some embodiments, the point of focus moves (1012) at a speed that corresponds to a wrist angle of the wrist of the user. For example, the further the user rotates their wrist, the faster the point of focus moves. In some embodiments, the point of focus moves (1014) at a speed that corresponds to a speed of the in-air wrist movement. For example, if the user quickly flicks their wrist the point of focus moves faster than if the user slowly rotates their wrist. In some embodiments, the speed of the point of focus movement is based on both the angle and speed at which the gesture is performed.

In some embodiments, the system selects (1018) a user interface element by snapping the point of focus to the user interface element in accordance with a determination that the point of focus is within a threshold distance of the user interface element. For example, FIGS. 4C and 4D illustrate the point of focus 408 moving within the snapping boundary 412 and snapping to the user interface element 414.

In some embodiments, the system: (i) detects (1020) a user-interface control gesture; and (ii) deselects the user interface element in accordance with a determination that movement of the user-interface control gesture would cause the point of focus to move beyond a threshold distance of the user interface element. For example, FIGS. 4E and 4F illustrate the point of focus 408 moving beyond the snapping boundary 412 and deselection of the user interface element 414. In some embodiments the snapping threshold and un-snapping thresholds are different.

The system receives (1022), via the one or more neuromuscular-signal sensors, additional data generated during performance of an in-air gesture by the user. The system determines (1024) that the in-air gesture is an execution gesture. The system executes (1026) a command corresponding to the execution gesture. For example, FIG. 1H shows the user 115 performing a thumb tap gesture and a corresponding insertion of the emoji 117 into the response box 121.

As one of skill in the art will appreciate, aspects of the method 800 can be combined and/or replaced with aspects of the methods 900 and 1000. For example, the method 800 can be performed prior to (or after) the method 1000. The method 1000 can include the operations of method 900, e.g., the operations 920, 922, and 924 can be performed after the operation 918. As another example, the operation 802 can be replaced (or supplemented by) the operation 1002.

Having thus described example sequences and methods of operation that make use of the example sequences, attention will now be directed to system-level depictions of hardware and software on which (or with which) the methods can be implemented.

Example Systems

Figure 11A:
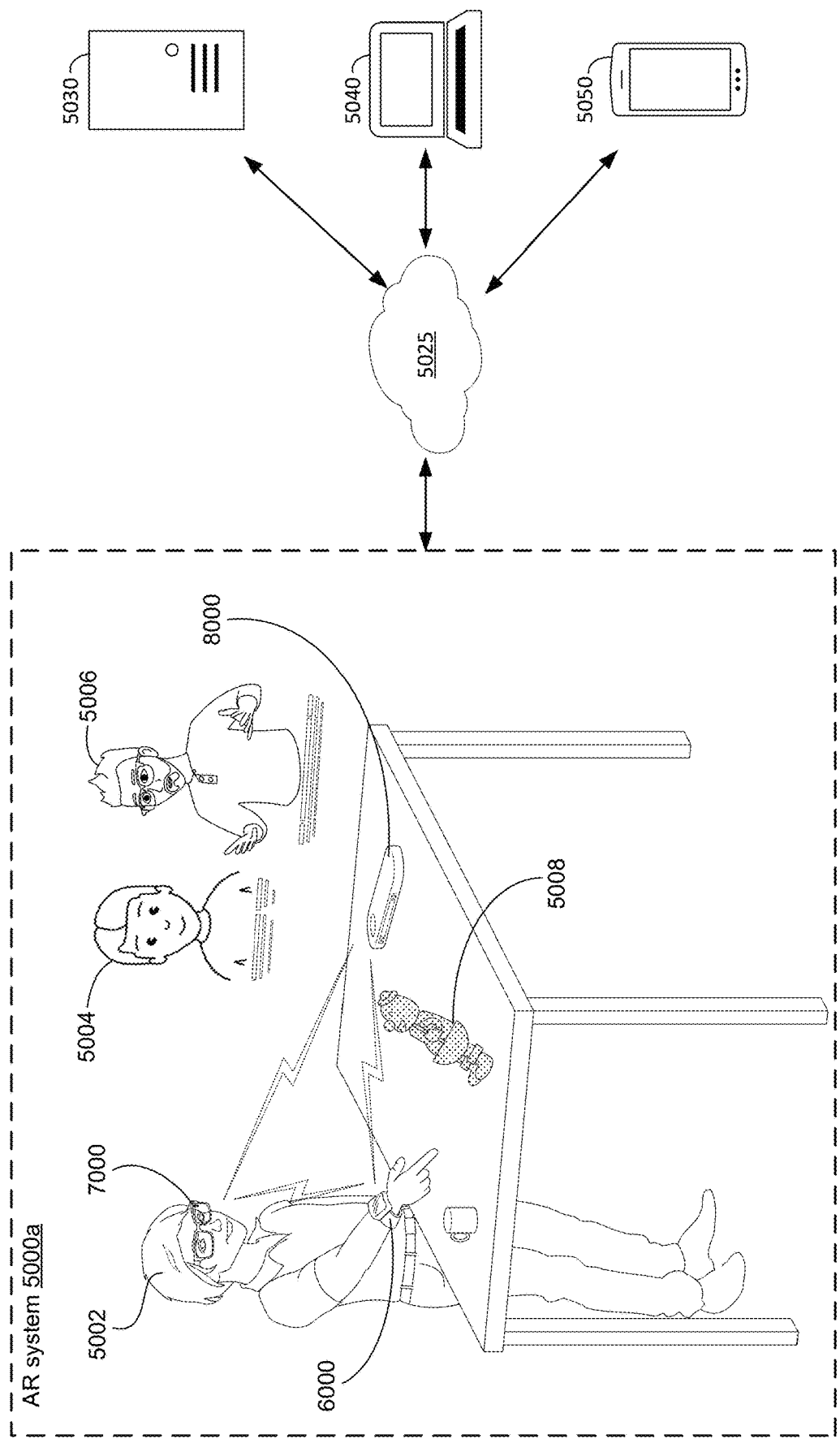
FIGS. 11A, 11B, 11C-1, 11C-2, 11D-1, and 11D-2 illustrate example AR systems in accordance with some embodiments.
Figure 11B:
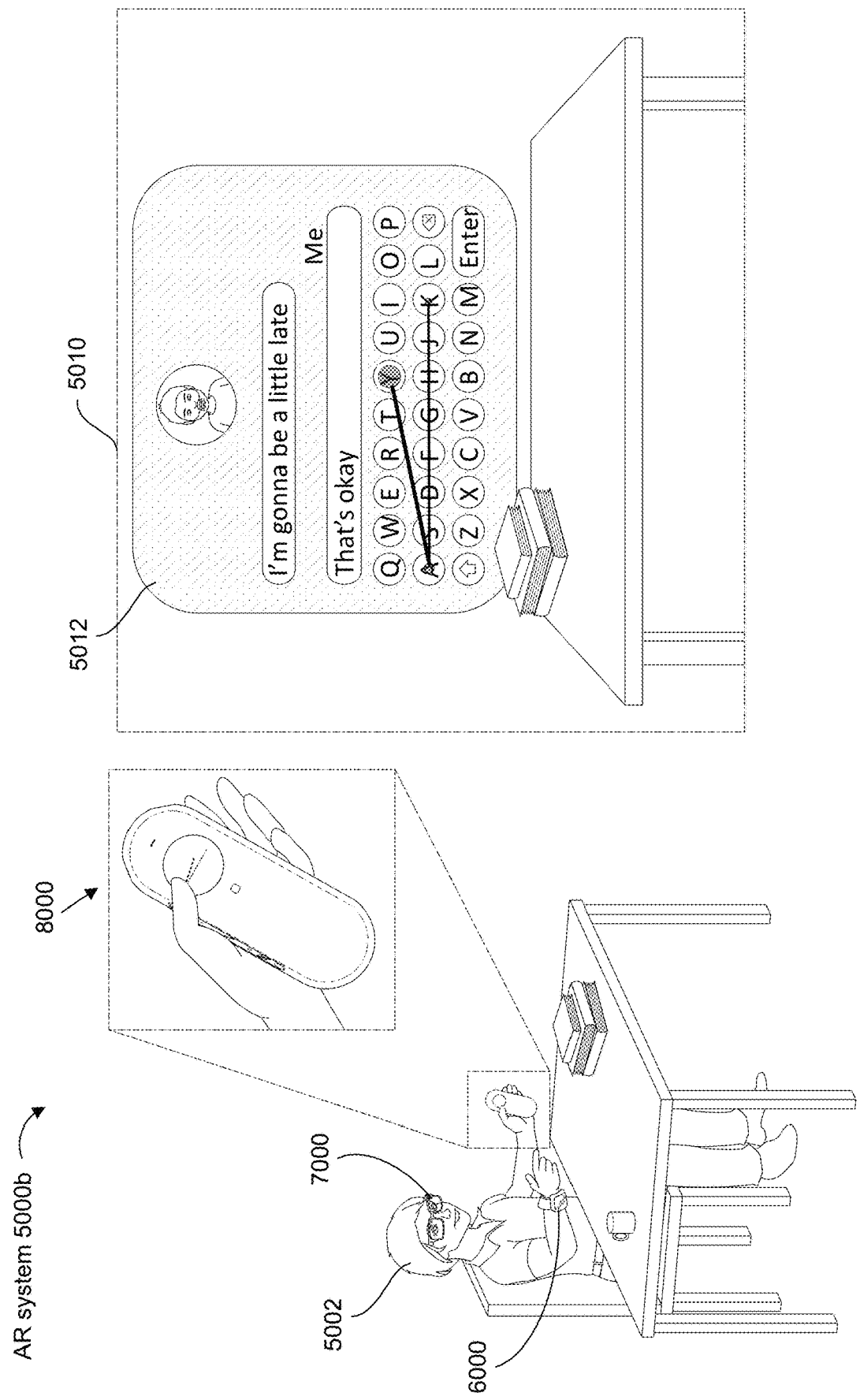
Figures 1, 11C:
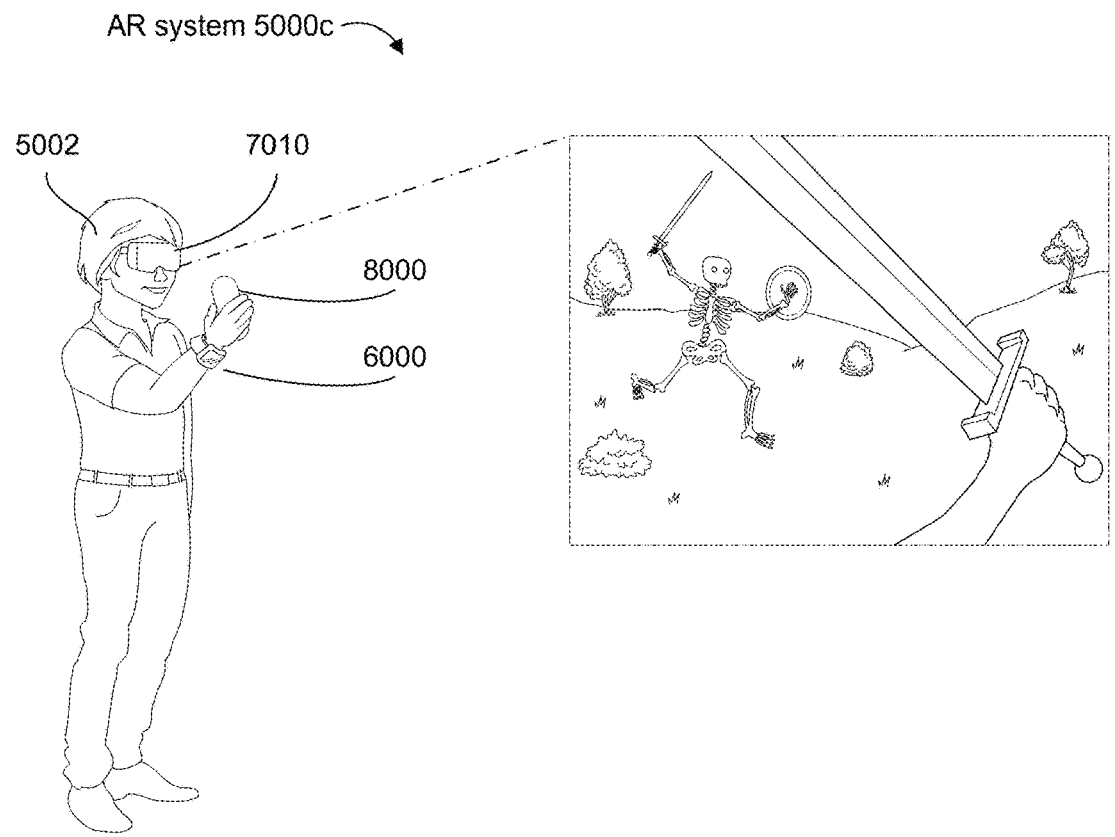
Figures 2, 11C:
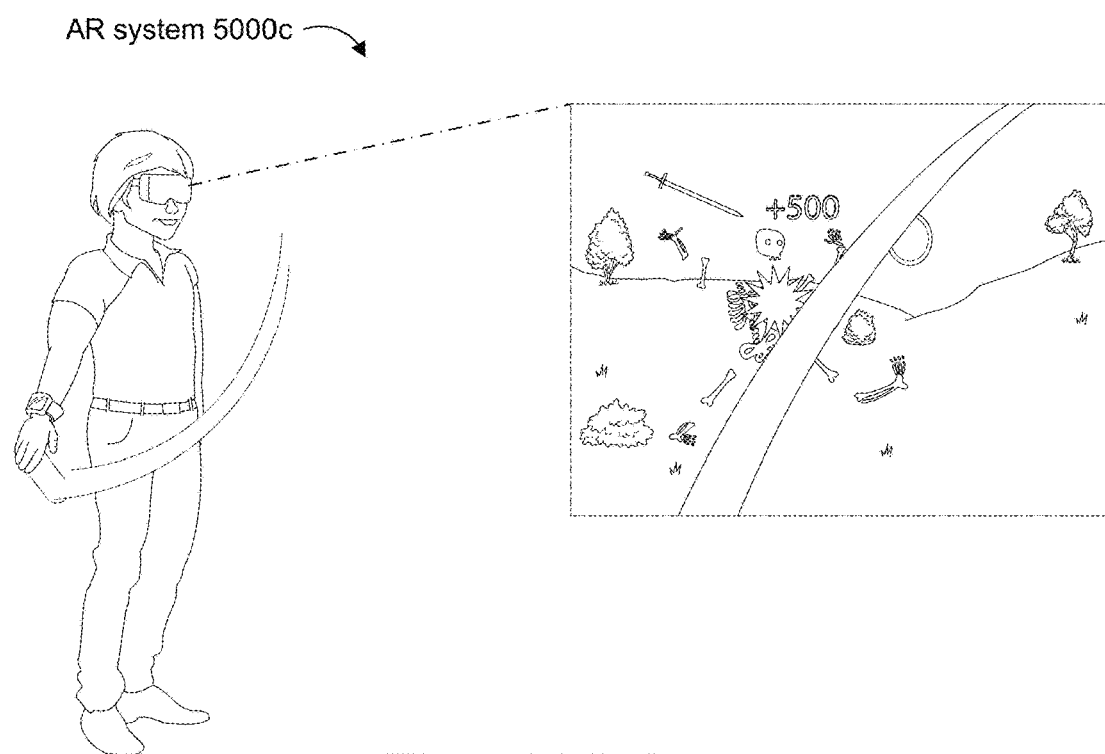
Figures 1, 11D:
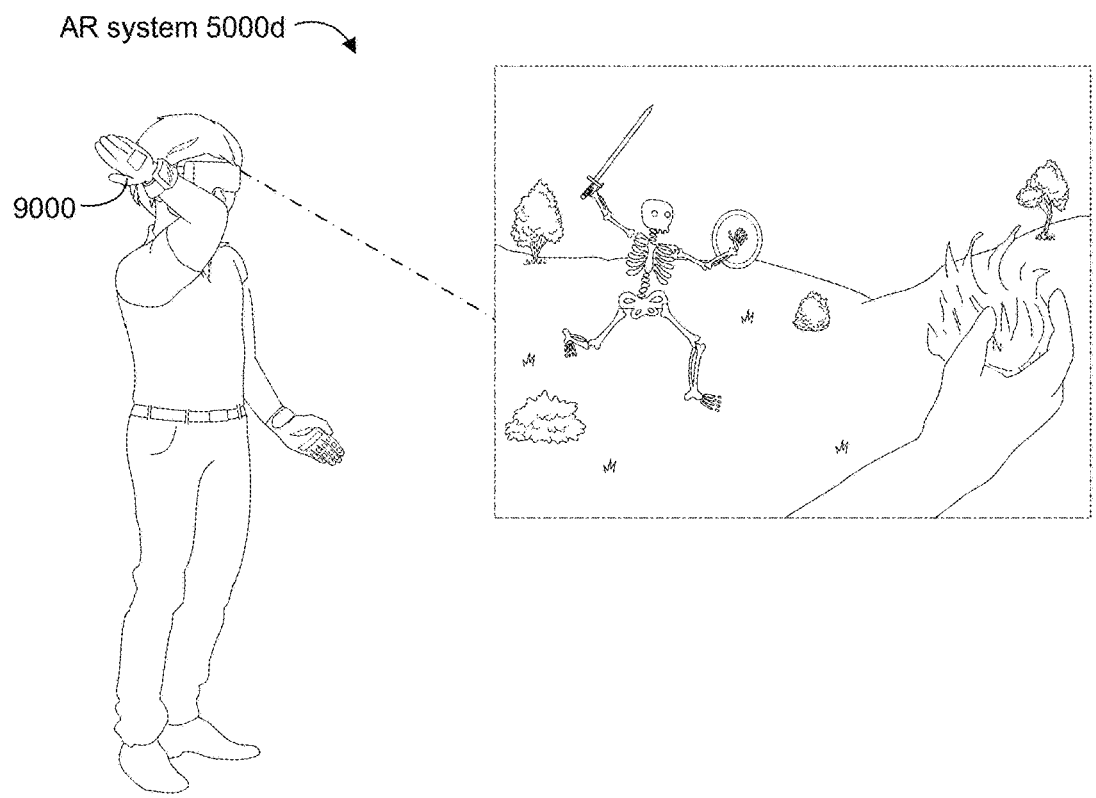
Figures 2, 11D:
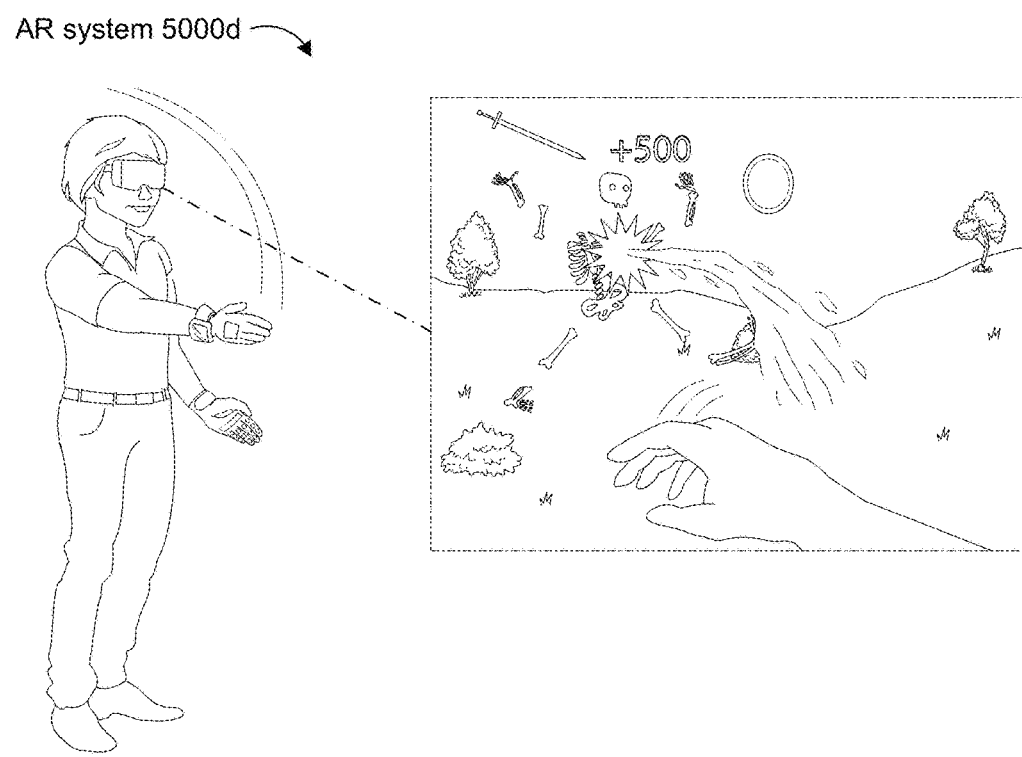

FIGS. 11A-11D illustrate example AR systems in accordance with some embodiments. FIG. 11A shows an AR system 5000*a* and first example user interactions using a wrist-wearable device 6000, a head-wearable device (e.g., AR system 7000), and/or a handheld intermediary processing device (HIPD) 8000. FIG. 11B shows an AR system 5000*b* and second example user interactions using the wrist-wearable device 6000, the AR system 7000, and/or an HIPD 8000. FIGS. 11C-1 and 11C-2 show an AR system 5000c and third example user interactions using a wrist-wearable device 6000, a head-wearable device (e.g., VR headset 7010), and/or an HIPD 8000. FIGS. 11D-1 and 11D-2 show a fourth AR system 5000d and fourth example user interactions using a wrist-wearable device 6000, VR headset 7010, and/or device 9000 (e.g., wearable haptic gloves). The above-example AR systems (described in detail below) can perform the various functions and/or operations described above with reference to FIGS. 1-10.

The wrist-wearable device 6000 and its components are described below in reference to FIGS. 12A-12B; the head-wearable devices and their components are described below in reference to FIGS. 13A-13D; and the HIPD 8000 and its components are described below in reference to FIGS. 14A-14B. Wearable gloves and their components are described below in reference to FIGS. 15A-15C. As shown in FIG. 11A, the wrist-wearable device 6000, the head-wearable devices, and/or the HIPD 8000 can communicatively couple via a network 5025 (e.g., cellular, near field, Wi-Fi, personal area network, or wireless LAN). Additionally, the wrist-wearable device 6000, the head-wearable devices, and/or the HIPD 8000 can also communicatively couple with one or more servers 5030, computers 5040 (e.g., laptops, computers, etc.), mobile devices 5050 (e.g., smartphones, tablets, etc.), and/or other electronic devices via the network 5025 (e.g., cellular, near field, Wi-Fi, personal area network, wireless LAN, etc.) Similarly, the device 9000 can also communicatively couple with the wrist-wearable device 6000, the head-wearable devices, the HIPD 8000, the one or more servers 5030, the computers 5040, the mobile devices 5050, and/or other electronic devices via the network 5025.

Turning to FIG. 11A, a user 5002 is shown wearing the wrist-wearable device 6000 and the AR system 7000 and having the HIPD 8000 on their desk. The wrist-wearable device 6000, the AR system 7000, and the HIPD 8000 facilitate user interaction with an AR environment. In particular, as shown by the AR system 5000a, the wrist-wearable device 6000, the AR system 7000, and/or the HIPD 8000 cause presentation of one or more avatars 5004, digital representations of contacts 5006, and virtual objects 5008. As discussed below, the user 5002 can interact with the one or more avatars 5004, digital representations of the contacts 5006, and virtual objects 5008 via the wrist-wearable device 6000, the AR system 7000, and/or the HIPD 8000.

The user 5002 can use any of the wrist-wearable device 6000, the AR system 7000, and/or the HIPD 8000 to provide user inputs. For example, the user 5002 can perform one or more hand gestures that are detected by the wrist-wearable device 6000 (e.g., using one or more EMG sensors and/or IMUs, described below in reference to FIGS. 12A-12B) and/or AR system 7000 (e.g., using one or more image sensor or camera, described below in reference to FIGS. 13A-13B) to provide a user input. Alternatively, or additionally, the user 5002 can provide a user input via one or more touch surfaces of the wrist-wearable device 6000, the AR system 7000, and/or the HIPD 8000, and/or voice commands captured by a microphone of the wrist-wearable device 6000, the AR system 7000, and/or the HIPD 8000. In some embodiments, the wrist-wearable device 6000, the AR system 7000, and/or the HIPD 8000 include a digital assistant to help the user in providing a user input (e.g., completing a sequence of operations, suggesting different operations or commands, providing reminders, or confirming a command). In some embodiments, the user 5002 provides a user input via one or more facial gestures and/or facial expressions. For example, cameras of the wrist-wearable device 6000, the AR system 7000, and/or the HIPD 8000 can track the user 5002's eyes for navigating a user interface.

The wrist-wearable device 6000, the AR system 7000, and/or the HIPD 8000 can operate alone or in conjunction to allow the user 5002 to interact with the AR environment. In some embodiments, the HIPD 8000 is configured to operate as a central hub or control center for the wrist-wearable device 6000, the AR system 7000, and/or another communicatively coupled device. For example, the user 5002 can provide an input to interact with the AR environment at any of the wrist-wearable device 6000, the AR system 7000, and/or the HIPD 8000, and the HIPD 8000 can identify one or more back-end and front-end tasks to cause the performance of the requested interaction and distribute instructions to cause the performance of the one or more back-end and front-end tasks at the wrist-wearable device 6000, the AR system 7000, and/or the HIPD 8000. In some embodiments, a back-end task is background processing task that is not perceptible by the user (e.g., rendering content, decompression, or compression), and a front-end task is a user-facing task that is perceptible to the user (e.g., presenting information to the user or providing feedback to the user). As described below in reference to FIGS. 14A-14B, the HIPD 8000 can perform the back-end tasks and provide the wrist-wearable device 6000 and/or the AR system 7000 operational data corresponding to the performed back-end tasks such that the wrist-wearable device 6000 and/or the AR system 7000 can perform the front-end tasks. In this way, the HIPD 8000, which can have more computational resources and greater thermal headroom than the wrist-wearable device 6000 and/or the AR system 7000, performs computationally intensive tasks and reduces the computer resource utilization and/or power usage of the wrist-wearable device 6000 and/or the AR system 7000.

In the example shown by the AR system 5000a, the HIPD 8000 identifies one or more back-end tasks and front-end tasks associated with a user request to initiate an AR video call with one or more other users (represented by the avatar 5004 and the digital representation of the contact 5006) and distributes instructions to cause the performance of the one or more back-end tasks and front-end tasks. In particular, the HIPD 8000 performs back-end tasks for processing and/or rendering image data (and other data) associated with the AR video call and provides operational data associated with the performed back-end tasks to the AR system 7000 such that the AR system 7000 perform front-end tasks for presenting the AR video call (e.g., presenting the avatar 5004 and the digital representation of the contact 5006).

In some embodiments, the HIPD 8000 operates as a focal or anchor point for causing the presentation of information. This allows the user 5002 to be generally aware of where information is presented. For example, as shown in the AR system 5000a, the avatar 5004 and the digital representation of the contact 5006 are presented above the HIPD 8000. In particular, the HIPD 8000 and the AR system 7000 operate in conjunction to determine a location for presenting the avatar 5004 and the digital representation of the contact 5006. In some embodiments, information can be presented a predetermined distance from the HIPD 8000 (e.g., within 5 meters). For example, as shown in the AR system 5000a, virtual object 5008 is presented on the desk some distance from the HIPD 8000. Similar to the above example, the HIPD 8000 and the AR system 7000 can operate in conjunction to determine a location for presenting the virtual object 5008. Alternatively, in some embodiments, presentation of information is not bound by the HIPD 8000. More specifically, the avatar 5004, the digital representation of the contact 5006, and the virtual object 5008 do not have to be presented within a predetermined distance of the HIPD 8000.

User inputs provided at the wrist-wearable device 6000, the AR system 7000, and/or the HIPD 8000 are coordinated such that the user can use any device to initiate, continue, and/or complete an operation. For example, the user 5002 can provide a user input to the AR system 7000 to cause the AR system 7000 to present the virtual object 5008 and, while the virtual object 5008 is presented by the AR system 7000, the user 5002 can provide one or more hand gestures via the wrist-wearable device 6000 to interact and/or manipulate the virtual object 5008.

FIG. 11B shows the user 5002 wearing the wrist-wearable device 6000 and the AR system 7000 and holding the HIPD 8000. In the AR system 5000b, the wrist-wearable device 6000, the AR system 7000, and/or the HIPD 8000 are used to receive and/or provide one or more messages to a contact of the user 5002. In particular, the wrist-wearable device 6000, the AR system 7000, and/or the HIPD 8000 detect and coordinate one or more user inputs to initiate a messaging application and prepare a response to a received message via the messaging application.

In some embodiments, the user 5002 initiates, via a user input, an application on the wrist-wearable device 6000, the AR system 7000, and/or the HIPD 8000 that causes the application to initiate on at least one device. For example, in the AR system 5000b the user 5002 performs a hand gesture associated with a command for initiating a messaging application (represented by messaging user interface 5012); the wrist-wearable device 6000 detects the hand gesture; and, based on a determination that the user 5002 is wearing AR system 7000, causes the AR system 7000 to present a messaging user interface 5012 of the messaging application. The AR system 7000 can present the messaging user interface 5012 to the user 5002 via its display (e.g., as shown by user 5002's field of view 5010). In some embodiments, the application is initiated and ran on the device (e.g., the wrist-wearable device 6000, the AR system 7000, and/or the HIPD 8000) that detects the user input to initiate the application, and the device provides another device operational data to cause the presentation of the messaging application. For example, the wrist-wearable device 6000 can detect the user input to initiate a messaging application; initiate and run the messaging application; and provide operational data to the AR system 7000 and/or the HIPD 8000 to cause presentation of the messaging application. Alternatively, the application can be initiated and ran at a device other than the device that detected the user input. For example, the wrist-wearable device 6000 can detect the hand gesture associated with initiating the messaging application and cause the HIPD 8000 to run the messaging application and coordinate the presentation of the messaging application.

Further, the user 5002 can provide a user input provided at the wrist-wearable device 6000, the AR system 7000, and/or the HIPD 8000 to continue and/or complete an operation initiated are at another device. For example, after initiating the messaging application via the wrist-wearable device 6000 and while the AR system 7000 present the messaging user interface 5012, the user 5002 can provide an input at the HIPD 8000 to prepare a response (e.g., shown by the swipe gesture performed on the HIPD 8000). The user 5002's gestures performed on the HIPD 8000 can be provided and/or displayed on another device. For example, the user 5002's swipe gestured performed on the HIPD 8000 are displayed on a virtual keyboard of the messaging user interface 5012 displayed by the AR system 7000.

In some embodiments, the wrist-wearable device 6000, the AR system 7000, the HIPD 8000, and/or other communicatively couple device presents one or more notifications to the user 5002. The notification can be an indication of a new message, an incoming call, an application update, or a status update. The user 5002 can select the notification via the wrist-wearable device 6000, the AR system 7000, the HIPD 8000, and cause presentation of an application or operation associated with the notification on at least one device. For example, the user 5002 can receive a notification that a message was received at the wrist-wearable device 6000, the AR system 7000, the HIPD 8000, and/or other communicatively couple device and provide a user input at the wrist-wearable device 6000, the AR system 7000, and/or the HIPD 8000 to review the notification, and the device detecting the user input can cause an application associated with the notification to be initiated and/or presented at the wrist-wearable device 6000, the AR system 7000, and/or the HIPD 8000.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, and financial applications. For example, the AR system 7000 can present to the user 5002 game application data and the HIPD 8000 can use a controller to provide inputs to the game. Similarly, the user 5002 can use the wrist-wearable device 6000 to initiate a camera of the AR system 7000, and the user can use the wrist-wearable device 6000, the AR system 7000, and/or the HIPD 8000 to manipulate the image capture (e.g., zoom in or out, apply filters, etc.) and capture image data.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform one or more functions. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

As described herein, a processor (e.g., a central processing unit (CPU)), is an electronic component that is responsible for executing instructions and controlling the operation of an electronic device (e.g., a computer). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing, and/ or can be customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, memory refers to electronic components in a computer or electronic device that store data and instructions for the processor to access and manipulate. Examples of memory can include: (i) random access memory (RAM) configured to store data and instructions temporarily; (ii) read-only memory (ROM) configured to store data and instructions permanently (e.g., one or more portions of system firmware, and/or boot loaders); (iii) flash memory, which can be configured to store data in electronic devices (e.g., USB drives, memory cards, and/or solid-state drives (SSDs); and (iv) cache memory configured to temporarily store frequently accessed data and instructions. Memory, as described herein, can include structured data (e.g., SQL databases, MongoDB databases, GraphQL data, and/or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, controllers are electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) which may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs.

As described herein, a power system of an electronic device is configured to convert incoming electrical power into a form that can be used to operate the device. A power system can include various components, including: (i) a power source, which can be an alternating current (AC) adapter or a direct current (DC) adapter power supply; (ii) a charger input, and can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals, and can provide a means for input and output of data and signals. Examples of peripheral interfaces can include: (i) universal serial bus (USB) and/or micro-USB interfaces configured for connecting devices to an electronic device; (ii) Bluetooth interfaces configured to allow devices to communicate with each other, including Bluetooth low energy (BLE); (iii) near field communication (NFC) interfaces configured to be short-range wireless interface for operations such as access control; (iv) POGO pins, which may be small, spring-loaded pins configured to provide a charging interface; (v) wireless charging interfaces; (vi) GPS interfaces; (vii) Wi-Fi interfaces for providing a connection between a device and a wireless network; (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can includer: (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface); light sensors (e.g., time-of-flight sensors, infrared light sensors, visible light sensors, etc.); . . . . As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and to diagnose neuromuscular disorders; (iv) electrooculography (EOG) sensors configure to measure the electrical activity of eye muscles to detect eye movement and diagnose eye disorders.

As described herein, an application stored in memory of an electronic device (e.g., software) includes instructions stored in the memory. Examples of such applications include: (i) games; (ii) word processors; messaging applications; media-streaming applications; financial applications; calendars; clocks; communication interface modules for enabling wired and/or wireless connections between different respective electronic devices (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocols);

As described herein, a communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs) and/or protocols like HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example Wrist-Wearable Devices

Figure 12A:
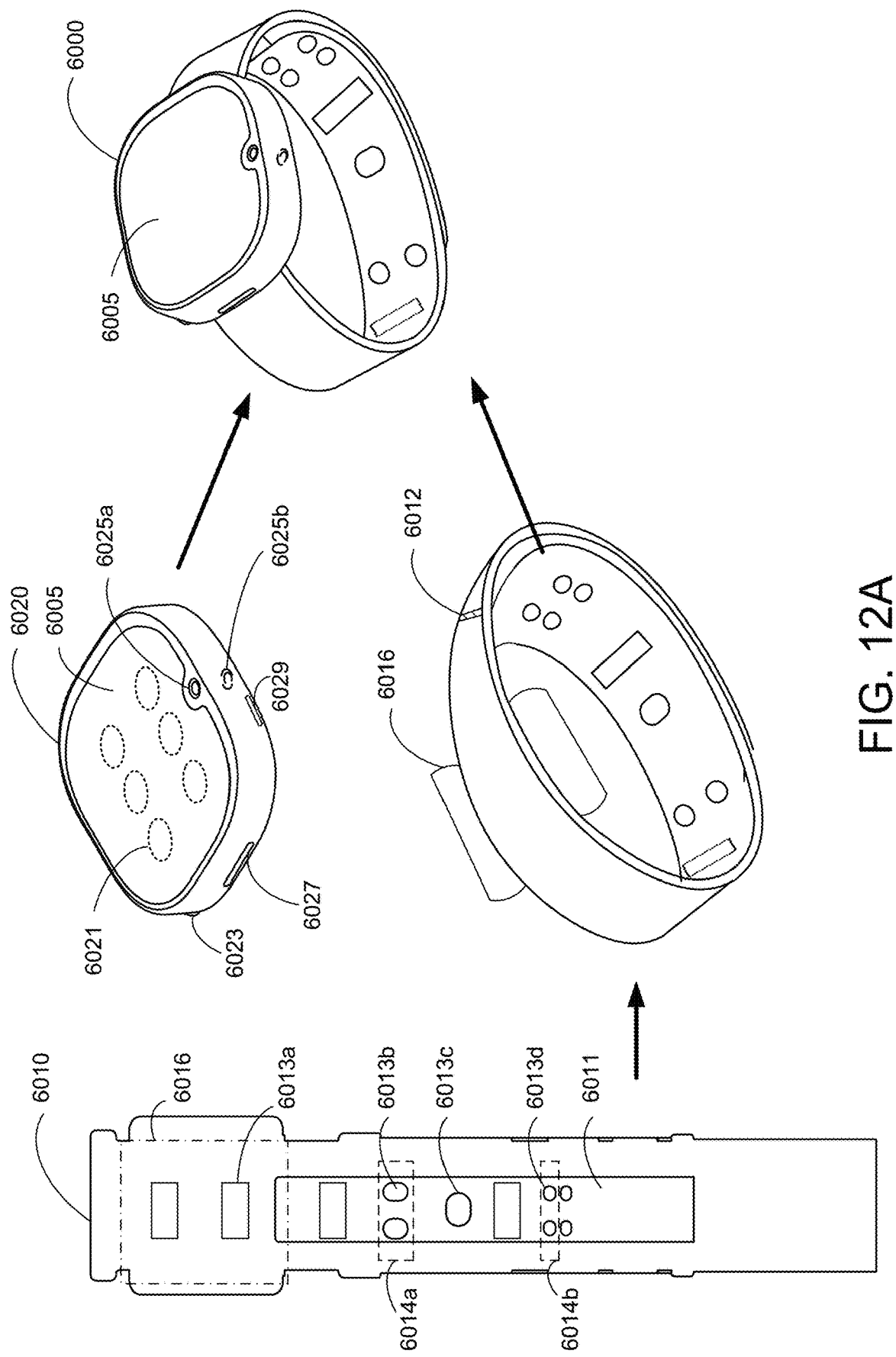
FIGS. 12A-12B illustrate an example wrist-wearable device in accordance with some embodiments.
Figure 12B:
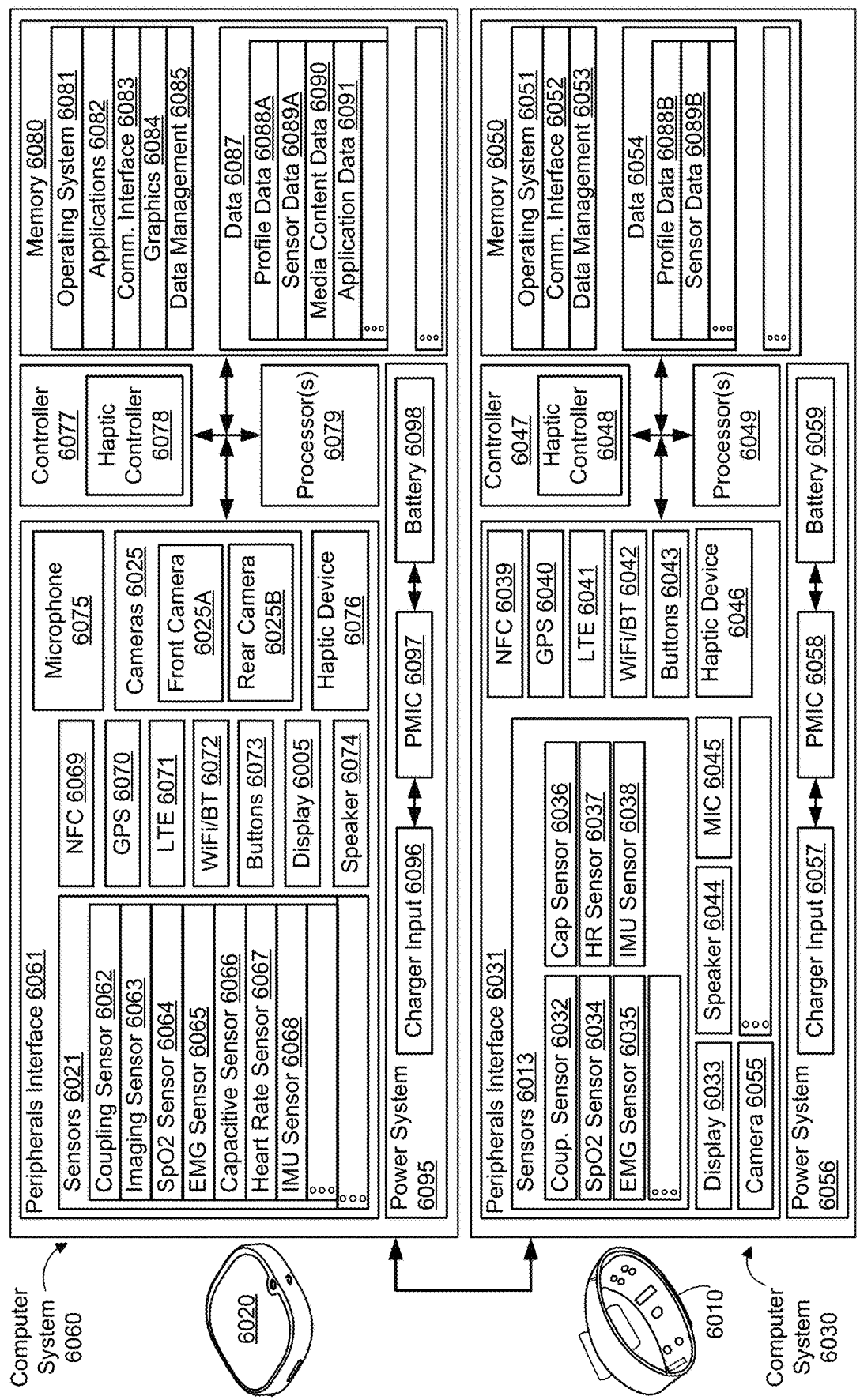

FIGS. 12A and 12B illustrate the wrist-wearable device 6000 in accordance with some embodiments. FIG. 12A illustrates components of the wrist-wearable device 6000, which can be used individually or in combination, including combinations that include other electronic devices and/or electronic components.

FIG. 12A shows a wearable band 6010 and a watch body 6020 (or capsule) being coupled, as discussed below, to form the wrist-wearable device 6000. The wrist-wearable device 6000 can perform various functions and/or operations associated with navigating through user interfaces and selectively opening applications, as well as the functions and/or operations described above with reference to FIGS. 1A-6.

As will be described in more detail below, operations executed by the wrist-wearable device 6000 can include: (i) presenting content to a user (e.g., displaying visual content via a display 6005); (ii) detecting (e.g., sensing) user input (e.g., sensing a touch on peripheral button 6023 and/or at a touch screen of the display 6005, a hand gesture detected by sensors (e.g., biopotential sensors); (iii) sensing biometric data via one or more sensors 6013 (e.g., neuromuscular signals, heart rate, temperature, and/or sleep); messaging (e.g., text, speech, and/or video); image capture via one or more imaging devices or cameras 6025; wireless communications (e.g., cellular, near field, Wi-Fi, and/or personal area network); location determination; financial transactions; providing haptic feedback; alarms; notifications; biometric authentication; health monitoring; sleep monitoring; etc.

The above-example functions can be executed independently in the watch body 6020, independently in the wearable band 6010, and/or via an electronic communication between the watch body 6020 and the wearable band 6010. In some embodiments, functions can be executed on the wrist-wearable device 6000 while an AR environment is being presented (e.g., via one of the AR systems 5000a to 5000d). As the skilled artisan will appreciate upon reading the descriptions provided herein, the novel wearable devices described herein can be used with other types of AR environments.

The wearable band 6010 can be configured to be worn by a user such that an inner surface of the wearable band 6010 is in contact with the user's skin. When worn by a user, sensors 6013 contact the user's skin. The sensors 6013 can sense biometric data such as a user's heart rate, saturated oxygen level, temperature, sweat level, neuromuscular signal sensors, or a combination thereof. The sensors 6013 can also sense data about a user's environment including a user's motion, altitude, location, orientation, gait, acceleration, position, or a combination thereof. In some embodiment, the sensors 6013 are configured to track a position and/or motion of the wearable band 6010. The one or more sensors 6013 can include any of the sensors defined above and/or discussed below with respect to FIG. 12B.

The one or more sensors 6013 can be distributed on an inside and/or an outside surface of the wearable band 6010. In some embodiments, the one or more sensors 6013 are uniformly spaced along the wearable band 6010. Alternatively, in some embodiments, the one or more sensors 6013 are positioned at distinct points along the wearable band 6010. As shown in FIG. 12A, the one or more sensors 6013 can be the same or distinct. For example, in some embodiments, the one or more sensors 6013 can be shaped as a pill (e.g., sensor 6013a), an oval, a circle a square, an oblong (e.g., sensor 6013c) and/or any other shape that maintains contact with the user's skin (e.g., such that neuromuscular signal and/or other biometric data can be accurately measured at the user's skin). In some embodiments, the one or more sensors 6013 are aligned to form pairs of sensors (e.g., for sensing neuromuscular signals based on differential sensing within each respective sensor). For example, sensor 6013b is aligned with an adjacent sensor to form sensor pair 6014a and sensor 6013d aligned with an adjacent sensor to form sensor pair 6014b. In some embodiments, the wearable band 6010 does not have a sensor pair. Alternatively, in some embodiments, the wearable band 6010 has a predetermined number of sensor pairs (e.g., one pair of sensors, three pairs of sensors, four pairs of sensors, six pairs of sensors, or sixteen pairs of sensors).

The wearable band 6010 can include any suitable number of sensors 6013. In some embodiments, the number and arrangement of sensors 6013 depends on the particular application for which the wearable band 6010 is used. For instance, a wearable band 6010 configured as an armband, wristband, or chest-band may include a plurality of sensors 6013 with different number of sensors 6013 and different arrangement for each use case, such as medical use cases as compared to gaming or general day-to-day use cases.

In accordance with some embodiments, the wearable band 6010 further includes an electrical ground electrode and a shielding electrode. The electrical ground and shielding electrodes, like the sensors 6013, can be distributed on the inside surface of the wearable band 6010 such that they contact a portion of the user's skin. For example, the electrical ground and shielding electrodes can be at an inside surface of coupling mechanism 6016 or an inside surface of a wearable structure 6011. The electrical ground and shielding electrodes can be formed and/or use the same components as the sensors 6013. In some embodiments, the wearable band 6010 includes more than one electrical ground electrode and more than one shielding electrode.

The sensors 6013 can be formed as part of the wearable structure 6011 of the wearable band 6010. In some embodiments, the sensors 6013 are flush or substantially flush with the wearable structure 6011 such that they do not extend beyond the surface of the wearable structure 6011. While flush with the wearable structure 6011, the sensors 6013 are still configured to contact the user's skin (e.g., via a skin-contacting surface). Alternatively, in some embodiments, the sensors 6013 extend beyond the wearable structure 6011 a predetermined distance (e.g., 0.1-2 mm) to make contact and depress into the user's skin. In some embodiment, the sensors 6013 are coupled to an actuator (not shown) configured to adjust an extension height (e.g., a distance from the surface of the wearable structure 6011) of the sensors 6013 such that the sensors 6013 make contact and depress into the user's skin. In some embodiments, the actuators adjust the extension height between 0.01 mm-1.2 mm. This allows the user to customize the positioning of the sensors 6013 to improve the overall comfort of the wearable band 6010 when worn while still allowing the sensors 6013 to contact the user's skin. In some embodiments, the sensors 6013 are indistinguishable from the wearable structure 6011 when worn by the user.

The wearable structure 6011 can be formed of an elastic material, elastomers, etc. configured to be stretched and fitted to be worn by the user. In some embodiments, the wearable structure 6011 is a textile or woven fabric. As described above, the sensors 6013 can be formed as part of a wearable structure 6011. For example, the sensors 6013 can be molded into the wearable structure 6011 or be integrated into a woven fabric (e.g., the sensors 6013 can be sewn into the fabric and mimic the pliability of fabric (e.g., the sensors 6013 can be constructed from a series woven strands of fabric)).

The wearable structure 6011 can include flexible electronic connectors that interconnect the sensors 6013, the electronic circuitry, and/or other electronic components (described below in reference to FIG. 12B) that are enclosed in the wearable band 6010. In some embodiments, the flexible electronic connectors are configured to interconnect the sensors 6013, the electronic circuitry, and/or other electronic components of the wearable band 6010 with respective sensors and/or other electronic components of another electronic device (e.g., watch body 6020). The flexible electronic connectors are configured to move with the wearable structure 6011 such that the user adjustment to the wearable structure 6011 (e.g., resizing, pulling, and/or folding) does not stress or strain the electrical coupling of components of the wearable band 6010.

As described above, the wearable band 6010 is configured to be worn by a user. In particular, the wearable band 6010 can be shaped or otherwise manipulated to be worn by a user. For example, the wearable band 6010 can be shaped to have a substantially circular shape such that it can be configured to be worn on the user's lower arm or wrist. Alternatively, the wearable band 6010 can be shaped to be worn on another body part of the user, such as the user's upper arm (e.g., around a bicep), forearm, chest, or legs. The wearable band 6010 can include a retaining mechanism 6012 (e.g., a buckle or a hook and loop fastener) for securing the wearable band 6010 to the user's wrist or other body part. While the wearable band 6010 is worn by the user, the sensors 6013 sense data (referred to as sensor data) from the user's skin. In particular, the sensors 6013 of the wearable band 6010 obtain (e.g., sense and record) neuromuscular signals.

The sensed data (e.g., sensed neuromuscular signals) can be used to detect and/or determine the user's intention to perform certain motor actions. In particular, the sensors 6013 sense and record neuromuscular signals from the user as the user performs muscular activations (e.g., movements and/or gestures). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 6005 of the wrist-wearable device 6000 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 6013 can be used to provide a user with an enhanced interaction with a physical object (e.g., devices communicatively coupled with the wearable band 6010) and/or a virtual object in an artificial-reality application generated by an artificial-reality system (e.g., user interface objects presented on the display 6005, or another computing device (e.g., a smartphone)).

In some embodiments, the wearable band 6010 includes one or more haptic devices 6046 (FIG. 12B, e.g., a vibratory haptic actuator) that are configured to provide haptic feedback (e.g., a cutaneous and/or kinesthetic sensation) to the user's skin. The sensors 6013, and/or the haptic devices 6046 can be configured to operate in conjunction with multiple applications including, without limitation, health monitoring, social media, games, and artificial reality (e.g., the applications associated with artificial reality).

The wearable band 6010 can also include coupling mechanism 6016 (e.g., a cradle or a shape of the coupling mechanism can correspond to shape of the watch body 6020 of the wrist-wearable device 6000) for detachably coupling a capsule (e.g., a computing unit) or watch body 6020 (via a coupling surface of the watch body 6020) to the wearable band 6010. In particular, the coupling mechanism 6016 can be configured to receive a coupling surface proximate to the bottom side of the watch body 6020 (e.g., a side opposite to a front side of the watch body 6020 where the display 6005 is located), such that a user can push the watch body 6020 downward into the coupling mechanism 6016 to attach the watch body 6020 to the coupling mechanism 6016. In some embodiments, the coupling mechanism 6016 can be configured to receive a top side of the watch body 6020 (e.g., a side proximate to the front side of the watch body 6020 where the display 6005 is located) that is pushed upward into the cradle, as opposed to being pushed downward into the coupling mechanism 6016. In some embodiments, the coupling mechanism 6016 is an integrated component of the wearable band 6010 such that the wearable band 6010 and the coupling mechanism 6016 are a single unitary structure. In some embodiments, the coupling mechanism 6016 is a type of frame or shell that allows the watch body 6020 coupling surface to be retained within or on the wearable band 6010 coupling mechanism 6016 (e.g., a cradle, a tracker band, a support base, or a clasp).

The coupling mechanism 6016 can allow for the watch body 6020 to be detachably coupled to the wearable band 6010 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 6020 to the wearable band 6010 and to decouple the watch body 6020 from the wearable band 6010. For example, a user can twist, slide, turn, push, pull, or rotate the watch body 6020 relative to the wearable band 6010, or a combination thereof, to attach the watch body 6020 to the wearable band 6010 and to detach the watch body 6020 from the wearable band 6010. Alternatively, as discussed below, in some embodiments, the watch body 6020 can be decoupled from the wearable band 6010 by actuation of the release mechanism 6029.

The wearable band 6010 can be coupled with a watch body 6020 to increase the functionality of the wearable band 6010 (e.g., converting the wearable band 6010 into a wrist-wearable device 6000, adding an additional computing unit and/or battery to increase computational resources and/or a battery life of the wearable band 6010, adding additional sensors to improve sensed data, etc.). As described above, the wearable band 6010 (and the coupling mechanism 6016) is configured to operate independently (e.g., execute functions independently) from watch body 6020. For example, the coupling mechanism 6016 can include one or more sensors 6013 that contact a user's skin when the wearable band 6010 is worn by the user and provide sensor data for determining control commands.

A user can detach the watch body 6020 (or capsule) from the wearable band 6010 in order to reduce the encumbrance of the wrist-wearable device 6000 to the user. For embodiments in which the watch body 6020 is removable, the watch body 6020 can be referred to as a removable structure, such that in these embodiments the wrist-wearable device 6000 includes a wearable portion (e.g., the wearable band 6010) and a removable structure (the watch body 6020).

Turning to the watch body 6020, the watch body 6020 can have a substantially rectangular or circular shape. The watch body 6020 is configured to be worn by the user on their wrist or on another body part. More specifically, the watch body 6020 is sized to be easily carried by the user, attached on a portion of the user's clothing, and/or coupled to the wearable band 6010 (forming the wrist-wearable device 6000). As described above, the watch body 6020 can have a shape corresponding to the coupling mechanism 6016 of the wearable band 6010. In some embodiments, the watch body 6020 includes a single release mechanism 6029 or multiple release mechanisms (e.g., two release mechanisms 6029 positioned on opposing sides of the watch body 6020, such as spring-loaded buttons) for decoupling the watch body 6020 and the wearable band 6010. The release mechanism 6029 can include, without limitation, a button, a knob, a plunger, a handle, a lever, a fastener, a clasp, a dial, a latch, or a combination thereof.

A user can actuate the release mechanism 6029 by pushing, turning, lifting, depressing, shifting, or performing other actions on the release mechanism 6029. Actuation of the release mechanism 6029 can release (e.g., decouple) the watch body 6020 from the coupling mechanism 6016 of the wearable band 6010, allowing the user to use the watch body 6020 independently from wearable band 6010, and vice versa. For example, decoupling the watch body 6020 from the wearable band 6010 can allow the user to capture images using rear-facing camera 6025B. Although the is shown positioned at a corner of watch body 6020, the release mechanism 6029 can be positioned anywhere on watch body 6020 that is convenient for the user to actuate. In addition, in some embodiments, the wearable band 6010 can also include a respective release mechanism for decoupling the watch body 6020 from the coupling mechanism 6016. In some embodiments, the release mechanism 6029 is optional and the watch body 6020 can be decoupled from the coupling mechanism 6016 as described above (e.g., via twisting or rotating).

The watch body 6020 can include one or more peripheral buttons 6023 and 6027 for performing various operations at the watch body 6020. For example, the peripheral buttons 6023 and 6027 can be used to turn on or wake (e.g., transition from a sleep state to an active state) the display 6005, unlock the watch body 6020, increase or decrease a volume, increase or decrease a brightness, interact with one or more applications, and/or interact with one or more user interfaces. Additionally, or alternatively, in some embodiments, the display 6005 operates as a touch screen and allows the user to provide one or more inputs for interacting with the watch body 6020.

In some embodiments, the watch body 6020 includes one or more sensors 6021. The sensors 6021 of the watch body 6020 can be the same or distinct from the sensors 6013 of the wearable band 6010. The sensors 6021 of the watch body 6020 can be distributed on an inside and/or an outside surface of the watch body 6020. In some embodiments, the sensors 6021 are configured to contact a user's skin when the watch body 6020 is worn by the user. For example, the sensors 6021 can be placed on the bottom side of the watch body 6020 and the coupling mechanism 6016 can be a cradle with an opening that allows the bottom side of the watch body 6020 to directly contact the user's skin. Alternatively, in some embodiments, the watch body 6020 does not include sensors that are configured to contact the user's skin (e.g., including sensors internal and/or external to the watch body 6020 that configured to sense data of the watch body 6020 and the watch body 6020's surrounding environment). In some embodiment, the sensors 6013 are configured to track a position and/or motion of the watch body 6020.

The watch body 6020 and the wearable band 6010 can share data using a wired communication method (e.g., a Universal Asynchronous Receiver/Transmitter (UART) or a USB transceiver) and/or a wireless communication method (e.g., near field communication or Bluetooth). For example, the watch body 6020 and the wearable band 6010 can share data sensed by the sensors 6013 and 6021, as well as application and device specific information (e.g., active and/or available applications, output devices (e.g., display and/or speakers), input devices (e.g., touch screen, microphone, and/or imaging sensors).

In some embodiments, the watch body 6020 can include, without limitation, a front-facing camera 6025A and/or a rear-facing camera 6025B, sensors 6021 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 6063; FIG. 12B), a touch sensor, a sweat sensor, etc.). In some embodiments, the watch body 6020 can include one or more haptic devices 6076 (FIG. 12B; a vibratory haptic actuator) that is configured to provide haptic feedback (e.g., a cutaneous and/or kinesthetic sensation) to the user. The sensors 6021 and/or the haptic device 6076 can also be configured to operate in conjunction with multiple applications including, without limitation, health monitoring applications, social media applications, game applications, and artificial reality applications (e.g., the applications associated with artificial reality).

As described above, the watch body 6020 and the wearable band 6010, when coupled, can form the wrist-wearable device 6000. When coupled, the watch body 6020 and wearable band 6010 operate as a single device to execute functions (operations, detections, and/or communications) described herein. In some embodiments, each device is provided with particular instructions for performing the one or more operations of the wrist-wearable device 6000. For example, in accordance with a determination that the watch body 6020 does not include neuromuscular signal sensors, the wearable band 6010 can include alternative instructions for performing associated instructions (e.g., providing sensed neuromuscular signal data to the watch body 6020 via a different electronic device). Operations of the wrist-wearable device 6000 can be performed by the watch body 6020 alone or in conjunction with the wearable band 6010 (e.g., via respective processors and/or hardware components) and vice versa. In some embodiments, operations of the wrist-wearable device 6000, the watch body 6020, and/or the wearable band 6010 can be performed in conjunction with one or more processors and/or hardware components of another communicatively coupled device (e.g., the HIPD 8000; FIGS. 14A-14B).

As described below with reference to the block diagram of FIG. 12B, the wearable band 6010 and/or the watch body 6020 can each include independent resources required to independently execute functions. For example, the wearable band 6010 and/or the watch body 6020 can each include a power source (e.g., a battery), a memory, data storage, a processor (e.g., a central processing unit (CPU)), communications, a light source, and/or input/output devices.

FIG. 12B shows block diagrams of a computing system 6030 corresponding to the wearable band 6010, and a computing system 6060 corresponding to the watch body 6020, according to some embodiments. A computing system of the wrist-wearable device 6000 includes a combination of components of the wearable band computing system 6030 and the watch body computing system 6060, in accordance with some embodiments.

The watch body 6020 and/or the wearable band 6010 can include one or more components shown in watch body computing system 6060. In some embodiments, a single integrated circuit includes all or a substantial portion of the components of the watch body computing system 6060 are included in a single integrated circuit. Alternatively, in some embodiments, components of the watch body computing system 6060 are included in a plurality of integrated circuits that are communicatively coupled. In some embodiments, the watch body computing system 6060 is configured to couple (e.g., via a wired or wireless connection) with the wearable band computing system 6030, which allows the computing systems to share components, distribute tasks, and/or perform other operations described herein (individually or as a single device).

The watch body computing system 6060 can include one or more processors 6079, a controller 6077, a peripherals interface 6061, a power system 6095, and memory (e.g., a memory 6080), each of which are defined above and described in more detail below.

The power system 6095 can include a charger input 6057, a power-management integrated circuit (PMIC) 6097, and a battery 6096, each are which are defined above. In some embodiments, a watch body 6020 and a wearable band 6010 can have respective batteries (e.g., battery 6098 and 6059), and can share power with each other. The watch body 6020 and the wearable band 6010 can receive a charge using a variety of techniques. In some embodiments, the watch body 6020 and the wearable band 6010 can use a wired charging assembly (e.g., power cords) to receive the charge. Alternatively, or in addition, the watch body 6020 and/or the wearable band 6010 can be configured for wireless charging. For example, a portable charging device can be designed to mate with a portion of watch body 6020 and/or wearable band 6010 and wirelessly deliver usable power to a battery of watch body 6020 and/or wearable band 6010. The watch body 6020 and the wearable band 6010 can have independent power systems (e.g., power system 6095 and 6056) to enable each to operate independently. The watch body 6020 and wearable band 6010 can also share power (e.g., one can charge the other) via respective PMICs (e.g., PMICs 6097 and 6058) that can share power over power and ground conductors and/or over wireless charging antennas.

In some embodiments, the peripherals interface 6061 can include one or more sensors 6021, many of which listed below are defined above. The sensors 6021 can include one or more coupling sensor 6062 for detecting when the watch body 6020 is coupled with another electronic device (e.g., a wearable band 6010). The sensors 6021 can include imaging sensors 6063 (one or more of the cameras 6025, and/or separate imaging sensors 6063 (e.g., thermal-imaging sensors)). In some embodiments, the sensors 6021 include one or more SpO2 sensors 6064. In some embodiments, the sensors 6021 include one or more biopotential-signal sensors (e.g., EMG sensors 6065 and 6035, which may be disposed on a user-facing portion of the watch body 6020 and/or the wearable band 6010). In some embodiments, the sensors 6021 include one or more capacitive sensors 6066. In some embodiments, the sensors 6021 include one or more heart rate sensors 6067. In some embodiments, the sensors 6021 include one or more IMU sensors 6068. In some embodiments, one or more IMU sensors 6068 can be configured to detect movement of a user's hand or other location that the watch body 6020 is placed or held).

In some embodiments, the peripherals interface 6061 includes a near-field communication (NFC) component 6069, a global-position system (GPS) component 6070, a long-term evolution (LTE) component 6071, and/or a Wi-Fi and/or Bluetooth communication component 6072. In some embodiments, the peripherals interface 6061 includes one or more buttons 6073 (e.g., the peripheral buttons 6023 and 6027 in FIG. 12A), which, when selected by a user, cause operation to be performed at the watch body 6020. In some embodiments, the peripherals interface 6061 includes one or more indicators, such as a light emitting diode (LED), to provide a user with visual indicators (e.g., message received, low battery, active microphone and/or camera).

The watch body 6020 can include at least one display 6005, for displaying visual representations of information or data to the user, including user-interface elements and/or three-dimensional virtual objects. The display can also include a touch screen for inputting user inputs, such as touch gestures, swipe gestures, and the like. The watch body 6020 can include at least one speaker 6074 and at least one microphone 6075 for providing audio signals to the user and receiving audio input from the user. The user can provide user inputs through the microphone 6075 and can also receive audio output from the speaker 6074 as part of a haptic event provided by the haptic controller 6078. The watch body 6020 can include at least one camera 6025, including a front camera 6025A and a rear camera 6025B.

The cameras 6025 can include ultra-wide-angle cameras, wide angle cameras, fish-eye cameras, spherical cameras, telephoto cameras, a depth-sensing cameras, or other types of cameras.

The watch body computing system 6060 can include one or more haptic controllers 6077 and associated componentry (e.g., haptic devices 6076) for providing haptic events at the watch body 6020 (e.g., a vibrating sensation or audio output in response to an event at the watch body 6020). The haptic controllers 6078 can communicate with one or more haptic devices 6076, such as electroacoustic devices, including a speaker of the one or more speakers 6074 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 6078 can provide haptic events to that are capable of being sensed by a user of the watch body 6020. In some embodiments, the one or more haptic controllers 6078 can receive input signals from an application of the applications 6082.

In some embodiments, the computing system 6030 and/or the computing system 6060 can include memory 6080, which can be controlled by a memory controller of the one or more controllers 6077. In some embodiments, software components stored in the memory 6080 include one or more applications 6082 configured to perform operations at the watch body 6020. In some embodiments, the one or more applications 6082 include games, word processors, messaging applications, calling applications, web browsers, social media applications, media streaming applications, financial applications, calendars, and/or clocks. In some embodiments, software components stored in the memory 6080 include one or more communication interface modules 6083 as defined above. In some embodiments, software components stored in the memory 6080 include one or more graphics modules 6084 for rendering, encoding, and/or decoding audio and/or visual data; and one or more data management modules 6085 for collecting, organizing, and/or providing access to the data 6087 stored in memory 6080. In some embodiments, one or more of applications 6082 and/or one or more modules can work in conjunction with one another to perform various tasks at the watch body 6020.

In some embodiments, software components stored in the memory 6080 can include one or more operating systems 6081 (e.g., a Linux-based operating system or an Android operating system). The memory 6080 can also include data 6087. The data 6087 can include profile data 6088A, sensor data 6089A, media content data 6090, and application data 6091.

It should be appreciated that the watch body computing system 6060 is an example of a computing system within the watch body 6020, and that the watch body 6020 can have more or fewer components than shown in the watch body computing system 6060, combine two or more components, and/or have a different configuration and/or arrangement of the components. The various components shown in watch body computing system 6060 are implemented in hardware, software, firmware, or a combination thereof, including one or more signal processing and/or application-specific integrated circuits.

Turning to the wearable band computing system 6030, one or more components that can be included in the wearable band 6010 are shown. The wearable band computing system 6030 can include more or fewer components than shown in the watch body computing system 6060, combine two or more components, and/or have a different configuration and/or arrangement of some or all of the components. In some embodiments, all, or a substantial portion of the components of the wearable band computing system 6030 are included in a single integrated circuit. Alternatively, in some embodiments, components of the wearable band computing system 6030 are included in a plurality of integrated circuits that are communicatively coupled. As described above, in some embodiments, the wearable band computing system 6030 is configured to couple (e.g., via a wired or wireless connection) with the watch body computing system 6060, which allows the computing systems to share components, distribute tasks, and/or perform other operations described herein (individually or as a single device).

The wearable band computing system 6030, similar to the watch body computing system 6060, can include one or more processors 6049, one or more controllers 6047 (including one or more haptics controller 6048), a peripherals interface 6031 that can includes one or more sensors 6013 and other peripheral devices, power source (e.g., a power system 6056), and memory (e.g., a memory 6050) that includes an operating system (e.g., an operating system 6051), data (e.g., data 6054 including profile data 6088B and/or sensor data 6089B), and one or more modules (e.g., a communications interface module 6052 and/or a data management module 6053).

The one or more sensors 6013 can be analogous to sensors 6021 of the computing system 6060 and in light of the definitions above. For example, sensors 6013 can include one or more coupling sensors 6032, one or more SpO2 sensor 6034, one or more EMG sensors 6035, one or more capacitive sensor 6036, one or more heart rate sensor 6037, and one or more IMU sensor 6038.

The peripherals interface 6031 can also include other components analogous to those included in the peripheral interface 6061 of the computing system 6060, including an NFC component 6039, a GPS component 6040, an LTE component 6041, a Wi-Fi and/or Bluetooth communication component 6042, and/or one or more haptic devices 6076 as described above in reference to peripherals interface 6061. In some embodiments, the peripherals interface 6061 includes one or more buttons 6043, a display 6033, a speaker 6044, a microphone 6045, and a camera 6055. In some embodiments, the peripherals interface 6061 includes one or more indicators, such as an LED.

It should be appreciated that the wearable band computing system 6030 is an example of a computing system within the wearable band 6010, and that the wearable band 6010 can have more or fewer components than shown in the wearable band computing system 6030, combine two or more components, and/or have a different configuration and/or arrangement of the components. The various components shown in wearable band computing system 6030 can be implemented in one or a combination of hardware, software, firmware, including one or more signal processing and/or application-specific integrated circuits.

The wrist-wearable device 6000 with respect to FIG. 12A is an example of the wearable band 6010 and the watch body 6020 coupled, so the wrist-wearable device 6000 will be understood to include the components shown and described for the wearable band computing system 6030 and the watch body computing system 6060. In some embodiments, wrist-wearable device 6000 has a split architecture (e.g., a split mechanical architecture, a split electrical architecture) between the watch body 6020 and the wearable band 6010. In other words, all of the components shown in the wearable band computing system 6030 and the watch body computing system 6060 can be housed or otherwise disposed in a combined watch device 6000, or within individual components of the watch body 6020, wearable band 6010, and/or portions thereof (e.g., a coupling mechanism 6016 of the wearable band 6010).

The techniques described above can be used with any device for sensing neuromuscular signals, including the arm-wearable devices of FIG. 12A-12B, but could also be used with other types of wearable devices for sensing neuromuscular signals (such as body-wearable or head-wearable devices that might have neuromuscular sensors closer to the brain or spinal column).

In some embodiments, a wrist-wearable device 6000 can be used in conjunction with a head-wearable device described below (e.g., AR system 7000 and VR headset 7010) and/or an HIPD 8000; and the wrist-wearable device 6000 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 6000 can also be used in conjunction with a wearable garment, such as the wearable gloves described below in reference to FIGS. 15A-15C. Having thus described example wrist-wearable device, attention will now be turned to example head-wearable devices, such AR system 7000 and VR headset 7010.

Example Head-Wearable Devices

Figure 13A:
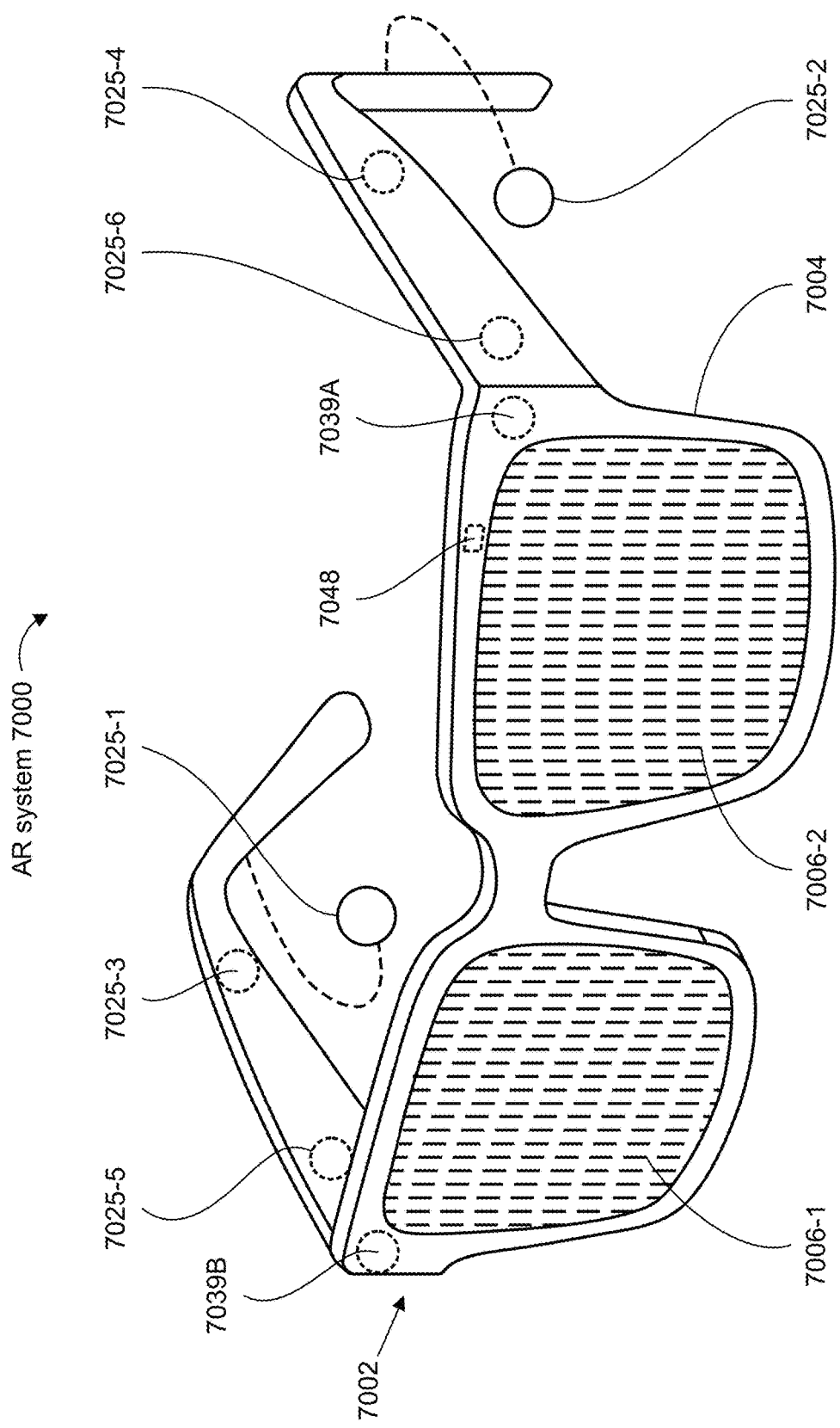
Figures 1, 13B:
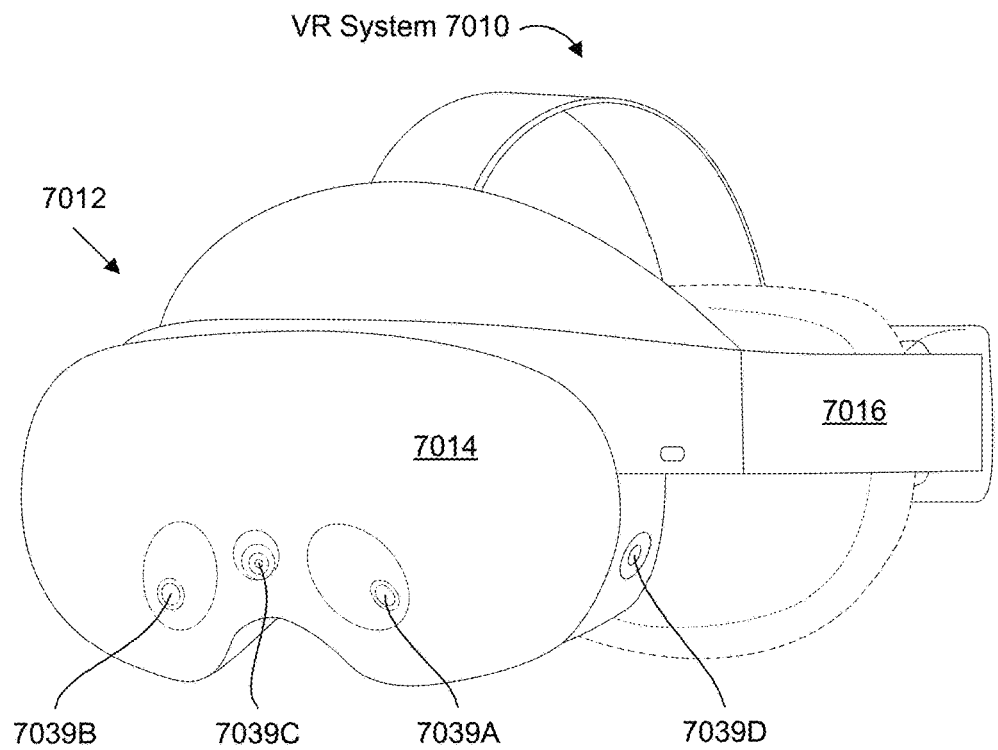
Figures 2, 13B:
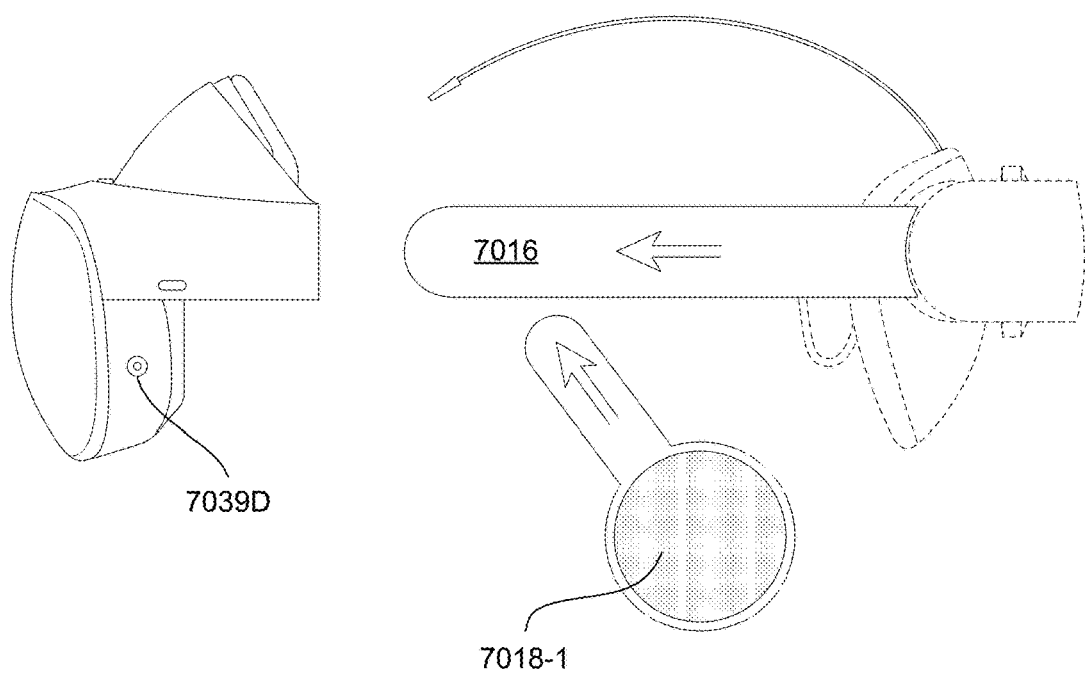
Figure 13C:
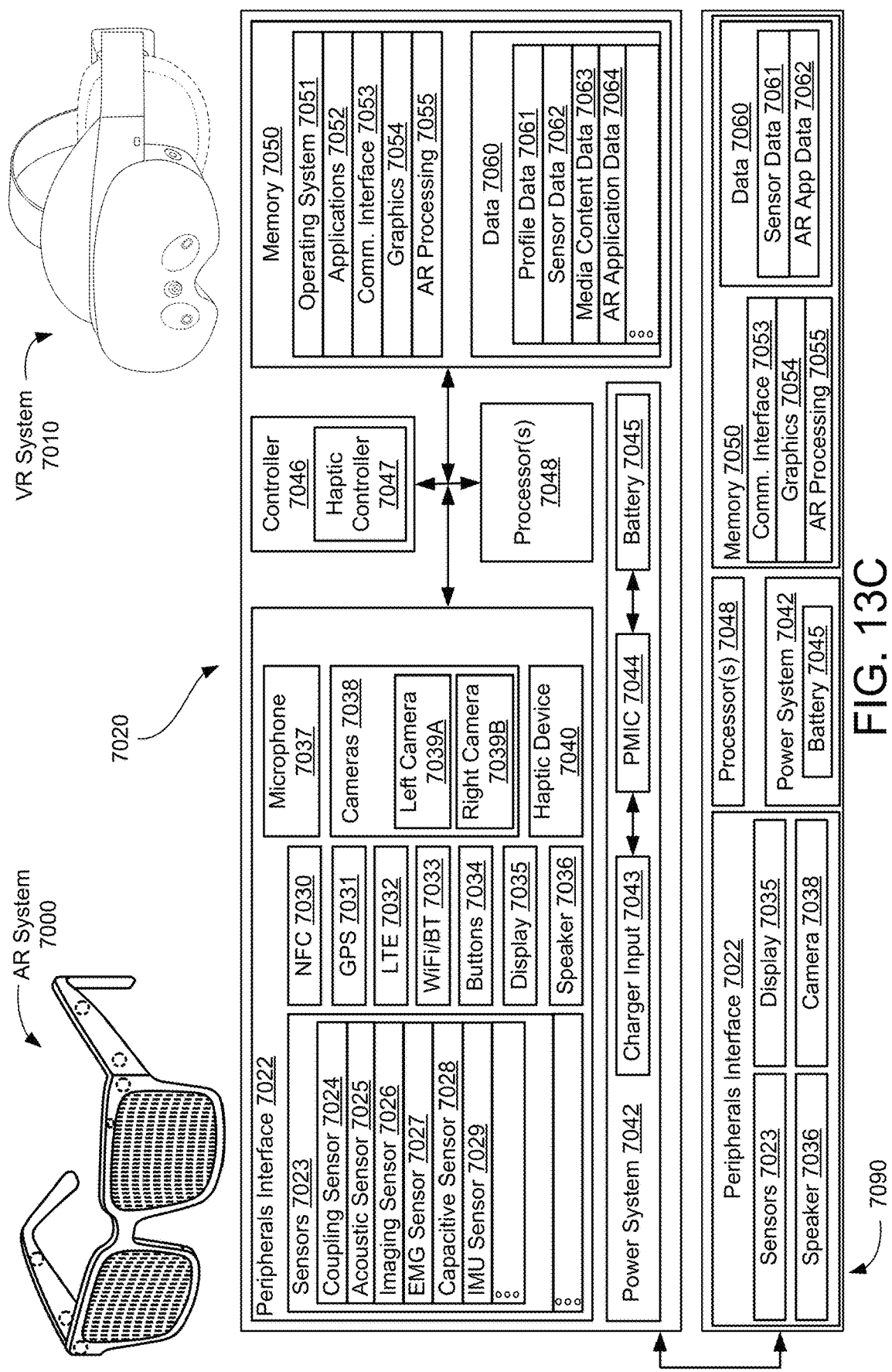

FIGS. 13A to 13C show example artificial-reality systems, including the AR system 7000. In some embodiments, the AR system 7000 is an eyewear device as shown in FIG. 13A. In some embodiments, the VR system 7010 includes a head-mounted display (HMD) 7012, as shown in FIGS. 13B-1 and 13B-2. In some embodiments, the AR system 7000 and the VR system 7010 include one or more analogous components (e.g., components for presenting interactive artificial-reality environments, such as processors, memory, and/or presentation devices, including one or more displays and/or one or more waveguides), some of which are described in more detail with respect to FIG. 13C. As described herein, a head-wearable device can include components of the eyewear device 7002, and/or the head-mounted display 7012. Some embodiments of head-wearable devices do not include any displays, including any of the displays described with respect to the AR system 7000 and/or the VR system 7010. While the example artificial-reality systems are respectively described herein as the AR system 7000 and the VR system 7010, either or both of the example AR systems described herein can be configured to present fully-immersive VR scenes presented in substantially all of a user's field of view, additionally or alternatively to, subtler augmented-reality scenes that are presented within a portion, less than all, of the user's field of view.

FIG. 13A show an example visual depiction of the AR system 7000 (which may also be described herein as augmented-reality glasses, and/or smart glasses). The AR system 7000 can include additional electronic components that are not shown in FIGS. 13A, such as a wearable accessory device and/or an intermediary processing device, in electronic communication or otherwise configured to be used in conjunction with the eyewear device. In some embodiments, the wearable accessory device and/or the intermediary processing device may be configured to couple with the eyewear device via a coupling mechanism in electronic communication with a coupling sensor 7024, where the coupling sensor 7024 can detect when an electronic device becomes physically or electronically coupled with the eyewear device. In some embodiments, the eyewear device is configured to couple to a housing 7090, which may include one or more additional coupling mechanisms configured to couple with additional accessory devices. The components shown in FIG. 13A can be implemented in hardware, software, firmware, or a combination thereof, including one or more signal-processing components and/or application-specific integrated circuits (ASICs).

The eyewear device includes mechanical glasses components, including a frame 7004 configured to hold one or more lenses (e.g., one or both lenses 7006-1 and 7006-2). One of ordinary skill in the art will appreciate that the eyewear device can include additional mechanical components, such as hinges configured to allow portions of the frame 7004 of the eyewear device 7002 to be folded and unfolded, a bridge configured to span the gap between the lenses 7006-1 and 7006-2 and rest on the user's nose, nose pads configured to rest on the bridge of the nose and provide support for the eyewear device, earpieces configured to rest on the user's ears and provide additional support for the eyewear device, temple arms configured to extend from the hinges to the earpieces of the eyewear device, and the like. One of ordinary skill in the art will further appreciate that some examples of the AR system 7000 can include none of the mechanical components described herein. For example, smart contact lenses configured to present artificial reality to users may not include any components of the eyewear device.

The eyewear device includes electronic components, many of which will be described in more detail below with respect to FIG. 13C. Some example electronic components are illustrated in FIG. 13A, including acoustic sensors 7025-1, 7025-2, 7025-3, 7025-4, 7025-5, and 7025-1, which can be distributed along a substantial portion of the frame 7004 of the eyewear device. The eyewear device also includes a left camera 7039A and a right camera 7039B, which are located on different sides of the frame 7004. And the eyewear device includes a processor 7048 (e.g., an integral microprocessor, such as an ASIC) that is embedded into a portion of the frame 7004.

FIGS. 13B-1 and 13B-2 show a VR system 7010 that includes a head-mounted display (HMD) 7012 (e.g., also referred to herein as an artificial-reality headset, a head-wearable device, or a VR headset), in accordance with some embodiments. As noted, some artificial-reality systems may (e.g., the AR system 7000), instead of blending an artificial reality with actual reality, substantially replace one or more of a user's sensory perceptions of the real world with a virtual experience (e.g., the AR systems 5000c and 5000d).

The HMD 7012 includes a front body 7014 and a frame 7016 (e.g., a strap or band) shaped to fit around a user's head. In some embodiments, the front body 7014 and/or the frame 7016 includes one or more electronic elements for facilitating presentation of and/or interactions with an AR and/or VR system (e.g., displays, IMUs, tracking emitter or detectors). In some embodiments, the HMD 7012 includes output audio transducers (e.g., an audio transducer 7018-1), as shown in FIG. 13B-2. In some embodiments, one or more components, such as the output audio transducer(s) 7018-1 and the frame 7016, can be configured to attach and detach (e.g., are detachably attachable) to the HMD 7012 (e.g., a portion or all of the frame 7016, and/or the audio transducer 7018-1), as shown in FIG. 13B-2. In some embodiments, coupling a detachable component to the HMD 7012 causes the detachable component to come into electronic communication with the HMD 7012.

FIG. 13B-1 to 13B-2 also show that the VR system 7010 one or more cameras, such as the left camera 7039A and the right camera 7039B, which can be analogous to the left and right cameras on the frame 7004 of the eyewear device 7002. In some embodiments, the VR system 7010 includes one or more additional cameras (e.g., cameras 7039C and 7039D), which can be configured to augment image data obtained by the cameras 7039A and 7039B by providing more information. For example, the camera 7039C can be used to supply color information that is not discerned by cameras 7039A and 7039B. In some embodiments, one or more of the cameras 7039A to 7039D can include an optional IR cut filter configured to remove IR light from being received at the respective camera sensors.

FIG. 13C illustrates a computing system 7020 and an optional housing 7090, each of which show components that can be included in the AR system 7000 and/or the VR system 7010. In some embodiments, more or less components can be included in the optional housing 7090 depending on practical restraints of the respective AR system being described.

In some embodiments, the computing system 7020 and/or the optional housing 7090 can include one or more peripheral interfaces 7022, one or more power systems 7042, one or more controllers 7046 (including one or more haptic controllers 7047), one or more processors 7048 (as defined above, including any of the examples provided), and memory 7050, which can all be in electronic communication with each other. For example, the one or more processors 7048 can be configured to execute instructions stored in the memory 7050, which can cause a controller of the one or more controllers 7046 to cause operations to be performed at one or more peripheral devices of the peripherals interface 7022. In some embodiments, each operation described can occur based on electrical power provided by the power system 7042.

In some embodiments, the peripherals interface 7022 can include one or more devices configured to be part of the computing system 7020, many of which have been defined above and/or described with respect to wrist-wearable devices shown in FIGS. 12A and 12B. For example, the peripherals interface can include one or more sensors 7023. Some example sensors include: one or more coupling sensors 7024, one or more acoustic sensors 7025, one or more imaging sensors 7026, one or more EMG sensors 7027, one or more capacitive sensors 7028, and/or one or more IMU sensors 7029; and/or any other types of sensors defined above or described with respect to any other embodiments discussed herein.

In some embodiments, the peripherals interface can include one or more additional peripheral devices, including one or more NFC devices 7030, one or more GPS devices 7031, one or more LTE devices 7032, one or more Wi-Fi and/or Bluetooth devices 7033, one or more buttons 7034 (e.g., including buttons that are slidable or otherwise adjustable), one or more displays 7035, one or more speakers 7036, one or more microphones 7037, one or more cameras 7038 (e.g., including the left camera 7039A and/or a right camera 7039B), and/or one or more haptic devices 7040; and/or any other types of peripheral devices defined above or described with respect to any other embodiments discussed herein.

AR systems can include a variety of types of visual feedback mechanisms (e.g., presentation devices). For example, display devices in the AR system 7000 and/or the VR system 7010 can include one or more liquid-crystal displays (LCDs), light emitting diode (LED) displays, organic LED (OLED) displays, and/or any other suitable types of display screens. Artificial-reality systems can include a single display screen (e.g., configured to be seen by both eyes), and/or can provide separate display screens for each eye, which can allow for additional flexibility for varifocal adjustments and/or for correcting a refractive error associated with the user's vision. Some embodiments of AR systems also include optical subsystems having one or more lenses (e.g., conventional concave or convex lenses, Fresnel lenses, or adjustable liquid lenses) through which a user can view a display screen.

For example, respective displays can be coupled to each of the lenses 7006-1 and 7006-2 of the AR system 7000. The displays coupled to each of the lenses 7006-1 and 7006-2 can act together or independently to present an image or series of images to a user. In some embodiments, the AR system 7000 includes a single display (e.g., a near-eye display) or more than two displays. In some embodiments, a first set of one or more displays can be used to present an augmented-reality environment, and a second set of one or more display devices can be used to present a virtual-reality environment. In some embodiments, one or more waveguides are used in conjunction with presenting artificial-reality content to the user of the AR system 7000 (e.g., as a means of delivering light from one or more displays to the user's eyes). In some embodiments, one or more waveguides are fully or partially integrated into the eyewear device 7002. Additionally, or alternatively to display screens, some artificial-reality systems include one or more projection systems. For example, display devices in the AR system 7000 and/or the virtual-reality system 7010 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. Artificial-reality systems can also be configured with any other suitable type or form of image projection system. In some embodiments, one or more waveguides are provided additionally or alternatively to the one or more display(s).

The computing system 7020 and/or the optional housing 7090 of the AR system 7000 or the VR system 7010 can include some or all of the components of a power system 7042. The power system 7042 can include one or more charger inputs 7043, one or more PMICs 7044, and/or one or more batteries 7045.

The memory 7050 includes instructions and data, some or all of which may be stored as non-transitory computer-readable storage media within the memory 7050. For example, the memory 7050 can include one or more operating systems 7051; one or more applications 7052; one or more communication interface applications 7053; one or more graphics applications 7054; one or more AR processing applications 7055; and/or any other types of data defined above or described with respect to any other embodiments discussed herein.

The memory 7050 also includes data 7060 which can be used in conjunction with one or more of the applications discussed above. The data 7060 can include: profile data 7061; sensor data 7062; media content data 7063; AR application data 7064; and/or any other types of data defined above or described with respect to any other embodiments discussed herein.

In some embodiments, the controller 7046 of the eyewear device 7002 processes information generated by the sensors 7023 on the eyewear device 7002 and/or another electronic device within the AR system 7000. For example, the controller 7046 can process information from the acoustic sensors 7025-1 and 7025-2. For each detected sound, the controller 7046 can perform a direction of arrival (DOA) estimation to estimate a direction from which the detected sound arrived at the eyewear device 7002 of the AR system 7000. As one or more of the acoustic sensors 7025 detects sounds, the controller 7046 can populate an audio data set with the information (e.g., represented in FIG. 13C as sensor data 7062).

In some embodiments, a physical electronic connector can convey information between the eyewear device and another electronic device, and/or between one or more processors of the AR system 7000 or the VR system 7010 and the controller 7046. The information can be in the form of optical data, electrical data, wireless data, or any other transmittable data form. Moving the processing of information generated by the eyewear device to an intermediary processing device can reduce weight and heat in the eyewear device, making it more comfortable and safer for a user. In some embodiments, an optional wearable accessory device (e.g., an electronic neckband) is coupled to the eyewear device via one or more connectors. The connectors can be wired or wireless connectors and can include electrical and/or non-electrical (e.g., structural) components. In some embodiments, the eyewear device and the wearable accessory device can operate independently without any wired or wireless connection between them.

In some situations, pairing external devices, such as an intermediary processing device (e.g., the HIPD 8000) with the eyewear device 7002 (e.g., as part of the AR system 7000) enables the eyewear device 7002 to achieve a similar form factor of a pair of glasses while still providing sufficient battery and computation power for expanded capabilities. Some, or all, of the battery power, computational resources, and/or additional features of the AR system 7000 can be provided by a paired device or shared between a paired device and the eyewear device 7002, thus reducing the weight, heat profile, and form factor of the eyewear device 7002 overall while allowing the eyewear device 7002 to retain its desired functionality. For example, the wearable accessory device can allow components that would otherwise be included on an eyewear device 7002 to be included in the wearable accessory device and/or intermediary processing device, thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the eyewear device 7002, standing alone. Because weight carried in the wearable accessory device can be less invasive to a user than weight carried in the eyewear device 7002, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

AR systems can include various types of computer vision components and subsystems. For example, the AR system 7000 and/or the VR system 7010 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An AR system can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate digital twins (e.g., interactable virtual objects), among a variety of other functions. For example, FIGS. 13B-1 and 13B-2 show the VR system 7010 having cameras 7039A to 7039D, which can be used to provide depth information for creating a voxel field and a two-dimensional mesh to provide object information to the user to avoid collisions.

In some embodiments, the AR system 7000 and/or the VR system 7010 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., the haptic feedback system described with respect to FIGS. 15A to 15C).

In some embodiments of an AR system, such as the AR system 7000 and/or the VR system 7010, ambient light (e.g., a live feed of the surrounding environment that a user would normally see) can be passed through a display element of a respective head-wearable device presenting aspects of the AR system. In some embodiments, ambient light can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment. For example, a visual user interface element (e.g., a notification user interface element) can be presented at the head-wearable device, and an amount of ambient light (e.g., 15-50% of the ambient light) can be passed through the user interface element, such that the user can distinguish at least a portion of the physical environment over which the user interface element is being displayed.

Example Handheld Intermediary Processing Devices

Figure 14B:
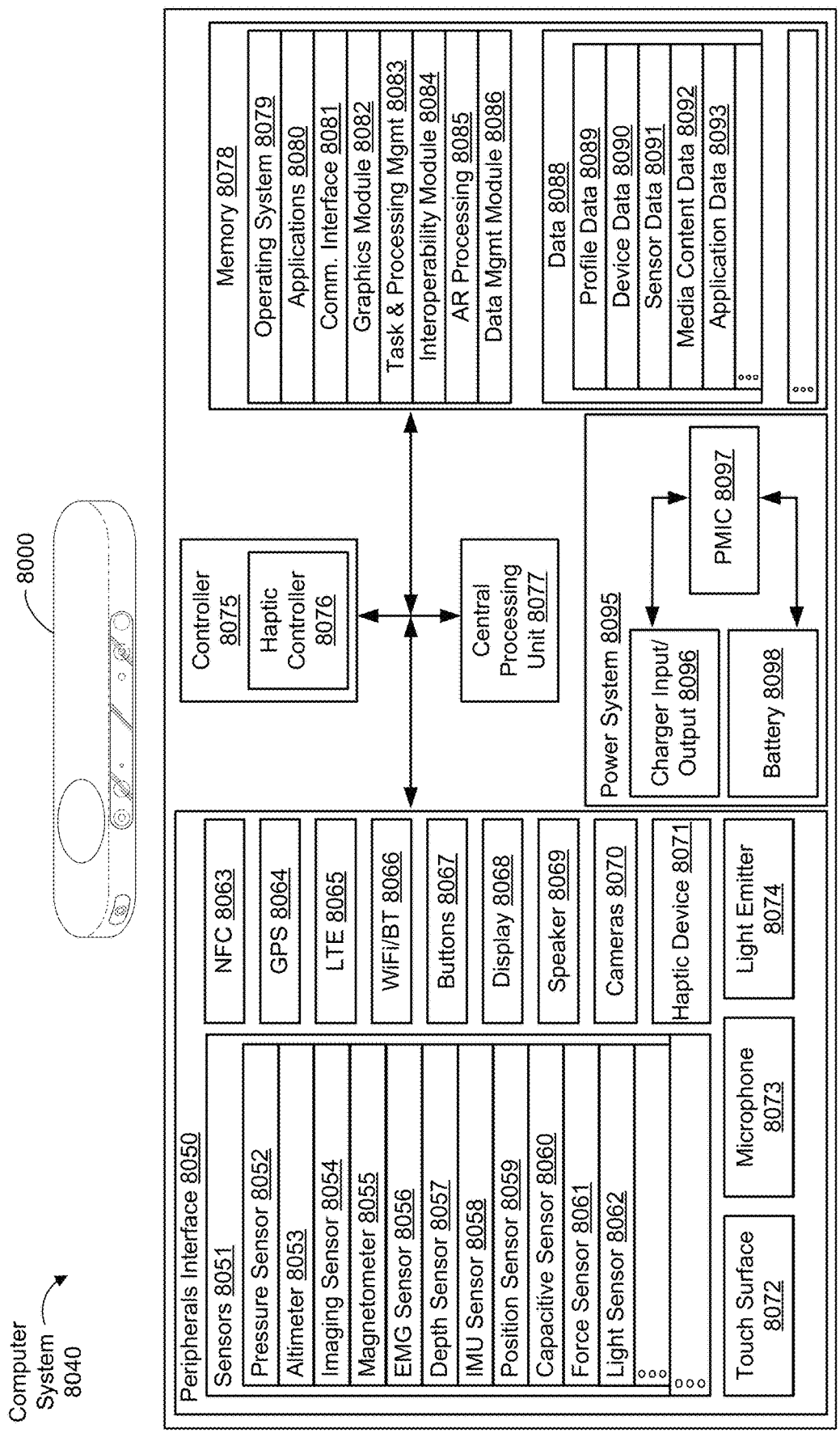

FIGS. 14A and 14B illustrate an example handheld intermediary processing device (HIPD) 8000, in accordance with some embodiments. The HIPD 8000 is an instance of the intermediary device described herein, such that the HIPD 8000 should be understood to have the features described with respect to any intermediary device defined above or otherwise described herein, and vice versa. FIG. 14A shows a top view 8005 and a side view 8025 of the HIPD 8000. The HIPD 8000 is configured to communicatively couple with one or more wearable devices (or other electronic devices) associated with a user. For example, the HIPD 8000 is configured to communicatively couple with a user's wrist-wearable device 6000 (or components thereof, such as the watch body 6020 and the wearable band 6010), AR system 7000, and/or VR headset 7010. The HIPD 8000 can be configured to be held by a user (e.g., as a handheld controller), carried on the user's person (e.g., in their pocket, in their bag, etc.), placed in proximity of the user (e.g., placed on their desk while seated at their desk, on a charging dock, etc.), and/or placed at or within a predetermined distance from a wearable device or other electronic device (e.g., where, in some embodiments, the predetermined distance is the maximum distance (e.g., 10 meters) at which the HIPD 8000 can successfully be communicatively coupled with an electronic device, such as a wearable device).

The HIPD 8000 can perform various functions independently and/or in conjunction with one or more wearable devices (e.g., wrist-wearable device 6000, AR system 7000, and/or VR headset 7010). The HIPD 8000 is configured to increase and/or improve the functionality of communicatively coupled devices, such as the wearable devices. The HIPD 8000 is configured to perform one or more functions or operations associated with interacting with user interfaces and applications of communicatively coupled devices, interacting with an AR environment, interacting with VR environment, and/or operating as a human-machine interface controller. Additionally, as will be described in more detail below, functionality and/or operations of the HIPD 8000 can include, without limitation, task offloading and/or handoffs; thermals offloading and/or handoffs; 6 degrees of freedom (6 DoF) raycasting and/or gaming (e.g., using imaging devices or cameras 8014, which can be used for simultaneous localization and mapping (SLAM) and/or with other image processing techniques); portable charging; messaging; image capturing via one or more imaging devices or cameras 8022; sensing user input (e.g., sensing a touch on a touch input surface 8002); wireless communications and/or interlining (e.g., cellular, near field, Wi-Fi, personal area network, etc.); location determination; financial transactions; providing haptic feedback; alarms; notifications; biometric authentication; health monitoring; sleep monitoring; etc. The above-example functions can be executed independently in the HIPD 8000 and/or in communication between the HIPD 8000 and another wearable device described herein. In some embodiments, functions can be executed on the HIPD 8000 in conjunction with an AR environment. As the skilled artisan will appreciate upon reading the descriptions provided herein, the novel the HIPD 8000 described herein can be used with any type of suitable AR environment.

While the HIPD 8000 is communicatively coupled with a wearable device and/or other electronic device, the HIPD 8000 is configured to perform one or more operations initiated at the wearable device and/or the other electronic device. In particular, one or more operations of the wearable device and/or the other electronic device can be offloaded to the HIPD 8000 to be performed. The HIPD 8000 performs the one or more operations of the wearable device and/or the other electronic device and provides to data corresponded to the completed operations to the wearable device and/or the other electronic device. For example, a user can initiate a video stream using AR system 7000 and back-end tasks associated with performing the video stream (e.g., video rendering) can be offloaded to the HIPD 8000, which the HIPD 8000 performs and provides corresponding data to the AR system 7000 to perform remaining front-end tasks associated with the video stream (e.g., presenting the rendered video data via a display of the AR system 7000). In this way, the HIPD 8000, which has more computational resources and greater thermal headroom than a wearable device, can perform computationally intensive tasks for the wearable device improving performance of an operation performed by the wearable device.

The HIPD 8000 includes a multi-touch input surface 8002 on a first side (e.g., a front surface) that is configured to detect one or more user inputs. In particular, the multi-touch input surface 8002 can detect single tap inputs, multi-tap inputs, swipe gestures and/or inputs, force-based and/or pressure-based touch inputs, held taps, and the like. The multi-touch input surface 8002 is configured to detect capacitive touch inputs and/or force (and/or pressure) touch inputs. The multi-touch input surface 8002 includes a touch-input surface 8004 defined by a surface depression, and a touch-input surface 8006 defined by a substantially planar portion. The touch-input surface 8004 can be disposed adjacent to the touch-input surface 8006. In some embodiments, the touch-input surface 8004 and the touch-input surface 8006 can be different dimensions, shapes, and/or cover different portions of the multi-touch input surface 8002. For example, the touch-input surface 8004 can be substantially circular and the touch-input surface 8006 is substantially rectangular. In some embodiments, the surface depression of the multi-touch input surface 8002 is configured to guide user handling of the HIPD 8000. In particular, the surface depression is configured such that the user holds the HIPD 8000 upright when held in a single hand (e.g., such that the using imaging devices or cameras 8014A and 8014B are pointed toward a ceiling or the sky). Additionally, the surface depression is configured such that the user's thumb rests within the touch-input surface 8004.

In some embodiments, the different touch-input surfaces include a plurality of touch-input zones. For example, the touch-input surface 8006 includes at least a touch-input zone 8008 within a touch-input zone 8006 and a touch-input zone 8010 within the touch-input zone 8008. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the touch-input zone 8008 causes the HIPD 8000 to perform a first command and a user input detected within the touch-input zone 8006 causes the HIPD 8000 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the touch-input zone 8008 can be configured to detect force touch inputs (e.g., a magnitude at which the user presses down) and capacitive touch inputs, and the touch-input zone 8006 can be configured to detect capacitive touch inputs.

The HIPD 8000 includes one or more sensors 8051 for sensing data used in the performance of one or more operations and/or functions. For example, the HIPD 8000 can include an IMU sensor that is used in conjunction with cameras 8014 for 3-dimensional object manipulation (e.g., enlarging, moving, or destroying an object) in an AR or VR environment. Non-limiting examples of the sensors 8051 included in the HIPD 8000 include a light sensor, a magnetometer, a depth sensor, a pressure sensor, and a force sensor. Additional examples of the sensors 8051 are provided below in reference to FIG. 14B.

The HIPD 8000 can include one or more light indicators 8012 to provide one or more notifications to the user. In some embodiments, the light indicators are LEDs or other types of illumination devices. The light indicators 8012 can operate as a privacy light to notify the user and/or others near the user that an imaging device and/or microphone are active. In some embodiments, a light indicator is positioned adjacent to one or more touch-input surfaces. For example, a light indicator can be positioned around the touch-input surface 8004. The light indicators can be illuminated in different colors and/or patterns to provide the user with one or more notifications and/or information about the device. For example, a light indicator positioned around the touch-input surface 8004 can flash when the user receives a notification (e.g., a message), change red when the HIPD 8000 is out of power, operate as a progress bar (e.g., a light ring that is closed when a task is completed (e.g., 0% to 100%)), operates as a volume indicator, etc.).

In some embodiments, the HIPD 8000 includes one or more additional sensors on another surface. For example, as shown FIG. 14A, HIPD 8000 includes a set of one or more sensors (e.g., sensor set 8020) on an edge of the HIPD 8000. The sensor set 8020, when positioned on an edge of the of the HIPD 8000, can be pe positioned at a predetermined tilt angle (e.g., 26 degrees), which allows the sensor set 8020 to be angled toward the user when placed on a desk or other flat surface. Alternatively, in some embodiments, the sensor set 8020 is positioned on a surface opposite the multi-touch input surface 8002 (e.g., a back surface). The one or more sensors of the sensor set 8020 are discussed in detail below.

The side view 8025 of the of the HIPD 8000 shows the sensor set 8020 and camera 8014B. The sensor set 8020 includes one or more cameras 8022A and 8022B, a depth projector 8024, an ambient light sensor 8028, and a depth receiver 8030. In some embodiments, the sensor set 8020 includes a light indicator 8026. The light indicator 8026 can operate as a privacy indicator to let the user and/or those around them know that a camera and/or microphone is active. The sensor set 8020 is configured to capture a user's facial expression such that the user can puppet a custom avatar (e.g., showing emotions, such as smiles and/or laughter on the avatar or a digital representation of the user). The sensor set 8020 can be configured as a side stereo RGB system, a rear indirect Time-of-Flight (iToF) system, or a rear stereo RGB system. As the skilled artisan will appreciate upon reading the descriptions provided herein, the HIPD 8000 described herein can use different sensor set 8020 configurations and/or sensor set 8020 placements.

In some embodiments, the HIPD 8000 includes one or more haptic devices 8071 (e.g., a vibratory haptic actuator) that are configured to provide haptic feedback (e.g., kinesthetic sensation). The sensors 8051, and/or the haptic devices 8071 can be configured to operate in conjunction with multiple applications and/or communicatively coupled devices including, without limitation, wearable devices, health monitoring applications, social media applications, game applications, and artificial reality applications (e.g., the applications associated with artificial reality).

The HIPD 8000 is configured to operate without a display. However, in optional embodiments, the HIPD 8000 can include a display 8068 (FIG. 14B). The HIPD 8000 can also income one or more optional peripheral buttons 8067 (FIG. 14B). For example, the peripheral buttons 8067 can be used to turn on or turn off the HIPD 8000. Further, the HIPD 8000 housing can be formed of polymers and/or elastomer elastomers. The HIPD 8000 can be configured to have a non-slip surface to allow the HIPD 8000 to be placed on a surface without requiring a user to watch over the HIPD 8000. In other words, the HIPD 8000 is designed such that it would not easily slide off surfaces. In some embodiments, the HIPD 8000 include one or magnets to couple the HIPD 8000 to another surface. This allows the user to mount the HIPD 8000 to different surfaces and provide the user with greater flexibility in use of the HIPD 8000.

As described above, the HIPD 8000 can distribute and/or provide instructions for performing the one or more tasks at the HIPD 8000 and/or a communicatively coupled device. For example, the HIPD 8000 can identify one or more back-end tasks to be performed by the HIPD 8000 and one or more front-end tasks to be performed by a communicatively coupled device. While the HIPD 8000 is configured to offload and/or handoff tasks of a communicatively coupled device, the HIPD 8000 can perform both back-end and front-end tasks (e.g., via one or more processors, such as CPU 8077; FIG. 14B). The HIPD 8000 can, without limitation, can be used to perform augmenting calling (e.g., receiving and/or sending 3D or 2.5D live volumetric calls, live digital human representation calls, and/or avatar calls), discreet messaging, 6 DoF portrait/landscape gaming, AR/VR object manipulation, AR/VR content display (e.g., presenting content via a virtual display), and/or other AR/VR interactions. The HIPD 8000 can perform the above operations alone or in conjunction with a wearable device (or other communicatively coupled electronic device).

FIG. 14B shows block diagrams of a computing system 8040 of the HIPD 8000, in accordance with some embodiments. The HIPD 8000, described in detail above, can include one or more components shown in HIPD computing system 8040. The HIPD 8000 will be understood to include the components shown and described below for the HIPD computing system 8040. In some embodiments, all, or a substantial portion of the components of the HIPD computing system 8040 are included in a single integrated circuit. Alternatively, in some embodiments, components of the HIPD computing system 8040 are included in a plurality of integrated circuits that are communicatively coupled.

The HIPD computing system 8040 can include a processor (e.g., a CPU 8077, a GPU, and/or a CPU with integrated graphics), a controller 8075, a peripherals interface 8050 that includes one or more sensors 8051 and other peripheral devices, a power source (e.g., a power system 8095), and memory (e.g., a memory 8078) that includes an operating system (e.g., an operating system 8079), data (e.g., data 8088), one or more applications (e.g., applications 8080), and one or more modules (e.g., a communications interface module 8081, a graphics module 8082, a task and processing management module 8083, an interoperability module 8084, an AR processing module 8085, and/or a data management module 8086). The HIPD computing system 8040 further includes a power system 8095 that includes a charger input and output 8096, a PMIC 8097, and a battery 8098, all of which are defined above.

In some embodiments, the peripherals interface 8050 can include one or more sensors 8051. The sensors 8051 can include analogous sensors to those described above in reference to FIG. 12B. For example, the sensors 8051 can include imaging sensors 8054, (optional) EMG sensors 8056, IMU sensors 8058, and capacitive sensors 8060. In some embodiments, the sensors 8051 can include one or more pressure sensor 8052 for sensing pressure data, an altimeter 8053 for sensing an altitude of the HIPD 8000, a magnetometer 8055 for sensing a magnetic field, a depth sensor 8057 (or a time-of flight sensor) for determining a difference between the camera and the subject of an image, a position sensor 8059 (e.g., a flexible position sensor) for sensing a relative displacement or position change of a portion of the HIPD 8000, a force sensor 8061 for sensing a force applied to a portion of the HIPD 8000, and a light sensor 8062 (e.g., an ambient light sensor) for detecting an amount of lighting. The sensors 8051 can include one or more sensors not shown in FIG. 17B.

Analogous to the peripherals described above in reference to FIGS. 12B, the peripherals interface 8050 can also include an NFC component 8063, a GPS component 8064, an LTE component 8065, a Wi-Fi and/or Bluetooth communication component 8066, a speaker 8069, a haptic device 8071, and a microphone 8073. As described above in reference to FIG. 17A, the HIPD 8000 can optionally include a display 8068 and/or one or more buttons 8067. The peripherals interface 8050 can further include one or more cameras 8070, touch surfaces 8072, and/or one or more light emitters 8074. The multi-touch input surface 8002 described above in reference to FIG. 17A is an example of touch surface 8072. The light emitters 8074 can be one or more LEDs, lasers, etcetera, and can be used to project or present information to a user. For example, the light emitters 8074 can include light indicators 8012 and 8026 described above in reference to FIG. 17A. The cameras 8070 (e.g., cameras 8014 and 8022 described above in FIG. 17A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 8070 can be used for SLAM; 6 DoF ray casting, gaming, object manipulation, and/or other rendering; facial recognition and facial expression recognition, etc.

Similar to the watch body computing system 6060 and the watch band computing system 6030 described above in reference to FIG. 12B, the HIPD computing system 8040 can include one or more haptic controllers 8076 and associated componentry (e.g., haptic devices 8071) for providing haptic events at the HIPD 8000.

Memory 8078 can include high-speed random-access memory and/or non-volatile memory, such as one or more magnetic disk storage devices, flash memory devices, or other non-volatile solid-state memory devices. Access to the memory 8078 by other components of the HIPD 8000, such as the one or more processors and the peripherals interface 8050, can be controlled by a memory controller of the controllers 8075.

In some embodiments, software components stored in the memory 8078 include one or more operating systems 8079, one or more applications 8080, one or more communication interface modules 8081, one or more graphics modules 8082, one or more data management modules 8086, which are analogous to the software components described above in reference to FIG. 12B.

In some embodiments, software components stored in the memory 8078 include a task and processing management module 8083 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 8083 uses data 8088 (e.g., device data 8090) to distribute the one or more front-end and/or back-end tasks based on communicatively coupled devices' computing resources, available power, thermal headroom, ongoing operations, and/or other factors. For example, the task and processing management module 8083 can cause the performance of one or more back-end tasks (of an operation performed at communicatively coupled AR system 7000) at the HIPD 8000 in accordance with a determination that the operation is utilizing a predetermined amount (e.g., at least 70%) of computing resources available at the AR system 7000.

In some embodiments, software components stored in the memory 8078 include an interoperability module 8084 for exchanging and utilizing information received and/or provided to distinct communicatively coupled devices. The interoperability module 8084 allows for different systems, devices, and/or applications to connect and communicate in a coordinated way without user input. In some embodiments, software components stored in the memory 8078 include an AR module 8085 that is configured to process signals based at least on sensor data for use in an AR and/or VR environment. For example, the AR module 8085 can be used for 3D object manipulation, gesture recognition, facial and facial expression, and/or recognition.

The memory 8078 can also include data 8088, including structured data. In some embodiments, the data 8088 includes profile data 8089, device data 8090 (including device data of one or more devices communicatively coupled with the HIPD 8000, such as device type, hardware, software, and/or configurations), sensor data 8091, media content data 8092, and application data 8093.

It should be appreciated that the HIPD computing system 8040 is an example of a computing system within the HIPD 8000, and that the HIPD 8000 can have more or fewer components than shown in the HIPD computing system 8040, combine two or more components, and/or have a different configuration and/or arrangement of the components. The various components shown in HIPD computing system 8040 are implemented in hardware, software, firmware, or a combination thereof, including one or more signal processing and/or application-specific integrated circuits.

The techniques described above in FIG. 17A-17B can be used with any device used as a human-machine interface controller. In some embodiments, an HIPD 8000 can be used in conjunction with one or more wearable device such as a head-wearable device (e.g., AR system 7000 and VR system 7010) and/or a wrist-wearable device 6000 (or components thereof). In some embodiments, an HIPD 8000 is used in conjunction with a wearable garment, such as the wearable gloves of FIGS. 15A-15C. Having thus described example HIPD 8000, attention will now be turned to example feedback devices, such as device 9000.

Example Feedback Devices

Figure 15B:
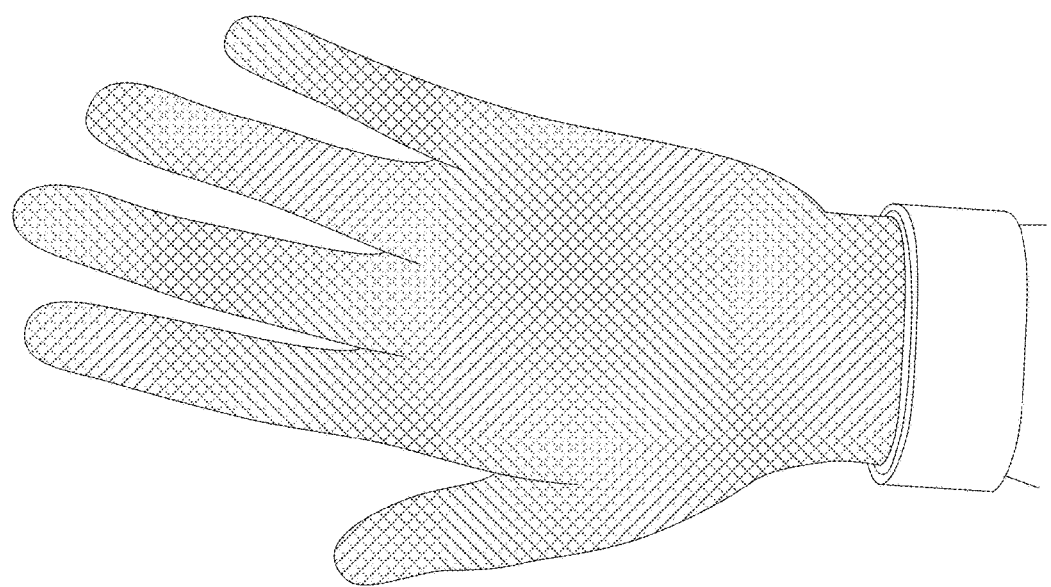
FIGS. 15A-15C illustrate example wearable gloves in accordance with some embodiments.
Figure 15A:
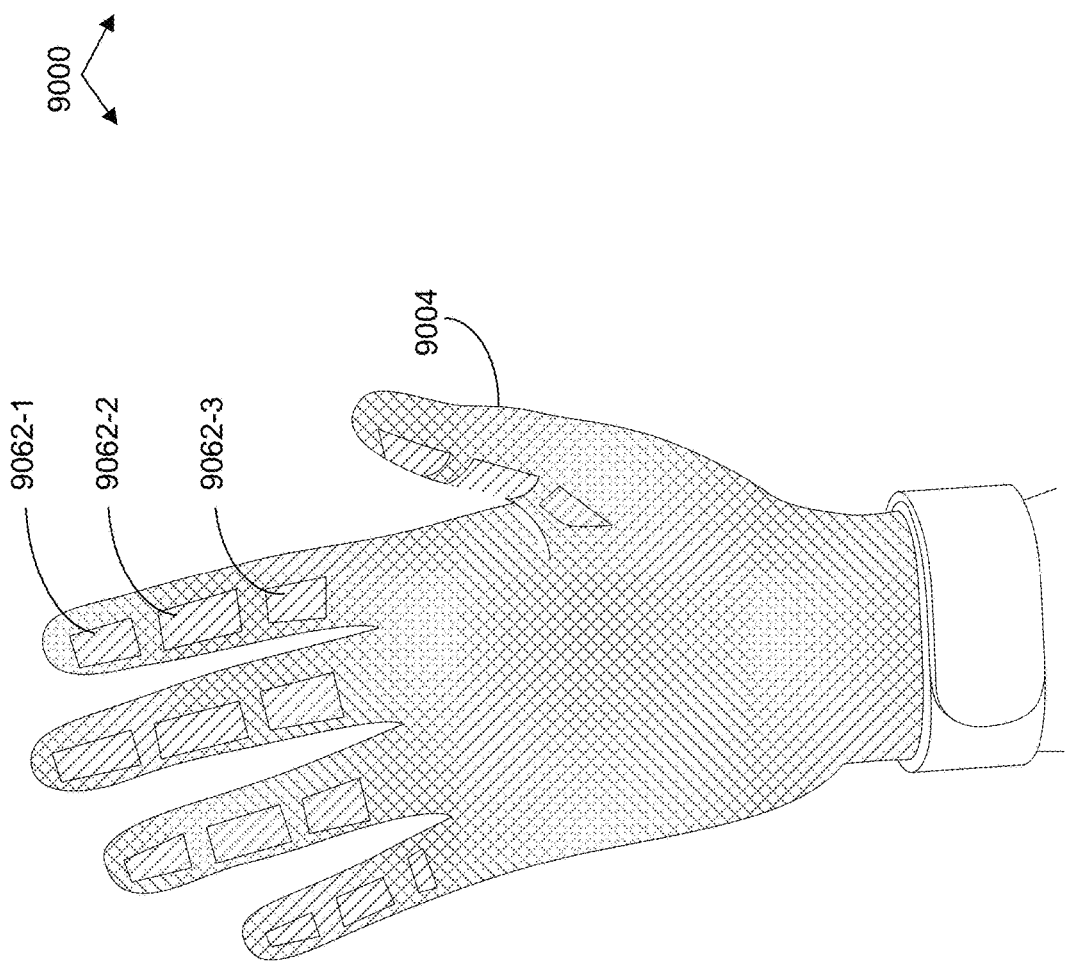

FIGS. 15A and 15B show example haptic feedback systems (e.g., hand-wearable devices) for providing feedback to a user regarding the user's interactions with a computing system (e.g., an artificial-reality environment presented by the AR system 7000 or the VR system 7010). In some embodiments, a computing system (e.g., the AR system 5000*d*) may also provide feedback to one or more users based on an action that was performed within the computing system and/or an interaction provided by the AR system (e.g., which may be based on instructions that are executed in conjunction with performing operations of an application of the computing system). Such feedback may include visual and/or audio feedback and may also include haptic feedback provided by a haptic assembly, such as one or more haptic assemblies 9062 of the device 9000 (e.g., haptic assemblies 9062-1, 9062-2, and 9062-3). For example, the haptic feedback may prevent (or, at a minimum, hinder/resist movement of) one or more fingers of a user from bending past a certain point to simulate the sensation of touching a solid coffee mug. In actuating such haptic effects, the device 9000 can change (either directly or indirectly) a pressurized state of one or more of the haptic assemblies 9062.

Each of the haptic assemblies 9062 includes a mechanism that, at a minimum, provides resistance when the respective haptic assembly 9062 is transitioned from a first pressurized state (e.g., atmospheric pressure or deflated) to a second pressurized state (e.g., inflated to a threshold pressure). Structures of haptic assemblies 9062 can be integrated into various devices configured to be in contact or proximity to a user's skin, including, but not limited to devices such as glove worn devices, body worn clothing device, and headset devices.

As noted above, the haptic assemblies 9062 described herein can be configured to transition between a first pressurized state and a second pressurized state to provide haptic feedback to the user. Due to the ever-changing nature of artificial reality, the haptic assemblies 9062 may be required to transition between the two states hundreds, or perhaps thousands of times, during a single use. Thus, the haptic assemblies 9062 described herein are durable and designed to quickly transition from state to state. To provide some context, in the first pressurized state, the haptic assemblies 9062 do not impede free movement of a portion of the wearer's body. For example, one or more haptic assemblies 9062 incorporated into a glove are made from flexible materials that do not impede free movement of the wearer's hand and fingers (e.g., an electrostatic-zipping actuator). The haptic assemblies 9062 are configured to conform to a shape of the portion of the wearer's body when in the first pressurized state. However, once in the second pressurized state, the haptic assemblies 9062 can be configured to restrict and/or impede free movement of the portion of the wearer's body (e.g., appendages of the user's hand). For example, the respective haptic assembly 9062 (or multiple respective haptic assemblies) can restrict movement of a wearer's finger (e.g., prevent the finger from curling or extending) when the haptic assembly 9062 is in the second pressurized state. Moreover, once in the second pressurized state, the haptic assemblies 9062 may take different shapes, with some haptic assemblies 9062 configured to take a planar, rigid shape (e.g., flat and rigid), while some other haptic assemblies 9062 are configured to curve or bend, at least partially.

As a non-limiting example, the device 9000 includes a plurality of haptic devices (e.g., a pair of haptic gloves, and a haptics component of a wrist-wearable device (e.g., any of the wrist-wearable devices described with respect to FIGS. 12A-12B. Each of which can include a garment component (e.g., a garment 9004) and one or more haptic assemblies coupled (e.g., physically coupled) to the garment component. For example, each of the haptic assemblies 9062-1, 9062-2, 9062-3, . . . 9062-N are physically coupled to the garment 9004 are configured to contact respective phalanges of a user's thumb and fingers. As explained above, the haptic assemblies 9062 are configured to provide haptic simulations to a wearer of the device 9000. The garment 9004 of each device 9000 can be one of various articles of clothing (e.g., gloves, socks, shirts, or pants). Thus, a user may wear multiple devices 9000 that are each configured to provide haptic stimulations to respective parts of the body where the devices 9000 are being worn.

Figure 15C:
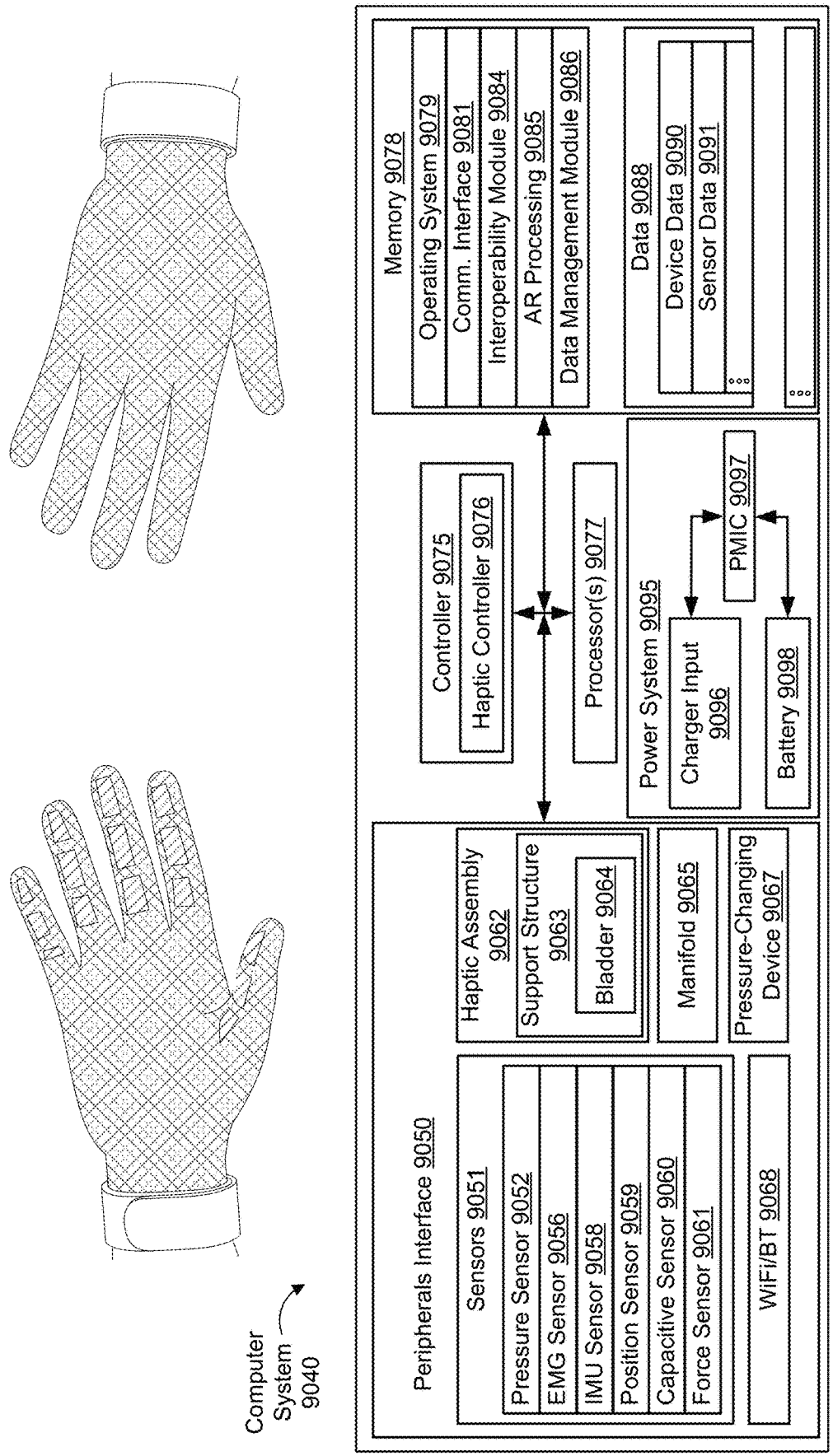

FIG. 15C shows block diagrams of a computing system 9040 of the device 9000, in accordance with some embodiments. The computing system 9040 can include one or more peripheral interfaces 9050, one or more power systems 9095, one or more controllers 9075 (including one or more haptic controllers 9076), one or more processors 9077 (as defined above, including any of the examples provided), and memory 9078, which can all be in electronic communication with each other. For example, the one or more processors 9077 can be configured to execute instructions stored in the memory 9078, which can cause a controller of the one or more controllers 9075 to cause operations to be performed at one or more peripheral devices of the peripherals interface 9050. In some embodiments, each operation described can occur based on electrical power provided by the power system 9095. The power system 9095 includes a charger input 9096, a PMIC 9097, and a battery 9098.

In some embodiments, the peripherals interface 9050 can include one or more devices configured to be part of the computing system 9040, many of which have been defined above and/or described with respect to wrist-wearable devices shown in FIGS. 12A and 12B. For example, the peripherals interface 9050 can include one or more sensors 9051. Some example sensors include: one or more pressure sensors 9052, one or more EMG sensors 9056, one or more IMU sensors 9058, one or more position sensors 9059, one or more capacitive sensors 9060, one or more force sensors 9061; and/or any other types of sensors defined above or described with respect to any other embodiments discussed herein.

In some embodiments, the peripherals interface can include one or more additional peripheral devices, including one or more Wi-Fi and/or Bluetooth devices 9068; one or more haptic assemblies 9062; one or more support structures 9063 (which can include one or more bladders 9064; one or more manifolds 9065; one or more pressure-changing devices 9067; and/or any other types of peripheral devices defined above or described with respect to any other embodiments discussed herein.

In some embodiments, each haptic assembly 9062 includes a support structure 9063, and at least one bladder 9064. The bladder 9064 (e.g., a membrane) is a sealed, inflatable pocket made from a durable and puncture resistance material, such as thermoplastic polyurethane (TPU), a flexible polymer, or the like. The bladder 9064 contains a medium (e.g., a fluid such as air, inert gas, or even a liquid) that can be added to or removed from the bladder 9064 to change a pressure (e.g., fluid pressure) inside the bladder 9064. The support structure 9063 is made from a material that is stronger and stiffer than the material of the bladder 9064. A respective support structure 9063 coupled to a respective bladder 9064 is configured to reinforce the respective bladder 9064 as the respective bladder changes shape and size due to changes in pressure (e.g., fluid pressure) inside the bladder.

The device 9000 also includes a haptic controller 9076 and a pressure-changing device 9067. In some embodiments, the haptic controller 9076 is part of the computer system 9040 (e.g., in electronic communication with one or more processors 9077 of the computer system 9040). The haptic controller 9076 is configured to control operation of the pressure-changing device 9067, and in turn operation of the device 9000. For example, the controller 9076 sends one or more signals to the pressure-changing device 9067 to activate the pressure-changing device 9067 (e.g., turn it on and off). The one or more signals may specify a desired pressure (e.g., pounds-per-square inch) to be output by the pressure-changing device 9067. Generation of the one or more signals, and in turn the pressure output by the pressure-changing device 9067, may be based on information collected by the sensors in FIGS. 11A and 11B. For example, the one or more signals may cause the pressure-changing device 9067 to increase the pressure (e.g., fluid pressure) inside a haptic assembly 9062 at a first time, based on the information collected by the sensors in FIGS. 11A and 11B

(e.g., the user makes contact with an artificial coffee mug). Then, the controller may send one or more additional signals to the pressure-changing device 9067 that cause the pressure-changing device 9067 to further increase the pressure inside the haptic assembly 9062 at a second time after the first time, based on additional information collected by the sensors 9051. Further, the one or more signals may cause the pressure-changing device 9067 to inflate one or more bladders 9064 in a device 9000-A, while one or more bladders 9064 in a device 9000-B remain unchanged. Additionally, the one or more signals may cause the pressure-changing device 9067 to inflate one or more bladders 9064 in a device 9000-A to a first pressure and inflate one or more other bladders 9064 in the device 9000-A to a second pressure different from the first pressure. Depending on the number of devices 9000 serviced by the pressure-changing device 9067, and the number of bladders therein, many different inflation configurations can be achieved through the one or more signals and the examples above are not meant to be limiting.

The device 9000 may include an optional manifold 9065 between the pressure-changing device 9067 and the devices 9000. The manifold 9065 may include one or more valves (not shown) that pneumatically couple each of the haptic assemblies 9062 with the pressure-changing device 9067 via tubing. In some embodiments, the manifold 9065 is in communication with the controller 9075, and the controller 9075 controls the one or more valves of the manifold 9065 (e.g., the controller generates one or more control signals). The manifold 9065 is configured to switchably couple the pressure-changing device 9067 with one or more haptic assemblies 9062 of the same or different devices 9000 based on one or more control signals from the controller 9075. In some embodiments, instead of using the manifold 9065 to pneumatically couple the pressure-changing device 9067 with the haptic assemblies 9062, the device 9000 may include multiple pressure-changing devices 9067, where each pressure-changing device 9067 is pneumatically coupled directly with a single (or multiple) haptic assembly 9062. In some embodiments, the pressure-changing device 9067 and the optional manifold 9065 are configured as part of one or more of the devices 9000 (not illustrated) while, in other embodiments, the pressure-changing device 9067 and the optional manifold 9065 are configured as external to the device 9000. A single pressure-changing device 9067 may be shared by multiple devices 9000.

In some embodiments, the pressure-changing device 9067 is a pneumatic device, hydraulic device, a pneudraulic device, or some other device capable of adding and removing a medium (e.g., fluid, liquid, gas) from the one or more haptic assemblies 9062.

The devices shown in FIGS. 15A to 15C may be coupled via a wired connection (e.g., via busing). Alternatively, one or more of the devices shown in FIGS. 15A to 15C may be wirelessly connected (e.g., via short-range communication signals).

The memory 9078 includes instructions and data, some or all of which may be stored as non-transitory computer-readable storage media within the memory 9078. For example, the memory 9078 can include one or more operating systems 9079; one or more communication interface applications 9081; one or more interoperability modules 9084; one or more AR processing applications 9085; one or more data management modules 9086; and/or any other types of data defined above or described with respect to any other embodiments discussed herein.

The memory 9078 also includes data 9088 which can be used in conjunction with one or more of the applications discussed above. The data 9088 can include: device data 9090; sensor data 9091; and/or any other types of data defined above or described with respect to any other embodiments discussed herein.

Having thus described system-block diagrams and then example devices, attention will now be directed to certain example embodiments.

Example Embodiments

Turning now to some example embodiments of the methods, devices, systems, and computer-readable storage media described earlier. In short, the descriptions below proceed by first discussing the paragraphs beginning with an A symbol, which are related to an aspect in which wrist movements are used to control a user interface; following that is a discussion of paragraphs beginning with a B symbol, which relate to an aspect in which in-air hand gestures are used to move and snap a point of focus.

(A1) In one aspect, some embodiments include a method (e.g., the method 1000) of using wrist movements to control a user-interface. In some embodiments, the method is performed at a wearable device (e.g., the wrist-wearable device 120) having memory (e.g., memory 1160) and one or more processors (e.g., the processor(s) 6079). The method includes: (i) receiving, via one or more neuromuscular-signal sensors of a wrist-wearable device worn by a user, data generated during performance of an in-air wrist movement by the user; (ii) moving a point of focus on the user interface in accordance with the in-air wrist movement (e.g., as illustrated in FIG. 1G); (iii) receiving, via the one or more neuromuscular-signal sensors, additional data generated during performance of an in-air gesture by the user; (iv) determining that the in-air gesture is an execution gesture; and (v) executing a command corresponding to the execution gesture (e.g., as illustrated in FIG. 1H). For example, after moving a cursor via wrist rotations, the user taps the thumb (or other phalange) to execute a command for a user interface element selected by the cursor. In some situations, snapping to a closest element helps reduce frustration with noisy input signals. In some embodiments, the point of focus is moved in accordance with a gesture distance from an initial position (e.g., as described in FIGS. 7S-7U).

In some embodiments, a priming gesture is required before wrist rotation by the user is accepted as a control input for a point of focus. For example, a user is required to maintain a fist or pinch gesture while rotating their wrist in order for the wrist rotation to move the point of focus (e.g., as illustrated in FIGS. 1A-1G). In this way, inadvertent wrist movements won't cause the point of focus to move when undesired by the user.

In some embodiments, the data generated corresponds to muscle movement during the performance of the wrist movement. For example, moving a cursor around using wrist angle information, where a wrist-wearable watch can sense the angle of the user's wrist (e.g., using an EMG and/or IMU sensor). In this way, a user can use minute wrist movements to navigate a user interface.

In some embodiments, the wearable device is a wrist-wearable device, such as a smartwatch (e.g., the wrist-wearable device 120). In some embodiments, the wearable device includes an inertial measuring unit (IMU). In some embodiments, the wearable device is a head-wearable wearable device, such as smart glasses (e.g., the head-wearable device 402). The methods described herein, in addition to being performed at a wearable device, can also be performed at an artificial-reality system (e.g., the AR system 5000) that includes both a wrist-wearable device and a head-wearable wearable device, among other hardware accessories or components.

In some embodiments, by using the data from the one or more neuromuscular-signal sensors, an in-air hand gesture described herein is detected before its performance has been completed by the user, such as detecting an intention to perform the in-air hand gesture followed by completion of the in-air hand gesture, which can either be separately detected or determined based on the user's intention to perform the in-air hand gesture.

In some embodiments, the in-air hand gestures described herein include movement of a user's wrist, elbow, and shoulder (e.g., an arm lift or wave gesture). In some embodiments, the in-air gesture is a gesture that does not contact the wearable device.

(A2) In some embodiments of A1, the method further includes, prior to moving the point of focus, identifying the in-air wrist movement as being part of a navigation gesture, where the point of focus is moved in accordance with the identification. For example, the system forgoes moving the point of focus for wrist movements that are not intended as navigation gestures.

In some embodiments, the system activates a user interface in accordance with identifying a navigation, priming, or control gesture. In some embodiments, activating the user interface includes giving focus to a first user interface element of the user interface. In some embodiments, activating the user interface includes causing a plurality of user interface elements to be displayed. In some embodiments, activating the user interface includes presenting a user interface element that was not presented prior to activating the user interface. For example, activating commands for the user interface, where the commands correspond to the additional gestures. In some embodiments, activating the user interface further includes activating one or more sensors of a wearable device. In some embodiments, activating the user interface includes enabling display of the user interface. In some embodiments, activating the user interface includes updating display of the user interface (e.g., to display a menu that wasn't previously displayed).

(A3) In some embodiments of A1 or A2: (i) the in-air wrist movement includes the wrist of the user rotating from an initial position to a rotated position, and where the wrist of the user is maintained in the rotated position for an amount of time; and (ii) the method further includes, while the wrist of the user is maintained in the rotated position for the amount of time, scrolling the point of focus through a plurality of selectable user interface elements. For example, while the user maintains the downward wrist rotation shown in FIG. 1G, the point of focus 105 moves downward through the emojis in the emoji menu.

(A4) In some embodiments of any of A1-A3, the movement (e.g., rotation) of the wrist causes the movement of the point of focus. In some embodiments, the (relative) position of the wrist causes the movement. In some embodiments, the movement of the point of focus is based on both the movement and position of the user's wrist. In some embodiments, a type of navigation is selected based on the movement and/or position of the wrist (e.g., as illustrated in FIG. 5A-5E).

(A5) In some embodiments of A4, the method further includes, in accordance with a determination that the in-air wrist movement comprises the wrist of the user returning to the initial position (e.g., the user's wrist returning to the origin point on the scale 510 as illustrated in FIG. 5B), ceasing to scroll the point of focus and selecting a nearest user interface element to the point of focus. In some embodiments, in accordance with the determination that the in-air wrist movement comprises the wrist of the user returning to the initial position, the scroll of the point of focus ceases without selecting the nearest user interface element.

(A6) In some embodiments of A5, the nearest user interface element is not selected unless the point of focus is overlaid with the nearest user interface element (or within a snapping threshold (e.g., the snapping boundary 412) of the nearest user interface element).

(A7) In some embodiments of any of A1-A6, the method further includes, prior to moving the point of focus, identifying an initial position of the wrist of the user, where the point of focus is moved in accordance with movement of the wrist of the user from the initial position (e.g., as described previously with respect to FIGS. 5A-5E). For example, whatever angle the user's wrist is at initially (e.g., at the time when the user performs an associated priming gesture) becomes the origin point [0,0,0] in a reference plane for the gesture.

(A8) In some embodiments of any of A1-A7, the point of focus is moved at a speed that corresponds to a wrist angle of the wrist of the user. In some embodiments, if the wrist angle is greater than a first threshold but less than a second threshold the point of focus moves at a first speed, and if the wrist angle is greater than the second threshold the point of focus moves at a second speed greater than the first speed. In some embodiments, a type of navigation is selected based on the movement and/or position of the wrist with respect to one or more thresholds (e.g., as illustrated in FIG. 5A-5E).

(A9) In some embodiments of any of A1-A8, the point of focus is moved at a speed that corresponds to a speed of the in-air wrist movement. In some embodiments, if the wrist movement speed is greater than a first threshold but less than a second threshold the point of focus moves at a first speed, and if the wrist movement speed is greater than the second threshold the point of focus moves at a second speed greater than the first speed (e.g., a gentle rotation vs. a flick rotation).

(A10) In some embodiments of any of A1-A9, the method further includes, in accordance with a determination that the point of focus is within a threshold distance of a selectable user interface element, selecting the user interface element by snapping the point of focus to the selectable user interface element. For example, FIGS. 4C and 4D illustrate the point of focus 408 moving within the snapping boundary 412 and snapping to the user interface element 414.

(A11) In some embodiments of A10, the method further includes: (i) after selecting the user interface element, detecting a user-interface control gesture; and (ii) in accordance with a determination that movement of the user-interface control gesture would cause the point of focus to move beyond a second threshold distance of the selected user interface element, deselecting the user interface element. For example, FIGS. 4E and 4F illustrate the point of focus 408 moving beyond the snapping boundary 412 and deselection of the user interface element 414. In some embodiments the snapping threshold and un-snapping thresholds are different. In some embodiments, the point of focus is displayed separately from the selection and when the point of focus moves beyond the second threshold distance the user interface element is deselected. In some embodiments, in accordance with the point of focus moving to a position that is closer to another selectable object (as compared to the selected user interface element), the user interface element is deselected, and the other selectable object is selected. In some embodiments, the point of focus is moved by different gestures that can deselect one element, and select another. In some embodiments, a single gesture causes selection and subsequent deselection of the user interface element (e.g., a long swipe gesture causes the point of focus to move past the user interface element). In some embodiments, point of focus unsnaps and does not re-snap until it's within a threshold distance of another selectable user interface element. For example, in accordance with some embodiments, while the point of focus is greater than a threshold distance from every selectable user interface element, no user interface element is selected.

(A12) In some embodiments of A11, the method further includes, in accordance with deselecting the user interface element, selecting a different selectable user interface element by snapping the point of focus to the different selectable user interface element. In some embodiments, at least one user interface element is always selected. For example, the point of focus is overlaid with a first element and the first element is selected. In this example, as the point of focus moves away from the first element, the first element continues to be selected until the point of focus overlays a second element, at which time the select element becomes selected and the first element is deselected. In some embodiments, when a user interface element has been deselected, another is immediately selected. In some embodiments, another UI element is not selected if the threshold distance is not met.

(A13) In some embodiments of any of A1-A12, the point of focus is presented as a cursor. In some embodiments, the user can use their wrist movements as a cursor, and the point of focus is displayed using that cursor.

(A14) In some embodiments of any of A1-A13, the method further includes: (i) receiving, via the one or more neuromuscular-signal sensors, more data generated from performance of an additional in-air gesture by the user; (ii) determining that the additional in-air gesture is a navigation gesture; and (iii) snapping the point of focus to a selectable user interface element in accordance with the navigation gesture. For example, the additional in-air gesture is a pinch gesture (e.g., a gesture in which the user's pointer finger touches the user's thumb). As an example, the pinch gesture causes a point of focus to scroll to the next item such as a next photo in a photo gallery. In some embodiments, a user-interface control gesture is performed by a user making a pinch gesture using a first phalange (pointer finger) with another phalange (thumb) resulting in selecting the next item in a list.

(A15) In some embodiments of any of A1-A14: (i) the user interface includes a plurality of selectable user interface elements organized in a grid; and (ii) the method further includes: (a) receiving, via the one or more neuromuscular-signal sensors, data generated from performance of an additional navigation gesture; (b) in accordance with the additional navigation gesture having a first directionality, snapping the point of focus to a next user interface element in the grid; and (c) in accordance with the additional navigation gesture having a second directionality, snapping the point of focus to a previous user interface element in the grid. In some embodiments, the grid is a one-dimensional grid (e.g., a single row or column) also sometimes referred to as a list. In some embodiments, the additional navigation gesture includes the user's thumb moving in a directional pad (d-pad) manner (e.g., moving along a virtual d-pad).

(A16) In some embodiments of any of A1-A15, the user interface is displayed via a head-wearable device worn by the user. For example, the user interface could be on a smart watch, glasses, phone, monitor, or the like. In some embodiments, the user interface is part of an augmented-reality or virtual-reality environment.

(B1) In another aspect, some embodiments include a method (e.g., the method 800) using in-air gestures to control a point of focus in a user-interface. In some embodiments, the method is performed at a wearable device (e.g., the wrist-wearable device 120) having memory (e.g., memory 6050 and/or 6080) and one or more processors (e.g., the processor(s) 6049 and/or 6079). The method includes: (i) receiving, via one or more sensors of a wrist-wearable device worn by a user, data generated during performance of an in-air hand gesture by the user; (ii) determining, based on the sensor data, that the in-air hand gesture is a user-interface control gesture; (iii) moving a point of focus on the user interface in accordance with the user-interface control gesture; and (iv) in accordance with a determination that the point of focus is within a threshold distance of a selectable user interface element, selecting the user interface element by snapping the point of focus to the selectable user interface element. In some embodiments, the data generated corresponds to muscle movement during the performance of the in-air hand gesture. In some embodiments, the point of focus is moved in accordance with a gesture distance from an initial position (e.g., as described in FIGS. 7S-7U).

(B2) In some embodiments of B1, the method further includes: (i) after selecting the user interface element, detecting a second user-interface control gesture; and (ii) in accordance with a determination that movement of the second user-interface control gesture would cause the point of focus to move beyond a second threshold distance of the selected user interface element, deselecting the user interface element (e.g., as described previously with respect to A11).

(B3) In some embodiments of B2, the method further includes, in accordance with deselecting the user interface element, selecting a different selectable user interface element by snapping the point of focus to the different selectable user interface element (e.g., as described previously with respect to A12).

(B4) In some embodiments of any of B1-B3, the in-air hand gesture includes one or more wrist movements, and the point of focus moves in accordance with wrist angle information corresponding to the one or more wrist movements (e.g., as described previously with respect to A1).

(B5) In some embodiments of any of B1-B4, the point of focus is presented as a cursor. In some embodiments, the point of focus is presented as a cursor in some situations (e.g., when between selectable user interface elements) and not presented as a cursor in other situations (e.g., when overlaid with a selectable user interface element).

(B6) In some embodiments of any of B1-B5, the method further includes: (i) receiving, via the one or more sensors, data generated from performance of an additional in-air hand gesture by the user; (ii) determining that the additional in-air hand gesture is an execution gesture; and (iii) in accordance with the execution gesture, executing a command corresponding to the execution gesture and the selected user interface element. For example, the additional in-air gesture comprises the user tapping the thumb (phalange) against the index finger to execute a command associated with the selected user interface element.

(B7) In some embodiments of any of B1-B6, the method further includes: (i) receiving, via the one or more sensors, data generated from performance of an additional in-air hand gesture by the user; (ii) determining that the additional in-air hand gesture is a navigation gesture; and (iii) in accordance with the navigation gesture, snapping the point of focus to an adjacent selectable user interface element. As an example, the pinch gesture causes a point of focus to scroll to the next item such as a next photo in a photo gallery. In some embodiments, a user-interface control gesture is performed by a user making a pinch gesture using a first phalange (pointer finger) with another phalange (thumb) resulting in selecting the next item in a list.

(B8) In some embodiments of any of B1-B7: (i) the user interface includes a plurality of selectable user interface elements organized in a grid; and (ii) the method further includes: (a) receiving, via the one or more neuromuscular-signal sensors, data generated from performance of an additional navigation gesture; (b) in accordance with the additional navigation gesture having a first directionality, snapping the point of focus to a next user interface element in the grid; and (c) in accordance with the additional navigation gesture having a second directionality, snapping the point of focus to a previous user interface element in the grid (e.g., as described previously with respect to A15). In some embodiments, a user-interface control gesture is performed by a user making a pinch gesture using a second phalange (middle finger) with another phalange (thumb) resulting in selecting the previous item in the list.

(B9) In some embodiments of any of B1-B8: (i) the user-interface control gesture is maintained for an amount of time; and (ii) the method further includes, while the user-interface control gesture is maintained for the amount of time, scrolling the point of focus through a plurality of selectable user interface elements (e.g., as described previously with respect to A3). For example, FIGS. 2D and 2E show the user interface 206 scrolling photos in accordance with a held pinch gesture. In some embodiments, the system starts the scrolling after the gesture is held for at least a preset amount of time (e.g., 0.5, 1, or 2 seconds).

(B10) In some embodiments of B9, the method further includes, in accordance with a determination that the user-interface control gesture is released, ceasing to scroll the point of focus, and selecting a nearest user interface element to the point of focus. For example, the user makes a pinch gesture with two phalanges and holds it, resulting in continuously scrolling until the user releases the gesture.

(B11) In some embodiments of any of B1-B10, the user interface is displayed via a head-wearable device worn by the user. For example, the user interface could be on a smart watch, glasses, phone, monitor, or the like. In some embodiments, the user interface is part of an augmented-reality or virtual-reality environment.

(B12) In some embodiments of any of B1-B11, the one or more sensors of the wrist-wearable device include one or more of an electromyography (EMG) sensor, and an inertial measurement unit (IMU) sensor. In some embodiments, gestures are detected using one or more of: an IMU sensor and an EMG sensor.

(C1) In another aspect, some embodiments include a method of presenting at a head-wearable device (e.g., the head-wearable device 202), a user interface that includes a first quick-action user interface element associated with a first direction (e.g., the quick-action user interface elements 602 in FIG. 6A). For example, the user interface can be a home-screen/landing page user interface with which users navigate through an augmented-reality environment to access applications, functions, and the like.

The method includes: (i) receiving, from a wrist-wearable device (e.g., the wrist-wearable device 120), an indication of performance of a first in-air directional-pad ("d-pad") gesture in which a user's thumb moves in the first direction (e.g., the upward direction shown in FIG. 6B); (ii) in response to receiving the indication of the performance of the first in-air d-pad gesture in which the user's thumb moves in the first direction (e.g., across a top of the user's index finger and substantially without moving other fingers or the user's hand as a whole): (a) ceasing to display the user interface; and (b) presenting, via the head-wearable device, information associated with the first quick-action user interface element (e.g., FIG. 7B shows activation of a messaging application corresponding to quick-action user interface element 602a), and a return user interface element (e.g., quick-action user interface element 704) associated with a second direction, substantially opposite to the first direction; (iii) receiving, from the wrist-wearable device, an indication of performance of a second in-air d-pad gesture in which the user's thumb moves in the second direction (e.g., as shown in FIG. 7L); (iv) in response to receiving the indication of the performance of the second in-air hand d-pad gesture in which the user's thumb moves in the second direction: (a) ceasing to present the information associated with the first quick-action user interface element; and (b) presenting, via the head-wearable device, the user interface that includes the first quick-action user interface element associated with the first direction (e.g., as shown in FIG. 7L). In some embodiments, a home screen quick-action user interface element (e.g., a quick-action icon) is displayed on each screen to allow a user to do a d-pad gesture to return back to the home screen.

(C2) In some embodiments of C1, the user interface that includes the first quick-action user interface element associated with the first direction also includes a second quick-action user interface element associated with the second direction (e.g., the notifications application quick-action user interface element 602c in FIG. 6A). The method further includes: (i) while presenting the user interface that includes the first quick-action user interface element and the second quick-action user interface element, receiving, from the wrist-wearable device, an indication of performance of a third in-air d-pad gesture in which the user's thumb moves in the second direction (e.g., across a top of the user's index finger and substantially without moving other fingers or the user's hand as a whole); and (ii) in response to receiving the indication of the performance of the third in-air d-pad gesture in which the user's thumb moves in the second direction: (a) ceasing to display the user interface; and (b) presenting, via the head-wearable device, information associated with the second quick-action user interface element and the return user interface element associated with the second direction.

(C3) In some embodiments of C2, the user interface that includes the first quick-action user interface element associated with the first direction and the second quick-action user interface element associated with the second direction also includes a third quick-action user interface element (e.g., the quick-action user interface element 602b) associated with a third direction (e.g., substantially perpendicular (within +/−5 degrees of perpendicular) to the first and second directions), and the method further includes: (i) while presenting the user interface that includes the first quick-action user interface element, the second quick-action user interface element, and the third quick-action user interface element, receiving, from the wrist-wearable device, an indication of performance of a fourth in-air directional-pad ("d-pad") gesture in which the user's thumb moves in the third direction; and (ii) in response to receiving the indication of the performance of the fourth in-air d-pad gesture in which the user's thumb moves in the third direction: (a) ceasing to display the user interface; and (b) presenting, via the head-wearable device, information associated with the third quick-action user interface element, and the return user interface element associated with the second direction (e.g., the music user interface displayed in FIG. 7M in response to activation of the music application quick-action user interface element 602*b* in FIG. 7L).

(C4) In some embodiments of C3, wherein the user interface that includes the first quick-action user interface element associated with the first direction, the second quick-action user interface element associated with the second direction, and the third quick-action user interface element associated with a third direction also includes a fourth quick-action user interface element associated with a fourth direction (e.g., substantially perpendicular (within +/−5 degrees of perpendicular) to the first and second directions), and the method further includes: (i) while presenting the user interface that includes the first quick-action user interface element, the second quick-action user interface element, the third quick-action user interface element, and the fourth quick-action user interface, receiving, from the wrist-wearable device, an indication of performance of a fifth in-air directional-pad ("d-pad") gesture in which the user's thumb moves in the third direction; and (ii) in response to receiving the indication of the performance of the fifth in-air d-pad gesture in which the user's thumb moves in the fourth direction: (a) ceasing to display the user interface; and (b) presenting, via the head-wearable device, information associated with the fourth quick-action user interface element, and the return user interface element associated with the second direction.

(C5) In some embodiments of C4, the performance of the first, second, third, fourth, and/or fifth in-air d-pad gestures are detected using a plurality of neuromuscular-signal sensors of the wrist-wearable device (e.g., sensor channels 6014*a* and 6014*b* and/or electrodes 6013*a*-6013*d* of FIG. 12A).

(C6) In some embodiments of any of C1-C5, the user interface is caused to be presented via the head-wearable device in response to a quick-action gesture (e.g., a wake gesture) detected via a low-power gesture detector on the wrist-wearable device. For example, prior to presenting the user interface, the wrist-wearable device is operating in a low power mode in which it is responsive to one or more wake gesture (e.g., but not responsive to other types of gestures). In some embodiments, the wrist-wearable device includes a low-power detector (e.g., a microcontroller) and a high-power detector (e.g., a CPU and/or DSP). In some embodiments, while operating in the low-power mode, the wrist-wearable device detects, identifies, and/or responds to quick-action gestures using a low-power detector and not the high-power detector. For example, the wrist-wearable device detects, identifies, and/or responds to quick-action gestures while maintaining the high-power detector in an inactive state.

(C7) In some embodiments of any of C1-C6, the head-wearable device is a pair of augmented-reality smart glasses (e.g., the AR system 7000) in which user interfaces are viewable in conjunction with pass-through views of physical objects in the real-world (e.g., as illustrated in FIG. 6E).

(C8) In some embodiments of any of C1-C7, the information associated with the first quick-action user interface element is application content associated with a messaging application (e.g., the messages shown in FIG. 7C).

(C9) In some embodiments of any of C2-C8, the information associated with the second quick-action user interface element is application content associated with a music application (e.g., the music user interface shown in FIG. 7M).

(C10) In some embodiments of C9, the method further includes detecting a gating in-air hand gesture (e.g., the pinch gesture shown in FIG. 7N) that is maintained while a wrist-roll gesture is performed (e.g., the wrist-roll gesture shown in FIG. 7O) to manipulate a volume level associated with the music application (e.g., a volume level corresponding to the volume indicator 732).

(C11) In some embodiments of any of C3-C10, the information associated with the third quick action user interface element is application content associated with an application that is distinct from respective applications associated with the first and second quick-action user interface elements (e.g., information associated with the notifications application quick-action user interface element 602*c* or the camera application quick-action user interface element 602*d* in FIG. 6A).

(C12) In some embodiments of any of C3-C11, the information associated with the fourth quick-action user interface element is application content associated with an application that is distinct from respective applications associated with the first, second, and third quick-action user interface elements.

In some embodiments, one or more of the gestures described above (e.g., with respect to A1-A16, B1-B12, and/or C1-C12) are detected with an optical sensor (e.g., a camera) or sensors associated with an inertial measurement unit (IMU) rather than (or in addition to, via fusing the sensor inputs to detect the various in-air hand gestures described herein) the one or more neuromuscular-signal sensors. In some embodiments, the one or more gestures described above (e.g., with respect to A1-A16, B1-B12, and/or C1-C12) are replaced with gestures performed by other parts of the user's body (e.g., head gestures, leg gestures, or torso gestures). As one example, an in-air priming gesture can be detected using one or more of neuromuscular-signal sensors, data from an IMU, and cameras; as another example, a control gesture can be a shaking of the user's head (as if the user is indicating "No") or a nodding of the user's head (as if the user is indicating "Yes").

In some embodiments, the wearable device detects neuromuscular signals travelling through the user's neck or back, which can be done using neuromuscular-signal sensors coupled with the VR goggles or the AR glasses in some example embodiments. In some embodiments, the one or more gestures described above (e.g., with respect to A1-A16, B1-B12, and/or C1-C12) are replaced with (or performed using) in-air hand gestures on a controller (e.g., a handheld controller or foot pedal controller). In some embodiments, the one or more in-air hand gestures described above (e.g., with respect to A1-A16, B1-B12, and/or C1-C12) are replaced with audio commands (e.g., spoken word commands or non-word commands such as a tongue click).

In another aspect, some embodiments include a computing system including one or more processors and memory coupled to the one or more processors, the memory storing one or more programs configured to be executed by the one or more processors, the one or more programs including instructions for performing any of the methods described herein (e.g., methods 800, 900, and 1000 and A1-A16, B1-B12, and C1-C12 above).

In yet another aspect, some embodiments include a non-transitory computer-readable storage medium storing one or more programs for execution by one or more processors of a computing system, the one or more programs including instructions for performing any of the methods described herein (e.g., methods 800, 900, and 1000 and A1-A16, B1-B12, and C1-C12 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method, comprising:
    causing display of a user interface comprising a plurality of control elements having a plurality of distinct locations on the user interface;
    receiving, via one or more neuromuscular-signal sensors of a wrist-wearable device worn by a user, data generated during performance of an in-air gesture that includes movement by one or more of a wrist of the user, a hand of the user, and an arm of the user;
    in response to receiving the data, causing display of a point of focus element to move independently of the plurality of control elements on the user interface in accordance with the in-air gesture such that the point of focus element moves from a first location to a location of a control element of the plurality of control elements, thereby selecting the control element of the user interface;
    wherein causing the point of focus element to move comprises:
        in accordance with a determination that a portion of the in-air gesture is a phalange-based gesture, before causing the point of focus element to move to the location of the control element, causing the point of focus element to snap from a first control element in the user interface to a second control element in the user interface; or
        in accordance with a determination that a portion of the in-air gesture is a wrist-based or forearm-based gesture, before causing the point of focus element to move to the location of the control element, causing the point of focus element to move to a location distinct from the locations of the plurality of control elements in the user interface according to directionality of the in-air gesture;
    while the point of focus element is selecting the control element of the user interface, receiving, via the one or more neuromuscular-signal sensors, additional data generated during performance of an additional in-air gesture by the user;
    determining that the additional in-air gesture is an execution gesture; and
    executing a command corresponding to the execution gesture and the control element.

2. The method of claim 1, further comprising, prior to causing the point of focus element to move;
    identifying the in-air gesture as being part of a navigation gesture, wherein the point of focus element is moved in accordance with the identification, or
    identifying an initial position of the wrist of the user, wherein the point of focus element is moved in accordance with movement of the wrist of the user from the initial position.

3. The method of claim 1, wherein the in-air gesture comprises the wrist of the user rotating from an initial position to a rotated position, and wherein the wrist of the user is maintained in the rotated position for an amount of time; and
    the method further comprises, while the wrist of the user is maintained in the rotated position for the amount of time, causing the point of focus element to scroll through the plurality of control elements on the user interface.

4. The method of claim 3, further comprising causing the point of focus element to cease to scroll and causing selection of a nearest control element to the point of focus element in accordance with the wrist of the user returning to the initial position.

5. The method of claim 1, further comprising, in accordance with a determination that the point of focus element is within a threshold distance of a third control element on the user interface, causing selection of the third control element by causing the point of focus element to snap to the third control element.

6. The method of claim 5, further comprising:
    after selecting the third control element, detecting a user-interface control gesture; and
    in accordance with a determination that movement of the user-interface control gesture would cause the point of focus element to move beyond a second threshold distance of the third control element, causing the third control element to be deselected.

7. The method of claim 6, further comprising, in accordance with causing the third control element to be deselected, causing selection of a different control element by causing the point of focus element to snap to the different control element.

8. The method of claim 1, wherein the point of focus element has a first appearance while selecting the control element and a second appearance while not selecting any control element of the user interface, the second appearance being different than the first appearance.

9. The method of claim 1, wherein the point of focus element is caused to be displayed while a portion of the in-air gesture is maintained, and wherein the point of focus element ceases to be displayed in accordance with the portion of the in-air gesture being released.

10. A system comprising:
one or more processors; and
memory comprising instructions for:
causing display of a user interface comprising a plurality of control elements having a plurality of distinct locations on the user interface;
receiving, via one or more neuromuscular-signal sensors of a wrist-wearable device worn by a user, data generated during performance of an in-air gesture that includes movement by a wrist of the user;
in response to receiving the data, causing a display of a point of focus element to move independently of the plurality of control elements on the user interface in accordance with the in-air gesture such that the point of focus element moves from a first location to a location of a control element of the plurality of control elements, thereby selecting the control element of the user interface;
wherein causing the point of focus element to move comprises:
in accordance with a determination that a portion of the in-air gesture is a phalange-based gesture, before causing the point of focus element to move to the location of the control element, causing the point of focus element to snap from a first control element in the user interface to a second control element in the user interface; or
in accordance with a determination that a portion of the in-air gesture is a wrist-based or forearm-based gesture, before causing the point of focus element to move to the location of the control element, causing the point of focus element to move to a location distinct from locations of the plurality of control elements in the user interface according to directionality of the in-air gesture;
while the point of focus element is selecting the control element of the user interface, receiving, via the one or more neuromuscular-signal sensors, additional data generated during performance of an additional in-air gesture by the user;
determining that the additional in-air gesture is an execution gesture; and
executing a command corresponding to the execution gesture and the control element.

11. The system of claim 10, wherein the memory further comprises instructions for, prior to causing the point of focus element to move;
identifying the in-air gesture as being part of a navigation gesture, wherein the point of focus element is moved in accordance with the identification, or
identifying an initial position of the wrist of the user, wherein the point of focus element is moved in accordance with movement of the wrist of the user from the initial position.

12. The system of claim 10, wherein the in-air gesture comprises the wrist of the user rotating from an initial position to a rotated position, and wherein the wrist of the user is maintained in the rotated position for an amount of time; and
the memory further comprises instructions for, while the wrist of the user is maintained in the rotated position for the amount of time, causing the point of focus element to scroll through the plurality of control elements on the user interface.

13. The system of claim 12, wherein the memory further comprises instructions for causing the point of focus element to cease to scroll and causing selection of a nearest control element to the point of focus element in accordance with the wrist of the user returning to the initial position.

14. The system of claim 10, wherein the point of focus element has a first appearance while selecting the control element and a second appearance while not selecting any control element of the user interface, the second appearance being different than the first appearance.

15. The system of claim 10, wherein the point of focus element is caused to be displayed while a portion of the in-air gesture is maintained, and wherein the point of focus element ceases to be displayed in accordance with the portion of the in-air gesture being released.

16. A non-transitory computer-readable storage medium including instructions that, when executed by a wearable device, cause the wearable device to:
cause display of a user interface comprising a plurality of control elements having a plurality of distinct locations on the user interface;
receive, via one or more neuromuscular-signal sensors of a wrist-wearable device worn by a user, data generated during performance of an in-air gesture that includes movement by one or more of a wrist of the user, a hand of the user, and an arm of the user;
in response to receiving the data, cause a display of a point of focus element to move independently of the plurality of control elements on the user interface in accordance with the in-air gesture such that the point of focus element moves from a first location to a location of a control element of the plurality of control elements, thereby selecting the control element of the user interface;
wherein causing the point of focus element to move comprises:
in accordance with a determination that a portion of the in-air gesture is a phalange-based gesture, before causing the point of focus element to move to the location of the control element, cause the point of focus element to snap from a first control element in the user interface to a second control element in the user interface; or
in accordance with a determination that a portion of the in-air gesture is a wrist-based or forearm-based gesture, before causing the point of focus element to move to the location of the control element, cause the point of focus element to move to a location distinct from the locations of the plurality of control elements in the user interface according to directionality of the in-air gesture;
while the point of focus element is selecting the control element of the user interface, receive, via the one or more neuromuscular-signal sensors, additional data generated during performance of an additional in-air gesture by the user;

determine that the additional in-air gesture is an execution gesture; and execute a command corresponding to the execution gesture and the control element.

17. The non-transitory computer-readable storage medium of claim 16, further comprising instructions that, when executed by the wearable device, cause the wearable device to, prior to causing the point of focus element to move;

identify the in-air gesture as being part of a navigation gesture, wherein the point of focus element is moved in accordance with the identification, or identify an initial position of the wrist of the user, wherein the point of focus element is moved in accordance with movement of the wrist of the user from the initial position.

18. The non-transitory computer-readable storage medium of claim 16, wherein the in-air gesture comprises the wrist of the user rotating from an initial position to a rotated position, and wherein the wrist of the user is maintained in the rotated position for an amount of time; and further comprising instructions that, when executed by the wearable device, cause the wearable device to, while the wrist of the user is maintained in the rotated position for the amount of time, cause the point of focus element to scroll through the plurality of control elements on the user interface.

19. The non-transitory computer-readable storage medium of claim 16, wherein the point of focus element has a first appearance while selecting the control element and a second appearance while not selecting any control element of the user interface, the second appearance being different than the first appearance.

20. The non-transitory computer-readable storage medium of claim 16, wherein the point of focus element is caused to be displayed while a portion of the in-air gesture is maintained, and wherein the point of focus element ceases to be displayed in accordance with the portion of the in-air gesture being released.

* * * * *